US007200530B2

(12) United States Patent
Brown et al.

(10) Patent No.: US 7,200,530 B2
(45) Date of Patent: *Apr. 3, 2007

(54) ARCHITECTURE FOR DISTRIBUTED COMPUTING SYSTEM AND AUTOMATED DESIGN, DEPLOYMENT, AND MANAGEMENT OF DISTRIBUTED APPLICATIONS

(75) Inventors: Mathilde C. Brown, Seattle, WA (US); Charlie D. Chase, Woodinville, WA (US); Kevin Grealish, Seattle, WA (US); Galen C. Hunt, Bellevue, WA (US); Aamer Hydrie, Seattle, WA (US); David Noble, Redmond, WA (US); Geoffrey Outhred, Seattle, WA (US); Glenn R. Peterson, Kenmore, WA (US); Bassam Tabbara, Seattle, WA (US); Alexander Torone, Sammamish, WA (US); Robert V. Welland, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/321,280

(22) Filed: Dec. 29, 2005

(65) Prior Publication Data

US 2006/0106585 A1    May 18, 2006

Related U.S. Application Data

(63) Continuation of application No. 10/789,440, filed on Feb. 26, 2004, now Pat. No. 7,072,807.

(60) Provisional application No. 60/452,736, filed on Mar. 6, 2003.

(51) Int. Cl.
    *G06F 17/50* (2006.01)
(52) U.S. Cl. .......................................... 703/1; 709/201
(58) Field of Classification Search .................. 703/1; 709/201, 203, 226; 707/110, 10, 102
    See application file for complete search history.

(56) References Cited

U.S. PATENT DOCUMENTS

| 5,958,009 | A | 9/1999 | Friedrich et al. |
|---|---|---|---|
| 6,336,138 | B1 | 1/2002 | Caswell et al. |
| 6,691,146 | B1 | 2/2004 | Zinky et al. |
| 6,823,373 | B1 | 11/2004 | Pancha et al. |
| 6,829,770 | B1 | 12/2004 | Hinson et al. |
| 6,868,454 | B1 | 3/2005 | Kubota et al. |
| 6,898,791 | B1 | 5/2005 | Chandy et al. |
| 6,907,395 | B1 | 6/2005 | Hunt et al. |
| 7,072,807 | B2 * | 7/2006 | Brown et al. .................. 703/1 |
| 2002/0198995 | A1 | 12/2002 | Liu et al. |

FOREIGN PATENT DOCUMENTS

WO    WO0073929    12/2000

* cited by examiner

*Primary Examiner*—Albert W. Paladini
(74) *Attorney, Agent, or Firm*—Lee & Hayes, PLLC

(57) ABSTRACT

A design tool includes a service definition model to enable abstract description of distributed computing systems and distributed applications. The design tool also includes a schema to dictate how functional operations within the service definition model are to be specified. The functional operations include design of distributed applications, deployment of distributed applications, and management of distributed applications.

9 Claims, 93 Drawing Sheets

| Settings Schema | Deployment Manifest | Port Implementation Reference |
|---|---|---|

*Fig. 9*

| Settings Values | Deployment Values | Constraints Values | Port Types or Hosted Type List |
|---|---|---|---|

*Fig. 10*

Application
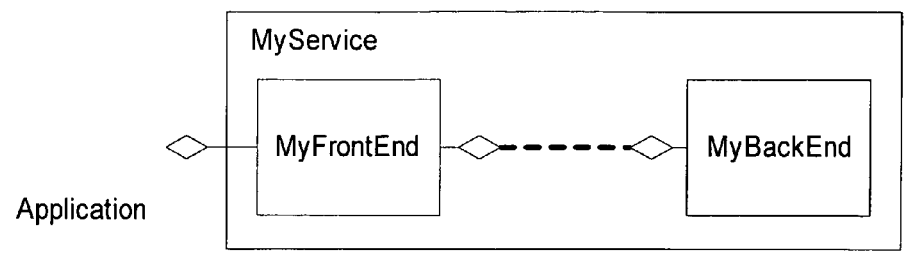
Deployment
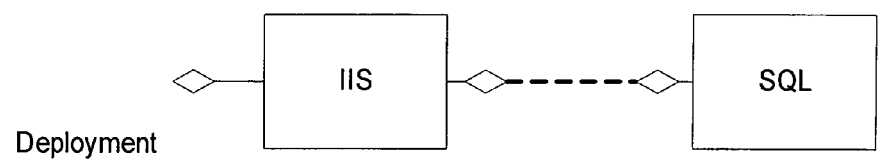
VDC
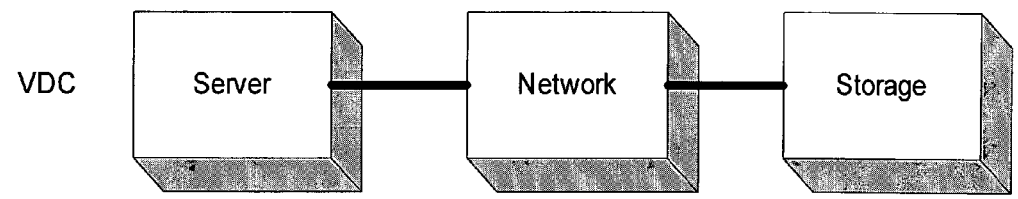
Hardware
Fig. 11

| Initial Phase | App Development Phase | Install Phase | Running Phase |
|---|---|---|---|
| Synch datacenter & LIM | Code/Test versus LIM | Install Application | Scale-out Topology- |

Room 42/4814,
Power Grid 4800

| ID | Src | Dst | Dual | Category | Name | Driver Identifier | Unique Identifier | Cardin | Notes | | |
|---|---|---|---|---|---|---|---|---|---|---|---|
| 1 | | | | Power Source | Grid4800 | | | | | | |
| 2 | | | | Physical Container | Room424814 | | | | | | |
| 3 | | | | X86 PC | PC00 | | | | | Physical Entities | Entities |
| 4 | | | | Disk | IBM372720 | | | | | | |
| 5 | | | | Disk | QuantCX20 | | | | | | |
| 6 | | | 7 | Network Device | Summit48A | | | | | | |
| 7 | | | 6 | Network Device | Summit48B | | | | | | |
| 8 | | | | Network Device | Maxtor4100 | | | | | | |
| 9 | | | | Disk | MaxtorD540X | | | | | | |
| 10 | 1 | | | Power | AC Outlets | | | | | Pwr | |
| 11 | 2 | | | Physical | Inside | | | | | | |
| 12 | 3 | | | ATA | IDE0 | | | 2 | | | |
| 13 | 3 | | | ATA | IDE1 | | | 2 | | | |
| 14 | 3 | | 15 | Ethernet | NIC0 | | mac:00-B0-D0-20-3F-32 | 1 | | PC Connectors | |
| 15 | 3 | | 14 | Ethernet | NIC1 | | mac:00-A0-C9-A0-0B-06 | 1 | | | |
| 16 | 3 | | | Power | DC Connector | | | | | | |
| 17 | 3 | | | Power | AC Connector | | | 1 | | | |
| 18 | 3 | | | Physical | Outside | | | | | | |
| 19 | 3 | | | Physical | Inside | | | 3 | | | |
| 20 | 4 | | | ATA | Port | | | 1 | | | |
| 21 | 4 | | | Power | DC Connector | | | | | Disk | Connectors |
| 22 | 4 | | | Physical | Outside | | | | | | |
| 23 | 5 | | | ATA | Port | | | 1 | | | |
| 24 | 5 | | | Power | DC Connector | | | | | Disk | |
| 25 | 5 | | | Physical | Outside | | | | | | |
| 26 | 6 | | 30 | Ethernet | Port 32 | | | 1 | | | |
| 27 | 6 | | 31 | Ethernet | Port 41 | | | 1 | | Switch | |
| 28 | 6 | | | Power | AC Connector | | | | | | |
| 29 | 6 | | | Physical | Outside | | | | | | |
| 30 | 7 | | 26 | Ethernet | Port 11 | | | 1 | | | |
| 31 | 7 | | 27 | Ethernet | Port 12 | | | 1 | | Switch | |
| 32 | 7 | | | Power | AC Connector | | | | | | |
| 33 | 7 | | | Physical | Outside | | | | | | |
| 34 | 8 | | 35 | Ethernet | NIC0 | | mac:00-A0-29-FE-CA-20 | 1 | | | |
| 35 | 8 | | 34 | Ethernet | NIC1 | | mac:00-A0-29-FE-CA-21 | 1 | | | |
| 36 | 8 | | | ATA | IDE0 | | | 2 | | NAS | |
| 37 | 8 | | | Power | DC Connector | | . | | | | |
| 38 | 8 | | | Power | AC Connector | | | | | | |
| 39 | 8 | | | Physical | Outside | | | | | | |
| 40 | 8 | | | Physical | Inside | | | 3 | | | |
| 41 | 9 | | | ATA | Port | | | 1 | | | |
| 42 | 9 | | | Power | DC Connector | | | | | Disk | |
| 43 | 9 | | | Physical | Outside | | | | | | |
| 44 | 26 | 14 | 45 | Ethernet | Wire0 | | | | | PC to Envir. | |
| 45 | 30 | 15 | 44 | Ethernet | Wire1 | | | | | | |
| 46 | 10 | 17 | | Power | Cord0 | | | | | | |
| 47 | 11 | 18 | | Physical | Contained | | | | | | |
| 48 | 12 | 20 | | ATA | Cable | | | | | Disk to PC | |
| 49 | 16 | 21 | | Power | DC Cable | | | | | | |
| 50 | 19 | 22 | | Physical | Internal | | | | | PC | Connections |
| 51 | 13 | 23 | | ATA | Cable | | | | | | |
| 52 | 16 | 24 | | Power | DC Cable | | | | | Disk to PC | |
| 53 | 19 | 25 | | Physical | Internal | | | | | PC | |
| 54 | 27 | 34 | 55 | Ethernet | Wire2 | | | | | | |
| 55 | 31 | 35 | 54 | Ethernet | Wire3 | | | | | NAS to Env. | |
| 56 | 10 | 38 | | Power | Cord0 | | | | | | |
| 57 | 11 | 39 | | Physical | Contained | | | | | | |
| 58 | 36 | 41 | | ATA | Cable | | | | | Disk to NAS | |
| 59 | 37 | 42 | | Power | Cable | | | | | | |
| 60 | 40 | 43 | | Physical | Internal | | | | | | |

Fig. 65

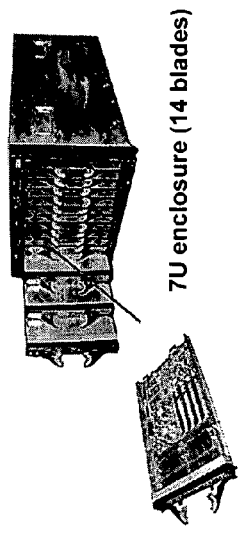

7U enclosure (14 blades)

IBM BladeCenter
- Dual Xeon
- 8GB ECC RAM
- iSCSI or Fibre Channel storage
- (4) Gigabit Ethernet
- (4) 1200 W power supplies
- 98 blades per 42U rack

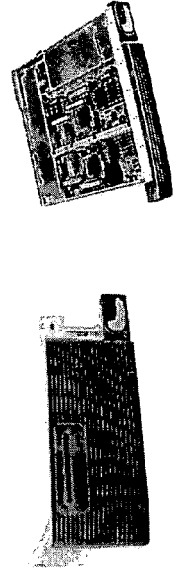

Processing Blade egenera BladeFrame
- 2 or 4-way Xeon 1.4GHz
- 12GB ECC RAM
- Redundant 10/100, 1 Gb or Fibre Channel
- Redundant power supplies
- Hot pluggable blades
- 24 processing blades per rack

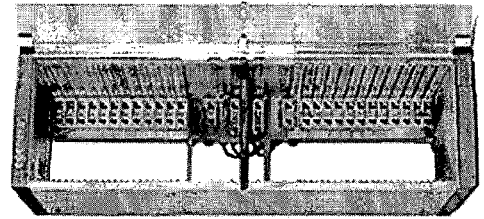

Control Blade

Fig. 89

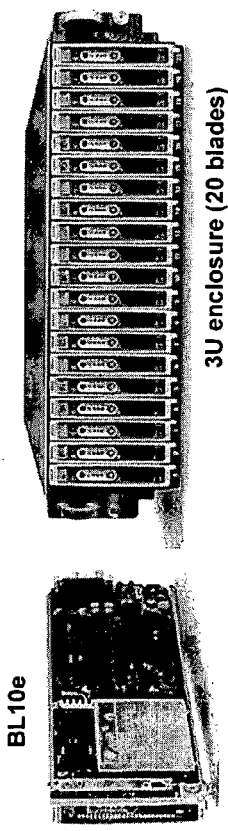

BL10e 3U enclosure (20 blades)

HPQ Proliant BL e-class
- Pentium III 700MHz
- 512MB – 1GB ECC RAM
- 30GB ATA Hard Disk
- Dual 10/100 Fast Ethernet
- Layer 2 switch, (4) Gigabit uplinks
- Redundant 600 W power supplies
- 280 blades per 42U rack, 25W per slot

Dell PowerEdge 1655MC
- Dual Pentium III 1.2GHz
- 128MB – 2GB ECC RAM
- 36-146GB SCSI Hard Disk
- Dual Gigabit Ethernet
- (2) Layer 2 switches, (4) Gigabit uplinks
- Redundant 1040 W power supplies
- 84 blades per 42U rack

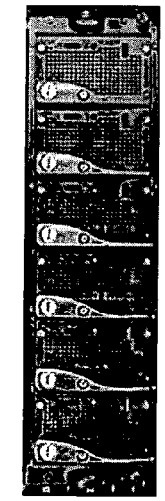

3U enclosure (6 blades)

```
using System;
using System.SQL;
using System.IIS;
assembly name MyService;

componenttype MyFrontEnd :
    ASPApplication {
    port SQLClient catalog;
    implementation "MyFE, MyCLRApp"
} componenttype MyBackEnd :
    SQLDatabase {
    implementation "MySQL, MyCLRApp"
} componenttype MyService
{
    component MyFrontEnd fe;
    component MyBackEnd be;
    port http = fe.http;
    wire TDS tds {
        fe.catalog;
        be.sql;
    }
    implementation "MyService, MyCLRApp"
}
```

Fig. 95

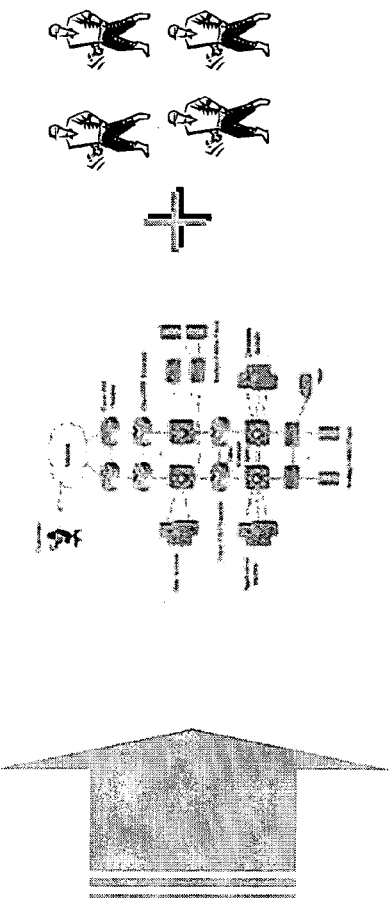
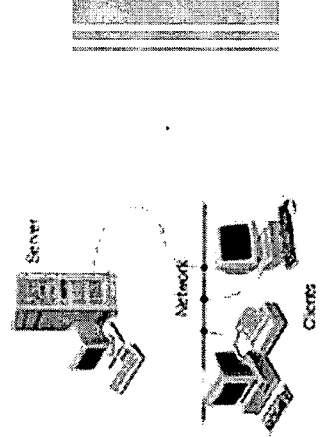
Fig. 103

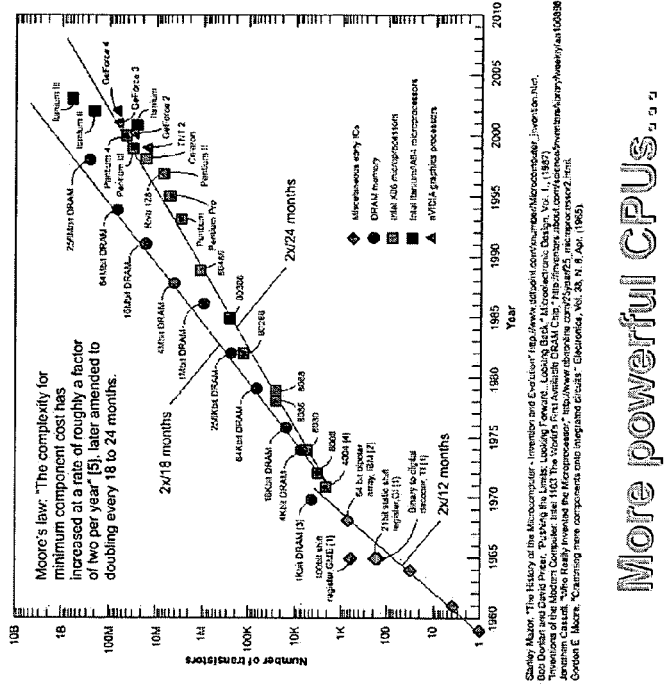
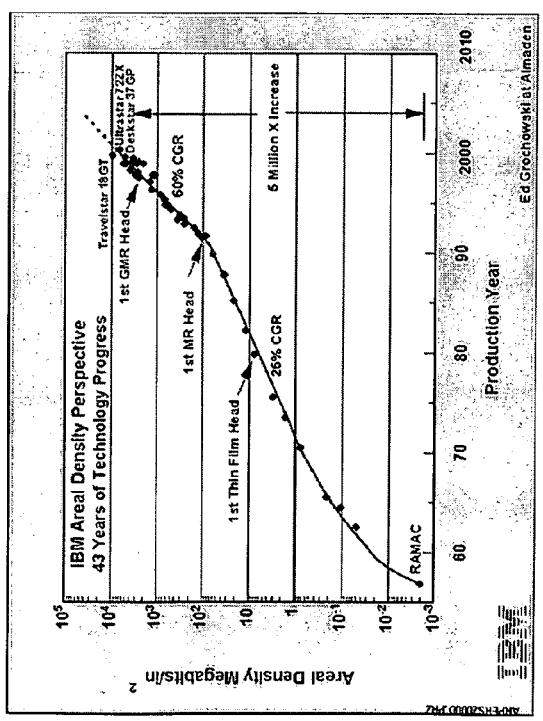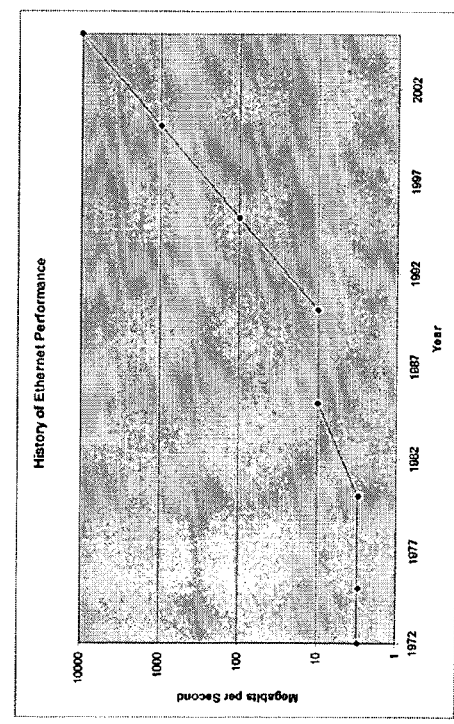
Fig. 104

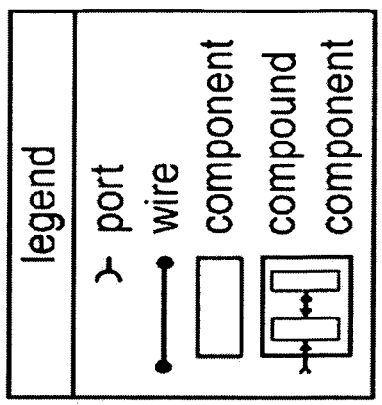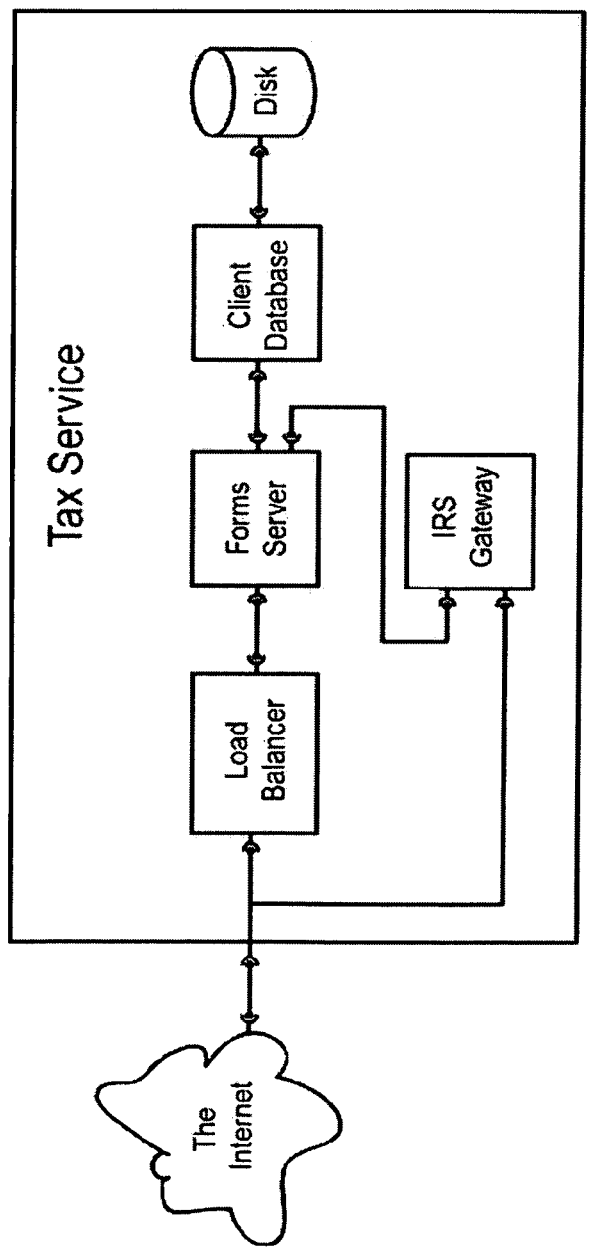
Fig. 109

ARCHITECTURE FOR DISTRIBUTED COMPUTING SYSTEM AND AUTOMATED DESIGN, DEPLOYMENT, AND MANAGEMENT OF DISTRIBUTED APPLICATIONS

RELATED APPLICATIONS

This application is a Continuation of application Ser. No. 10/789,440, filed Feb. 26, 2004 now U.S. Pat. No. 7,072,807, entitled "Architecture for Distributed Computing System and Automated Design, Deployment, and Management of Distributed Applications", and incorporated herein by reference. That application claims the benefit of U.S. Provisional Application No. 60/452,736, filed Mar. 6, 2003, the disclosure of which is incorporated herein by reference.

This patent application is also related to the following US patent applications (all of which are incorporated herein by reference):

U.S. patent application Ser. No. 10/382,942, filed on Mar. 6, 2003, titled "Virtual Network Topology Generation";

U.S. patent application Ser. No. 09/695,812, filed on Oct. 24, 2000, titled "System and Method for Distributed Management of Shared Computers";

U.S. patent application Ser. No. 09/695,813, filed on Oct. 24, 2000, titled "System and Method for Logical Modeling of Distributed Computer Systems";

U.S. patent application Ser. No. 09/695,820, filed on Oct. 24, 2000, titled "System and Method for Restricting Data Transfers and Managing Software Components of Distributed Computers";

U.S. patent application Ser. No. 09/695,821, filed on Oct. 24, 2000, titled "Using Packet Filters and Network Virtualization to Restrict Network Communications";

U.S. patent application Ser. No. 09/696,707, filed on Oct. 24, 2000, titled "System and Method for Designing a Logical Model of Distributed Computer System and Deploying Physical Resources According to the Logical Model"; and U.S. patent application Ser. No. 09/696,752, filed on Oct. 24, 2000, titled "System and Method Providing Automatic Policy Enforcement in a Multi-Computer Service Application".

TECHNICAL FIELD

The invention relates to an architecture for a distributed computing system and automated design, deployment, and management of distributed applications on the distributed computing system.

BACKGROUND

Internet usage has exploded over the past several years and continues to grow. People have become very comfortable with many services offered on the World Wide Web (or simply "Web"), such as electronic mail, online shopping, gathering news and information, listening to music, viewing video clips, looking for jobs, and so forth. To keep pace with the growing demand for Internet-based services, there has been tremendous growth in the computer systems dedicated to hosting Websites, providing backend services for those sites, and storing data associated with the sites.

One type of distributed computer system is an Internet data center (IDC), which is a specifically designed complex that houses many computers for hosting Internet-based services. IDCs, which also go by the names "Webfarms" and "server farms", typically house hundreds to thousands of computers in climate-controlled, physically secure buildings. These computers are interconnected to run one or more programs supporting one or more Internet services or Websites. IDCs provide reliable Internet access, reliable power supplies, and a secure operating environment.

FIG. 1 shows an Internet data center 100. It has many server computers 102 arranged in a specially constructed room. The computers are general-purpose computers, typically configured as servers. An Internet data center may be constructed to house a single site for a single entity (e.g., a data center for Yahoo! or MSN), or to accommodate multiple sites for multiple entities (e.g., an Exodus center that host sites for multiple companies).

The IDC 100 is illustrated with three entities—entity A, entity B, and entity C—that share the computer resources. These entities represent various companies that want a presence on the Web. The IDC 100 has a pool of additional computers 104 that may be used by the entities at times of heavy traffic. For example, an entity engaged in online retailing may experience significantly more demand during the Christmas season. The additional computers give the IDC flexibility to meet this demand.

Today, large IDCs are complex and often called upon to host multiple applications. For instance, some websites may operate several thousand computers, and host many distributed applications. These distributed applications often have complex networking requirements that require operators to physically connect computers to certain network switches, as well as manually arrange the wiring configurations within the IDC to support the complex applications. As a result, this task of building physical network topologies to conform to the application requirements can be a cumbersome, time consuming process that is prone to human error. Accordingly, there is a need for improved techniques for designing and deploying distributed applications onto the physical computing system.

SUMMARY

An architecture and methodology for designing, deploying, and managing a distributed application onto a distributed computing system is described.

BRIEF DESCRIPTION OF THE DRAWINGS

Similar reference numbers are used throughout the figures to reference like components and/or features.

FIGS. 9–10 illustrate an example SDM type space.
FIGS. 11–15 illustrate example layer abstractions.

FIGS. 63–67 illustrate an example physical configuration of devices.

FIG. 89 illustrates example products that may be included in a system described herein.

FIG. 95 illustrates an SDML example.

FIGS. 103–105 illustrate example changes due to the Internet.

FIG. 109 illustrates an example service.

DETAILED DESCRIPTION

Figure 1:
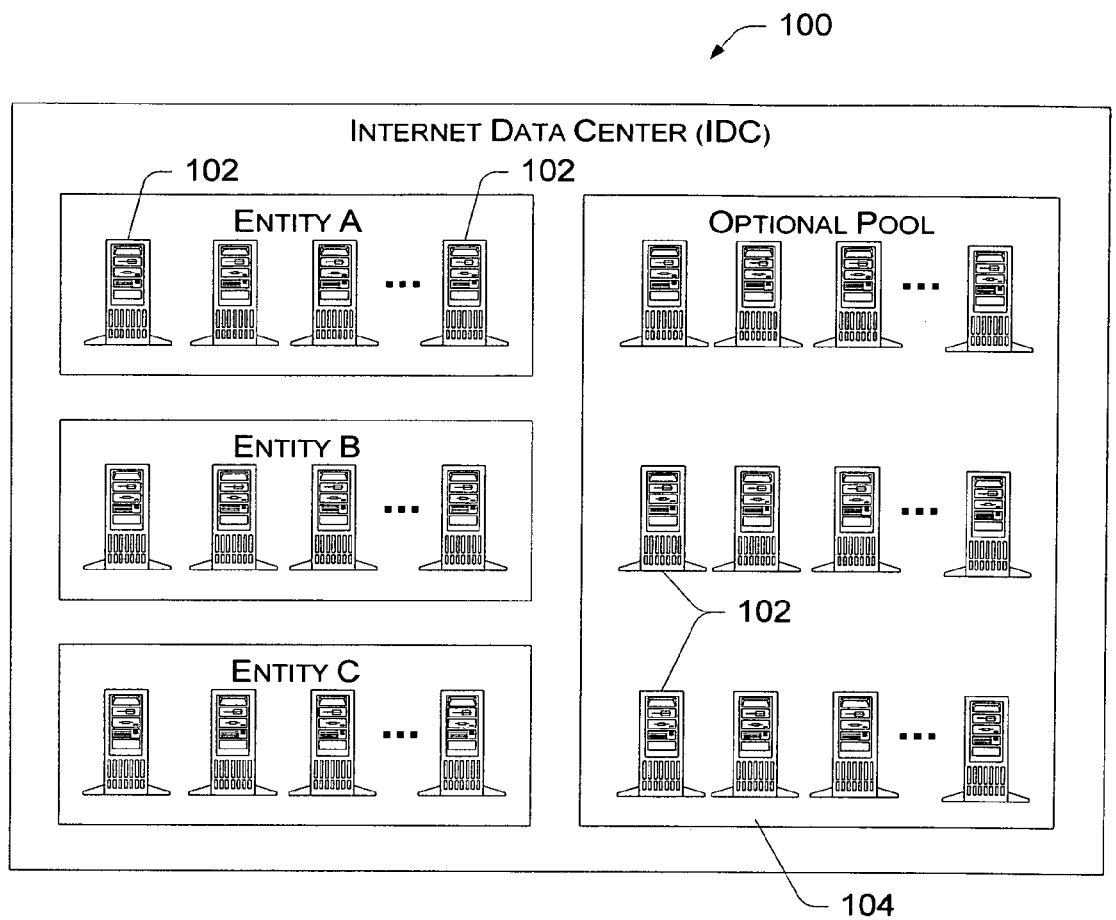
FIG. 1 illustrates an example of an Internet data center.

The following disclosure describes a number of aspects pertaining to an architecture for designing and implementing a distributed computing system with large-scale application services. The disclosure includes discussion of a service definition model (SDM) and an SDM runtime environment. The disclosure further includes design aspects such as how to model data center components, how to model a distributed application description, and techniques for logically placing a modeled application onto a modeled data center and validating this logical placement at design time. The disclosure further explains deployment aspects such as how to instantiate the model using physical resources, physical placement of the distributed application on the physical resources to facilitate application deployment at the physical data center. The disclosure also addresses management aspects, including using the SDM to provide contextual management feedback, tracking, and operations feedback. The disclosure discusses various resource managers used in deployment of the application across physical resources and to support the management aspects.

Service Definition Model (SDM)

The service definition model (SDM) provides tools and a context for an application architect to design distributed computer applications and data centers in an abstract manner. The model defines a set of elements that represent functional units of the applications that will eventually be implemented by physical computer resources and software. Associated with the model elements is a schema that dictates how functional operations represented by the components are to be specified.

SDM Overview

Introduction

Internet Era

Over the last decade we have witnessed the Internet emerge as a computing platform. More and more software companies are adopting the "software as a service" model. These services are typically comprised of several components running on many machines including servers, networking equipment and other specialized hardware. Loosely coupled, asynchronous programming models are becoming the norm. Scalability, availability and reliability are critical to the success of these distributed services.

We are also witnessing a change in hardware trends. High density servers and specialized network hardware are widespread in data centers. Switched fabrics are replacing system buses and providing greater flexibility in system configurations. Hardware cost now plays a small role in the Total Cost of Ownership (TCO) metric compared to the cost of training and maintaining a dedicated operations staff. While rock-solid operational practices are vital to any highly available service, these practices are difficult to repeat consistently because of the fallibility that results from people executing manual procedures. In the emerging software as a service era, the focus of development is shifting away from the desktop and toward the server. Along with this change of focus comes a plethora of new problems for software developers, hardware vendors, and IT professionals:

Services are larger and more complex—services are time-consuming to develop, difficult and costly to maintain, and risky to extend with additional functionality.

Services tend to be monolithic—services tend to rely on custom components and specific configurations. Portions of many services cannot be removed, upgraded independently, or replaced with alternatives without impacting the availability of the service.

Services rely on specific hardware configurations—whether it's a certain network topology or a dependency on a specific network appliance, the binding between hardware and software significantly reduces the ability to host services in different data center environments.

Services demand operational consistency—most services require a staff of operations personnel to function. The lack of a common platform reduces the ability to reuse code and enact operational best practices across services. Unfortunately, operations staff must be trained in the specifics of each service and retrained as each service evolves.

The terms "service" and "application" are used interchangeably throughout this document. In general, an application could be viewed as a collection of distributed services. For example, Hotmail would be an application comprised of multiple services where each service performs a different function.

These problems are not unlike those of the desktop and DOS era (circa 1980's). DOS defined valuable core services for application developers such as disk management, file system, console facilities, etc. It did, however, leave many complex tasks up to the ISVs. As an example, WordPerfect and Lotus 123 both independently had to write printer drivers in order to support printing within their respective applications. Similarly, printer hardware vendors had to make deals with the software companies in order to have a successful product. The barrier to entry for ISVs and hardware vendors was exceptionally high. This resulted in only a few successful software and hardware companies during this era. Microsoft addressed this problem by creating the Windows platform, which dramatically reduced the barrier to entry. Windows defined an abstraction layer for most hardware devices on the PC platform. This relieved the ISVs from having to worry about supporting specific hardware devices. Windows managed all resources within the PC including memory, disk and network. Windows also came with a wealth of additional services that could be utilized by ISVs. This platform sparked enormous growth in the industry. ISVs that targeted the Windows platform were extremely productive. Many new hardware vendors emerged offering cheaper hardware due to the commoditization effect of having a common platform: Windows.

Service Definition Model (SDM)

SDM Fundamentals

The SDM:
Defines abstractions that make it easier to design distributed applications/services.
Enables a framework for reuse and automation of operational practices.
Simplifies deployment and operations of distributed applications and services.

It can be easier to understand what the SDM is by considering that it captures what today is often seen as a complex diagram on the wall near the operators of a service. In these diagrams a box typically represents a running element of the service and the lines connecting the boxes represent communication paths between the service elements. For example, a load balancer connected to some IIS front-end machines which in turn are connected to one or more middle-tier or back-end services.

Another way to think about the SDM is that it is both a meta-model for the behavior of distributed applications/services and a "live" blueprint of a running application/service in its computing environment. The SDM captures the structure of the application in its computing environment, including its allowable software operations, in a declarative and scale-invariant manner. The ability to declaratively describe the topology of a service, including the bindings between the hardware and network resources, and the valid operations of its software components, is quite powerful.

As an analogy, let's look at Microsoft's Common Object Model (COM). COM standardized how components are packaged, registered, activated, discovered, etc. COM mandates strict rules related to lifetime, memory management and interface implementation. These primitives are essential for interoperability because they allow components to be treated as black boxes. COM is the basis for more sophisticated services such as eventing, automation, and OLE.

Likewise the SDM needs to define some basic primitives on which to build more sophisticated capabilities. These primitives are:

Components—units of implementation, deployment and management.
Ports—named end-points that have an associated type and a set of valid operations.
Wires—permissible communication paths between ports.
Layers—separation of resource management ownership and bindings.
Mappings—bindings between components, ports and wires at each layer.

The remainder of this document will describe each of these primitives in more detail.

Components, Ports and Wires

For the purposes of this document, it is useful to consider a graphical representation of a simple service called MyService drawn using components, ports and wires. See FIG. 2. In the diagram, boxes represent components, diamonds represent ports, and dashed lines represent wires.

MyService is a compound component because it uses the components MyFrontEnd and MyBackEnd.
MyService has one visible port called web which is a delegated port implemented by the MyFrontEnd component.

MyFrontEnd has two ports, the delegated port and a port labeled catalog.

MyBackEnd has one port labeled data.

The MyFrontEnd and MyBackEnd components have a potential communication relationship that binds the catalog port to the data port through a wire.

Components

Components are units of implementation, deployment and management. Examples of components are a dedicated server running Windows Server, an IIS virtual web site or a SQL database. Components generally have machine boundaries, but are not required to as evidenced by web services hosted on a single IIS server.

Components expose functionality through ports and communicate through wires. Simple components can only have ports as members. Components that use other components are referred to as compound components, which can have ports and wires as members in addition to other components.

Compound components are created through composition and do not have any implementation associated with them. Compound component ports are delegated ports from inner components. Compound components make collocation, encapsulation and reuse possible and so can be thought of as a way to organize an application/service and its behaviors.

Only the public ports of a component are visible outside the component. Compound components to the outside world look like simple components with the internal structure of the components they use hidden through encapsulation. In fact, a simple component could be replaced with a compound component or vice versa as along as the port types and behaviors supported by both are exactly the same.

Ports

Ports are named end-points that define a set of behaviors. Ports have an associated type or role and are typically associated with a set of allowed operations. Examples of ports are an HTTP server port, a SOAP port with a set of allowed operations, etc. Ports can be delegated which means that an outer component can expose the port of an inner component as its own.

Ports form the public interface (behavior) to a component. Ports are the only members of a component that can be made public (visible).

Wires

Wires are permissible bindings between ports and represent topological relationships between ports (and components). Wires do not specify any instance interconnect topology but instead express a "potentiality" for an instance interconnect topology.

Wires are essentially busses and can contain one or more port members. Wires should not be mistaken for a point-to-point relationship. A given port cannot appear more than once within the same wire.

Schema

In order to describe an application/service, it is necessary to have a standard schema for the SDM. The SDM schema should be expressible using XSD and XML grammars. While it is beyond the scope of this document to describe the SDM schema in great detail, it is necessary to provide some brief explanation as context for the subject matter described later in this document. Below is a simplified view of the SDM schema.

```
<sdm>
    <identityReference />
    <portClasses/>
    <wireClasses />
    <componentClasses />
    <hostRelations />
    <portTypes />
    <wireTypes />
    <componentTypes />
</sdm>
```

Please read the SDM Schema specification and review the sample XSD files at http://big/ for more detailed information on the SDM schema.

SDM Class

Every component, port and wire in an application/service is a type created through use of a class. New types can be created from existing classes and types. An SDM class is essentially an abstraction for common features. For example, Web Service can be modeled as class as can a SQL Database. In the MyService application, MyFrontEnd would be a new type derived from the class Web Service; and MyBackEnd would be a new type derived from the class SQL Database.

Below is an example of the class schemas for ports, wires and components.

```
<portClass name="ServerDataAccess" layer="Application">
    <settingSchema>
        <xs:element name="databaseName" type="xs:string" />
    </settingSchema>
</portClass>
```

```
<wireClass name="DataConnection" layer="Application">
    <settingSchema>
        <xs:element name="useSSL" type="xs:boolean" />
    </settingSchema>
    <portClassesAllowed>
        <portClassRef name="ServerDataAccess" maxOccurs="1" />
        <portClassRef name="ClientDataAccess" />
    </portClassesAllowed>
</wireClass>
```

```
<componentClass name="Database" layer="Application">
    <deploymentSchema>
        <xs:element name="sqlScriptFilePath" type="xs:string" maxOccurs="unbounded" />
    </deploymentSchema>
    <settingSchema>
        <xs:element name="databaseName" type="xs:string"/>
    </settingSchema>
    <portClassesAllowed closed="true">
        <portClassRef name="ServerDataAccess" />
    </portClassesAllowed>
</componentClass>
```

Notice that each componentClass and wireClass schema can contain a setting schema, deployment schema and port classes allowed. The portClass does not have a port classes allowed section. These schemas are defined as follows:

Setting Schema is the XSD for the configuration parameters on components, ports and wires that can be design-time validated.

Deployment Schema is the XSD that expresses what installation parameters need to be set in order for the component, port or wire to be installed. This manifest could be the schema for Fusion or some other installer technology.

Port Classes Allowed is where components and wires declare the allowable ports by referencing declared port classes.

Please refer to the SDM Schema Design Specification at http://big for more details on the class schemas.

Class Relationships

A component, port or wire that can host other components is declared using a hostRelations schema that identifies the installer and the component classes it can host. One can think of the hostRelations element as a directional link between classes where one of the components, ports or wires is acting as a host for the others.

Hosting a component means providing the execution environment for a component's code. For example, SQL can be a host for components of class Database as shown in the example below.

```
<hostRelations>
    <installer name="DatabaseInstaller" codeType="InstallerPlugIn" />
    <hostRelation                              classRef="database"
componentHostClassRef="host:SQL" installerRef="DatabaseInstaller"
/>
</hostRelations>
```

SDM Types

There are three distinct spaces that the SDM models: resource, application and instance. The instance space is discussed later in this document. The resource space is where classes live and are the building blocks from which applications are constructed. The application space is where types reside. Below is an example of the XML for port, wire and component types.

```
<portType name="UserDataServer" class="ServerDataAccess">
    <deployment />
    <setttings />
</portType>
```

```
<wireType name="UserData" class="DataConnection">
    <deployment />
    <settings>
        <useSSL>false</useSSL>
    </settings>
    <portTypeRefs>
        <portTypeRef name="UserDataServer"/>
        <portTypeRef name="UserDataClient"/>
    </portTypeRefs>
</wireType>
```

```
<componentType name="SQLBackEnd" class="Database">
    <deployment>
<sqlScriptFilePath>%install%\mydatabaseDfn.sql</sqlScriptFilePath>
    </deployment>
    <settings>
        <databaseName>UserData</databaseName>
    </settings>
    <ports>
        <port name="userData" type="UserDataServer"/>
    </ports>
</componentType>
```

Notice each portType, wireType and componentType in the SDM schema contains setting and deployment values.

Settings is XML for the settings schema that supplies the configuration values for components, ports and wires and can be design-time validated.

Deployment is the XML for the deployment manifest that expresses the values that the configuration parameters need to be set to in order for the component, port or wire to install properly.

Please refer to the SDM Schema Design Specification at http://big for more details on types.

Compound Components

Compound components can be used to define an application and its topological relationships to other components, ports and wires. Compound components do not have an associated implementation and instead use delegation of ports and host relationships to expose behavior of member components and ports.

The XML below shows how the compound component MyService might be described using the SDM.

```
<compoundComponentType name="MyService">
    <components>
        <component name="MyFrontEnd" type="IISFrontEnd" />
        <component name="MyBackEnd" type="SQLBackEnd" />
    </components>
    <wires>
        <wire name="data" type="UserData">
            <members>
                <member componentName="MyFrontEnd" portName="serverData" />
                <member componentName="MyBackEnd" portName="userData" />
            </members>
        </wire>
    </wires>
</compoundComponentType>
```

Instances

While components, ports and wires define the structure and behavior of an application/service, they do not define the running instances. Every component, port and wire type declaration can have one or more instances. Instances are the result of deploying an application/service such that physical resources (servers, network switch ports and disks) are allocated, and software resources (operating systems, runtime hosts, application code) are installed and configured. It is the job of the SDM Runtime to track all instances from the time of creation until they have been deleted.

SDM Runtime

The SDM Runtime does not itself create instances of components, ports and wires; instead, it provides a set of APIs that are used to coordinate the creation and management of SDM instances. The actual creation of an instance, such as a server running Windows Server with IIS as the host for a web service component, will typically involve multiple entities and could possibly take hours or days to complete.

The SDM Runtime knows when a "create SDM instance" process starts and when it terminates, either with success or failure. The SDM Runtime also knows what changes are made to an SDM instance during its lifetime. One way to think about the SDM Runtime is that it is an accountant that records all transactions related to a given application/service SDM such that it can be queried for information about the instances associated with the specified SDM.

The first step in creating an SDM instance is registration of an application/service SDM with the SDM Runtime. Once the SDM Runtime knows about a given SDM, the instance creation process can be invoked using Factories and Resource Managers (explained below).

Please read the SDM Runtime Architecture specification at http://big/ for more detailed information on the APIs and runtime design.

Hosts and Factories

Components that are capable of "hosting" other components are called hosts and act as factories for the classes they support. A component can be declared a host of one or more component classes using the SDM schema hostRelations element described previously.

While hosts provide the execution environment for a component's code, factories are the actual services that create SDM instances of a given type and interact with the SDM Runtime through the SDM Runtime APIs. Factories can support one or more component classes and must register with the SDM Runtime specifying which component classes they support.

It is possible for a given factory to support multiple hosts of the same type with different configurations as well as for individual factories to exist for each type of host configuration. For example, an IIS Factory can support multiple classes such as Web Service and Web Application. Likewise, the SQL Factory can support different database types such as Database, Partitioned Database and Highly Available Database.

Factories do not themselves manage physical resources such as storage, network and servers. Factories interact with physical resources (and their logical equivalents) through Resource Managers.

Resource Managers

Resource Managers manage the physical and logical resources that are (1) discovered or created as part of a bootstrap process or (2) specified through some declarative XML-based description of the physical environment. Resource managers own all storage, network and server resources and expose a common resource management API to process resource allocation requests and to track ownership of these resources.

Examples of resource managers are the NRM (Network Resource Manager), the SRM (Storage Resource Manager), and the PRM (PC Resource Manager). Each of these resource managers is responsible for allocation of a physical port or disk or server and the logical resources they expose such as VLANs, logical disk volumes, file shares, web server, etc. Resource managers are also responsible for programming the physical devices to effect allocation and de-allocation.

In order to program the physical hardware, resource managers interact with the hardware through resource providers that hide the implementation details of the hardware device so that, for example, network switches from multiple vendors can be used interchangeably (given that a provider for the manufacturer's device exists). Like the hardware abstraction layer (HAL) and device driver model in Windows, there is an equivalent abstraction layer for the data center environment that spans servers, network and storage devices.

Layers and Mappings

While components, ports and wires are powerful abstractions when combined with hosts, factories, resource managers and the SDM runtime, they are not sufficient to deploy and manage a distributed application/service. In order to create and manage the physical instances of these logical abstractions, some additional constructs are needed. Those additional constructs are layers and mappings.

Layers

Figure 3:
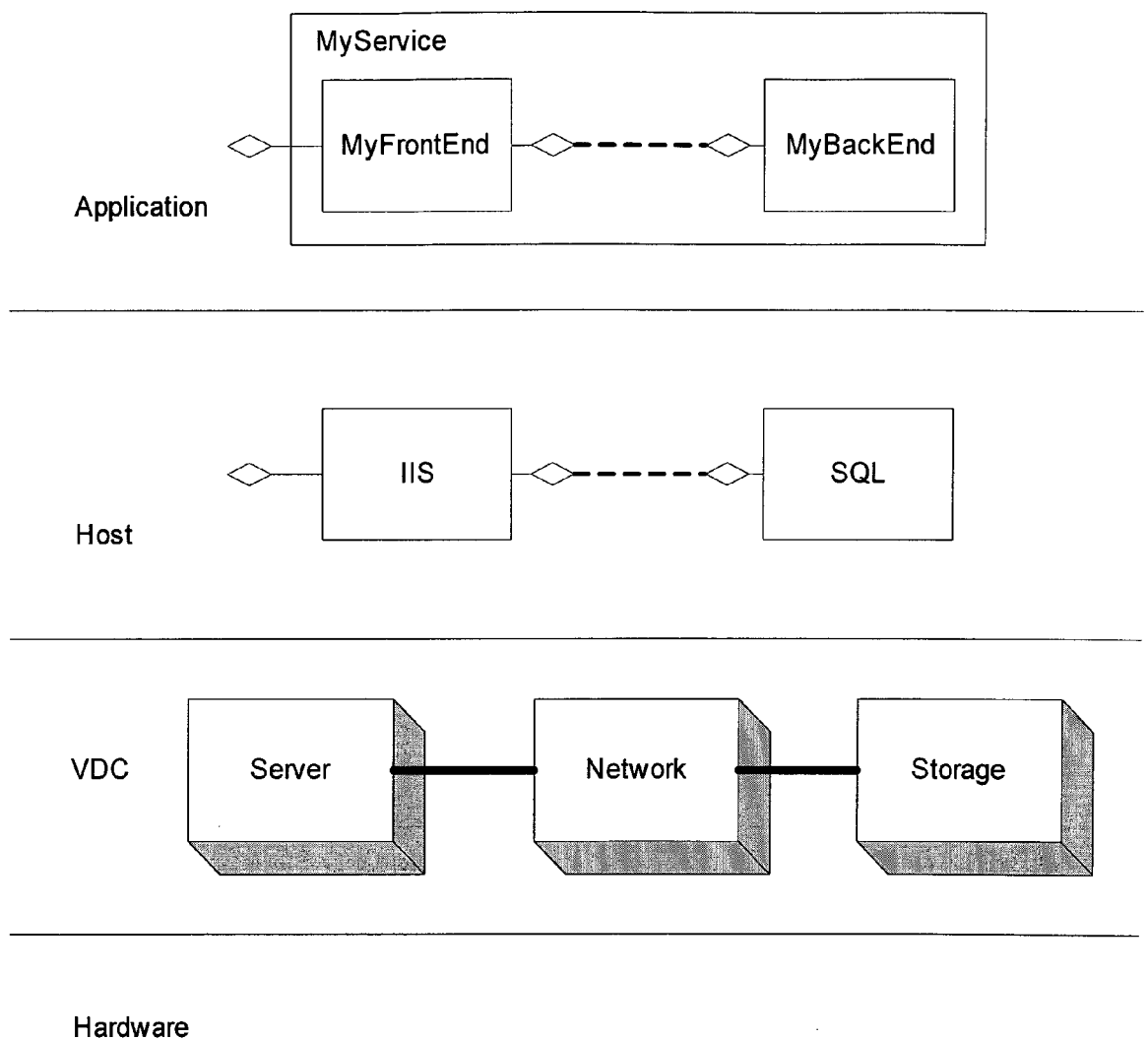
FIGS. 3–8 illustrate example layer abstractions.

The need for layers is motivated by the desire to perform design-time validation of deployment requirements of an application/service. FIG. 3 shows the layer abstractions defined by the SDM.

Application layer describes the distributable components, their deployment requirements and constraints, and their communication relationships in the context of an application/service.

Host layer describes the configuration and policy settings and constraints for hosts such as IIS, CLR and SQL, among others.

Virtual Data Center (VDC) layer describes the data center environment settings and constraints from the operating system through the network topology down to the servers, network and storage devices.

Hardware layer is describes the physical data center environment and is either discovered or specified in a declarative manner using XML, for example. This layer is not scale-invariant and therefore not modeled in the SDM, but is included for completeness.

Mappings

Because the SDM is layered, there needs to be a way to bind between the various layers. A mapping is essentially a binding of a component or port at one layer to a component or port at the next layer down. A mapping can be described as follows:

$$M_T = [T_n \rightarrow T_{n-1}] + [T_{n-1} \rightarrow T_{n-2}] + [T_{n-2} \rightarrow T_{n-3}][\ldots]$$

where M represents a mapping and T represents a component, port or wire and n represents the layer. The arrow symbol represents the direction of the mapping which is always from a higher layer to a lower layer.

Figure 4:
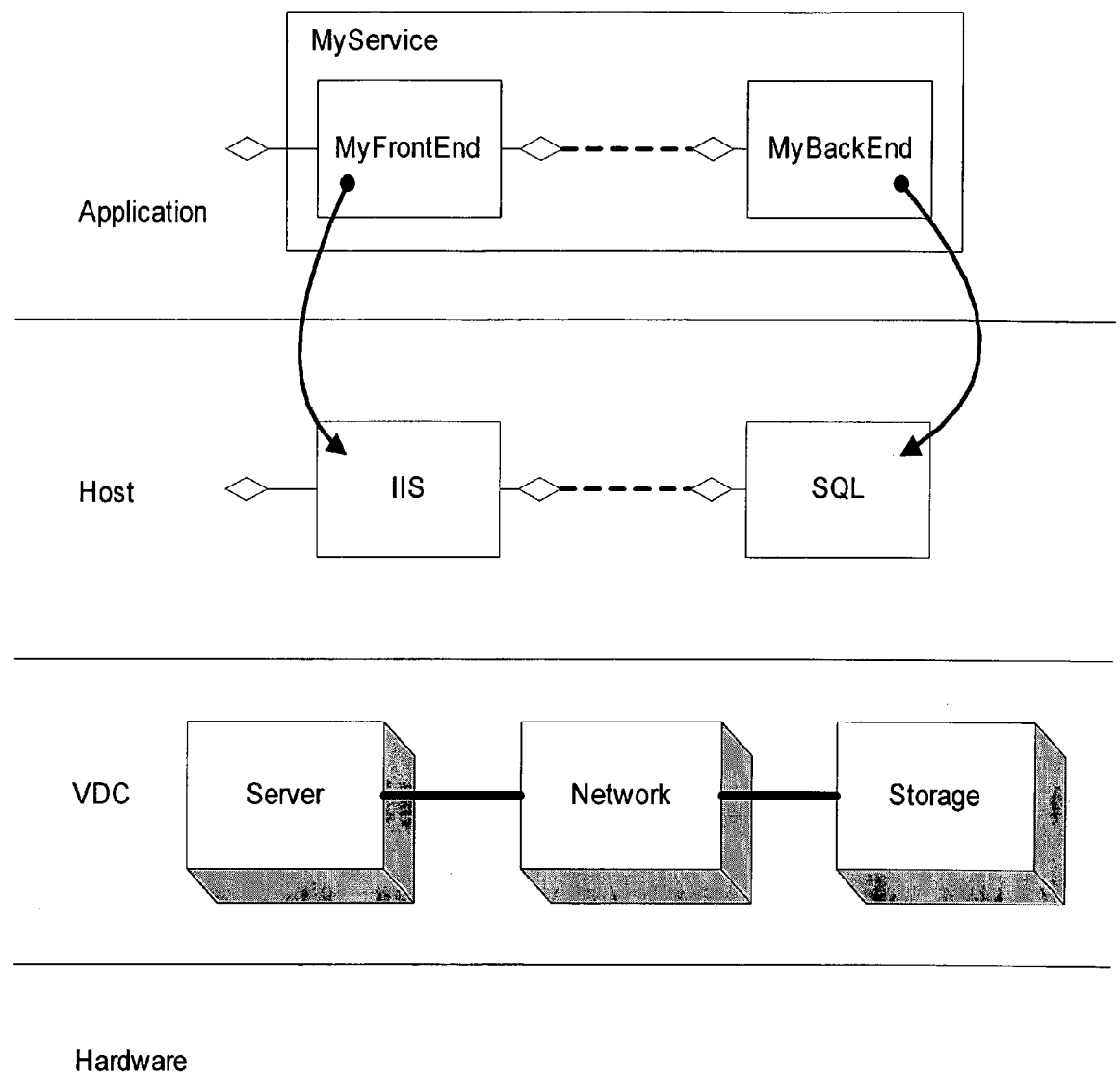

For example, in FIG. 4 the component at the application layer named MyFrontEnd is mapped to a component at the host layer called IIS. Likewise the component named MyBackEnd is mapped to the SQL component at the host layer.

Design-Time Validation

Figure 5:
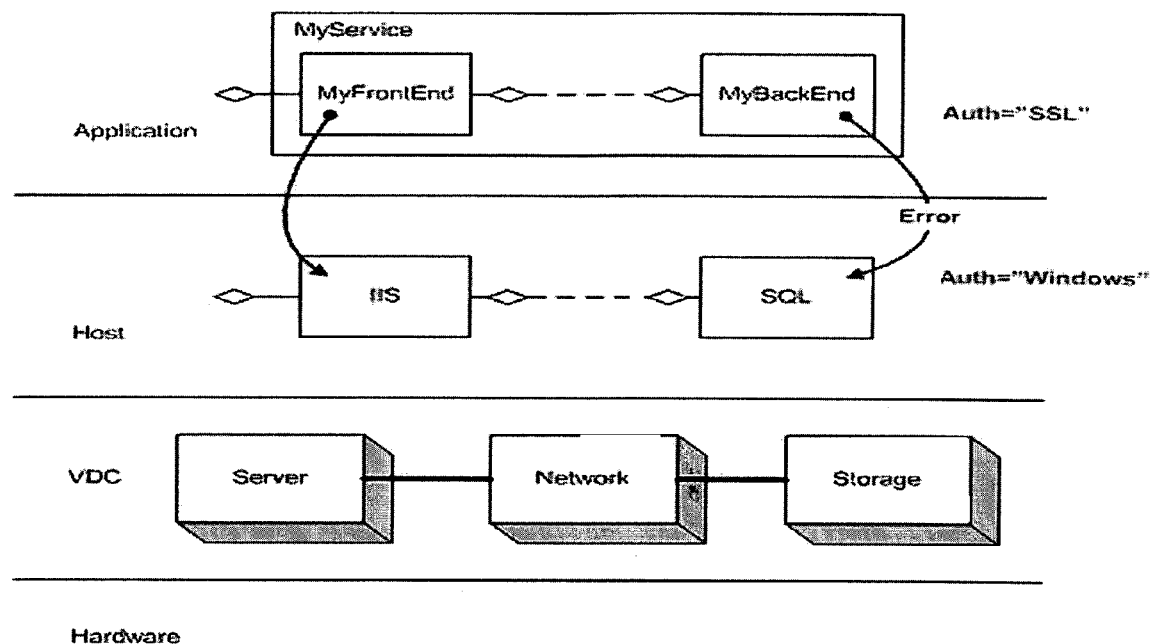

The binding between a component and its host component at the layer below can surface problems to the developer before the application/service is actually deployed in the live data center. These problems can be due to incompatible types, configuration conflicts, mismatched operations, missing topological relationships, etc. FIG. 5 depicts a settings and constraints checking error between a component and its host with regards to authentication.

Figure 6:
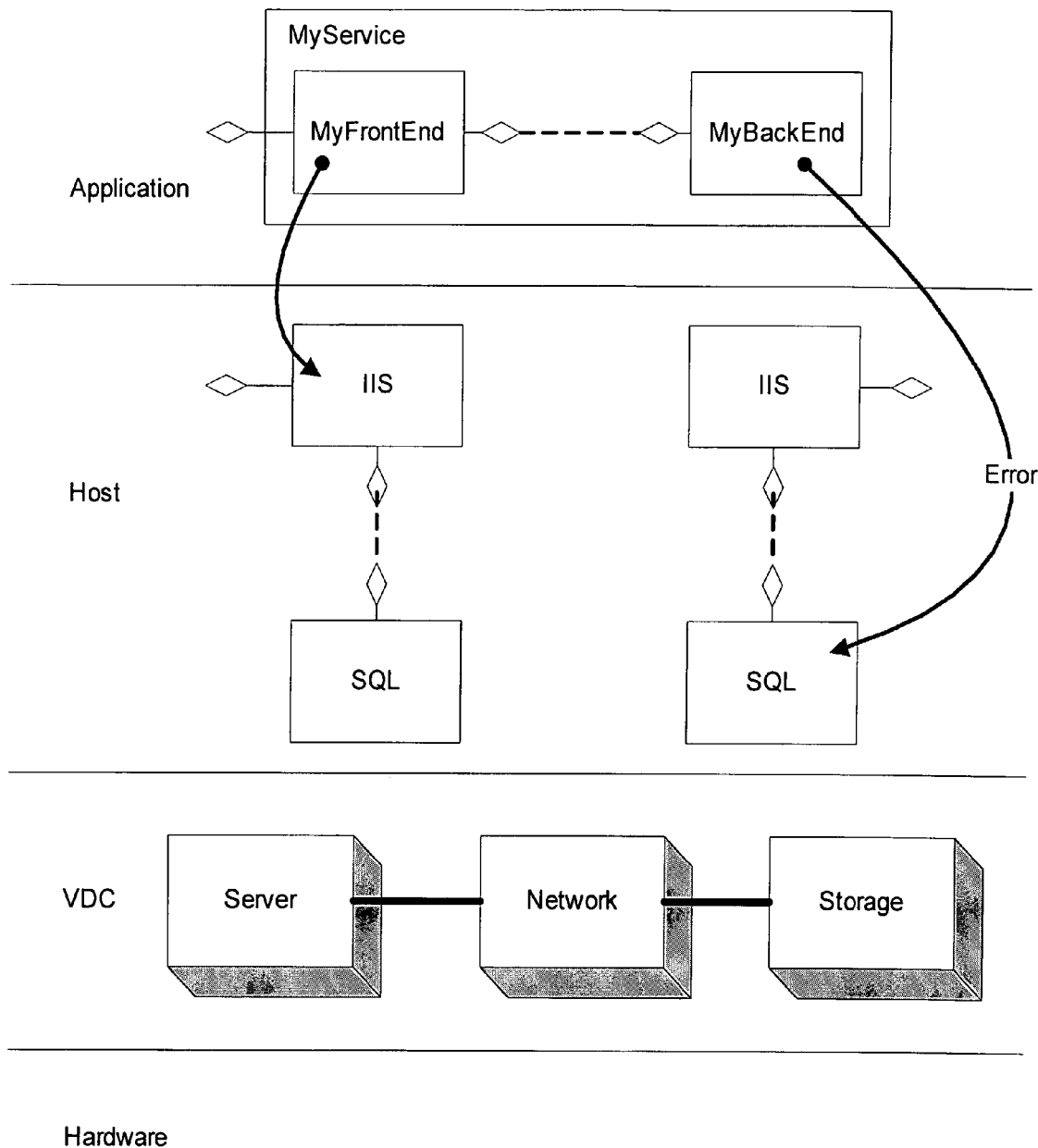

In FIG. 6, the attempted mapping depicted in the diagram below would result in an error because there is no potential communication relationship between the IIS and SQL components at the deployment layer.

While the mapping from the MyBackEnd component to the SQL host component could have been a valid binding based on the component and host type compatibility and the lack of configuration conflicts, it is invalid because the MyService SDM defined a topological relationship between MyFrontEnd and MyBackEnd that does not exist at the specified deployment layer.

Settings and Constraints Checking

The ability to map from the application layer to the deployment layer (and so on) is quite powerful because it enables design-time validation of a component's settings against a host's constraints; and it also allows validation of a host's settings against a component's constraints.

Figure 7:
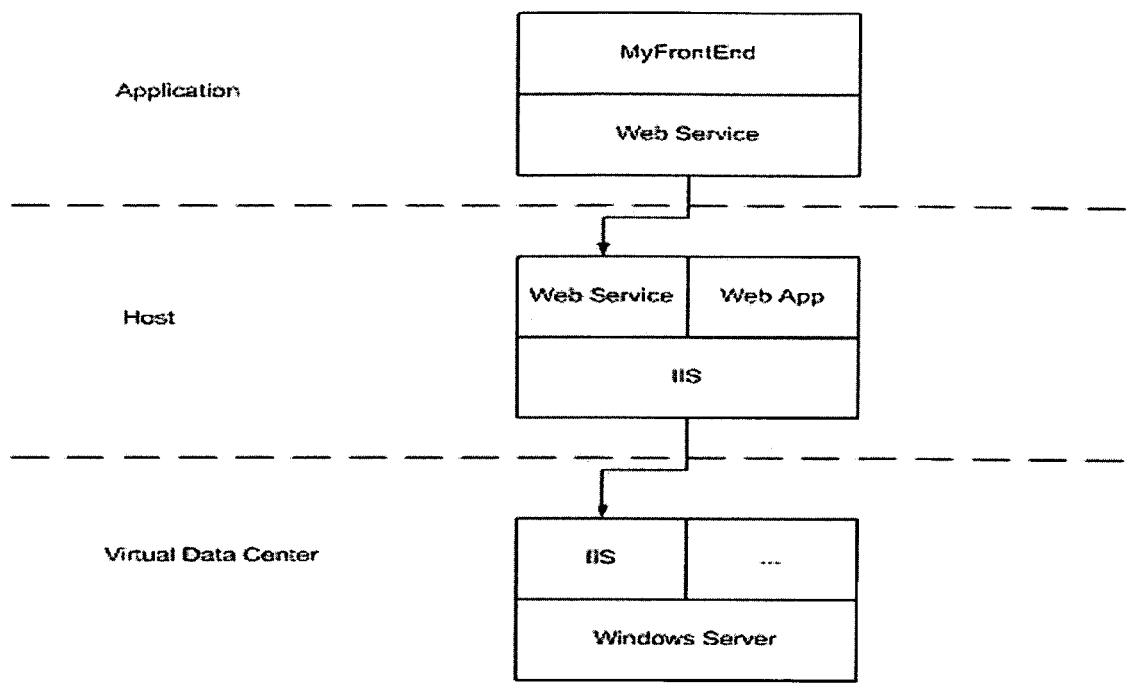

FIG. 7 shows a more detailed view of the relationships between components and host at the different layers. Notice that there is a binding between a component at one layer and a host component at the next layer down all the way through to the VDC layer.

In FIG. 7, MyFrontEnd is a Web Service hosted by IIS which is in turn a Windows Application hosted by Windows Server. There is an IIS factory that supports creation and deletion of Web Service and Web Application component instances just as there is a Windows Application factory that is responsible for creating and deleting instances of IIS and SQL.

Figure 8:
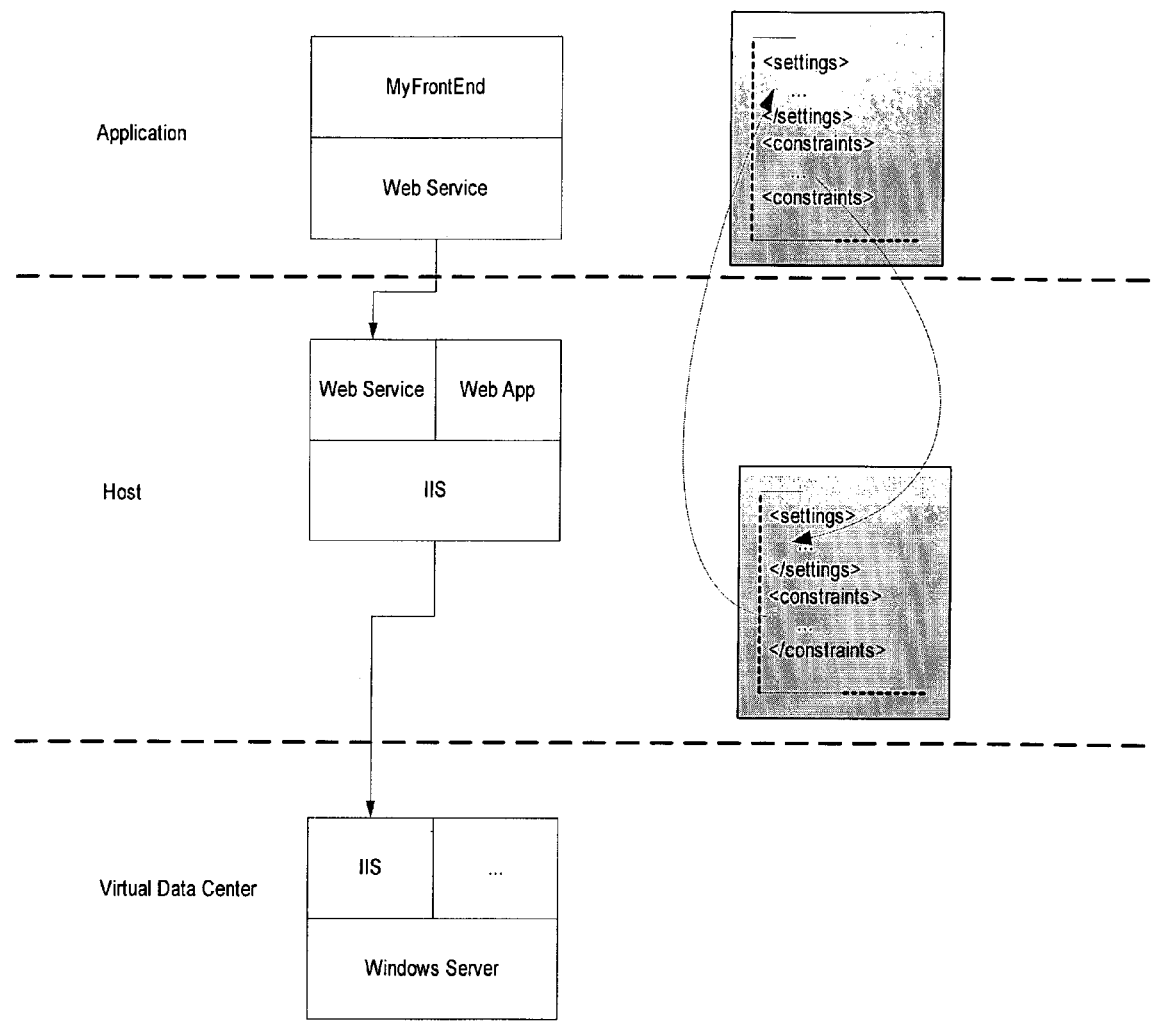

FIG. 8 shows how design-time validation would work between components at the different layers using the SDM settings and constraints semantics described previously.

Notice that the constraints of a component at the layer above are validated against the settings of a host component at the layer below. Also notice that the constraints of the host component are validated against the settings of the component to be hosted.

This two-way settings and constraint checking allows a developer to reliably develop his/her application/service in the context of the operational environment described using SDM semantics all the way down. In order to describe a data center such that its description can be relied upon during the development process, it is necessary to create an abstraction of the data center referred to as the VDC.

Virtual Data Center (VDC)

A VDC is a logical representation of a physical data center environment that simplifies the developer's view of the data center. Ideally an IT Professional or Architect should be able to describe the data center in the same scale-invariant manner that a developer can describe a distributed application/service. The way to think about the VDC is that it is an abstraction of the server, network and storage resources within the data center and their topological relationships. A typical data center diagram is quite complex with multiple interconnected servers, network equipment, IP addresses, VLANs, operating systems, storage, etc. all expressed on a single diagram drawn using Visio or a similar tool. In addition to the diagram, there are usually long documents that prescribe exactly how the data center is partitioned, configured and managed.

An example of this complexity is the Microsoft Systems Architecture (MSA) Enterprise Data Center (EDC). It should be obvious that keeping the manually drawn diagrams and documents current with the state of the data center over time as updates and upgrades are applied becomes a costly if not impossible task. Likewise, the ability to validate the environment against the document prescriptions is difficult and prone to human error.

The ability to represent a complex data center such as the MSA EDC in a scale-invariant manner would be immensely powerful to both the developer and the IT professional. The ability to describe a data center using components, ports and wires provides a powerful framework within which to model and validate deployment requirements that is missing in today's design and deployment process.

SDM Fundamentals

The SDM:
 Defines abstractions that make it easier to design distributed applications/services.
 Enables a framework for reuse and automation of operational practices.
 Simplifies deployment and operations of distributed applications and services.

It can be easier to understand what the SDM is by considering that it captures what today is often seen as a complex diagram on the wall near the operators of a service. In these diagrams a box typically represents a running element of the service and the lines connecting the boxes represent communication paths between the service elements. For example, a load balancer connected to some IIS front-end machines which in turn are connected to one or more middle-tier or back-end services.

Another way to think about the SDM is that it is both a meta-model for the behavior of distributed applications/services and a "live" blueprint of a running application/service in its computing environment. The SDM captures the structure of the application in its computing environment, including its allowable software operations, in a declarative and scale-invariant manner. The ability to declaratively describe the topology of a service, including the bindings between the hardware and network resources, and the valid operations of its software components, is quite powerful.

As an analogy, let's look at Microsoft's Common Object Model (COM). COM standardized how components are packaged, registered, activated, discovered, etc. COM mandates strict rules related to lifetime, memory management and interface implementation. These primitives are essential for interoperability because they allow components to be treated as black boxes. COM is the basis for more sophisticated services such as eventing, automation, and OLE.

Likewise the SDM needs to define some basic primitives on which to build more sophisticated capabilities. These primitives are:
 Components—units of implementation, deployment and management.
 Ports—named end-points that have an associated type and a set of valid operations.
 Wires—permissible communication paths between ports.
 Layers—separation of resource management ownership and bindings.
 Mappings—bindings between components, ports and wires at each layer.

The remainder of this document will describe each of these primitives in more detail.

Components, Ports and Wires

For the purposes of this document, it is useful to consider a graphical representation of a simple service called MyService drawn using components, ports and wires.

Figure 2:
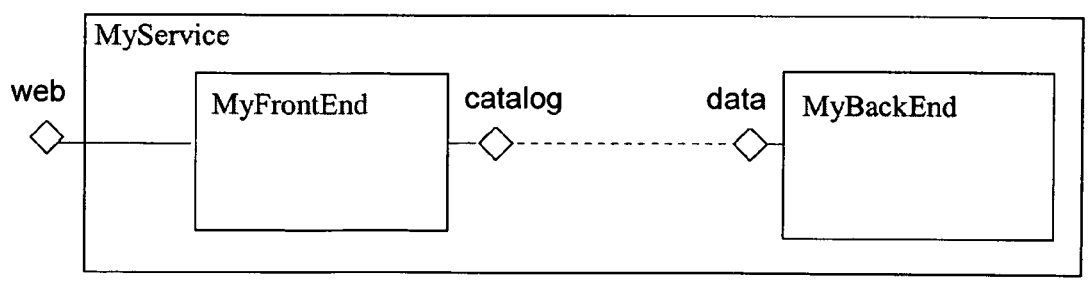
FIG. 2 illustrates an example of a service.

In FIG. 2, boxes represent components, diamonds represent ports, and dashed lines represent wires.

MyService is a compound component because it uses the components MyFrontEnd and MyBackEnd.

MyService has one visible port called web which is a delegated port implemented by the MyFrontEnd component.

MyFrontEnd has two ports, the delegated port and a port labeled catalog.

MyBackEnd has one port labeled data.

The MyFrontEnd and MyBackEnd components have a potential communication relationship that binds the catalog port to the data port through a wire.

Components

Components are units of implementation, deployment and management. Examples of components are a dedicated server running Windows Server, an IIS virtual web site or a SQL database. Components generally have machine boundaries, but are not required to as evidenced by multiple IIS virtual web sites hosted on a single server.

Components expose functionality through ports and communicate through wires. Simple components can only have ports as members. Components that use other components are referred to as compound components, which can have ports and wires as members in addition to other components.

Compound components are created through composition and do not have any implementation associated with them. Compound component ports are delegated ports from inner components. Compound components make collocation, encapsulation and reuse possible and so can be thought of as a way to organize an application/service and its behaviors.

Only the public ports of a component are visible outside the component. Compound components to the outside world look like simple components with the internal structure of the components they use hidden through encapsulation. In fact, a simple component could be replaced with a compound component or vice versa as along as the port types and behaviors supported by both are exactly the same.

Ports

Ports are named end-points that have an associated type and are typically associated with a protocol role and a set of allowed operations. Examples of ports are an HTTP server port, a SOAP port with a set of allowed operations, etc. Ports can be delegated which means that an outer component can expose the port of an inner component as its own.

Ports form the public interface (behavior) to a component. Ports are the only members of a component that can be made public (visible).

Wires

Wires are permissible bindings between ports and represent topological relationships between ports (and components). Wires do not specify any instance interconnect topology but instead express a "potentiality" for an instance interconnect topology.

Wires are essentially busses and can contain one or more port members. Wires should not be mistaken for a point-to-point relationship. A given port cannot appear more than once within the same wire.

Schema

In order to describe an application/service, it is necessary to have a standard schema for the SDM. The SDM schema should be expressible using XSD and XML grammars. While it is beyond the scope of this document to describe the SDM schema in great detail, it is necessary to provide some brief explanation as context for the subject matter described later in this document. Below is a simplified view of the SDM schema.

```
<sdm>
    <import />
    <identityReference />
    <information />
    <portImplementationType />
    <wireImplementationType />
    <componentImplementationType />
    <hostRelations />
    <portTypes />
    <wireTypes />
    <componentTypes />
</sdm>
```

Please read the SDM Schema specification and review the sample XSD files at http://big/ for more detailed information on the SDM schema.

Types

Every component, port and wire used in an application/service is a type. Type is essentially equivalent to class in object-oriented languages like C++ and C#, and like it is with classes, new types can be created from existing types. The scale-invariant space is represented in the SDM schema by portTypes, wireTypes and componentTypes. Scale-invariance implies that a component, port or wire can be represented once in an application/service SDM even though there may be multiple instances of each in the actual data center.

A type is ultimately derived from an implementation type, which is essentially an abstraction for common technology features. For example, Web Service can be modeled as an implementation type as can SQL Database. In the MyService application, MyFrontEnd would be a new type derived from the implementation type Web Service and MyBackEnd would be a new type derived from the implementation type SQL Database.

Each componentImplementationType and wireImplementationType SDM schema element can contain a settings schema, deployment manifest and port implementation reference. The portImplementationType element does not have a port implementation reference. FIG. 9 illustrates what the SDM implementation type space looks like.

Settings Schema is the XSD for the configuration parameters on components, ports and wires that can be design-time validated.

Deployment Manifest is the XSD that expresses what installation parameters need to be set in order for the component, port or wire to be installed. This manifest could be the schema for Fusion or some other installer technology.

Port Implementation Reference is where components and wires declare the allowable ports by referencing declared port implementation types.

In addition, a component that can host other components is declared using a hostRelations SDM schema element that identifies the installer and the component implementation types it can host. One can think of the hostRelations element as a directional link between component implementation types where one of the components is acting as a host for the other component(s). Hosting a component means providing the execution environment for a component's code. For example, IIS is a host for components of implementation type Web Service and Web Application. Hosts will be explained in more detail later in this document.

Each portType, wireType and componentType element in the SDM schema contains application constraint values, deployment values and host constraint values. In addition, the wireType element contains a port types element that defines the allowable port types on the specified wire type; and the componentType element contains a hosted types list element that identifies those implementation types that can be hosted on the specified component type. FIG. 10 shows the SDM type space.

Settings Values is XML for the settings schema that supplies the configuration values for components, ports and wires and can be design-time validated against a host's constraints values.

Deployment Values is the XML for the deployment manifest that expresses the values that the configuration parameters need to be set to in order for the component, port or wire to function properly.

Constraints Values is the XML for the settings schema that supplies the configuration parameter values that a component, port or wire of a host must be set to. Constraints values can be design-time validated against the settings values of the underlying host.

Port Types is the XML that lists the allowable port types that can be a member of the specified wire.

Hosted Type List is the XML where a component declares the list of component implementation types it can host.

Instances

While components, ports and wires define the structure and behavior of an application/service, they do not define the running instances. Every component, port and wire type declaration can have one or more instances. Instances are the result of deploying an application/service such that physical resources (servers, network switch ports and disks) are allocated, and software resources (operating systems, runtime hosts, application code) are installed and configured.

It is the job of the SDM Runtime to track all instances from the time of creation until they have been deleted.

SDM Runtime

The SDM Runtime does not itself create instances of components, ports and wires; instead, it provides a set of APIs that are used to coordinate the creation and management of SDM instances. The actual creation of an instance, such as a server running Windows Server with IIS as the host for a web service component, will typically involve multiple entities and could possibly take hours or days to complete.

The SDM Runtime knows when a "create SDM instance" process starts and when it terminates, either with success or failure. The SDM Runtime also knows what changes are made to an SDM instance during its lifetime. One way to think about the SDM Runtime is that it is an accountant that records all transactions related to a given application/service SDM such that it can be queried for information about the instances associated with the specified SDM.

The first step in creating an SDM instance is registration of an application/service SDM with the SDM Runtime. Once the SDM Runtime knows about a given SDM, the instance creation process can be invoked using Factories and Resource Managers (explained below).

Please read the SDM Runtime Architecture specification at http://big/ for more detailed information on the APIs and runtime design.

Hosts and Factories

Components that are capable of "hosting" other components are called hosts and act as factories for the implementation types they support. A component can be declared a host of one or more component implementation types using the SDM schema hostRelations element described previously.

While hosts provide the execution environment for a component's code, factories are the actual services that create SDM instances of a given type and interact with the SDM Runtime through the SDM Runtime APIs. Factories can support one or more component implementation types and must register with the SDM Runtime specifying which component implementation types they support. It is possible for a given factory to support multiple hosts of the same type with different configurations as well as for individual factories to exist for each type of host configuration. For example, an IIS Factory can support multiple implementation types such as Web Service and Web Application. Likewise, the SQL Factory can support different database types such as Database, Partitioned Database and Highly Available Database.

Factories do not themselves manage physical resources such as storage, network and servers. Factories interact with physical resources (and their logical equivalents) through Resource Managers.

Resource Managers

Resource Managers manage the physical and logical resources that are (1) discovered or created as part of a bootstrap process or (2) specified through some declarative XML-based description of the physical environment. Resource managers own all storage, network and server resources and expose a common resource management API to process resource allocation requests and to track ownership of these resources.

Examples of resource managers are the NRM (Network Resource Manager), the SRM (Storage Resource Manager), and the PRM (PC Resource Manager). Each of these resource managers is responsible for allocation of a physical port or disk or server and the logical resources they expose such as VLANs, logical disk volumes, file shares, web server, etc. Resource managers are also responsible for programming the physical devices to effect allocation and de-allocation.

In order to program the physical hardware, resource managers interact with the hardware through resource providers that hide the implementation details of the hardware device so that, for example, network switches from multiple vendors can be used interchangeably (given that a provider for the manufacturer's device exists). Like the hardware abstraction layer (HAL) and device driver model in Windows, there is an equivalent abstraction layer for the data center environment that spans servers, network and storage devices.

Layers and Mappings

While components, ports and wires are powerful abstractions when combined with hosts, factories, resource managers and the SDM runtime, they are not sufficient to deploy and manage a distributed application/service. In order to create and manage the physical instances of these logical abstractions, some additional constructs are needed. Those additional constructs are layers and mappings.

Layers

The need for layers is motivated by the desire to perform design-time validation of deployment requirements of an application/service. FIG. 11 shows the layer abstractions defined by the SDM.

Application layer describes the distributable components, their deployment requirements and constraints, and their communication relationships in the context of an application/service.

Deployment layer describes the configuration and policy settings and constraints for hosts such as IIS, CLR and SQL, among others.

Virtual Data Center (VDC) layer describes the data center environment settings and constraints from the operating system through the network topology down to the servers, network and storage devices.

Hardware layer is describes the physical data center environment and is either discovered or specified in a declarative manner using XML, for example. This layer is not scale-invariant and therefore not modeled in the SDM, but is included for completeness.

Mappings

Because the SDM is layered, there needs to be a way to bind between the various layers. A mapping is essentially a binding of a component or port at one layer to a component or port at the next layer down. A mapping can be described as follows:

$$M_T = [T_n \rightarrow T_{n-1}] + [T_{n-1} \rightarrow T_{n-2}] + [T_{n-2} \rightarrow T_{n-3}][\ldots]$$

where M represents a mapping and T represents a component, port or wire and n represents the layer. The arrow symbol represents the direction of the mapping which is always from a higher layer to a lower layer.

Figure 12:
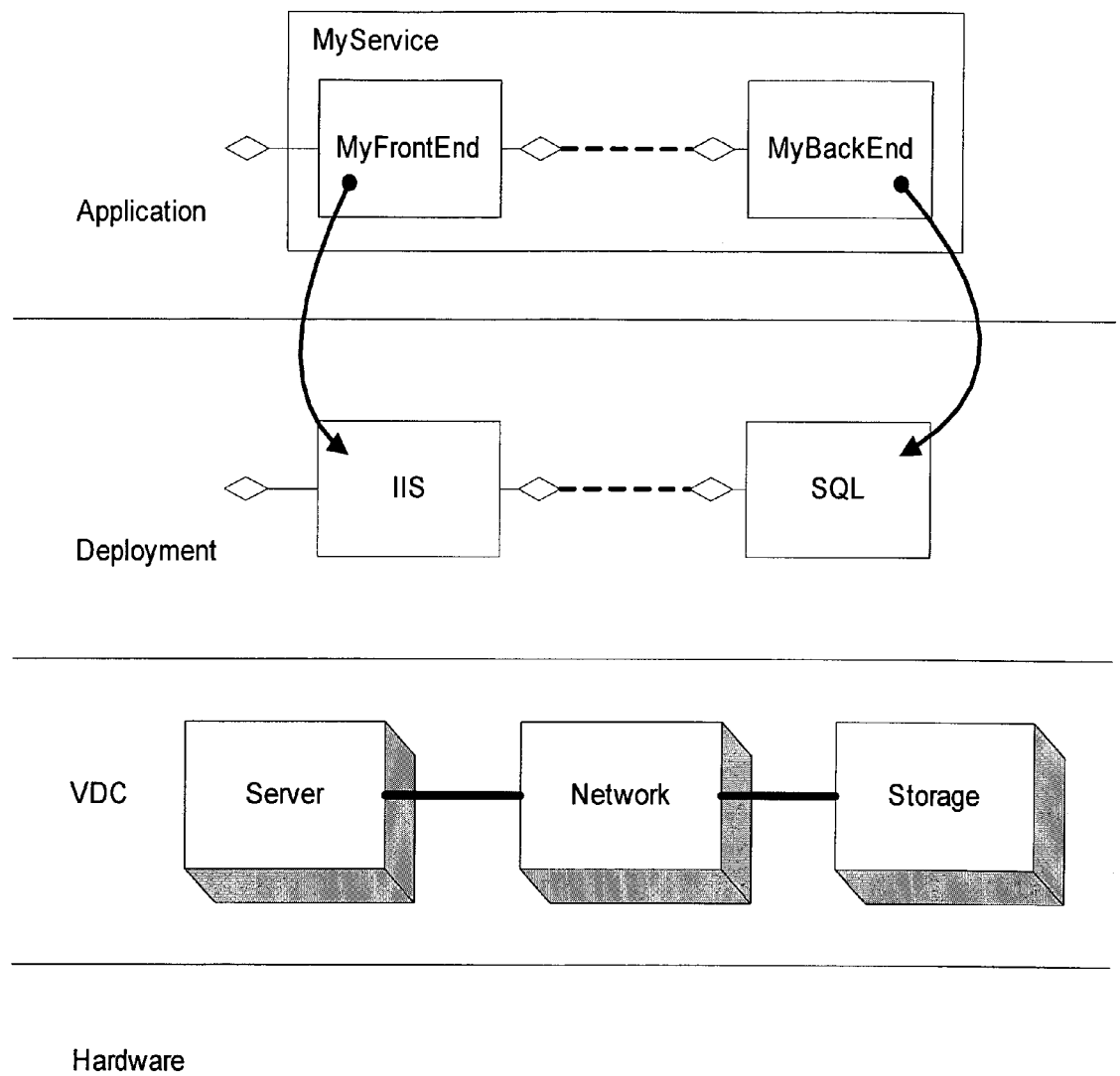

For example, in FIG. 12 the component at the application layer named MyFrontEnd is mapped to a component at the deployment layer called IIS. Likewise the component named MyBackEnd is mapped to the SQL component at the deployment layer.

Design-Time Validation

Figure 13:
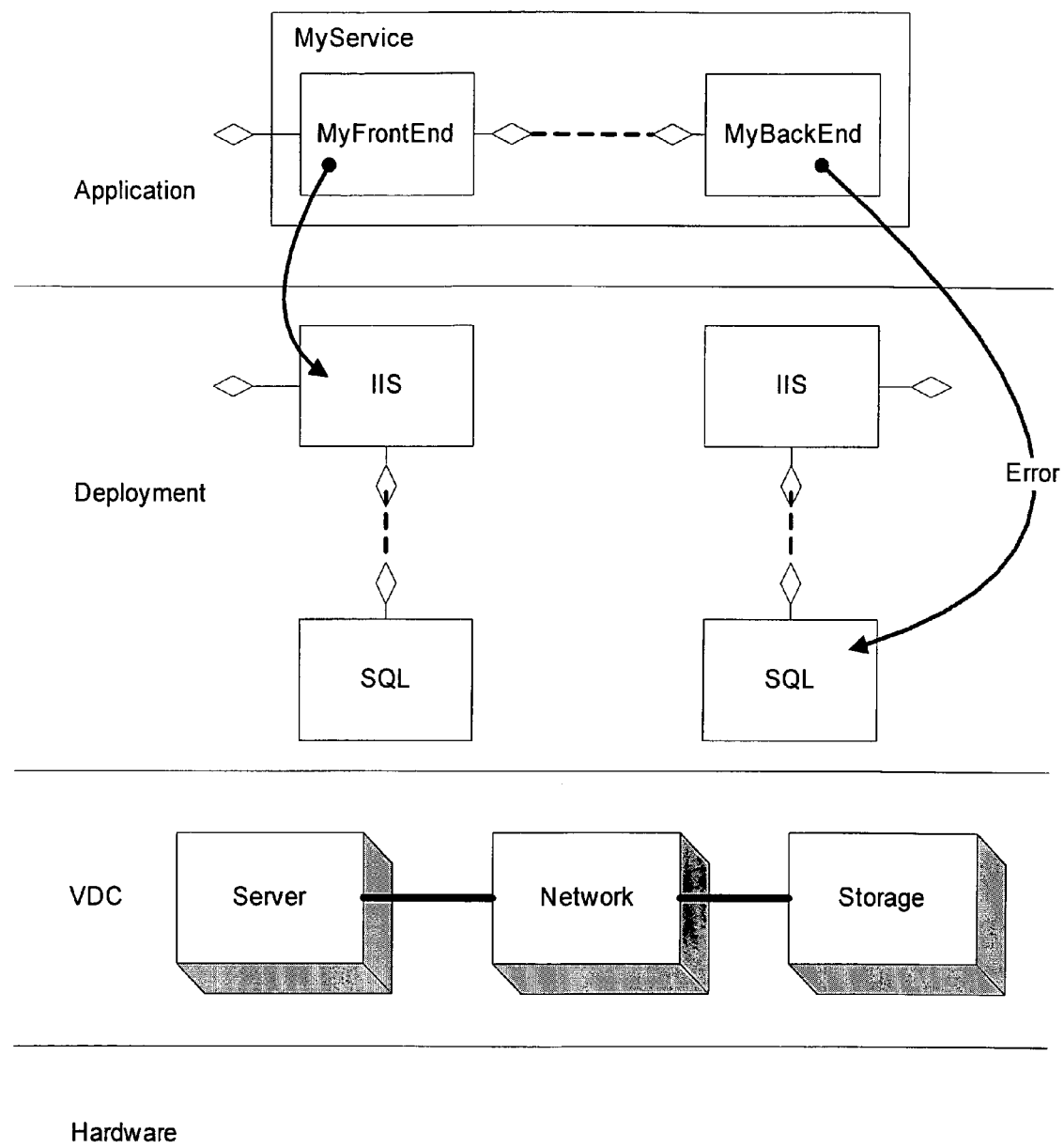

The binding between a component and its host component at the layer below can surface problems to the developer before the application/service is actually deployed in the live data center. These problems can be due to incompatible types, configuration conflicts, mismatched operations, missing topological relationships, etc. For example, the attempted mapping depicted in FIG. 13 would result in an error because there is no potential communication relationship between the IIS and SQL components at the deployment layer.

While the mapping from the MyBackEnd component to the SQL host component could have been a valid binding based on the component and host type compatibility and the lack of configuration conflicts, it is invalid because the MyService SDM defined a topological relationship between MyFrontEnd and MyBackEnd that does not exist at the specified deployment layer.

Settings and Constraints Checking

The ability to map from the application layer to the deployment layer (and so on) is quite powerful because it enables design-time validation of a component's settings against a host's constraints; and it also allows validation of a host's settings against a component's constraints.

Figure 14:
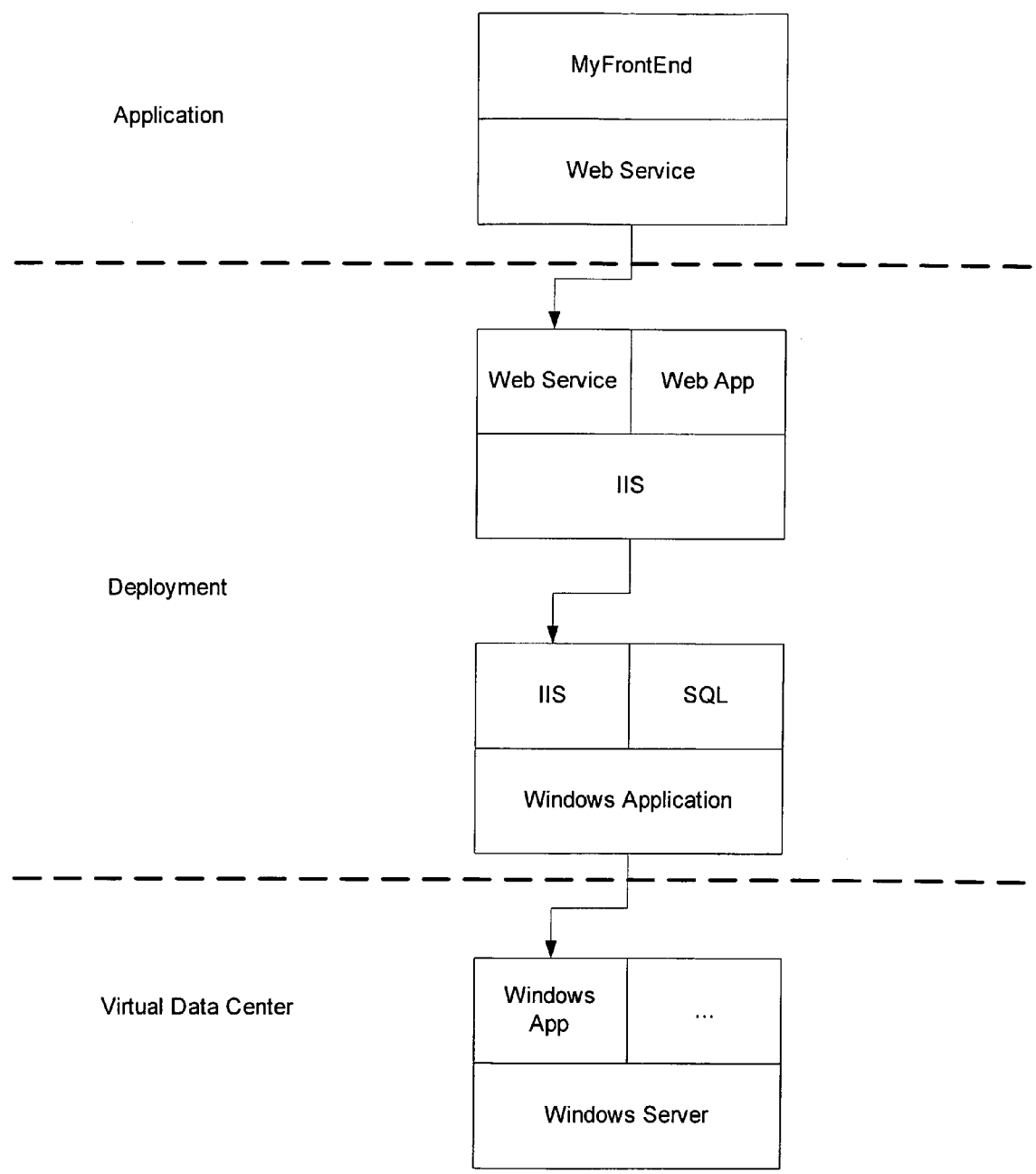

FIG. 14 shows a more detailed view of the relationships between components and host at the different layers. Notice that there is a binding between a component at one layer and a host component at the next layer down all the way through to the VDC layer.

In FIG. 14, MyFrontEnd is a Web Service hosted by IIS which is in turn a Windows Application hosted by Windows Server. There is an IIS factory that supports creation and deletion of Web Service and Web Application component instances just as there is a Windows Application factory that is responsible for creating and deleting instances of IIS and SQL.

Figure 15:
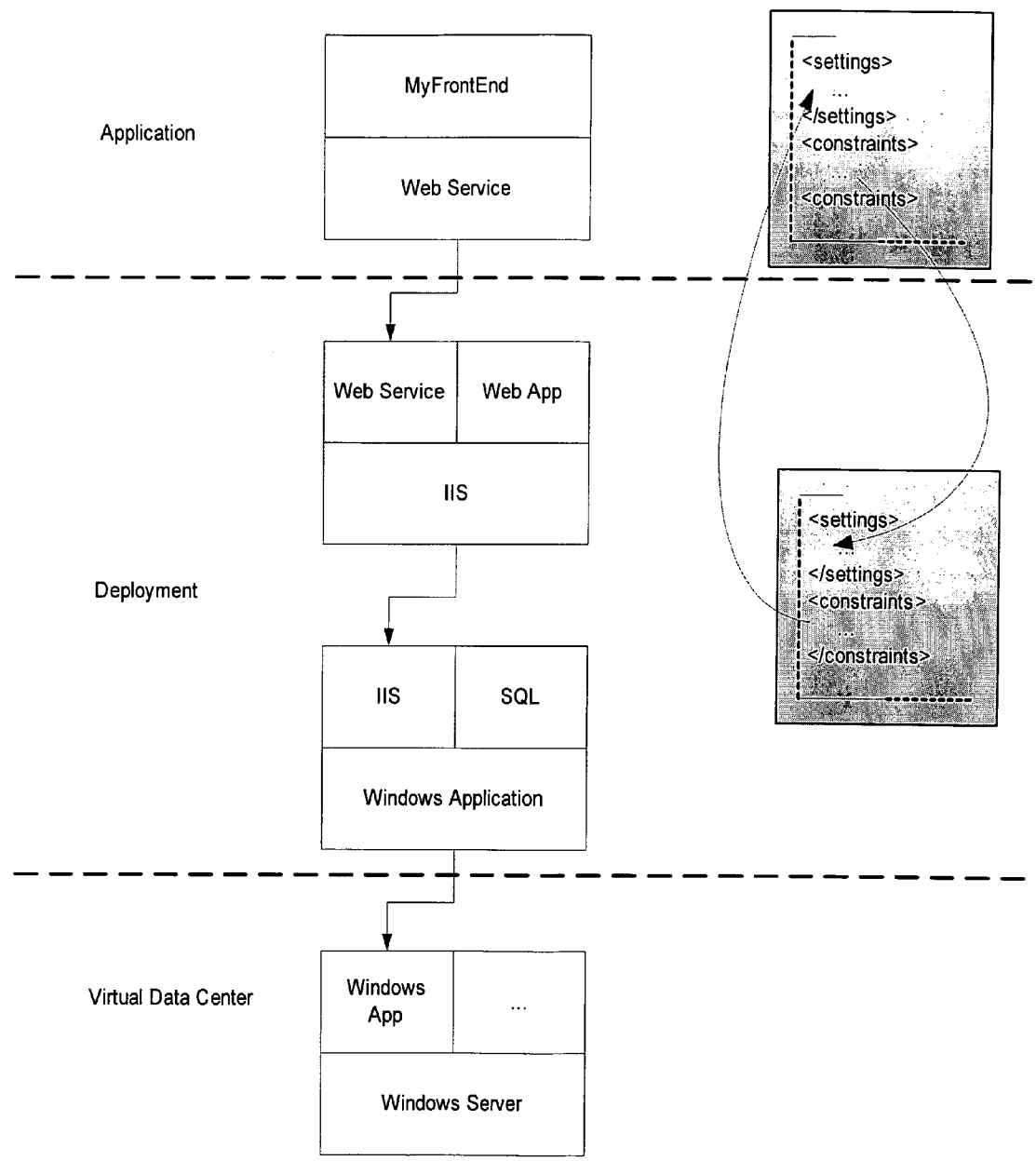
Figure 16:
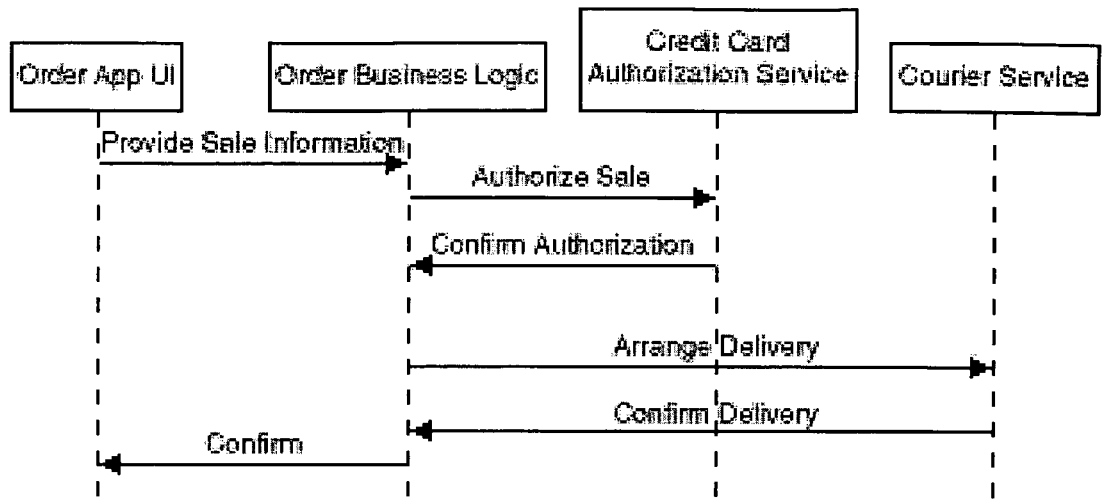
FIG. 16 illustrates an example process.
Figure 18:
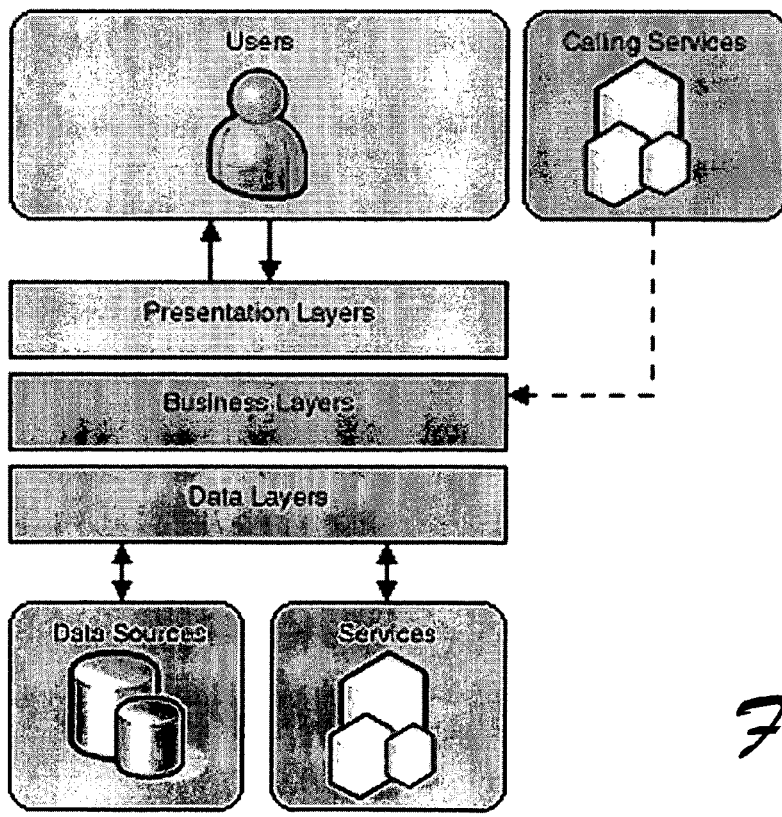
FIGS. 17–19 illustrate example components as discussed herein.
Figure 17:
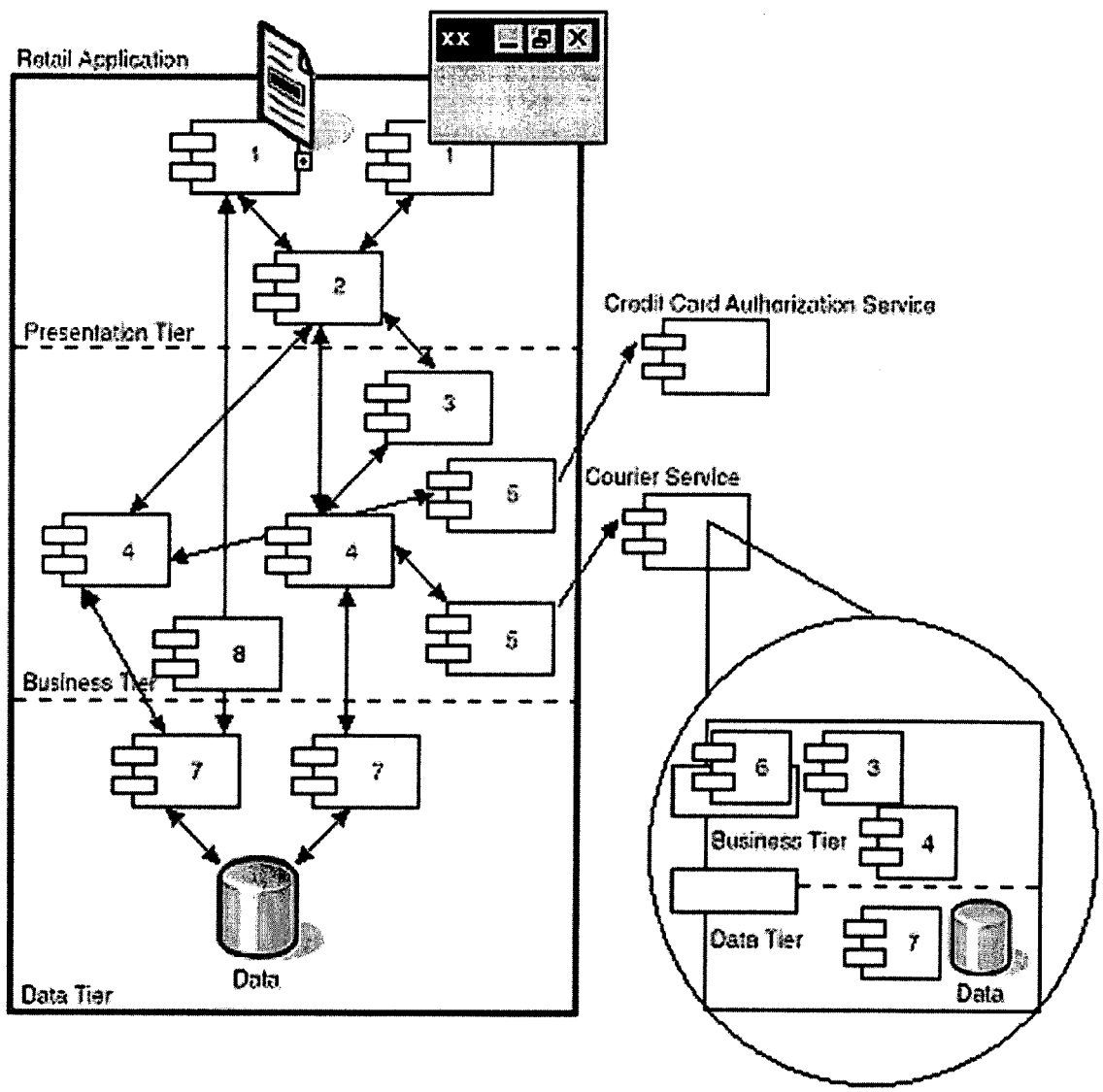
Figure 19:
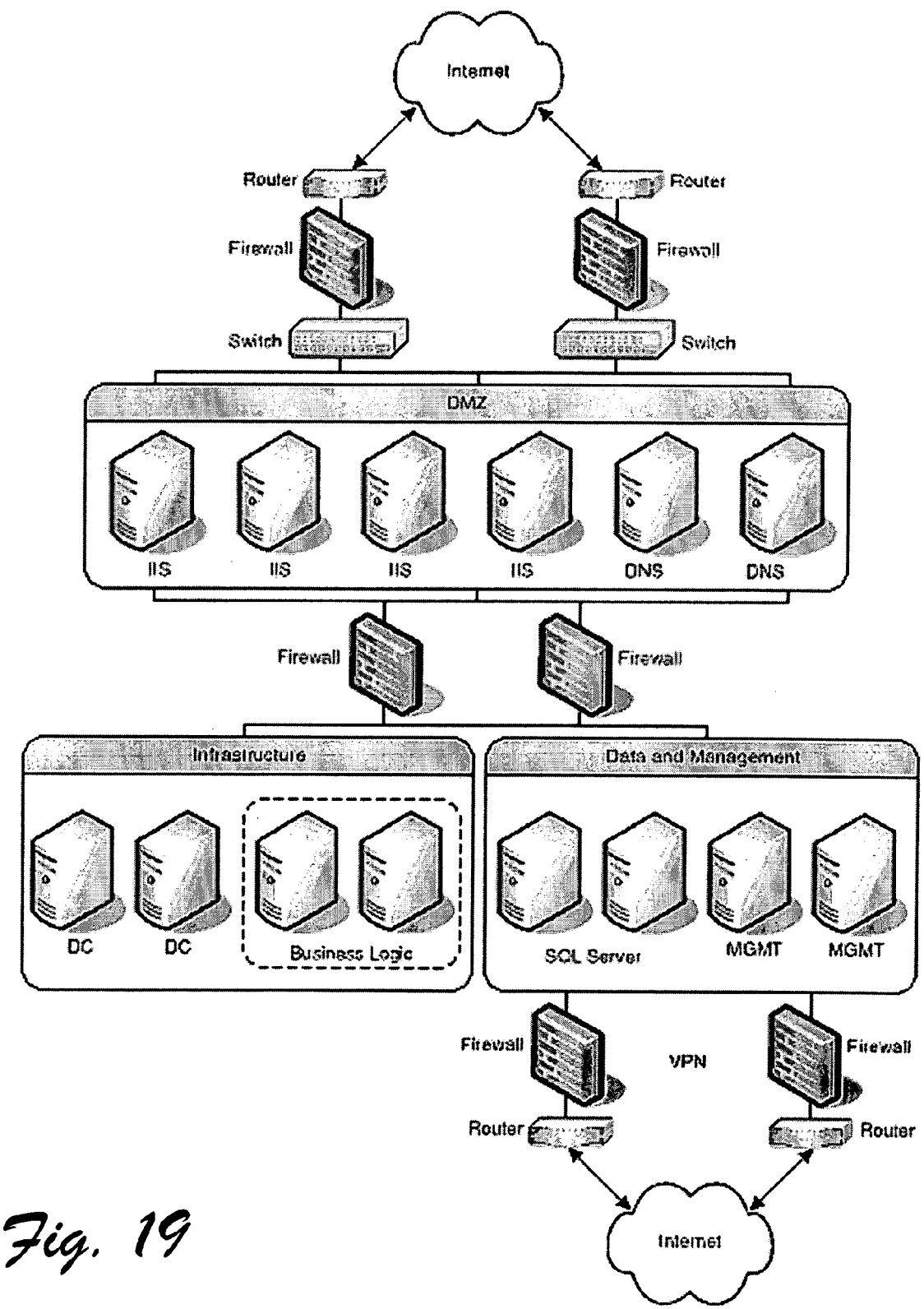

FIG. 15 shows how design-time validation would work between components at the different layers using the SDM settings and constraints semantics described previously.

Notice that the constraints of a component at the layer above are validated against the settings of the host component at the layer below. Also notice that the constraints of the host component are validated against the settings of the component to be hosted.

This two-way settings and constraint checking allows a developer to reliably develop his/her application/service in the context of the operational environment described using SDM semantics all the way down. In order to describe a data center such that its description can be relied upon during the development process, it is necessary to create an abstraction of the data center referred to as the VDC.

Virtual Data Center (VDC)

A VDC is a logical representation of a physical data center environment that simplifies the developer's view of the data center. Ideally an IT Professional or Architect should be able to describe the data center in the same scale-invariant manner that a developer can describe a distributed application/service. The way to think about the VDC is that it is an abstraction of the server, network and storage resources within the data center and their topological relationships. A typical data center diagram is quite complex with multiple interconnected servers, network equipment, IP addresses, VLANs, operating systems, storage, etc. all expressed on a single diagram drawn using Visio or a similar tool. In addition to the diagram, there are usually long documents that prescribe exactly how the data center is partitioned, configured and managed.

An example of this complexity is the Microsoft Systems Architecture (MSA) Enterprise Data Center (EDC). It should be obvious that keeping the manually drawn diagrams and documents current with the state of the data center over time as updates and upgrades -are applied becomes a costly if not impossible task. Likewise, the ability to validate the environment against the document prescriptions is difficult and prone to human error.

The ability to represent a complex data center such as the MSA EDC in a scale-invariant manner would be immensely powerful to both the developer and the IT professional. The ability to describe a data center using components, ports and wires provides a powerful framework within which to model and validate deployment requirements that is missing in today's design and deployment process.

Agenda: Overview, SDM Building Blocks, Example Application, Example Host, Logical Placement, Deployment, Status.

The SDM is a meta-model well-suited for capturing the elemental pieces of distributed applications and their deployment environments. The SDM is authoritative: Application and environment are constructed from their SDM, Changes to the application and environment will be done through the SDM. Provide a namespace for management processes.

The Service Definition Model refers to a collection of interrelated schemas:

Classes, class relationship and installer schema
Component, Port and Wire Types schema
Logical placement schema
Physical placement schema
Instantiation request schema
Instance schema SDM Classes are the basic building blocks for all distributed applications and deployment environments. Application classes: ASP.Net Web Service, ASP.Net Web Site, BizTalk Orchestration Schedule, Services Components (COM+), etc. Service classes: IIS Server, SQL Server, BizTalk Server. OS, Network & Storage classes: Windows VLAN, Filter, Disk, etc. Hardware classes: Server, Switch, Firewall, Load Balancer, SAN, etc. Classes are authored by system level developers and don't change frequently. Classes are behind every component, port and wire in the SDM. Each class contains a schema for its public settings (simply called settings) and private settings (called deployment). Relationships are captured between classes: component class to port class, wire class to port class, and component class to component class.

```
ASP.Net Web Site Class
    <componentClass name="WebSite" layer="Application">http://big/
        <settingSchema><xs:schema><xs:complexType><xs:sequence>
            <xs:element name="webSiteName" type="xs:string"/>
            <xs:element name="authentication" type="xs:string"/>
            <xs:element name="sessionState" type="xs:boolean"/>
        </xs:sequence></xs:complexType></xs:schema></settingSchema>
        <deploymentSchema><xs:schema><xs:complexType>
        <xs:sequence>
            <xs:element name="fusionManifest" type="xs:string"/>
        </xs:sequence></xs:complexType></xs:schema>
        </deploymentSchema>
        <portClassesAllowed closed="true">
            <portClassRef name="ClientDataAccess" />
            <portClassRef name="WebServer" maxOccurs="1"/>
            <portClassRef name="SoapClientInterface" />
            <portClassRef name="RemotingClientInterface" />
        </portClassesAllowed>
    </componentClass>
SOAP Client Port Class
    <portClass name="SoapClientInterface"
    layer="Application">http://big/
        <settingSchema><xs:schema><xs:complexType><xs:sequence>
            <xs:element name="formatter" type="xs:string"/>
            <xs:element name="transport" type="xs:string"/>
        </xs:sequence></xs:complexType></xs:schema></settingSchema>
        <deploymentSchema><xs:schema><xs:complexType>
        <xs:sequence>
            <xs:element name="wsdlFile" type="xs:string"/>
        </xs:sequence></xs:complexType></xs:schema>
        </deploymentSchema>
    </portClass>
SOAP Wire Class
    <wireClass name="SoapConnnection" layer="Application">
        <settingSchema/>
        <deploymentSchema/>
        <portClassesAllowed>
            <portClassRef name="SoapServerInterface"/>
            <portClassRef name="SoapClientInterface"/>
        </portClassesAllowed>
    </wireClass>
IIS Component Class
    <componentClass name="IIS" layer="Service">
        <settingSchema><xs:schema><xs:complexType><xs:sequence>
            <xs:element name="certificateAuth" type="xs:boolean"/>
            <xs:element name="ntlmAuth" type="xs:boolean"/>
            <xs:element name="sessionStateType" type="xs:string"/>
        </xs:sequence></xs:complexType></xs:schema></settingSchema>
        <deploymentSchema><xs:schema><xs:complexType>
        <xs:sequence>
            <xs:element name="fusionManifest" type="xs:string"/>
        </xs:sequence></xs:complexType></xs:schema>
        </deploymentSchema>
    - <portClassesAllowed>
            <portClassRef name="HTTPServer"/>
            <portClassRef name="HTTPClient"/>
            <portClassRef name="TDSClient"/>
        </portClassesAllowed>
    </componentClass>
Class Relationships and Installers
    <hostRelation classRef="WebSite" hostClassRef="IIS"
installerRef="WebSiteInstaller"/>
    <installer name="WebSiteInstaller" code="WebSiteInstaller,
    IISInstaller"
codeType="assembly" />
```

<HostRelation> captures a hosting relationship between classes: IIS can host Web Sites Installers are "plugins" into the SDM Runtime that are responsible for creating a new instances of the component, port and/or wire classes. Installers are also responsible for configuring instances of the class. Different installers might use the same underlying deployment & configuration technology, such as Fusion or WMI.Config.

Distributed Application

Distributed Applications are constructed from component, port and wire classes. Developers create component, port and wire types from classes. Types are "uses" of classes and supply the values of the setting and deployment schema. Types are a units of reuse. Types map to a single project in Visual Studio.

SDM supports composition of types through compound component types. Composition allows bigger distributed applications to be built from smaller ones. Compound component types map to a new project type in Visual Studio—Whitehorse.

```
FMStocks.Web Component Type
    <componentType name="FMStocks.Web" class="WebSite">
        <ports>
            <port name="web" type="webServer"/>
            <port name="stock" type="StockClient"/>
            <port name="accounts" type="AccountClient"/>
            <port name="trades" type="TradeClient"/>
        </ports>
            <settings>
                <webSiteName>FMStocks.Web</webSiteName>
                <authentication>Certificate</authentication>
                <sessionState>true</sessionState>
            </settings>
            <deployment>
                <fusionManifest>fmstocks.web.manifest
                </fusionManifest>
            </deployment>
    </componentType>
FMStocks7 Compound Component Type
    <compoundComponentType name="FMStocks">
        <components>
            <component name="web" type="FMStocks.Web"/>
            <component name="svc" type="FMStocks.WebService"/>
            <component name="biz" type="FMStocks.BusinessService"/>
            <component name="custdb"
            type="FMStocks.CustomerDatabase"/>
        </components>
        <wires/>
        <delegatePorts>
            <port name="web" componentname="web" portname="web"/>
            <port name="svc" componentname="svc" portname="svc"/>
        </delegateports>
    </componentType>
```

SDU and Deployment Environment

Component, port and wire types for a distributed application are packaged along with any binaries in an Service Deployment Unit (SDU). Binaries include all .DLLs, .EXE, config, static content, etc. SDU represents a portable, independently installable, distributed application. Analogous to the Windows Installer MSI file for Desktop applications. But, unlike desktop applications which primarily target a uniform environment (Windows), distributed applications. Can be hosted on different deployment environments that vary significantly. Must be able to express their requirements on the deployment environment. Must honor all policies of their deployment environment.

Therefore, we need a model to express requirements and constraints of both the application and the deployment environment. My WebSite component type needs an IIS server that has been configured with sessions state stored in a SQL database. The web zone will only host webSites components that are using certificate authentication.

```
IIS Component Type
    <componentType name="WebTierIIS" class="IIS">
        <ports/>
            <settings>
                <certificateAuth>true</certificateAuth>
                <ntlmAuth>false</ntlmAuth>
            <sessionStateType>true</sessionStateType>
            </settings>
            <deployment/>
            <hostedClasses>
                <hostedClass class="WebSite">
                <!-- constraint language expressed using XPath -->
                    <constraint>/
                    [authentication="certificate"</constraint>
                </hostedClass>
            </hostedClasses>
    </componentType>
FMStocks.Web Component Type (revisited)
    <componentType name="FMStocks.Web" class="WebSite">
        <ports/>
            <settings>
                <webSiteName>FMStocks.Web</webSiteName>
                <authentication>Certificate</authentication>
            <sessionState>true</sessionState>
            </settings>
        <deployment>
            <fusionManifest>fmstocks.web.manifest
            </fusionManifest>
        </deployment>
        <hostConstraints>
            <hostConstraint hostClass="IIS">
                <constraints>/
                [sessionStateType="SQL"]</constraints>
            </hostConstraint>
        </hostConstraints>
    </componentType>
```

Logical Placement

Before an SDU can be deployed, we must first do a logical placement of the types on the target deployment environment. Logical placement can be done at design time. Requirements and constraints are checked and the developer is alerted of any errors or warnings. The result of the logical placement is captured in a separate file from the SDU. An SDU can be have different logical placements for different deployment environments (Development, Test, Production, etc.) Constraint checking is implemented using XPath and the XSD specified on each component, port and wire class.

Building the Deployment Environment

Figure 22:
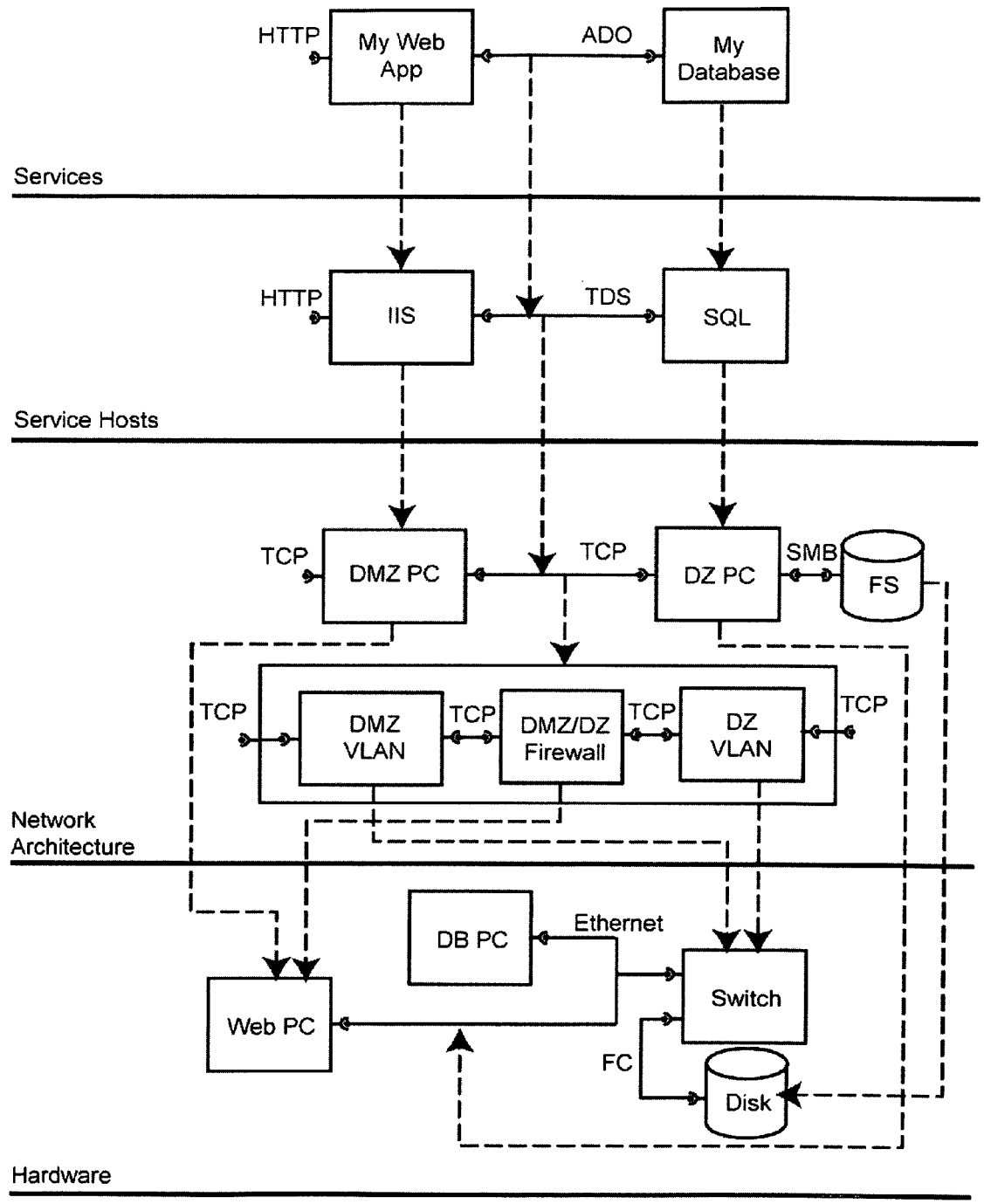
FIG. 22 illustrates an example SDM model.
Figure 23:
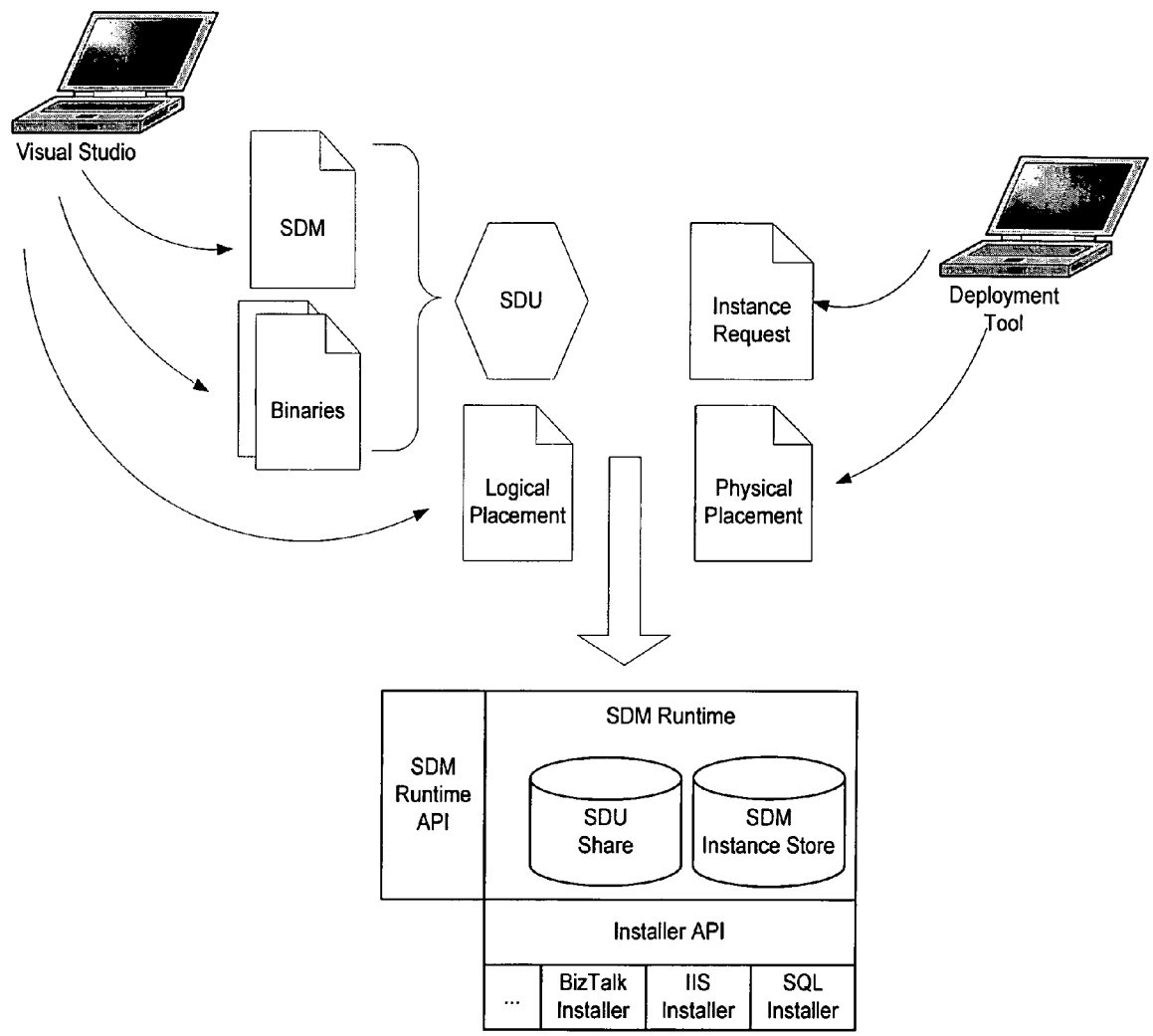
FIG. 23 illustrates an example deployment.

Deployment environments are built using the SDM model. See FIG. 22. In essence, they are SDM Applications at a different layer. Component, port and wire types are used in the same way to compose service hosts, network architectures, and hardware. In the Whidbey timeframe we will support deploying the application layer only. In ADS V2.0 we will be able to deploy the Service Host, Network and Hardware Layers. Visual studio is building a designer for authoring deployment environments. Visual Studio refers to this as the Logical Infrastructure Model. FIG. 23 illustrates an example deployment.

Instance Request Document

Figure 24:
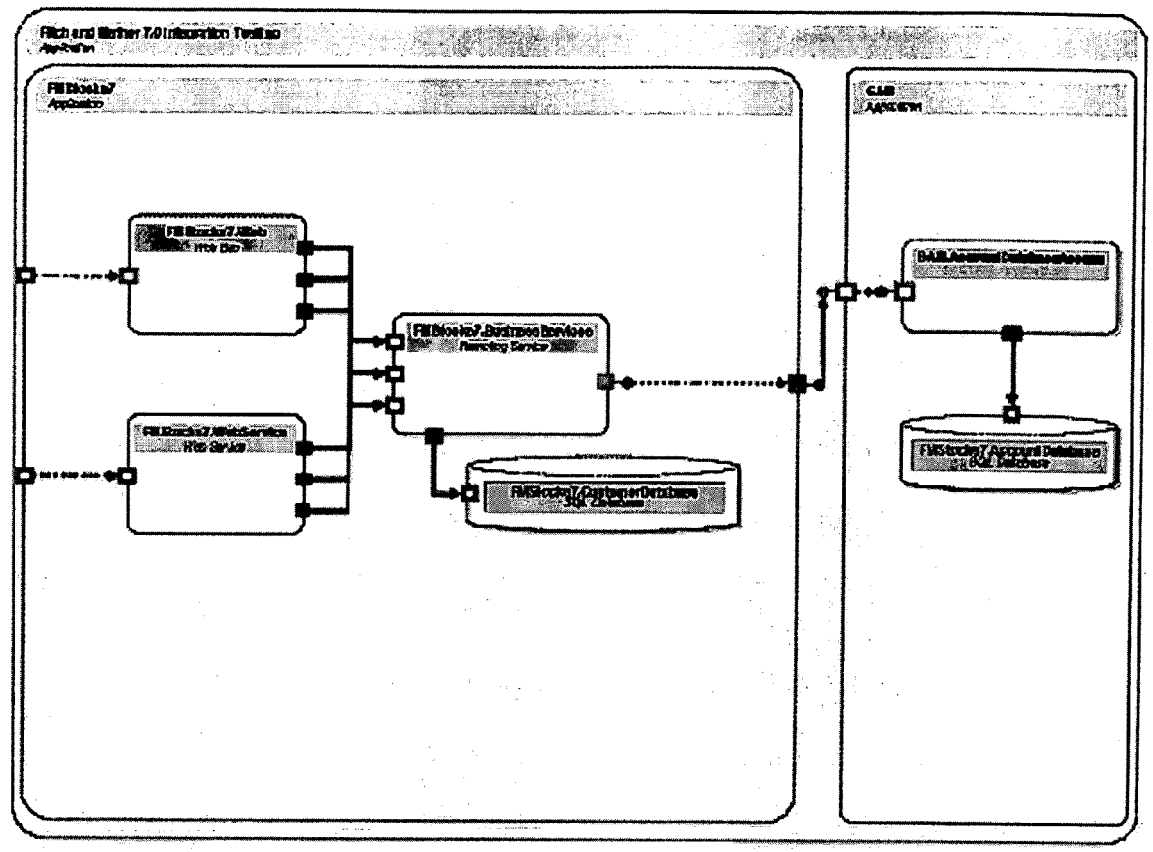
FIG. 24 illustrates example types.
Figure 25:
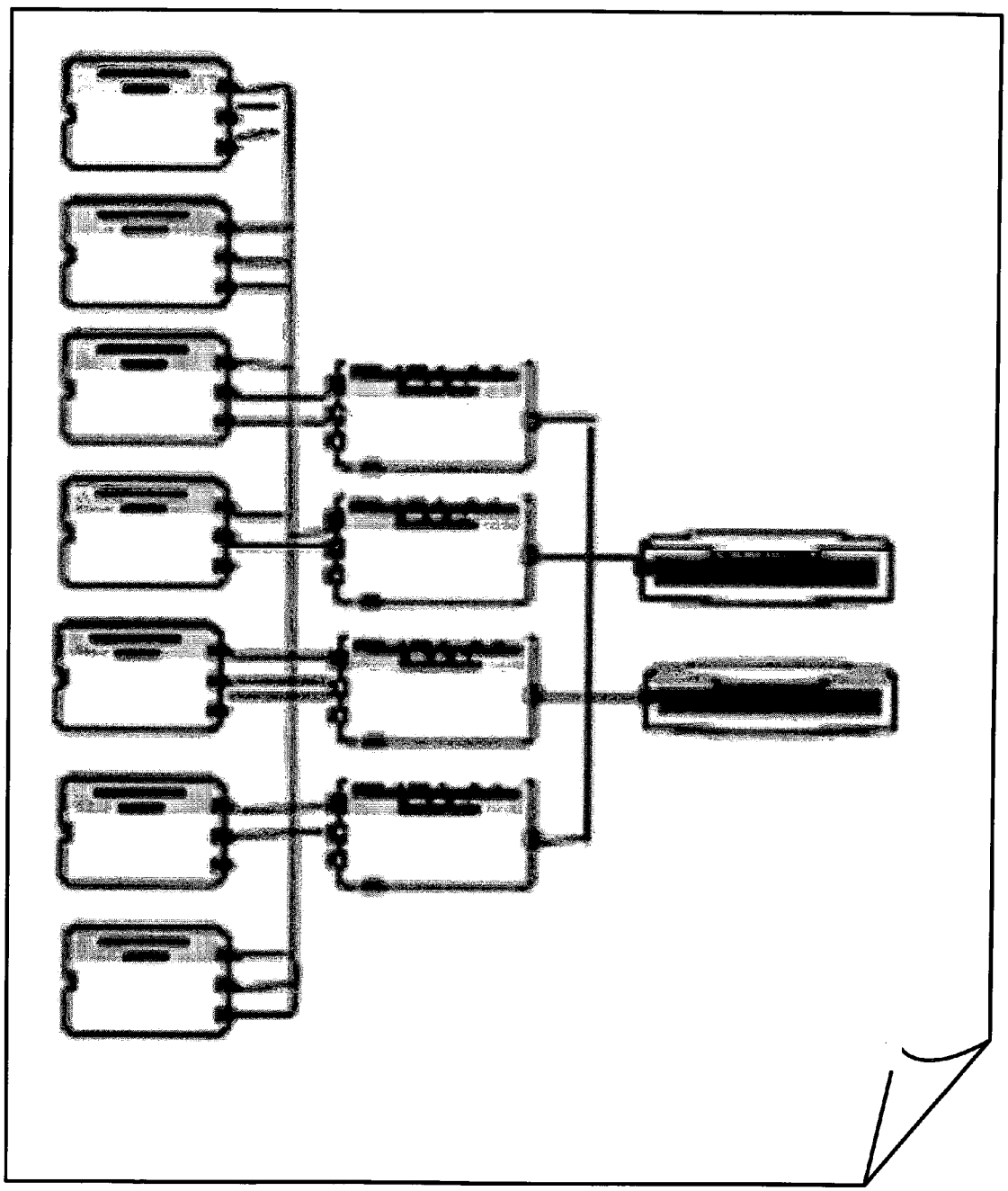
FIG. 25 illustrates example instance requests.

SDM types are scale invariant and can be created to any scale. The Instance Request Document is a declarative definition of the instances that need to be created. Includes the wiring topology. FIG. 24 illustrates example types and FIG. 25 illustrates example instance requests.

Physical Placement

Figure 26:
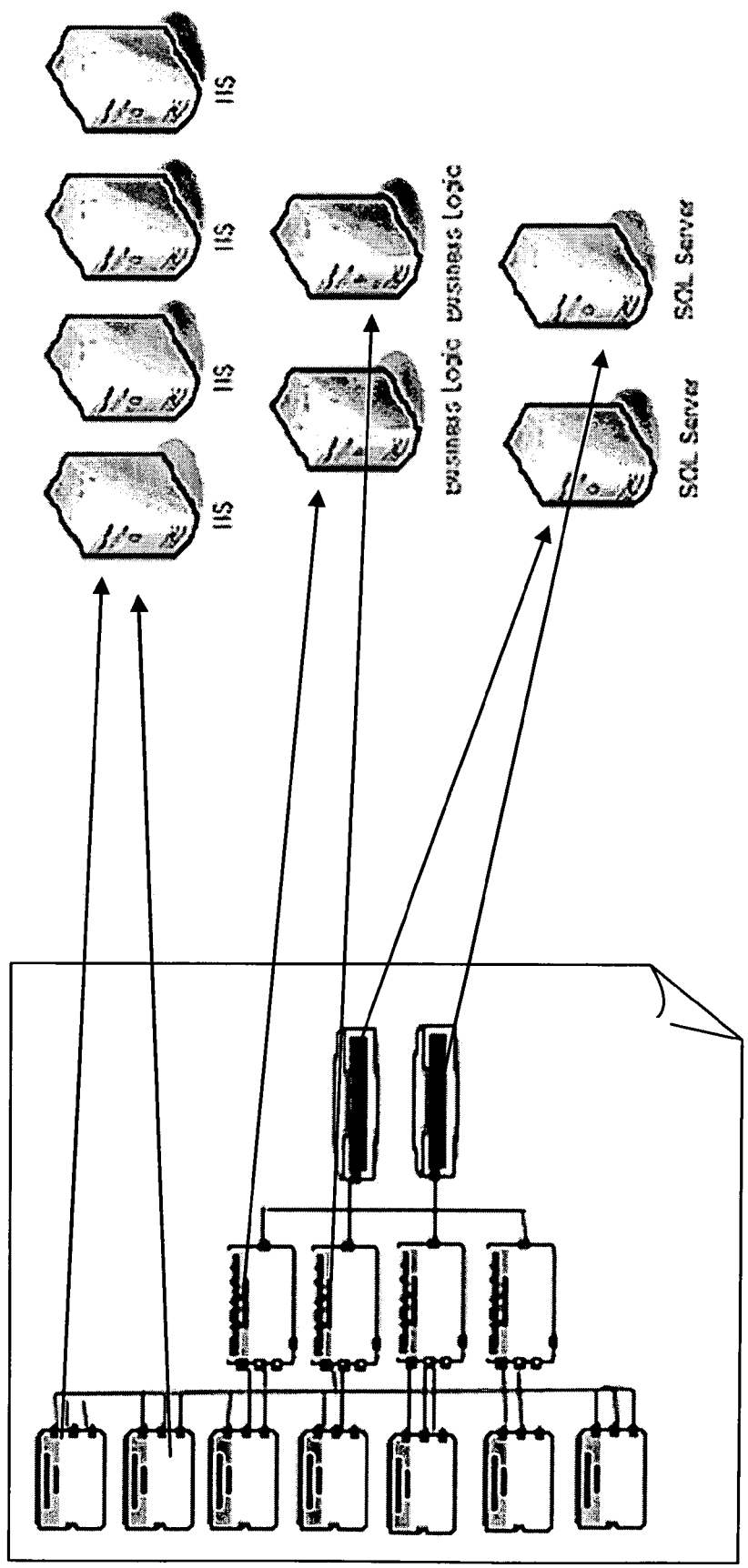
FIG. 26 illustrates example revalidation of constraints.

Physical placement is the act of picking the specific host instance that is the target of deployment. Physical placement is constrained by the logical placement. Constraints are revalidated during physical placement. See FIG. 26.

Deployment

SDU, Logical Placement file, Instance Request, and Physical Placement file are fed into the SDM Runtime. The SDM Runtime will then invoke the appropriate installer based on the class and host relationship. The installer is responsible for creating a new instance on the host and configuring it to match the settings values on the type. SDM Runtime will maintain a database of all instances, their final setting values, and placement. Runtime API will support querying of the instance space.

SDM Schema Design Specification

There are three core elements of the SDM schema: ports, wires and components. Ports represent communication endpoints, components represent parts of a distributed application and wires represent communication links between applications parts. These appear in different forms in three separate spaces: the resource space, the application space, and the instance space.

In the resource space, the resource classes that applications in the application space will be built from are defined. These classes provide a common categorization of the application parts allowing tool support for a wide range of applications and providing the basis for type checking at design time. We expect these core classes to provide a comprehensive set of features for service design and we expect that they will change slowly over time.

In the application space, application types are built. We take a resource class and fill in the details, such as providing links to content, and providing setting values for the properties. We then build distributed applications from these types by associating port types with component types, using component types within a compound component types and describing the communication relationships between the members of a compound component type by using wire types.

The instance space consists of the instances created during the process deploying and running an application. We expose the communication relationships we defined in application space through the SDM runtime thus allowing instances to find other instances.

Resource Classes

We use resource classes to define the elements of application that we need to know about in order to check configuration at design time and then to deploy at run time. These elements are:

a) Who an application communicates with. In order to verify a distributed application against a network topology we need to know about the protocols that parts of the application can use to communicate with each other. Port classes are used to describe protocol end points. Wire classes are used to describe the relationships that can be constructed between these endpoints.

b) What settings apply to an application and how is it deployed. Component classes define building blocks that can be used to construct an application. A component class defines the settings that can be used to control behavior specific to the component and defines a schema for the files and scripts that can be provided to deploy the component.

c) What an application depends on in order to function correctly. In order to work correctly a component may depend on certain functionality that must already exist in the target environment. An example is a web service that depends on IIS. We express these requirements as hosting relationships between resources. Using these relationships we can build a dependency tree over the set of resource types that allows us to check ahead of time whether a specific application will run in a particular environment.

Application Types

We build applications types using the resource classes defined in the resource space. From these classes, we derive port types and wire types to model application specific communication links and we build component types to model the discrete parts of the application.

Port types are communications endpoints that describe behavior particular to an application. We take a port resource and provide information that is specific to its use within the application. An example might be a port type that takes a soap resource and provides a WSDL file to define the functions that the application exposes.

Wire types define application specific communication paths. A wire type confines a particular wire resource to connecting two compatible application end points. For example, we might take a soap wire resource and confine it to connecting the soap port types that we defined above.

Component types are used to model the parts of an application that can be deployed independently and can also be distributed across machine boundaries. For example, an application having a web front end and a database backend is likely to consist of several component types. In this case we might take a web service resource and use it to create the web front end component type and a database resource to create the database backend component type. We would then add the appropriate port types to the component types in order to model the application interfaces. We call these port members.

Compound component types used are group component types together to form a new component type. A use of a component type inside a compound component is called a component member. We connect the interfaces that component members expose to other members using the wire types we defined earlier. These become the wire members of the compound component.

In order for compound components to look like a component, they need to expose interfaces, capabilities and requirements just like a component. We do this by delegating out a subset of the ports members from the component members of the compound component.

In order to satisfy the requirements of a component we have to bind that component to another component that has matching capabilities. We call this process binding.

Exemplary Implementation

In this section we describe the XML schema that we use to define the elements of the SDM model. Settings are used by both applications and resources so we describe them first, then we describe resource classes, then application types and finally the instance space.

Naming

Namespaces are used to define naming scopes within which classes and types can be defined. Within a namespace all class and type names are unique. A namespace is defined by a name, version, and a cryptographic key that can be used to validate the contents of the namespace.

```
<xs:attributeGroup name="identity">
    <xs:attribute name="name" type="xs:string" use="required"/>
    <xs:attribute name="version" type="fourPartVersionType"
            use="required"/>
    <xs:attribute name="publicKeyToken" type="publicKeyTokenType"
            use="optional"/>
</xs:attributeGroup>
```

A file version is defined by a four part number of the form N.N.N.N where 0<N<65535.

```
<xs:simpleType name="fourPartVersionType">
    <xs:annotation>
        <xs:documentation>Four part version numbers where the segments
are in the range 0–65535 </xs:documentation>
    </xs:annotation>
    <xs:restriction base="xs:string">
        <xs:pattern value="(0|[1–5][0–9]{0,4}|[7–9][0–9]{0,3}|6[0–4]
[0–9]{0,3}|6[6–9][0–9]{0,2}|65|65[0–4][0–9]{0,2}|65[6–9]
[0–9]?|655|55[0–2][0–9]?|655[4–9]|6553[0–5]?).(0|[1–5][0–9]{0,4}|[7–9]
[0–9]{0,3}|6[0–4][0–9]{0,3}|6[6–9][0–9]{0,2}|65|65[0–4][0–9]{0,2}|
65[6–9][0–9]?|655|655[0–2][0–9]?|655[4–9]|6553[0–5]?).(0|[1–5][0–9]
{0,4}|[7–9][0–9]{0,3}|6[0–4][0–9]{0,3}|6[6–9][0–9]{0,2}|65|65[0–4]
[0–9]{0,2}|65[6–9][0–9]?|655|655[0–2][0–9]?|655[4–9]|6553[0–5]?).(0|
[1–5][0–9]{0,4}|[7–9][0–9]{0,3}|6[0–4][0–9]{0,3}|6[6–9]
[0–9]{0,2}|65|65[0–4][0–9]{0,2}|65[6–9][0–9]?|655|655[0–2]
[0–9]?|655[4–9]|6553[0–5]?)"/>
    </xs:restriction>
</xs:simpleType>
```

A public key token is a 16 character hex string that identifies the public part of a public/private key pair. The document will be signed using the private key, allowing the user of the document to verify its contents using the public key.

```
<xs:simpleType name="publicKeyTokenType">
    <xs:annotation>
        <xs:documentation>Public Key Token: 16 hex digits in
size</xs:documentation>
    </xs:annotation>
    <xs:restriction base="xs:string">
        <xs:pattern value="([0–9]|[a–f]|[A–F]){16}"/>
    </xs:restriction>
</xs:simpleType>
```

Simple names within the namespace are then constructed using strings.

We allow namespaces to reference other namespaces by importing them into the current namespace and then associating an alias with the namespace.

```
<xs:complexType name="import">
    <xs:attribute name="alias" type="xs string" use="required"/>
    <xs:attributeGroup ref="identity"/>
</xs:complexType>
```

References to classes and types are then either simple names that refer to objects defined in the current namespace or compound names that use both an alias and a simple name to identify an object defined in another namespace.

Settings

Both resource classes and application types can expose a settings schema. This schema is used to describe the values that can be provided when a new port, wire or component type is created from a class, when a port type is added to a component type, or when a wire type or component type is used in a compound component type.

Settings Schema

We use XSD to describe the settings schema. For the initial release we use a subset of XSD that is limited to simple types and a list of element types.

```
<xs:complexType name="settingSchema">
    <xs:sequence>
        <xs:any namespace="http://www.w3.org/2001/XMLSchema"
              processContents="skip" minOccurs="0"
maxOccurs="unbounded"/>
    </xs:sequence>
</xs:complexType>
```

Setting Values

Setting values are provided when a type is created based on a class or when a type is used inside a component or compound component. The settings values are a XML block that conforms to the appropriate settings schema.

```
<xs:complexType name="settingValues">
    <xs:sequence>
        <xs:any namespace="##other" processContents="lax"/>
    </xs:sequence>
</xs:complexType>
```

Settings Flow

We use settings flow to allow settings values to pass from the component type to the members of the component type. Settings flow is implemented using XPATH in setting values sections that select values from the settings schema defined by the type.

We identify values that we want to flow contents to by the use of a special attribute that is defined in the SDM namespace. If this attribute exists on an element then we expect the attribute value to be an XPath into the settings schema for the type.

Settings Constraints

Settings constraints are used to validate and constrain settings values. For example an IIS server may require all web services that it hosts to have some of their settings values confined to a particular value or range of values. We use XPATH to validate settings values (or XQUERY once it is fully supported). We support the following forms of query:

Path must exist.

Path must not exist.

If path exists then [(path must exist|path must not exist)*]

Using the first form we can require settings to be set to a particular value or set of values, using the second we can require that a setting not be set to a value or set of values and using the third form we can construct relationships between settings requiring combinations of settings to be set together.

```
<xs:complexType name="settingConstraints">
    <xs:sequence>
        <xs:element name="mustExist" type="simpleTest"
              minOccurs="0" maxOccurs="unbounded"/>
        <xs:element name="mustNotExist" type="simpleTest"
              minOccurs="0" maxOccurs="unbounded"/>
        <xs:element name="ifExists" type="nestedTest"
              minOccurs="0" maxOccurs="unbounded"/>
        <xs:element name="ifNotExists" type="nestedTest"
              minOccurs="0" maxOccurs="unbounded"/>
    </xs:sequence>
</xs:complexType>
<xs:attributeGroup name="testAttributes">
    <xs:attribute name="path" type="xs:string"/>
    <xs:attribute name="ifNullPath" type="ifNullPath"/>
    <xs:attribute name="error" type="xs:int"/>
    <xs:attribute name="errorDesc" type="xs:string"/>
</xs:attributeGroup>
<xs:complexType name="simpleTest">
    <xs:attributeGroup ref="testAttributes"/>
</xs:complexType>
<xs:complexType name="nestedTest">
    <xs:sequence>
        <xs:element name="mustExist" type="simpleTest"
              minOccurs="0" maxOccurs="unbounded"/>
        <xs:element name="mustNotExist" type="simpleTest"
              minOccurs="0" maxOccurs="unbounded"/>
        <xs:element name="ifExists" type="nestedTest"
              minOccurs="0" maxOccurs="unbounded"/>
        <xs:element name="ifNotExists" type="nestedTest"
              minOccurs="0" maxOccurs="unbounded"/>
    </xs:sequence>
    <xs:attributeGroup ref="testAttributes"/>
</xs:complexType>
```

We need to expose options for dealing with the case when the path does not exist. The following allow the designer to choose to raise an error, insert a value or ignore the test.

```
<xs:simpleType name="ifNullPath">
    <xs:restriction base="xs:string">
        <xs:enumeration value="skip"/>
        <xs:enumeration value="override"/>
        <xs:enumeration value="returnError"/>
    </xs:restriction>
</xs:simpleType>
```

EXAMPLES

The following is a simple schema modeling values a computer class might expose. The schema has a single top level node that identifies the settings group and three properties underneath the node.

```
<settingSchema>
    <xs:schema>
        <xs:element name="processorSettings">
            <xs:complexType>
```

```
        <xs:sequence>
            <xs:element name="numberOfCpus" type="xs:int"/>
            <xs:element name="memory" type="xs:int"/>
            <xs:element name="dualHomed" type="xs:boolean"/>
        </xs:sequence>
      </xs:complexType>
    </xs:element>
  </xs:schema>
</settingSchema>
```

We could provide the following values for the schema within a type.

```
<settings>
    <processorSettings>
        <numberOfCpus>4</numberOfCpus>
        <memory>8000</memory>
        <dualHomed>false</dualHomed>
    </processorSettings>
</settings>
```

If we wanted to provide the settings values when the type was used then we would use settings flow.

Constraints may be written against these values. In the example, the first is a simple mustExist constraint. The second constraint uses a test to determine whether to evaluate the nested constraints.

```
<constraints>
    <mustExist path="ProcessorSettings/[memory >= 1000]"
        errorDesc="Host machine does not have enough memory"/>
    <ifExists path="ProcessorSettings/[cpu >= 2]"
        errorDesc="Host machine has two processors but not enough
resources">
        <mustExist path="ProcessorSettings/[memory >= 2000]"
            errorDesc="Host machine does not have enough memory"/>
    </ifExists >
</constraints>
```

Resources

Base Class

All resource class schemas derive from class. They share a settings schema, deployment schema and name and layer attributes. The settings schema describes the settings that apply to types based on this class, the values that they can take and description of each. The deployment schema describes the information that is required to deploy a type that is based on this resource. The layer attribute associated the resource with one layer in the design space. The name attribute is used to give the class a unique name within the namespace.

```
<xs:complexType name="class">
    <xs:sequence>
        <xs:element name="deploymentSchema" type="deploymentSchema"
            minOccurs="0" maxOccurs="1"/>
        <xs:element name="settingSchema" type="settingsSchema"
            minOccurs="0" maxOccurs="1"/>
    </xs:sequence>
    <xs:attribute name="name" type="xs:string" use="required"/>
    <xs:attribute name="layer" type="layer" use="required"/>
</xs:complexType>
```

For the deployment schema the namespace is left undefined. The constraints on the schema are entirely the responsibility of the installer for the class.

```
<xs:complexType name="deploymentSchema">
    <xs:sequence>
        <xs:any namespace="##other" processContents="lax"/>
    </xs:sequence>
</xs:complexType>
```

The values provides as part of the deployment section must match the associated deployment schema.

```
<xs:complexType name="deploymentValues">
    <xs:sequence>
        <xs:any namespace="##other" processContents="lax"/>
    </xs:sequence>
</xs:complexType>
```

The layer attribute is an enumeration of four layer types. The application layer contains high level application components such as database and webserver. The service layer contains middleware services such as IIS and SQL. The network layer contains operating system, storage and network definitions. The hardware layer contains definitions of the hardware components of a data center.

```
<xs:simpleType name="layer">
    <xs:restriction base="xs:string">
        <xs:enumeration value="Application"/>
        <xs:enumeration value="Service"/>
        <xs:enumeration value="Network"/>
        <xs:enumeration value="Hardware"/>
    </xs:restriction>
</xs:simpleType>
```

Port Class

Port classes do not contain any information above that defined in the resource base type.

```
<xs:complexType name="portClass">
    <xs:complexContent>
        <xs:extension base="class">
        </xs:extension>
    </xs:complexContent>
</xs:complexType>
```

Component Class

A component class extends the base class by adding a list of allowed port classes.

```
<xs:complexType name="componentClass">
    <xs:complexContent>
        <xs:extension base="class">
            <xs:sequence>
                <xs:element name="portClassesAllowed"
                    type="portClassesAllowed"
                    minOccurs="0" maxOccurs="1"/>
            </xs:sequence>
        </xs:extension>
    </xs:complexContent>
</xs:complexType>
```

The list of port classes can be open or closed, if it is closed, then only those port types based on classes that appear in the list can be used on the associated component type. The minOccurs and maxOccurs attributes define the number of times one of these port types can be used.

```
<xs:complexType name="portClassesAllowed">
    <xs:sequence>
        <xs:element name="portClassRef" minOccurs="0"
                maxOccurs="unbounded">
            <xs:complexType>
                <xs:attribute name="name" type="xs:string"
                    use="required"/>
                <xs:attribute name="minOccurs" type="xs:int"
                    use="optional"/>
                <xs:attribute name="maxOccurs" type="xs:string"
                    use="optional"/>
            </xs:complexType>
        </xs:element>
    </xs:sequence>
    <xs:attribute name="closed" type="xs:boolean"
                default="true" use="optional"/>
</xs:complexType>
```

Wire Class

The wire class also extends the base schema by adding a list of allowed port classes. In this case the list defines the classes of the port types that may be associated with the wire type.

```
<xs:complexType name="wireClass">
    <xs:complexContent>
        <xs:extension base="class">
            <xs:sequence>
                <xs:element name="portClassesAllowed"
                    type="portClassesAllowed" minOccurs="0" maxOccurs="1"/>
            </xs:sequence>
        </xs:extension>
    </xs:complexContent>
</xs:complexType>
```

Hosting Relationship

A hosting relationship defines is a triple identifying a source class, a target class and an installer. The existence of the relationship indicates that an instance of a type based on the source class could be created using an instance of a type based on the target class and the installer associated with the relationship. The target class must be a component class.

For example a webservice class may be the source class in a hosting relationship with an IIS class and the webservice installer. In this case the relationship indicates that it may be possible to create an instance of type MyWebservice on type MyIIS using the installer. We do not know whether it will be possible to create the relationship until we have evaluated constraints that exist in both the application space and the instance space.

```
<xs:complexType name="hostRelation">
    <xs:attribute name="classRef" type="xs:string" use="required"/>
    <xs:attribute name="componentHostClassRef" type="xs:string"
        use="required"/>
    <xs:attribute name="installerRef" type="xs:string" use="required"/>
</xs:complexType>
```

The installer is identified by name, code type and a link to the binary that implements the installer.

```
<xs:complexType name="installer">
    <xs:sequence>
        <xs:element name="binary" type="xs:string" minOccurs="1"
            maxOccurs="1"/>
    </xs:sequence>
    <xs:attribute name="codeType" type="xs:string" use="required"/>
    <xs:attribute name="name" type="xs:string" use="required"/>
</xs:complexType>
```

EXAMPLES

These examples are excerpts from the extended four layer example. See the complete example files for details.

First we create some port classes to model access to a database. In this case we have a server port and a client port.

```
<portClass name="ServerDataAccess" layer="Application">
    <settingSchema>
        <xs:schema>
            <xs:complexType>
                <xs:sequence>
                    <xs:element name="databaseName" type="xs:string"/>
                    <!-- other connection string properties -->
                </xs:sequence>
            </xs:complexType>
        </xs:schema>
    </settingSchema>
</portClass>
<portClass name="ClientDataAccess" layer="Application"/>
```

We then create a wire class that models the communication link between the two port classes. The wire class has some settings and references the two port classes defined above. In this case the wire constrains there to be only one server on the connection, modeling the fact that the client port does not know how to load balance connections across multiple servers. A more complex wire implementation may allow multiple servers and implement some form of management to resolve connections.

```
<wireClass name="DataConnection" layer="Application">
    <settingSchema>
        <xs:schema>
            <xs:complexType>
                <xs:sequence>
                    <xs:element name="useSSL" type="xs:boolean"/>
                </xs:sequence>
            </xs:complexType>
        </xs:schema>
    </settingSchema>
    <portClassesAllowed>
        <portClassRef name="ServerDataAccess" maxOccurs="1"/>
        <portClassRef name="ClientDataAccess"/>
    </portClassesAllowed>
</wireClass>
```

Finally we create a component class that models a database. This class has both a settings and a deployment schema and identifies the ports that can exist on a component type based on this class.

```
<componentClass name="Database" layer="Application">
    <deploymentSchema>
        <xs:schema>
            <xs:complexType>
```

-continued

```
        <xs:sequence>
            <xs:element name="sqlScriptFilePath" type="xs:string"
                        maxOccurs="unbounded"/>
        </xs:sequence>
    </xs:complexType>
</xs:schema>
</deploymentSchema>
<settingSchema>
    <xs:schema>
        <xs:complexType>
            <xs:sequence>
                <xs:element name="databaseName" type="xs:string"/>
            </xs:sequence>
        </xs:complexType>
    </xs:schema>
</settingSchema>
<portClassesAllowed closed="true">
    <portClassRef name="ServerDataAccess"/>
</portClassesAllowed>
</componentClass>
```

All these components need mapping to compatible host types. In this case SQL server acts as a host for the server port and the database and IIS acts as a host for the sql client port. These classes are defined in a separate namespace aliased to middleware.

```
<hostRelations>
    <installer name="DatabaseInstaller" codeType="InstallerPlugin"/>
    <hostRelation classRef="database"
            componentHostClassRef="middleware:SQL"
            installerRef="DatabaseInstaller"/>
    <hostRelation classRef="ServerDataAccess"
            componentHostClassRef=" middleware:SQL"
            installerRef="DatabaseInstaller"/>
    <hostRelation classRef="ClientDataAccess"
            componentHostClassRef=" middleware:IIS"
            installerRef="WebServiceInstaller"/>
</hostRelations>
```

Applications

The application developer creates component, port and wire types in the application space to model his application. These types are created by selecting classes that match the layer that the developer is working within and then supplying values for the classes.

Application Base Type

All application type schemas are based on the following application base schema. The base schema attributes identify the class that the type is based on and the name of the type. In the body of the schema we identify the deployment values that will allow this type to be deployed, and the settings for the settings schema on the associated class. The type may define also define a new settings schema that identifies values that can be provided when this type is used within other types. Finally the base type includes a section for host constraints. This section identifies constraints on possible hosts for this type based on the host relationships that exist in the resource space for the class associated with this type.

```
<xs:complexType name="baseType">
    <xs:sequence>
        <xs:element name="deployment" type="deploymentValues"
                    minOccurs="0" maxOccurs="1"/>
```

```
        <xs:element name="settings" type="settingsValues"
                    minOccurs="0" maxOccurs="1"/>
        <xs:element name="settingSchema" type="settingSchema"
                    minOccurs="0" maxOccurs="1"/>
        <xs:element name="hostConstraints" type="hostConstraints"
                    minOccurs="0" maxOccurs="1"/>
    </xs:sequence>
    <xs:attribute name="class" type="xs:string" use="required"/>
    <xs:attribute name="name" type="xs:string" use="required"/>
</xs:complexType>
```

The hostConstraints section includes a set of constraints for each of the classes that could host the class associated with this type. These classes are identified by the host relations in the resource space. The constraints associated with each class are in terms of the settings schema the classes. The form of the constraints was defined above.

```
<xs:complexType name="hostConstraints">
    <xs:sequence>
        <xs:element name="hostConstraint" minOccurs="1"
                maxOccurs="1">
            <xs:complexType>
                <xs:sequence>
                    <xs:element name="constraint" type="settingConstraint"/>
                </xs:sequence>
                <xs:attribute name="host" type="xs:string" use="required"/>
            </xs:complexType>
        </xs:element>
    </xs:sequence>
</xs:complexType>
```

Port Type

Port types simply use the base type. There is no further information associated with a port type.

```
<xs:complexType name="portType">
    <xs:complexContent>
        <xs:extension base="baseType">
        </xs:extension>
    </xs:complexContent>
</xs:complexType>
```

Wire Type

Wire types extend the base type to add a list of allowed port types. Uses of these port types may then be associated with a use of the wire type within a compound component. By defining wire types in this way, the application designer can constrain the set of allowable connections between parts of his application by only creating wires types for compatible port types.

```
<xs:complexType name="wireType">
    <xs:complexContent>
        <xs:extension base="baseType">
            <xs:sequence>
                <xs:element name="portTypeRefs" minOccurs="0">
                    <xs:complexType>
                        <xs:sequence>
                            <xs:element name="portTypeRef"
                                    minOccurs="0" maxOccurs="unbounded">
                                <xs:complexType>
                                    <xs:attribute name="name" type="xs:string"
                                            use="required"/>
```

```
            </xs:complexType>
          </xs:element>
        </xs:sequence>
      </xs:element>
    </xs:sequence>
  </xs:extension>
</xs:complexContent>
</xs:complexType>
```

Component Type

A component type extends the base type to add a list of port members and a list of hosted classes.

Each port member is a use of an existing port type. The list of hosted classes identifies the classes that this component can host. These classes are a subset of the classes identified by the host relationships in the resource space, where this type's class is identified as a potential host.

```
<xs:complexType name="componentType">
  <xs:complexContent>
    <xs:extension base="baseType">
      <xs:sequence>
        <xs:element name="ports" type="portsList"
              minOccurs="0" maxOccurs="1"/>
        <xs:element name="hostedClasses" type="hostedClassesList"
              minOccurs="0" maxOccurs="1">
      </xs:sequence>
    </xs:extension>
  </xs:complexContent>
</xs:complexType>
```

Each port member in the ports list is identified by name and type. The port name must be unique within the component. The port type must have an associated port class that is allowed on the component class associated with this component type. For each port member we can provide a list of settings that match the schema defined by the port type.

```
<xs:complexType name="portsList">
  <xs:sequence>
    <xs:element name="port" minOccurs="0" maxOccurs="unbounded">
      <xs:complexType>
        <xs:sequence>
          <xs:element name="settings" type="settingValues"
minOccurs="0" maxOccurs="1"/>
        </xs:sequence>
        <xs:attribute name="name" type="xs:string" use="required"/>
        <xs:attribute name="type" type="xs:string"/>
      </xs:complexType>
    </xs:element>
  </xs:sequence>
</xs:complexType>
```

For each class in the hosted classes list we can associate a list of constraints. These constraints are written with respect to the setting schema of the hosted class.

```
<xs:complexType name="hostedClassesList">
  <xs:sequence>
    <xs:element name="hostedClass" minOccurs="1" maxOccurs="1">
      <xs:complexType>
        <xs:sequence>
```

```
          <xs:element name="constraints" type="settingConstraints"
minOccurs="1" maxOccurs="1"/>
        </xs:sequence>
        <xs:attribute name="class" type="xs:string" use="required"/>
      </xs:complexType>
    </xs:element>
  </xs:sequence>
</xs:complexType>
```

Compound Component Type

A compound component type (hereafter referred to as compound component) defines a new component type. When defining the compound component, there is the option to specify that the members of the type should be co-located. If the members are co-located, then when the type is deployed all the members of the type must be deployed on a single host. The compound component also contains a list of component members, a list of wire members, a section defining the ports that the component delegates and a list identifying the classes that the component can host.

```
<xs:complexType name="compoundComponentType">
  <xs:sequence>
    <xs:element name="components" type="components"
                  minOccurs="0" maxOccurs="1"/>
    <xs:element name="wires" type="wires"
                  minOccurs="0" maxOccurs="1"/>
    <xs:element name="delegatePorts" type="delegatePorts"
                  minOccurs="0" maxOccurs="1"/>
    <xs:element name="delegateHostedClasses"
  type="delegateHostedClasses"
                    minOccurs="0" maxOccurs="1"/>
  </xs:sequence>
  <xs:attribute name="name" type="xs:string" use="required"/>
  <xs:attribute name="colocate" type="xs:boolean"
                  use="optional" default="false"/>
</xs:complexType>
```

The component list identifies uses of component types that have already been defined—we call these the component members of the compound component. Each member has a unique name within the compound component, a reference to the type that defines it and a flag that indicates whether it is singleton or not.

If a component member is marked as singleton, then there can only be once instance of this component member within an instance of the containing compound component. If it is not marked as singleton, then instances of a member may be created and deleted according to external factors such as load changes. This means that any component member that is connected to a non-singleton member may see one or more instances of that member at runtime.

Each component member may also provide settings values for the settings schema defined in the associated component type.

```
<xs:complexType name="components">
  <xs:sequence>
    <xs:element name="component" minOccurs="0"
maxOccurs="unbounded">
      <xs:complexType>
        <xs:sequence>
          <xs:element name="settings" type="settingValues"
                    minOccurs="0" maxOccurs="1"/>
```

```
        </xs:sequence>
        <xs:attribute name="name" type="xs:string" use="required"/>
        <xs:attribute name="type" type="xs:string" use="required"/>
        <xs:attribute name="singleton" type="xs:boolean"
                use="optional" default="false"/>
      </xs:complexType>
    </xs:element>
  </xs:sequence>
</xs:complexType>
```

A use of wire type within a compound component is called a wire member. Each wire member has a name that is unique to the compound component and identifies an associated wire type. Wire member can also provide settings values for the settings schema defined in the wire type.

The key role of a wire member is to identify connection between component members within the compound component. The way this is done is to add port references to the wire member. Each port reference identifies a port on a component member within the compound component. The port types of the references ports must match the port types that are associated with the wire type.

```
<xs:complexType name="wires">
  <xs:sequence>
    <xs:element name="wire" minOccurs="0"
        maxOccurs="unbounded">
      <xs:complexType>
        <xs:sequence>
          <xs:element name="settings" type="settingValues"
minOccurs="0" maxOccurs="1"/>
          <xs:element name="members" minOccurs="1"
              maxOccurs="1">
            <xs:complexType>
              <xs:sequence>
                <xs:element name="member"
type="componentPortRef" minOccurs="0" maxOccurs="unbounded"/>
              </xs:sequence>
            </xs:complexType>
          </xs:element>
        </xs:sequence>
        <xs:attribute name="name" type="xs:string" use="required"/>
        <xs:attribute name="type" type="xs:string"/>
      </xs:complexType>
    </xs:element>
  </xs:sequence>
</xs:complexType>
```

A port reference identifies a component member within the same containing compound component. The port name is the name of a port member on the component type associated with the component member.

```
<xs:complexType name="componentPortRef">
  <xs:attribute name="componentName" type="xs:string"/>
  <xs:attribute name="portName" type="xs:string" use="required"/>
</xs:complexType>
```

A compound component cannot use port types directly as there is no code associated with the compound component that the port member could bind to. Instead we delegate out port members from the component members of the compound component. This means that these ports appear as though they belong to the compound component when it is used as a component type.

When a port is delegated, it is identified by first identifying the component member and then the port member within that component. The port can be renamed as part of this process in order to avoid name clashes in cases where ports with the same name are delegated from different component members.

```
<xs:complexType name="delegatePorts">
  <xs:sequence>
    <xs:element name="delegatePort" minOccurs="0"
maxOccurs="unbounded">
      <xs:complexType>
        <xs:attribute name="name" type="xs:string"/>
        <xs:attribute name="componentName" type="xs:string"/>
        <xs:attribute name="portName" type="xs:string"
            use="optional"/>
      </xs:complexType>
    </xs:element>
  </xs:sequence>
</xs:complexType>
```

In order to construct hosts that may provide services for a range of different classes we allow a compound component to expose the hosted class declarations from its component members. When the compound component is used as a component type, it then appears that the compound component can act as a host for all the declared classes.

To expose these hosted class declarations we use delegation in a similar way to the way in which we delegated port members. We identify the component member that contains the hosted class, and then we identify the class that the component claims to be able to host.

```
<xs:complexType name="delegateHostedClasses">
  <xs:sequence>
    <xs:element name="hostedClassRef"
        minOccurs="1" maxOccurs="unbounded">
      <xs:complexType>
        <xs:attribute name="componentName" type="xs:string"/>
        <xs:attribute name="hostedClass" type="xs:string"
            use="required"/>
      </xs:complexType>
    </xs:element>
  </xs:sequence>
</xs:complexType>
```

Binding

Binding is the process where we identify hosts for the members of a particular compound component. We do this in order to check compatibility between an application and the environment in which it will be hosted and to deploy the application. Both the application and the host environment are modeled using compound components so the process of binding is to find matching members from both components that support the connection topology between the members.

To identify compatible hosts for a member, we start by looking at the relationship between classes in the resource space. We look at the type of wire or component member and then identify the class associated with the member. We then look for component members in the host component that have compatible classes associated with their component types. We then look at the host constraints on the type associated with the member and see if they match the settings on the host member's type. We then do the reverse, checking the hostedClass constraints on the host member's type against the settings on the type of the member that we want to host.

If we are trying to match a component member then we need to check that all the port members of the component member's type can also be hosted on any potential host for the component member.

If we are trying to match a wire member, then we have to match any component members that exist on the path between the hosts that we choose for component members in the compound component that we are trying to host.

Based on the port classes we described in the previous example, we create two port types.

```
<portType name="UserDataServer" class="ServerDataAccess">
    <deployment/>
    <settings/>
</portType>
<portType name="UserDataClient" class="ServerDataAccess">
    <deployment/>
    <settings/>
</portType>
```

These types are complimented by a wire type.

```
<wireType name="UserData" class="DataConnection">
    <deployment/>
    <settings>
        <useSSL>false</useSSL>
    </settings>
    <portTypeRefs>
        <portTypeRef name="UserDataServer"/>
        <portTypeRef name="UserDataClient"/>
    </portTypeRefs>
</wireType>
```

Now we create a component type based on the database class. The database type exposes one server data port.

```
<componentType name="UserData" class="Database">
    <deployment>
        <sqlScriptFilePath>%install%¦mydatabaseDfn.sql</sqlScriptFilePath>
    </deployment>
    <settings>
        <databaseName>UserData</databaseName>
    </settings>
    <ports>
        <port name="userData" type="UserDataServer"/>
    </ports>
</componentType>
```

We could create a compound component type that uses some of these types. The following compound component uses three component types. The first type UserPages represents a web service with two access points, the second type QueryManagement is a middle tier logic component, and the last type is our database type. We connect these components up using two wire types: UserData and QueryManager. The data wire connects the middle tier to the database and the query wire connects the frontend to the middle tier. We then expose two ports: signup and enquiry, from the front end using delegation.

```
<compoundComponentType name="UserManagementApplication">
    <components>
        <component name="userPages" type="UserPages"/>
        <component name="queryLogic" type="QueryManagement"/>
        <component name="userData" type="UserData" singleton="true"/>
    </components>
    <wires>
        <wire name="data" type="UserData">
            <members>
                <member componentName="queryLogic" portName="userData"/>
                <member componentName="userData" portName="userData"/>
            </members>
        </wire>
        <wire name="query" type="QueryManager">
            <members>
                <member componentName="userPages" portName="queryManager1"/>
                <member componentName="userPages" portName="queryManager2"/>
                <member componentName="queryLogic" portName="queryManager"/>
            </members>
        </wire>
    </wires>
    <delegatePorts>
        <delegatePort name="signup" componentName="userPages" portName="signup"/>
        <delegatePort name="enquiry" componentName="userPages" portName="enquiry"/>
    </delegatePorts>
</compoundComponentType>
```

SDM Document Structure

An SDM document has a strong identity which defines the namespace of the document. It imports a list of references other namespaces. The document also contains a information section that identifies document specific attribute such as the document owner, company name and revision date. It then contains lists of port, wire and component classes, followed by a list of host relationships, followed in turn by lists of port, wire and component types.

```
<xs:element name="sdm">
    <xs:annotation>
        <xs:documentation>SDM root element. It is a container for SDM types.</xs:documentation>
    </xs:annotation>
    <xs:complexType>
        <xs:sequence>
            <xs:element name="import" type="import" minOccurs="0" maxOccurs="unbounded"/>
            <xs:element name="information" type="information" minOccurs="0" maxOccurs="1"/>
            <xs:element name="portClasses" minOccurs="0" maxOccurs="1">
                <xs:complexType>
                    <xs:sequence>
                        <xs:element name="portClass" type="portClass" minOccurs="1" maxOccurs="unbounded"/>
                    </xs:sequence>
                </xs:complexType>
            </xs:element>
            <xs:element name="wireClasses" minOccurs="0" maxOccurs="1">
                <xs:complexType>
                    <xs:sequence>
                        <xs:element name="wireClass" type="wireClass" minOccurs="1" maxOccurs="unbounded"/>
                    </xs:sequence>
                </xs:complexType>
            </xs:element>
            <xs:element name="componentClasses" minOccurs="0" maxOccurs="1">
```

-continued

```
        <xs:complexType>
            <xs:sequence>
                <xs:element name="componentClass" type=
"componentClass"
minOccurs="1" maxOccurs="unbounded"/>
            </xs:sequence>
        </xs:complexType>
    </xs:element>
    <xs:element name="hostRelations" minOccurs="0"
maxOccurs="1">
        <xs:complexType>
            <xs:sequence>
                <xs:element name="installer" type="installer" minOccurs="1"
maxOccurs="unbounded"/>
                <xs:element name="hostRelation" type="hostRelation"
minOccurs="1" maxOccurs="unbounded"/>
            </xs:sequence>
        </xs:complexType>
    </xs:element>
    <xs:element name="portTypes" minOccurs="0" maxOccurs="1">
        <xs:complexType>
            <xs:sequence>
                <xs:element name="portType" type="portType"
minOccurs="0" maxOccurs="unbounded"/>
            </xs:sequence>
        </xs:complexType>
    </xs:element>
    <xs:element name="wireTypes" minOccurs="0" maxOccurs="1">
        <xs:complexType>
            <xs:sequence>
                <xs:element name="wireType" type="wireType"
minOccurs="0" maxOccurs="unbounded"/>
            </xs:sequence>
        </xs:complexType>
    </xs:element>
    <xs:element name="componentTypes" minOccurs="0"
maxOccurs="1">
        <xs:complexType>
            <xs:sequence>
                <xs:element name="componentType" type=
"componentType" minOccurs="0" maxOccurs="unbounded"/>
                <xs:element name="compoundComponentType"
type="compoundComponentType" minOccurs="0"
maxOccurs="unbounded"/>
            </xs:sequence>
        </xs:complexType>
    </xs:element>
</xs:sequence>
<xs:attributeGroup ref="identity"/>
</xs:complexType>
</xs:element>
```

Associated XSD

The following is an example structure for a change request.

```
<?xml version="1.0" encoding="utf-8" ?>
<xs:schema targetNamespace="urn:schemas-microsoft-
com:sdmChangeRequest" xmlns="urn:schemas-microsoft-
com:sdmChangeRequest" xmlns:settings="urn:schemas-microsoft-
com:sdmSettings" xmlns:mstns="http://tempuri.org/XMLSchema.xsd"
xmlns:xs="http://www.w3.org/2001/XMLSchema"
elementFormDefault="qualified" version="0.7" id="sdmChangeRequest">
    <xs:import namespace="urn:schemas-microsoft-com:sdmSettings"
schemaLocation="SDM7Settings.xsd" />
    <xs:import namespace="urn:schemas-microsoft-com:sdmNames"
schemaLocation="SDM7Names.xsd" />
    <xs:complexType name="ChangeRequestType">
        <xs:sequence>
            <xs:element name="group" type="groupType"
minOccurs="0" maxOccurs="unbounded" />
        </xs:sequence>
    </xs:complexType>
    <xs:complexType name="groupType">
        <xs:sequence>
            <xs:element name="group" type="groupType"
minOccurs="0" maxOccurs="unbounded" />
            <xs:element name="addInstance"
type="addInstanceType" minOccurs="0" maxOccurs="unbounded" />
            <xs:element name="updateInstance"
type="updateInstanceType" minOccurs="0" maxOccurs="unbounded" />
            <xs:element name="deleteInstance"
type="deleteInstanceType" minOccurs="0" maxOccurs="unbounded" />
            <xs:element name="addConnection"
type="addConnectionType" minOccurs="0" maxOccurs="unbounded" />
            <xs:element name="deleteConnection"
type="deleteConnectionType" minOccurs="0" maxOccurs=
"unbounded" />
        </xs:sequence>
        <xs:attribute name="canLeConcurrentlyExecuted"
type="xs:boolean" />
    </xs:complexType>
    <xs:complexType name="addInstanceType">
        <xs:sequence>
            <xs:element name="classSettings"
type="settings:settingValues" minOccurs="0" />
            <xs:element name="typeSettings"
type="settings:settingValues" minOccurs="0" />
            <!-- setting values for class -->
            <!-- setting values for type -->
        </xs:sequence>
        <xs:attribute name="parent" type="reference" use="optional"
/>
        <xs:attribute name="host" type="reference" use="optional"
/>
        <xs:attribute name="member" type="xs:string"
use="optional" />
        <xs:attribute name="type" type="xs:string" use="optional" />
        <xs:attribute name="name" type"xs:string" use="optional"
/>
        <!-- the parent of this instance -->
        <!-- the host of this instance -->
        <!-- Name of the member on the parent type -->
        <!-- Fully qualified type that this is an instance of -->
        <!-- alias for the id that can be filled in when the instance is
created.
            this name must be unique for all instances of the same
member. -- >
    </xs:complexType>
    <!-- what can we change about an instance? -->
    <xs:complexType name="updateInstanceType">
        <xs:sequence>
            <xs:element name="classSettings"
type="settings:settingValues" minOccurs="0" />
            <xs:element name="typeSettings"
type="settings:settingValues" minOccurs="0" />
            <!-- setting values for class -->
            <!-- setting values for type -->
        </xs:sequence>
        <xs:attribute name="id" type="reference" use="required" />
        <xs:attribute name="parent" type="reference" use="optional"
/>
        <xs:attribute name="host" type="reference" use="optional"
/>
        <xs:attribute name="member" type="xs:string"
use="optional" />
        <xs:attribute name="type" type="xs:string" use="optional" />
        <xs:attribute name="name" type="xs:string" use="optional"
/>
        <!-- Unique identifier scoped to the SDM Runtime. This is
generated by t_u101 ? SDM runtime
            and is immutable -->
        <!-- the parent of this instance -->
        <!-- the host of this instance -->
        <!-- Name of the member on the parent type -->
        <!-- Fully qualified type that this is an instance of -->
        <!-- alias for the id that can be filled in when the instance is
created.
            this name must be unique for all instances of the same
member. -->
    </xs:complexType>
    <xs:complexType name="deleteInstanceType">
        <xs:attribute name="id" type="reference" use="required" />
```

```
        <xs:attribute name="option" type="deleteOptionType"
use="required" />
        <!-- Unique identifier scoped to the SDM Runtime. This is
generated by the SDM runtime
            and is immutable -__cf2 >
    </xs:complexType>
    <xs:complexType name="addConnectionType">
        <xs:attribute name="port" type="reference" use="required" />
        <xs:attribute name="wire" type="reference" use="required" />
    </xs:complexType>
    <xs:complexType name="deleteConnectionType">
        <xs:attribute name="port" type="reference" use="required" />
        <xs:attribute name="wire" type="reference" use="required" />
    </xs:complexType>
    <!-- reference can be guid or path -->
    <xs:simpleType name="reference">
        <xs:union></xs:union>
    </xs:simpleType>
    <!-- delete options are: ??? -->
    <xs:simpleType name="deleteOptionType">
        <xs:union></xs:union>
    </xs:simpleType>
</xs:schema>
```

The following is an example structure for classes.

```
<?xml version="1.0" encoding="utf-8" ?>
<xs:schema targetNamespace="urn:schemas-microsoft-
    com:sdmClasses"
xmlns="urn:schemas-microsoft-com:sdmClasses" xmlns:names=
"urn:schemas-microsoft-com:sdmNames" xmlns:settings=
"urn:schemas-microsoft-com:sdmSettings" xmlns:xs=
"http://www.w3.org/2001/XMLSchema"
elementFormDefault="qualified" version="0.7" id="sdmClasses">
    <xs:import namespace="http://www.w3.org/2001/XMLSchema" />
    <xs:import namespace="urn:schemas-microsoft-com:sdmSettings"
schemaLocation="SDM7Settings.xsd" />
    <xs:import namespace="urn:schemas-microsoft-com:sdmNames"
schemaLocation="SDM7Names.xsd" />
    <!-- TODO [BassamT]: Normalize the port class refs, port type refs
and port members on wire classs, wire types and wire members -->
    <!-- TODO [BassamT]: Is the layer attribute mandatory on a class? -
->
    <!-- TODO [BassamT]: Add keys and keyefs for validation -->
    <!-- TODO [BassamT]: Add support for inlined types -->
    <!-- TODO [BassamT]: scrub minOccurs and maxOccurs -->
    <!-- TODO [BassamT]: New name for "class", possibly
"deployment" -->
    <!-- TODO [BassamT]: New name for "host", possibly "provider" --
>
    <!-- REVIEW [BassamT]: Can we merge the definitions of port,
component, wire classs in this XSD. It would make it less verbose at the
cost more semantic analysis. -->
    <!-- CONSIDER [BassamT]: General attribute mechanism for things
like Singleton, Colocation, Inline. -->
    <!-- TODO [BassamT]: Bindings: member to component member --
>
    <!-- TODO [geoffo]: ports - are they singleton? -->
    <!-- TODO [geoffo]: delegation - how do we combine ports? -->
    <!-- TODO [geoffo] Add back <any> in appropriate places -->
    <!--
=====================================================
=====================================================
= -->
    <!-- SDM root element -->
    <!--
=====================================================
=====================================================
= -->
    <xs:element name="sdmClasses">
        <xs:complexType>
            <xs:sequence>
                <xs:element name="import"
type="names:import" minOccurs="0" maxOccurs="unbounded" />
                <xs:element name="information"
type="information" minOccurs="0" />
                <xs:element name="portClasses"
minOccurs="0">
                    <xs:complexType>
                        <xs:sequence>
                            <xs:element
name="portClass" type="portClass" maxOccurs="unbounded" />
                        </xs:sequence>
                    </xs:complexType>
                </xs:element>
                <xs:element name="componentClasses"
minOccurs="0">
                    <xs:complexType>
                        <xs:sequence>
                            <xs:element
name="componentClass" type="componentClass" maxOccurs=
"unbounded" />
                        </xs:sequence>
                    </xs:complexType>
                </xs:element>
                <xs:element name="protocols"
minOccurs="0">
                    <xs:complexType>
                        <xs:sequence>
                            <xs:element
name="protocol" type="protocol" maxOccurs="unbounded" />
                        </xs:sequence>
                    </xs:complexType>
                </xs:element>
                <xs:element name="hostRelations"
minOccurs="0">
                    <xs:complexType>
                        <xs:sequence>
                            <xs:element
name="installer" type="installer" maxOccurs="unbounded" />
                            <xs:element
name="hostRelation" type="hostRelation" maxOccurs="unbounded" />
                        </xs:sequence>
                    </xs:complexType>
                </xs:element>
            </xs:sequence>
            <xs:attributeGroup ref="names:namespaceIdentity" />
        </xs:complexType>
    </xs:element>
    <!-- SDM type library information -->
    <xs:complexType name="information">
        <xs:annotation>
            <xs:documentation>Human readable information
about the SDM type library.</xs:documentation>
        </xs:annotation>
        <xs:sequence>
            <xs:element name="friendlyName" type="xs:string"
minOccurs="0" />
            <xs:element name="companyName" type="xs:string"
minOccurs="0" />
            <xs:element name="copyright" type="xs:string"
minOccurs="0" />
            <xs:element name="trademark" type="xs:string"
minOccurs="0" />
            <xs:element name="description" type="xs:string"
minOccurs="0" />
            <xs:element name="comments" type="xs:string"
minOccurs="0" />
        </xs:sequence>
    </xs:complexType>
    <!--
=====================================================
=====================================================
```

```
                -continued
= -->
        <!-- Classes -->
        <!--
============================================================
============================================================
= -->
        <xs:complexType name="baseClass">
            <xs:sequence>
                <xs:element name="deploymentSchema"
type="settings:deploymentSchema" minOccurs="0" />
                <xs:element name="settingSchema"
type="settings:settingSchema" minOccurs="0" />
                <!-- XSD schema that for how a class is deployed -->
                <!-- Setting schema -->
            </xs:sequence>
            <xs:attribute name="name" type="xs:string" use="required"
/>
            <xs:attribute name="layer" type="xs:string" use="required"
/>
            <!-- REVIEW [BassamT] Are these layers just for benefit of
tools, or are they
                strictly enforced in the SDM model? There are
                cases where mixing components from different
layers makes
                sense. For example, the filter component might
be a
                a component meta type hosted ISA server which
lives in layer 3.
                However, we want to use the Filter meta-type in
layer 2. -->
        </xs:complexType>
        <!-- port class -->
        <xs:complexType name="portClass">
            <xs:complexContent>
                <xs:extension base="baseClass" />
            </xs:complexContent>
        </xs:complexType>
        <!-- Component class -->
        <xs:complexType name="componentClass">
            <xs:complexContent>
                <xs:extension base="baseClass">
                    <xs:sequence>
                        <xs:element
name="portClassesAllowed" minOccurs="0">
                            <xs:complexType>
                                <xs:sequence>
                                    <xs:element
name="portClassRef" minOccurs="0" maxOccurs="unbounded" />
                                </xs:sequence>
                                <xs:attribute
name="closed" type="xs:boolean" use="optional" default="true" />
                                <!-- Whether the allowable
ports is closed list -->
                                <!-- If this value is "true"
then the list of ports is non-extensible. If this value is "false" then the list
of ports is open-ended, the ports listed will be considered mandatory. -->
                            </xs:complexType>
                        </xs:element>
                        <!-- this will specify a set of constraints
on the set of allowable ports
                            that can show up on a component
type of this meta type. -->
                    </xs:sequence>
                </xs:extension>
            </xs:complexContent>
        </xs:complexType>
        <xs:complexType name="portClassRef">
            <xs:attribute name="name" type="xs:string" use="required"
/>
            <xs:attribute name="required" type="xs:boolean"
use="required" />
            <xs:attribute name="singleton" type="xs:boolean"
use="required" />
            <!-- singleton implies that there can only be one instance of
this port within the parents scope -->
        </xs:complexType>
        <!--
============================================================
============================================================
```

```
                -continued
= -->
        <!-- relations -->
        <!--
============================================================
============================================================
= -->
        <xs:complexType name="relation">
            <xs:attribute name="name" type="xs:string" use="required"
/>
            <xs:attribute name="installer" type="xs:string"
use="optional" />
        </xs:complexType>
        <!-- a protocol is a relationship between one or more port classes -->
        <xs:complexType name="protocol">
            <xs:complexContent>
                <xs:extension base="relation">
                    <xs:sequence>
                        <xs:element name="portClassRef"
type="portClassRef" maxOccurs="unbounded" />
                    </xs:sequence>
                </xs:extension>
            </xs:complexContent>
        </xs:complexType>
        <!-- defines the host relationship between two classs -->
        <xs:complexType name="hostRelation">
            <xs:complexContent>
                <xs:extension base="relation">
                    <xs:attribute name="classRef" type="xs:string"
use="required" />
                    <xs:attribute name="hostClassRef"
type="xs:string" use="required" />
                </xs:extension>
            </xs:complexContent>
        </xs:complexType>
        <!-- the installer type identifes the code responsible for
instantiating a relationship -->
        <xs:complexType name="installer">
            <xs:sequence>
                <xs:element name="binary" type="xs:string" />
            </xs:sequence>
            <xs:attribute name="codeType" type="xs:string"
use="required" />
            <xs:attribute name="name" type="xs:string" use="required"
/>
        </xs:complexType>
    </xs:schema>
```

The following is an example structure for a deployment unit.

```
<?xml version="1.0" encoding="UTF-8" ?>
<xs:schema targetNamespace="urn:schemas-microsoft-com:sdmSDU"
xmlns:xs="http://www.w3.org/2001/XMLSchema" xmlns:names=
"urn:schemas-microsoft-com:sdmNames" xmlns="urn:schemas-microsoft-
com:sdmSDU"
elementFormDefault="qualified" version="0.7" id="sdmSDU">
    <xs:import namespace="http://www.w3.org/2001/XMLSchema" />
    <xs:import namespace="urn:schemas-microsoft-com:sdmNames"
schemaLocation="SDM7Names.xsd" />
    <!-- an sdm deployment unit imports one or more sdm type files the
includes mappings for a subset of the types from the imported file -->
    <xs:element name="sdmDeploymentUnit">
        <xs:annotation>
            <xs:documentation>
                The sdu contains a mapping of SDM types to
their implementation.
            </xs:documentation>
        </xs:annotation>
        <xs:complexType>
            <xs:sequence>
                <xs:element name="import"
type="names:import" minOccurs="0" maxOccurs="unbounded" />
                <xs:element name="implementation"
type="implementationMap" minOccurs="0" maxOccurs="unbounded" />
```

```
            </xs:sequence>
        </xs:complexType>
    </xs:element>
    <!-- a description of this deployment unit -->
    <xs:complexType name="deploymentDescription">
        <xs:attribute name="name" type="xs:string" />
        <xs:attribute name="dateCreated" type="xs:string" />
        <xs:attribute name="creator" type="xs:string" />
    </xs:complexType>
    <!-- a mapping from a type to an implementation of the type -->
    <xs:complexType name="implementationMap">
        <xs:sequence>
            <xs:element name="version" type="xs:string"
minOccurs="0" maxOccurs="unbounded" />
        </xs:sequence>
        <xs:attribute name="type" type="xs:string" />
        <xs:attribute name="path" type="xs:string" />
    </xs:complexType>
</xs:schema>
```

The following is an example structure for instances.

```
<?xml version="1.0" encoding="utf-8" ?>
<xs:schema targetNamespace="urn:schemas-microsoft-
com:sdmInstances"
xmlns:xs="http://www.w3.org/2001/XMLSchema" xmlns:settings=
"urn:schemas-microsoft-com:sdmSettings" xmlns="urn:schemas-
microsoft-com:sdmInstances"
elementFormDefault="qualified" version="0.7" id="sdmInstances">
    <xs:import namespace="http://www.w3.org/2001/XMLSchema" />
    <xs:import namespace="urn:schemas-microsoft-com:sdmSettings"
schemaLocation="SDM7Settings.xsd" />
    <xs:element name="sdmInstances">
        <xs:complexType>
            <xs:sequence>
                <xs:element name="import" type="import"
minOccurs="0" maxOccurs="unbounded" />
                <xs:element name="portInstances"
minOccurs="0">
                    <xs:complexType>
                        <xs:sequence>
                            <xs:element
name="portInstance" type="portInstance" minOccurs="0"
maxOccurs="unbounded" />
                        </xs:sequence>
                    </xs:complexType>
                </xs:element>
                <xs:element name="wireInstances"
minOccurs="0">
                    <xs:complexType>
                        <xs:sequence>
                            <xs:element
name="wireInstance" type="wireInstance" minOccurs="0"
maxOccurs="unbounded" />
                        </xs:sequence>
                    </xs:complexType>
                </xs:element>
                <xs:element name="componentInstances"
minOccurs="0">
                    <xs:complexType>
                        <xs:sequence>
                            <xs:element
name="componentInstance" type="componentInstance" minOccurs="0"
maxOccurs="unbounded" />
                            <xs:element
name="compoundComponentInstance" type=
"compoundComponentInstance"
minOccurs="0" maxOccurs="unbounded" />
                        </xs:sequence>
                    </xs:complexType>
                </xs:element>
```

```
    <xs:complexType name="import">
        <xs:attribute name="alias" type="xs:string" use="required" />
        <xs:attributeGroup ref="identity" />
    </xs:complexType>
    <!-- ================= Instance Schema ===============
-->
    <xs:complexType name="instanceBase">
        <xs:sequence>
            <xs:element name="classSettings"
type="settings:settingValues" minOccurs="0" />
            <xs:element name="typeSettings"
type="settings:settingValues" minOccurs="0" />
            <!-- setting values for class -->
            <!-- setting values for type -->
        </xs:sequence>
        <xs:attribute name="id" type="guid" use="required" />
        <xs:attribute name="parent" type="guid" use="optional" />
        <xs:attribute name="host" type="guid" use="optional" />
        <xs:attribute name="member" type="xs:string"
use="optional" />
        <xs:attribute name="type" type="xs:string" use="required" />
        <xs:attribute name="name" type="xs:string" use="optional"
/>
        <!-- Unique identifier scoped to the SDM Runtime. This is
generated by the SDM runtime
            and is immutable -->
        <!-- the parent of this instance -->
        <!-- the host of this instance -->
        <!-- Name of the member on the parent type -->
        <!-- Fully qualified type that this is an instance of -->
        <!-- alias for the id that can be filled in when the instance is
created_par this name must be unique for all instances of the same
member. -->
    </xs:complexType>
    <xs:complexType name="componentInstance">
        <xs:complexContent>
            <xs:extension base="instanceBase">
                <xs:sequence>
                    <xs:element name="portInstances">
                        <xs:complexType>
                            <xs:sequence>
                                <xs:element
name="portInstance" type="instanceRef" />
                                <!-- the port
Instances that I own -->
                            </xs:sequence>
                        </xs:complexType>
                    </xs:element>
                </xs:sequence>
            </xs:extension>
        </xs:complexContent>
    </xs:complexType>
    <xs:complexType name="compoundComponentInstance">
        <xs:complexContent>
            <xs:extension base="instanceBase">
                <xs:sequence>
                    <xs:element name="portInstances">
                        <xs:complexType>
                            <xs:sequence>
                                <xs:element
name="portInstance" type="instanceRef" />
                                <!-- the port
Instances that I delegate -->
                            </xs:sequence>
                        </xs:complexType>
                    </xs:element>
                    <xs:element
name="componentInstances">
                        <xs:complexType>
                            <xs:sequence>
                                <xs:element
name="componentInstance" type="instanceRef"/>
                            </xs:sequence>
                        </xs:complexType>
                    </xs:element>
                    <xs:element name="wireInstances">
                        <xs:complexType>
                            <xs:sequence>
```

```xml
        <xs:element
name="wireInstance" type="instanceRef" />
          </xs:sequence>
        </xs:complexType>
      </xs:element>
    </xs:sequence>
  </xs:extension>
 </xs:complexContent>
</xs:complexType>
<xs:complexType name="portInstance">
  <xs:complexContent>
    <xs:extension base="instanceBase">
      <xs:sequence />
    </xs:extension>
  </xs:complexContent>
</xs:complexType>
<xs:complexType name="wireInstance">
  <xs:complexContent>
    <xs:extension base="instanceBase">
      <xs:sequence>
        <xs:element name="portInstances">
          <xs:complexType>
            <xs:sequence>
              <xs:element
name="portInstance" type="instanceRef"/>
              <!-- the ports that I
have attached -->
            </xs:sequence>
          </xs:complexType>
        </xs:element>
      </xs:sequence>
    </xs:extension>
  </xs:complexContent>
</xs:complexType>
<xs:complexType name="instanceRef">
  <xs:attribute name="uniqueId" type="xs:string"/>
</xs:complexType>
<!-- ================ Simple Types
=========================== -->
<xs:simpleType name="fourPartVersionType">
  <xs:annotation>
    <xs:documentation>Four part version numbers where
the segments are in the range 0–65535 </xs:documentation>
  </xs:annotation>
  <xs:restriction base="xs:string">
    <xs:pattern value="(0|[1–5][0–9]{0,4}|[7–9][0–
9]{0,3}|6[0–4][0–9]{0,3}|6[6–9][0–9]{0,2}|65|65[0–4][0–9]{0,2}|65[6–9]
[0–9]?|655|655[0–2][0–9]?|655[4–9]|6553[0–5]?).(0|[1–5][0–9]{0,4}|[7–9]
[0–9]{0,3}|6[0–4][0–9]{0,3}|6[6–9][0–9]{0,2}|65|65[0–4][0–9]{0,2}|65
[6–9][0–9]?|655|655[0–2][0–9]?|655[4–9]|6553[0–5]?).(0|[1–5][0–9]{0,4}|
[7–9][0–9]{0,3}|6[0–4][0–9]{0,3}|6[6–9][0–9]{0,2}|65|65[0–4][0–9]
{0,2}|65[6–9][0–9]?|655|655[0–2][0–9]?|655[4–9]|6553[0–5]?).(0|[1–5][0–
9]{0,4}|[7–9][0–9]{0,3}|6[0–4][0–9]{0,3}|6[6–9][0–9]{0,2}|65|65 [0–4]
[0–9]{0,2}|65[6–9][0–9]?|655|655[0–2][0–9]?|655[4–9]|6553[0–5]?)" />
  </xs:restriction>
</xs:simpleType>
<xs:simpleType name="publicKeyTokenType">
  <xs:annotation>
    <xs:documentation>Public Key Token: 16 hex digits in
size</xs:documentation>
  </xs:annotation>
  <xs:restriction base="xs:string">
    <xs:pattern value="([0–9]|[a–f]|[A–F]){16}" />
  </xs:restriction>
</xs:simpleType>
<xs:attributeGroup name="identity">
  <xs:attribute name="name" type="xs:string" use="required"
/>
  <xs:attribute name="version" type=" fourPartVersionType"
use="required" />
  <xs:attribute name="publicKeyToken"
type="publicKeyTokenType" use="optional" />
</xs:attributeGroup>
<xs:simpleType name="guid">
  <xs:restriction base="xs:string">
    <xs:pattern value="[0–9a–fA–F]{8}-[0–9a–fA–F]{4}-[0–
9a–fA–F]{4}-[0–9a–fA–F]{4}-[0–9a–fA–F]{12}" />
  </xs:restriction>
</xs:simpleType>
</xs:schema>
```

The following is an example structure for mappings.

```xml
<?xml version="1.0" encoding="utf-8" ?>
<xs:schema targetNamespace="urn:schemas-microsoft-
com:sdmMapping" xmlns:xs="http://www.w3.org/2001/XMLSchema"
xmlns:names="urn:schemas-microsoft-com:sdmNames"
xmlns="urn:schemas-microsoft-com:sdmMapping"
elementFormDefault="qualified" version="0.7" id="sdmMapping">
  <!-- REVIEW [BassamT]: Do we allow mappings to components
within the same compound component? -->
  <xs:import namespace="urn:schemas-microsoft-com:sdmNames"
schemaLocation="SDM7Names.xsd" />
  <xs:element name="logicalPlacement">
    <xs:annotation>
      <xs:documentation>
        This file contains the mapping information
between SDM members.
        Mappings are constructed in a outside in
fashion, first binding the outer compound component, then its members
and so on.
      </xs:documentation>
    </xs:annotation>
    <xs:complexType>
      <xs:sequence>
        <xs:element name="import"
type="names:import" minOccurs="0" maxOccurs="unbounded" />
        <xs:element name="placement" minOccurs="0"
maxOccurs="unbounded">
          <xs:complexType>
            <xs:sequence>
              <xs:element
name="memberBinding" type="memberBinding"
maxOccurs="unbounded" />
              <xs:element
name="wireBinding" type="wireBinding"
minOccurs="0" maxOccurs="unbounded" />
            </xs:sequence>
            <xs:attribute
name="sourceComponentType" type="xs:string" />
            <xs:attribute
name="targetComponentType" type="xs:string" />
            <xs:attribute name="name"
type="xs:string" />
          </xs:complexType>
        </xs:element>
      </xs:sequence>
    </xs:complexType>
  </xs:element>
  <!-- a member binding may be a:
    1. compound component member - in which case we bind all
the members and wires of the compound component
    2. a simple component member - in which case we bind the
component and its ports
    3. a port member - in which case we bind it to a port and there
is no further binding
  -->
  <xs:complexType name="memberBinding">
    <xs:sequence>
      <xs:element name="memberBinding"
type="memberBinding" minOccurs="0" maxOccurs="unbounded" />
      <xs:element name="wireBinding" type="wireBinding"
minOccurs="0" maxOccurs="unbounded" />
    </xs:sequence>
    <xs:attribute name="sourceMember" type="xs:string"
use="required" />
```

```
        <!-- if a target member is not provided then the component
must be a compound component and its members
            will be bound to the members of the compound
component that its parent is bound to
            If a target member is provided and we are binding a
compound component, then the ports on the
                source compound component must be able to be bound to
the ports on the target compound component-->
        <xs:attribute name="targetMember" type="xs:string"
use="optional" />
    </xs:complexType>
    <!-- wires are bound to a path in the target compound component.
    This path consists of port, wire and component instances-->
    <xs:complexType name="wireBinding">
        <xs:sequence>
            <xs:element name="path">
                <xs:complexType>
                    <xs:sequence>
                        <xs:element name="element"
maxOccurs="unbounded">
                            <xs:complexType>
                                <xs:attribute
name="name" type="xs:string" />
                            </xs:complexType>
                        </xs:element>
                    </xs:sequence>
                </xs:complexType>
            </xs:element>
        </xs:sequence>
        <xs:attribute name="sourceWire" type="xs:string" />
    </xs:complexType>
    <!-- import -->
</xs:schema>
```

The following is an example structure for names.

```
<?xml version="1.0" encoding="UTF-8" ?>
<xs:schema targetNamespace="urn:schemas-microsoft-com:sdmNames"
xmlns:xs="http://www.w3.org/2001/XMLSchema" xmlns="urn:schemas-
microsoft-com:sdmNames" elementFormDefault="qualified"
version="0.7" id="sdmNames">
    <xs:import namespace="http://www.w3.org/2001/XMLSchema" />
    <!-- import creates an alias to another SDM file -->
    <xs:complexType name="import">
        <xs:attribute name="alias" type="xs:NCName"
use="required" />
        <xs:attribute name="location" type="xs:NCName"
use="optional" />
        <xs:attributeGroup ref="Identity" />
    </xs:complexType>
    <!-- class and type files are identified by name, version and public
key -->
    <xs:attributeGroup name="Identity">
        <xs:attribute name="name" type="xs:string" use="required"
/>
        <xs:attribute name="version" type="fourPartVersionType"
use="required" />
        <xs:attribute name="publicKeyToken"
type="publicKeyTokenType" use="optional" />
    </xs:attributeGroup>
    <xs:attributeGroup name="namespaceIdentity">
        <xs:attributeGroup ref="Identity" />
        <xs:attribute name="signature" type="xs:string"
use="optional" />
        <xs:attribute name="publicKey" type="xs:string"
use="optional" />
    </xs:attributeGroup>
    <!-- simple version number -->
    <xs:simpleType name="fourPartVersionType">
        <xs:annotation>
            <xs:documentation>Four part version numbers where
the segments are in the range 0–65535 </xs:documentation>
        </xs:annotation>
        <xs:restriction base="xs:string">
            <xs:pattern value="(0|[1–5][0–9]{0,4}|[7–9][0–
9]{0,3}|6[0–4][0–9]{0,3}|6[6–9][0–9]{0,2}|65|65[0–4][0–9]{0,2}|
65[6–9][0–9]?|655|655[0–2][0–9]?|655[4–9]|6553[0–5]?).(0|
[1–5][0–9]{0,4}|[7–9][0–9]{0,3}|6[0–4][0–9]{0,3}|
6[6–9][0–9]{0,2}|65|65[0–4][0–9]{0,2}|65[6–9][0–9]?|
655|655[0–2][0–9]?|655[4–9]|6553[0–5]?).(0|[1–5][0–9]{0,4}|
[7–9][0–9]{0,3}|6[0–4][0–9]{0,3}|6[6–9][0–9]{0,2}|65|
65[0–4][0–9]{0,2}|65[6–9][0–9]?|655|655[0–2][0–9]?|655[4–9]|
6553[0–5]?).(0|[1–5][0–9]{0,4}|[7–9][0–9]{0,3}|
6[0–4][0–9]{0,3}|6[6–9][0–9]{0,2}|65|65[0–4][0–9]{0,2}|
65[6–9][0–9]?|655|655[0–2][0–9]?|655[4–9]|6553[0–5]?)" />
        </xs:restriction>
    </xs:simpleType>
    <!-- public key for verifying signed docs -->
    <xs:simpleType name="publicKeyTokenType">
        <xs:annotation>
            <xs:documentation>Public Key Token: 16 hex digits in size</xs:documentation>
        </xs:annotation>
        <xs:restriction base="xs:string">
            <xs:pattern value="([0–9]|[a–f]|[A–F]){16}" />
        </xs:restriction>
    </xs:simpleType>
</xs:schema>
```

The following is an example structure for settings.

```
<?xml version="1.0" encoding="utf-8" ?>
<xs:schema targetNamespace="urn:schemas-microsoft-
com:sdmSettings" xmlns:xs="http://www.w3.org/2001/XMLSchema"
xmlns="urn:schemas-microsoft-com:sdmSettings"
elementFormDefault="qualified" version="0.7" id="sdmSettings">
    <xs:import namespace="http://www.w3.org/2001/XMLSchema" />
    <!-- settings schema, values and constraints -->
    <xs:complexType name="openSchema">
        <xs:sequence>
            <xs:any namespace="##other" processContents="lax"
/>
        </xs:sequence>
    </xs:complexType>
    <xs:complexType name="settingSchema">
        <xs:sequence>
            <xs:any
namespace="http://www.w3.org/2001/XMLSchema"
processContents="skip" minOccurs="0" maxOccurs="unbounded" />
        </xs:sequence>
    </xs:complexType>
    <xs:complexType name="settingValues">
        <xs:sequence>
            <xs:any namespace="##other" processContents="lax"
/>
        </xs:sequence>
    </xs:complexType>
    <!-- constraints -->
    <xs:attributeGroup name="testAttributes">
        <xs:attribute name="path" type="xs:string" />
        <xs:attribute name="ifNullPath" type="ifNullPath" />
        <xs:attribute name="error" type="xs:int" />
        <xs:attribute name="errorDesc" type="xs:string" />
    </xs:attributeGroup>
    <xs:complexType name="simpleTest">
        <xs:attributeGroup ref="testAttributes" />
    </xs:complexType>
    <xs:complexType name="settingConstraints">
        <xs:sequence>
            <xs:element name="mustExist" type="simpleTest"
minOccurs="0" maxOccurs="unbounded" />
            <xs:element name="mustNotExist" type="simpleTest"
minOccurs="0" maxOccurs="unbounded" />
            <xs:element name="ifExists" type="nestedTest"
minOccurs="0" maxOccurs="unbounded" />
            <xs:element name="ifNotExists" type="nestedTest"
minOccurs="0" maxOccurs="unbounded" />
        </xs:sequence>
```

```
        </xs:complexType>
        <xs:complexType name="nestedTest">
            <xs:sequence>
                <xs:element name="mustExist" type="simpleTest" minOccurs="0" maxOccurs="unbounded" />
                <xs:element name="mustNotExist" type="simpleTest" minOccurs="0" maxOccurs="unbounded" />
                <xs:element name="ifExists" type="nestedTest" minOccurs="0" maxOccurs="unbounded" />
                <xs:element name="ifNotExists" type="nestedTest" minOccurs="0" maxOccurs="unbounded" />
            </xs:sequence>
            <xs:attributeGroup ref="testAttributes" />
        </xs:complexType>
        <xs:complexType name="deploymentSchema">
            <xs:sequence>
                <xs:any namespace="##other" processContents="lax" />
            </xs:sequence>
        </xs:complexType>
        <xs:complexType name="deploymentValues">
            <xs:sequence>
                <xs:any namespace="##other" processContents="lax" />
            </xs:sequence>
        </xs:complexType>
        <!-- ================= Simple Types
========================== -->
        <xs:simpleType name="ifNullPath">
            <xs:restriction base="xs:string">
                <xs:enumeration value="skip" />
                <xs:enumeration value="override" />
                <xs:enumeration value="returnError" />
            </xs:restriction>
        </xs:simpleType>
    </xs:schema>
```

The following is an example structure for types.

```
<?xml version="1.0" encoding="utf-8" ?>
    <xs:schema targetNamespace="urn:schemas-microsoft-
    com:sdmTypes"
xmlns:xs="http://www.w3.org/2001/XMLSchema" xmlns="urn:schemas-
microsoft-com:sdmTypes" xmlns:names="urn:schemas-microsoft-
com:sdmNames" xmlns:settings="urn:schemas-microsoft-com:
sdmSettings"
elementFormDefault="qualified" version="0.7" id"sdmTypes">
        <xs:import namespace="http://www.w3.org/2001/
        XMLSchema" />
        <xs:import namespace="urn:schemas-microsoft-com:
        sdmSettings"
schemaLocation="SDM7Settings.xsd" />
        <xs:import namespace="urn:schemas-microsoft-com:
        sdmNames"
schemaLocation="SDM7Names.xsd" />
        <!-- TODO [BassamT]: Normalize the port class refs,
        port type refs
and port members on wire classs, wire types and wire members -->
        <!-- TODO [BassamT]: Add keys and keyefs for validation -->
        <!-- TODO [BassamT]: Add support for inlined types -->
        <!-- TODO [BassamT]: scrub minOccurs and maxOccurs -->
        <!-- TODO [BassamT]: New name for "class", possibly
"deployment" -->
        <!-- TODO [BassamT]: New name for "host",
        possibly "provider" --
>
        <!-- REVIEW [BassamT]: Can we merge the definitions of port,
component, wire classs in this XSD. It would make it less verbose at the
cost more semantic analysis. -->
        <!-- CONSIDER [BassamT]: General attribute mechanism for
things like Singleton, Colocation, Inline. -->
        <!-- TODO [BassamT]: Bindings: member to component
member -->
        <!-- TODO [geoffo]: ports - are they singleton? -->
        <!-- TODO [geoffo]: delegation - how do we combine ports? -->
        <!-- TODO [geoffo]Add back <any> in appropriate places -->
        <!--
==========================================================
==========================================================
= -->
        <!-- SDM root element -->
        <!--
==========================================================
==========================================================
= -->
        <xs:element name="sdmTypes">
            <xs:annotation>
                <xs:documentation>SDM root element. It is a
container for SDM types.</xs:documentation>
            </xs:annotation>
            <xs:complexType>
                <xs:sequence>
                    <xs:element name="import"
type="names:import" minOccurs="0" maxOccurs="unbounded" />
                    <xs:element name"information"
type="information" minOccurs="0" />
                    <xs:element name="portTypes"
minOccurs="0">
                        <xs:complexType>
                            <xs:sequence>
                                <xs:element
name="portType" type="portType" minOccurs"0" maxOccurs=
"unbounded" />
                            </xs:sequence>
                        </xs:complexType>
                    </xs:element>
                    <xs:element name="componentTypes"
minOccurs="0">
                        <xs:complexType>
                            <xs:sequence>
                                <xs:element
name="componentType" type="componentType" minOccurs="0"
maxOccurs="unbounded" />
                                <xs:element
name="compoundComponentType" type="compoundComponentType"
minOccurs="0" maxOccurs="unbounded" />
                            </xs:sequence>
                        </xs:complexType>
                    </xs:element>
                </xs:sequence>
                <xs:attributeGroup ref="names:namespaceIdentity" />
            </xs:complexType>
        </xs:element>
        <!-- SDM type library information -->
        <xs:complexType name="information">
            <xs:annotation>
                <xs:documentation>Human readable information
about the SDM type library.</xs:documentation>
            </xs:annotation>
            <xs:sequence>
                <xs:element name="friendlyName" type="xs:string"
minOccurs="0" />
                <xs:element name="companyName" type="xs:string"
minOccurs="0" />
                <xs:element name="copyright" type="xs:string"
minOccurs="0" />
                <xs:element name="trademark" type="xs:string"
minOccurs="0" />
                <xs:element name="description" type="xs:string"
minOccurs="0" />
                <xs:element name="comments" type"xs:string"
minOccurs="0" />
            </xs:sequence>
        </xs:complexType>
        <!--
==================================================__u61
?=================================================
== -->
        <!-- base complexType for component, port, and wire types -->
        <!--
==========================================================
==========================================================
```

```
    <xs:complexType name="baseType">
        <xs:annotation>
            <xs:documentation>base type for Component Type
and Port Type.</xs:documentation>
        </xs:annotation>
        <xs:sequence>
            <xs:element name="deployment"
type="settings:deploymentValues" minOccurs="0" />
            <xs:element name="settings"
type="settings:setting Values" minOccurs="0" />
            <xs:element name="settingSchema"
type="settings:settingSchema" minOccurs="0" />
            <xs:element name="hostConstraints"
type="hostConstraints" minOccurs="0" />
            <xs:element name="hostedClasses"
type="hostedClassesList" minOccurs="0" />
            <!-- deployment section contains the deployment
instructions for the type. The
                schema for this deployment is specified on the
"unit". -->
            <!-- The settings for this component. These are in
terms of the schema
                that is specified on the unit. -->
            <!-- Setting Schema. New setting schema that can be
exposed by the type.
                The values for this schema are set on members of
this type. Note
                also that we will support flowing setting values to
the settings
                on the unit. -->
            <!-- This section contains any constraints on the
settings of the host that
                is hosting this unit. Note that there can be more than
one host for
                each unit and we can supply constraints on each. -->
            <!-- This section contains the list of hosted units and
any constraints on the classs' settings.
                The constraints are specified in terms of the class's
schema. Note that there can be
                more than one class that is hosted here. -->
        </xs:sequence>
        <xs:attribute name="class" type="xs:string" use="required"
/>
        <xs:attribute name="name" type="xs:string" use="required"
/>
    </xs:complexType>
    <!--
========================================================
= -->
    <!-- Constraints -->
    <!--
========================================================
= -->
    <xs:complexType name="hostConstraints">
        <xs:annotation>
            <xs:documentation>Host constraints are constrains
against the classes that can host this component or port type.</xs:
documentation>
        </xs:annotation>
        <xs:sequence>
            <xs:element name="hostConstraint">
                <xs:complexType>
                    <xs:sequence>
                        <xs:element name="constraints"
type="settings:settingConstraints" />
                    </xs:sequence>
                    <xs:attribute name="host"
type="xs:string" use="required" />
                    <!-- the name of the component unit that
is the host.
                        May include an alias, for
example, "otherSDM:myPortType" -->
                </xs:complexType>
            </xs:element>
        </xs:sequence>
    </xs:complexType>
    <xs:complexType name="hostedClassesList">
        <xs:annotation>
            <xs:documentation>These are constraint against the
classes that this type can host</xs:documentation>
        </xs:annotation>
        <xs:sequence>
            <xs:element name="hostedClass"
maxOccurs="unbounded">
                <xs:complexType>
                    <xs:sequence>
                        <xs:element name="constraints"
type="settings:settingConstraints" />
                    </xs:sequence>
                    <xs:attribute name="class"
type="xs:string" use="required" />
                    <!-- the name of the component class
that we are hosting.
                        May include an alias, for
example, "otherSDM:myPortType" -->
                </xs:complexType>
            </xs:element>
        </xs:sequence>
    </xs:complexType>
    <!
========================================================
========================================================
= -->
    <!--Ports -->
    <!
========================================================
========================================================
= -->
    <xs:complexType name="portType">
        <xs:complexContent>
            <xs:extension base="baseType">
                <xs:sequence>
                    <xs:element name="portConstraints"
type="portConstraints" minOccurs="0" maxOccurs="unbounded" />
                </xs:sequence>
            </xs:extension>
        </xs:complexContent>
    </xs:complexType>
    <xs:complexType name="portConstraints">
        <xs:annotation>
            <xs:documentation>These are constraint against the
classes that this type can host</xs:documentation>
        </xs:annotation>
        <xs:sequence>
            <xs:element name="portConstraint">
                <xs:complexType>
                    <xs:sequence>
                        <xs:element name"constraints"
type="settings:settingConstraints" />
                    </xs:sequence>
                    <xs:attribute name="portClass"
type="xs:string" use="required" />
                    <xs:attribute name="portType"
type="xs:string" use="optional" />
                    <xs:attribute name="minOccurs"
type="xs:int" use="optional" />
                    <xs:attribute name="maxOccurs"
type="xs:int" use="optional" />
                    <xs:attribute name="visible"
type"xs:boolean" use="optional" />
                    <!-- port type is here to allow you to bind
to a port type that has behavior not exposed
                        through settings. In this case settings
would not be enough to allow an appropriate port to be identified -->
                    <!-- visible identifies whether the
application wants to see ports that match this constraint. An application
may
                        only choose to constrain port that it is
connected to without wanting connection values for their endpoints -->
                </xs:complexType>
            </xs:element>
```

-continued

```
            <!-- we probable need a mechanism here to allow a
        port to identify sets of optional port endpoints.
        i.e. I can bind to X,Y or Z but I must bind to at least
one-->
            </xs:sequence>
    </xs:complexType>
    <!--
========================================================
========================================================
= -->
    <!-- Components -->
    <!--
========================================================
========================================================
= -->
    <xs:complexType name="componentType">
        <xs:complexContent>
            <xs:extension base="baseType">
                <xs:sequence>
                    <xs:element name="ports"
type="portsList" minOccurs="0" />
                </xs:sequence>
                <!-- the exclusive attribute indicates whether an
instance of the type at the layer below can host instance of other types
                - shallow implies that the only instances hosted by the
instance are instance of this type
                - deep implies that the host must also be marked as
exclusive -->
                <xs:attribute name "exclusive" type="depth"
use="optional" default"notSet" />
            </xs:extension>
        </xs:complexContent>
    </xs:complexType>
    <xs:complexType name="portsList">
        <xs:sequence>
            <xs:element name"port" minOccurs="0"
maxOccurs="unbounded">
                <xs:complexType>
                    <xs:sequence>
                        <xs:element name="settings"
type="settings:settingValues" minOccurs"0" />
                        <!-- member setting values. These
are in terms of the setting schema
                                    specified on the type -->
                    </xs:sequence>
                    <xs attribute name="name"
type="xs:string" use="required" />
                    <xs:attribute name="type"
type="xs:string" />
                </xs:complexType>
            </xs:element>
        </xs:sequence>
    </xs:complexType>
    <!--
========================================================
========================================================
= -->
    <!-- Compound Component Types. -->
    <!--
========================================================
========================================================
= -->
    <xs:complexType name="compoundComponentType">
        <xs:sequence>
            <xs:element name "components" type="components"
minOccurs="0" />
            <xs:element name="wires" type="wires"
minOccurs="0" />
            <xs:element name="delegatePorts"
type="delegatePorts" minOccurs="0" />
            <xs:element name="delegateHostedClasses"
type="delegateHostedClasses" minOccurs="0" />
            <!-- delegate ports -->
            <!-- delegate hosts. These allow a compound
component to act as a host just as a simple
                component. -->
        </xs:sequence>
        <xs:attribute name="name" type="xs:string" use="required"
/>
            <!-- shallow co-location implies that instances of the
members of this compound component will be placed on the
                same host instance at the layer below - deep co-
location implies that that host is also colocated-->
            <xs:attribute name="colocate" type="depth" use="optional"
default="notSet" />
            <!-- the open attribute indicates whether bindings can see the
internal structure of the compound component
                or simply bind to the compound component as though it
was a simple component -->
            <xs:attribute name="open" type="xs:boolean" use="optional"
default="false" />
            <!-- the exclusive attribute indicates whether an instance of
the type at the layer below can host instance of other types
                - shallow implies that the only instances hosted by the
instance are instance of this type
                - deep implies that the host must also be marked as
exclusive -->
            <xs:attribute name="exclusive" type="depth" use="optional"
default="notSet" />
    </xs:complexType>
    <xs:complexType name="components">
        <xs:sequence>
            <xs:element name="component" minOccurs="0"
maxOccurs="unbounded">
                <xs:complexType>
                    <xs:sequence>
                        <xs:element name="settings"
type="settings:settingValues" minOccurs"0" />
                        <!-- member setting values. These
are in terms of the setting schema
                                    specified on the type -->
                    </xs:sequence>
                    <xs:attribute name="name"
type"xs:string" use="required" />
                    <xs:attribute name="type"
type="xs:string" use="required" />
                    <xs:attribute name="singleton"
type="xs:boolean" use="optional" defaufr="false" />
                </xs:complexType>
            </xs:element>
        </xs:sequence>
    </xs:complexType>
    <xs:complexType name="wires">
        <xs:sequence>
            <xs:element name="wire " minOccurs="0"
maxOccurs="unbounded">
                <xs:complexType>
                    <xs:sequence>
                        <xs:element name="members">
                            <xs:complexType>
                                <xs:sequence>
                                    <xs:element
name="member" type="componentPortRef" minOccurs="0"
maxOccurs="unbounded" />
                                </xs:sequence>
                            </xs:complexType>
                        </xs:element>
                        <!-- member setting values. These
are in terms of the setting schema
                                    specified on the type -->
                    </xs:sequence>
                    <xs:attribute name="name"
type="xs:string" use="required" />
                    <xs:attribute name="protocol"
type="xs:string" />
                </xs:complexType>
            </xs:element>
        </xs:sequence>
    </xs:complexType>
    <xs complexType name="delegatePorts">
        <xs:sequence>
            <xs:element name="delegatePort" minOccurs="0"
maxOccurs="unbounded">
                <xs:complexType>
                    <xs:attribute name="name"
type"xs:string" />
                    <xs:attribute name="componentName"
type"xs:string" />
```

-continued

```
            <xs:attribute name"portName"
type="xs:string" use="optional" />
            </xs:complexType>
        </xs:element>
    </xs:sequence>
</xs:complexType>
<xs:complexType name="componentPortRef">
    <xs:attribute name="componentName" type="xs:string" />
        <xs:attribute name"portName" type="xs:string"
use"required" />
    </xs:complexType>
    <xs:complexType name="delegateHostedClasses">
        <xs:sequence>
            <xs:element name="hostedClassRef"
maxOccurs="unbounded">
                <xs:complexType>
                    <xs:attribute name="componentName"
type="xs:string" />
                    <xs:attribute name="hostedClass"
type="xs:string" use="required" />
                </xs:complexType>
            </xs:element>
        </xs:sequence>
    </xs:complexType>
    <!--
==========================================================
==========================================================
= -->
        <!-- SimpleTypes. -->
        <!--
==========================================================
==========================================================
= -->
        <!-- depth identifies whether the settings applies to only the next
layer (shallow), or must apply to the next layer and be set on the next
layer
(deep)
-->
        <xs:simpleType name="depth">
            <xs:restriction base="xs:string">
                <xs:enumeration value="notSet" />
                <xs:enumeration value="shallow" />
                <xs:enumeration value="deep" />
            </xs:restriction>
        </xs:simpleType>
    </xs:schema>
```

SDM Runtime

Figure 27:
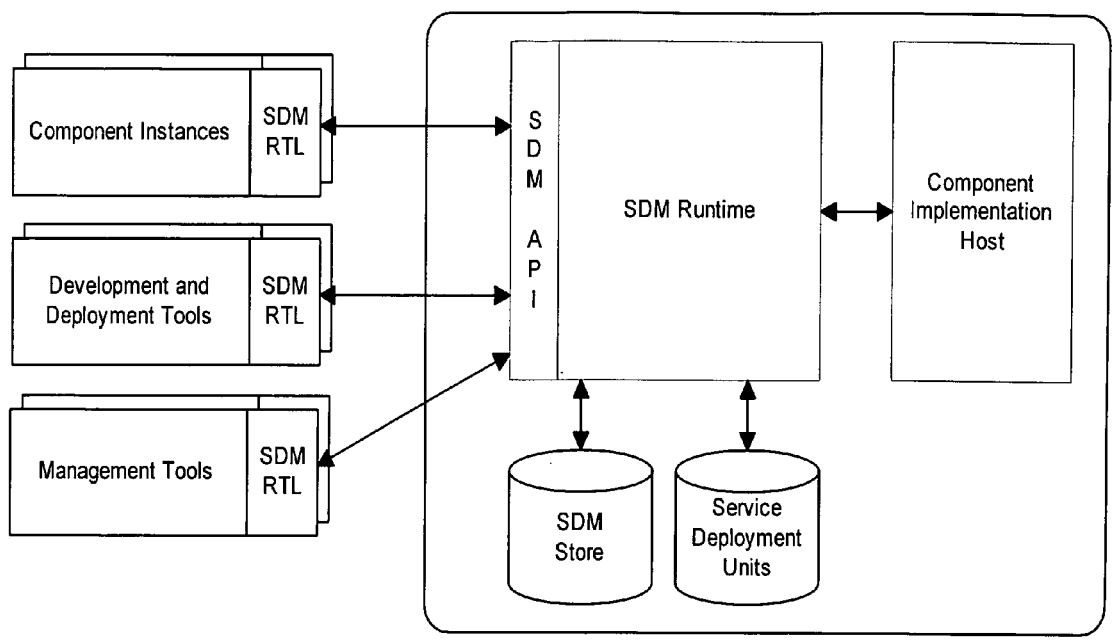
FIG. 27 illustrates an example logical architecture of an SDM runtime.

The SDM Runtime (or just runtime) hosts an implementation of the SDM. It is a highly available distributed service that exposes a set APIs for manipulating the SDM type, member and instance space. The runtime is responsible for tracking all SDM instances in a consistent manner. It provides machinery for deployment, versioning, security and recovery. FIG. 27 represents the logical architecture of the SDM runtime.

The SDM runtime consists of the following:

SDM Runtime—this is the SDM Runtime implementation. It is a distributed implementation that will run on one or more physical machines. The runtime exposes its functionality through the SDM API which is set of calls that manipulate the SDM and instances.

SDM Store—this is a durable store for SDM Models and instances. This store is highly available and its consistency is critical. This store will survive catastrophic events.

Service Deployment Units—this is a read-only store for SDUs. Just like the SDM store it is highly available and will survive catastrophic events.

Component Implementation Host—this is framework for hosting the CLR code that is referenced from SDM components.

The SDM Runtime is typically used by the following client classes:

Component Instances—these are component instances that communicate with the runtime using the SDM Runtime Library (RTL). We distinguish between two types of component instances—runtime-hosted component instances and non runtime-hosted component instances.

Development and Deployment tools—these include the SDM compiler, SDU installation tools as well as other development tools.

Management tools—these are privileged tools that are used for administering and managing the runtime itself.

Clients communicate with the runtime through the SDM Runtime Library (RTL). They typically perform operations that include:

Installing/Uninstalling SDUs: This is the process of adding and removing new SDUs into a running instance of the SDM Runtime.

Adding, removing and modifying SDM types and instances: clients can create new components, ports and wire types.

Creating and deleting instances: clients can create new components, port and wire instances.

Sourcing and sinking events: when changes are made to the type and/or instance space the runtime will send events the affected clients. Events can also be triggered on specific operations such as setting the port binding information.

Query the type and instance space: Clients can reflect on the type and instance space.

Service Definition Model Runtime Architecture

Introduction

This document discusses the Service Definition Model (SDM) and SDM Runtime. A technical discussion of the runtime architecture, core features and implementation are provided. The intended audience is technical evaluators of BIG, developers who intend to author services and components, or others with an interest in the details of the system.

Services Era

Over the last decade we have witnessed the Internet emerge as a computing platform. More and more software companies are adopting the "software as a service" model. Services are typically comprised of several components running on many machines including servers, networking gear and other specialized hardware. Loosely coupled, asynchronous programming models are becoming the norm. Scalability, availability and reliability are critical to the success of such services.

We are also witnessing a change in hardware trends. High density servers and specialized network hardware are widespread in data centers. Switched fabrics are replacing system buses providing greater flexibility in system configurations. Hardware cost plays a small role in the Total Cost of Ownership metric. This has been replaced by the cost of maintaining a dedicated operations staff. Rock-solid operational practices are rare but absolutely vital to any service. These practices, for the most part, are implemented by people.

Effectively the focus of development is shifting from the single PC into the network of PCs. Yet with all these changes have come a plethora of new problems for service developers, software vendors, hardware vendors, and end-users:

Services are large and complex—they are time-consuming to develop, difficult and costly to maintain, and risky to extend with additional functionality.

Services are monolithic—they rely on custom components and configurations. Portions of the service cannot be removed, upgraded independently, or replaced with alternatives.

Services rely on specific hardware configurations—whether it's a certain network topology or a dependency on a specific network appliance machine. This significantly reduces the ability to host a service in a different environment.

Services are developed in silos—due to the lack of a common platform, sharing code or even best operational practices is a daunting task.

Operational nightmare—most services require a staff of operations personnel to function. The operations staff must be trained in the specifics of each service and retrained as the service evolves.

Some of these problems are not unlike those during the DOS era (circa 1980's). DOS defined valuable core services for application developers such as disk management, file system, console facilities, etc. It did, however, leave many complex tasks up to the ISVs. As an example, WordPerfect and Lotus 123 both independently had to write printer drivers in order to support printing within their respective applications. Similarly printer hardware vendors had to make deals with the software companies in order to have a successful product. The barrier to entry for writing a DOS application and hardware vendors was exceptionally large. This resulted in only a few successful software companies.

Windows addressed this problem by defining a platform which dramatically reduced the barrier to entry. Windows defined an abstraction layer for most hardware on the PC platform. This relieved the developers from having to worry about supporting specific hardware devices. Windows managed all resources within the PC including memory, disk and network. It also came with a wealth of services that can be utilized by application developers. This platform sparked enormous growth in the industry. Software vendors that targeted the Windows platform were extremely productive. Many new hardware vendors emerged with cheaper hardware due to the commoditization effect of Windows.

The services era has yet to experience such growth—the revolution that has happened on the desktop machine needs to happen with services.

BIG services Platform

BIG is creating a platform for highly available and scalable services. This platform will enable:

Development of distributed, scalable and highly available services using Visual Studio and reusable building blocks like SQL, IIS, etc.

Deployment across a set of abstracted hardware and software resources which are automatically allocated, purposed and configured.

Lowering the cost of ownership through automation of operational best practices.

Procurement of standardized data center hardware that leverages commodity economics.

The BIG platform is an extension to the Windows platform and builds on the existing technologies such as .NET, SQL Server and other Microsoft assets. The BIG services platform is comprised of many pieces, including:

Hardware reference platform that aggregates commodity hardware to build a single large computer that we call the BIG Computer. This includes many interconnected servers, network devices, and storage.

Hardware abstraction layer that virtualizes resources. Enables dynamic hardware binding and re-deployment and automated network configuration Service Definition Model (SDM) for developers to describe an entire service. Enables developers to rapidly build new services using highly available SQL, IIS and other reusable building block components Highly available runtime that supports the SDM. Enables hosting multiple scalable services inside the BIG Computer.

Operations logic framework for automating operational best practices. Enables policy expression and enforcement This document will focus solely on the SDM and the SDM Runtime.

Service Definition Mode

This section will discuss the Service Definition Model (SDM). Please refer to the "Service Definition Model Language" document for a complete technical description of the SDM and the SDML language.

The SDM is the foundation on which all services are built. The SDM:

Enables the composition of services from smaller units. These units form the basis of hardware and software abstraction.

Serves as a live blueprint of a service—the SDM captures the overall structure of a service in a scale-invariant manner.

Provides a framework for automating operational practices and promotes their reuse.

Defines standards for deployment, reuse, discovery, versioning, and recovery of services.

Component Model for Services

In essence, the SDM is a component model for services. Like traditional component models, the SDM defines primitives on which more complex functionality can be built. Let's consider an analogy; Microsoft's Component Object Model (COM) defined a programming model for authoring components. It standardized on how components are packaged, registered, activated, discovered etc. COM mandated strict rules related to lifetime, memory management, and interface implementation. These primitives were essential for interoperability—it allowed components to be treated as black boxes. Com was the basis for more sophisticated services such as persistent storage, eventing, automation and OLE.

The SDM is defining a component model for services. This model is well suited for loosely coupled, distributed and asynchronous services. The SDM defines standards for deployment, versioning, recovery and scoping. The SDM is the model in which more sophisticated services such as network management, hardware management, storage abstraction, etc. are delivered. How does the SDM compare to other component models?

Certainly technologies such as DCOM and CORBA among others have well defined methods for developing applications based on reusable components. However, while existing component technologies are powerful, they have not been widely successful in the Internet or loosely coupled scenarios. This is largely due to the following:

Existing component technologies are not designed for the large scale—most implementations are optimized for a single machine or a small number of machines. Internet applications typically involve many interrelated components running on many machines.

Existing component technologies mandate invocation protocols such as RPC—they do not leverage well-established network protocols nor do they allow diverging protocols.

Existing component technologies lack a concept of an application—most have well developed definitions of components but lack an overall definition of an application that is composed of smaller components.

Existing component technologies are limited to software running on a general purpose computer—single-purpose network devices can not participate as components.

That said there is a lot of thinking that has gone into existing component technologies that is still significantly relevant to the services world.

SDM Fundamentals

The SDM is a declarative definition of the structure of a service. This definition is in terms of components, ports, and wires:

Components are units of implementation, deployment and operations. Components can be a dedicated server running .NET Server, an IIS virtual web site on a shared machine or network appliance such as a Cisco Local-Director. Components expose functionality through ports and establish communicating paths through wires. Components can be nested within outer components are referred to as compound components.

Ports are named endpoints that have an associated type. Port types often represent a protocol, for example, HTTP server. Ports capture the information required for establishing communication.

Wires are the permissible communication paths between ports. They declare the topological relationship between ports.

Services are authored using a declarative Service Definition Model Language

```
(SDML). Let's consider an example:
    using System;
    using System.Iis;
    using System.Sql;
    [sdmassembly:name("MyService")];
    [sdmassembly:version(1)];
    componenttype MyFrontEnd : AspApplication
    {
      port SqlClient catalog;
      implementation "MyFE, MyClrAssembly";
    }
    componenttype MyBackEnd : SqlDatabase
    {
      implementation "MyBE, MyClrAssembly";
    }
    componenttype MyService
    {
      component MyFrontEnd fe;
      component MyBackEnd be;
      port http = fe.http;
      wire SqlTds tds
      {
        fe.catalog;
        be.sqlServer;
      }
      implementation "MyService, MyClrAssembly";
    }
```

As can be seen the syntax for SDML borrows heavily from C#. SDML defines component, port and wire types. If we walk through this definition:

The using directive references namespaces of SDM types. These include the system namespace which is provided by the SDM runtime and defines basic types such as the http wire type. The other namespaces define types associated with IIS and SQL Server.

The assembly name and assembly version provide a strong name for the SDM assembly. Note that this is nothing to do with a CLR assembly. An SDM assembly is the smallest unit of SDM deployment. It is named and contains a collection of component, port and wire types. SDM assemblies should not be confused with CLR assemblies—they are completely distinct.

A componenttype called MyFrontEnd is declared that inherits from the component type AspApplication which is a referenced type defined in the System.Iis SDM assembly. Components are abstractions; they refer to a class and not instances. MyFrontEnd identifies a component from which zero or more component instances can be created.

port SqlClient catalog; declares a port on the MyFrontEnd component of type SqlClient. The port is called "catalog". This port is in addition to the ports, components and wires that MyFrontEnd inherits from base component type AspApplication.

The implementation keyword references an implementation for the component type. This implementation is a reference to a CLR class within a CLR assembly. This can be thought of as an entry point or constructor for the component type. When a component instance is created this code is invoked.

The MyService component type is defined with two sub-components called fe and be. These are of type MyFrontEnd and MyBackEnd. Instances of component MyService can subsequently have instances of fe and be forming a hierarchy of component instances.

port http=fe.http; declares a port on the MyService component type that is delegated to the http port on the fe component.

wire SqlTds tds declares a wire in the MyService component type of type SqlTds, with the name tds. Two ports are attached to the wire. This declaration means an instance of MyService can have zero or more instances of wire tds and each of those wire instances can have catalog ports from fe components and sql ports from be components attached to them.

It is often helpful to consider a graphical representation of services. See FIG. 28. Boxes represent components, diamonds represent ports and lines represent wires.

Component Implementation

Every component can reference an implementation in the form of a CLR class within a CLR assembly. The CLR assembly is hosted by the SDM Runtime and will be invoked at component instantiation time. The CLR class that implements the SDM component can perform SDM operations by calling the SDM Runtime API. This will be described in great detail later in this document. The following is a C# code snippet for the implementation of the MyService SDM component type from above.

using System;
using Microsoft.SDM;

```
public class MyService: SDMComponentInstance
{
    public override OnCreate(...)
    {
        SDMComponent fe1 = CreateComponentInstance("fe", "");
        SDMComponent fe2 = CreateComponentInstance("fe", "");
        SDMComponent be1 = CreateComponentInstance("be", "");
        SDMWire tds1 = CreateWire instanceance("tds");
        tds1.Members.Add(fe1.Ports["catalog"]);
        tds1.Members.Add(fe2.Ports["catalog"]);
        tds1.Members.Add(be1.Ports["sqlServer"]);
    }
}
```

This code defines a C# class MyService that inherits from the SDMComponent. The class overrides the OnCreate( ) method and creates two instances of the fe components, one instance of the be component and one wire instance. It then adds three ports to the wire instance.

This CLR code is compiled into an assembly called MyClrAssembly that is referenced within the SDM for MyService. When a component of type MyService is instantiated this code will be invoked and the OnCreate method will be called.

[BassamT] Consider showing the strongly-typed version of the C# code.

Instances

Figure 29:
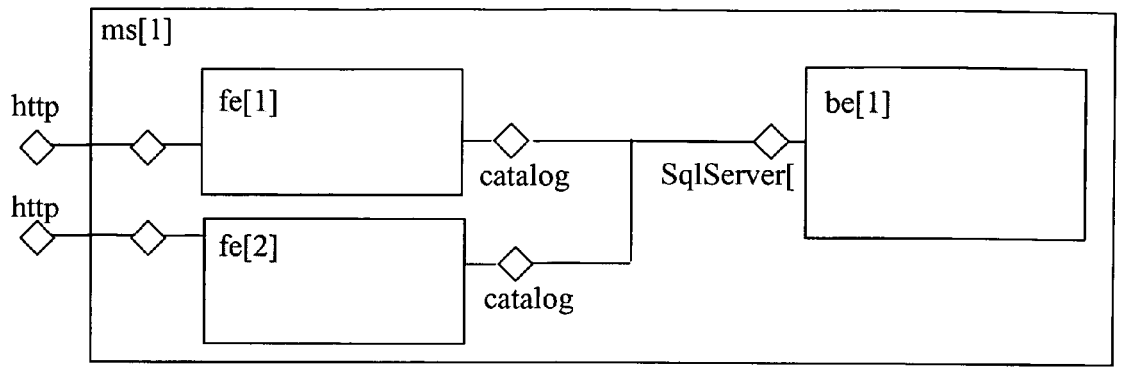
FIG. 29 illustrates an example instance space.

SDML is used to define component, port and wire types; it does not define instances. Instances can be created using the SDM Runtime API as we saw in the C# code above. The C# code above created a number of instances and formed a wiring topology in the instance space. These instances will be tracked by the SDM Runtime. For example the SDM Runtime will store the following information after the OnCreate call completes above:

component instance ms[1]
port instance http[1]
component instance fe[1]
component instance fe[2]
component instance be[1]
wire instance tds[1]
  fe[1].catalog
  fe[2].catalog
  be[1].SqlServer;

NOTE: The syntax used here is not SDML; it is used to illustrate the instance space that is tracked by the SDM runtime.

ms[1] is a component instance that has three children component instances fe[1], fe[2] and be[1]. fe[1] and fe[2] are instance of the fe component. be[1] is an instance of the be component. tds[1] is a wire instance that contains three members. Graphically, the instance space shown in FIG. 29.

Components instances have real physical manifestations—fe[1] and fe[2] in this example are two ASP.NET applications that are running on IIS running on a Windows machine. When the call to CreateComponentInstance was made a new ASP.NET application was created and configured on an IIS box. A number of intermediate steps could have also been invoked—for example, the caller's credit card has been charged for using the new resource or a new machine has been allocated due to lack of capacity. Later in this document we will examine the machinery behind component instantiation.

Service Deployment Units

Figure 30:
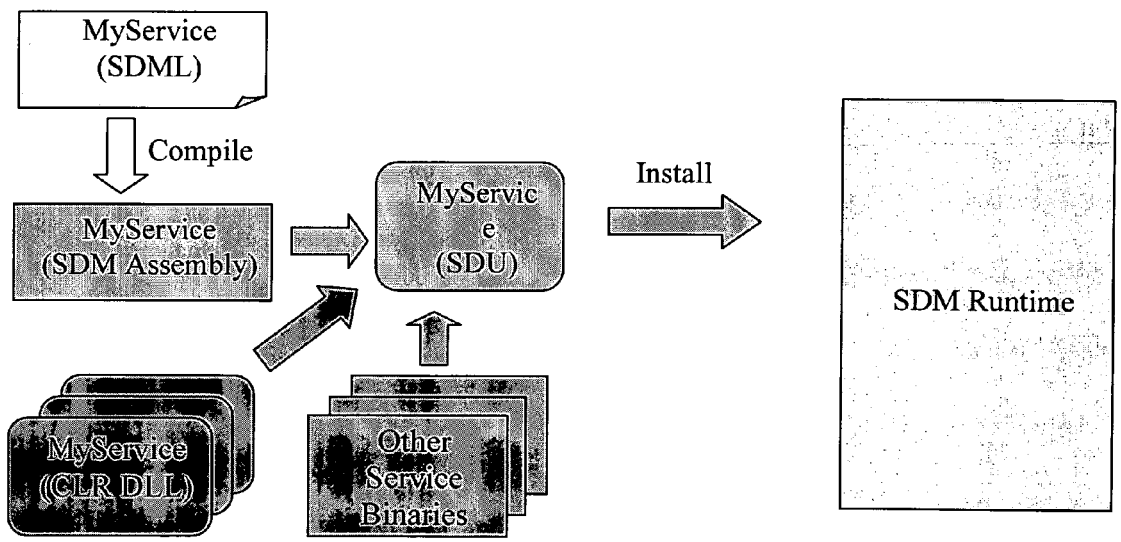
FIG. 30 illustrates an example of packaging data into an SDU.

The SDM model for MyService defined the structure of the service in terms of component, ports and wires. This resulted in an SDM Assembly that can be installed on an SDM Runtime machine. Obviously, the SDM assembly is not enough for instantiating the service. In addition to the SDM assembly we must also consider the CLR assemblies that are the implementations of components. We must also consider the ASP.NET code, SQL scripts and whatever else is needed by the service. The sum of all these pieces is packaged up into a Service Deployment Unit (or SDU). See FIG. 30.

SDM Runtime

The SDM Runtime (or just runtime) hosts an implementation of the SDM. It is a highly available distributed service that exposes a set APIs for manipulating the SDM type, member and instance space. The runtime is responsible for tracking all SDM instances in a consistent manner. It provides machinery for deployment, versioning, security and recovery.

This section describes the design and implementation of the SDM Runtime as proposed for the BIG V1.0 release. While there can certainly be different embodiments of the SDM Runtime we will focus on one throughout this document—the highly available SDM Runtime implementation that will be hosted on the BIG Computer (see _____ for more details).

Runtime Architecture

FIG. 27 represents the logical architecture of the SDM runtime.

The SDM runtime consists of the following:

SDM Runtime—this is the SDM Runtime implementation. It is a distributed implementation that will run on one or more physical machines. The runtime exposes its functionality through the SDM API which is set of calls that manipulate the SDM and instances.

SDM Store—this is a durable store for SDM Models and instances. This store is highly available and its consistency is critical. This store will survive catastrophic events.

Service Deployment Units—this is a read-only store for SDUs. Just like the SDM store it is highly available and will survive catastrophic events.

Component Implementation Host—this is framework for hosting the CLR code that is referenced from SDM components.

The SDM Runtime is typically used by the following client classes:

Component Instances—these are component instances that communicate with the runtime using the SDM Runtime Library (RTL). We distinguish between two types of component instances—runtime-hosted component instances and non runtime-hosted component instances.

Development and Deployment tools—these include the SDM compiler, SDU installation tools as well as other development tools.

Management tools—these are privileged tools that are used for administering and managing the runtime itself.

Clients communicate with the runtime through the SDM Runtime Library (RTL). They typically perform operations that include:

Installing/Uninstalling SDUs: This is the process of adding and removing new SDUs into a running instance of the SDM Runtime.

Adding, removing and modifying SDM types and instances: clients can create new components, ports and wire types.

Creating and deleting instances: clients can create new components, port and wire instances.

Sourcing and sinking events: when changes are made to the type and/or instance space the runtime will send events the affected clients. Events can also be triggered on specific operations such as setting the port binding information.

Query the type and instance space: Clients can reflect on the type and instance space.

Type, Member and Instance Space

Figure 31:
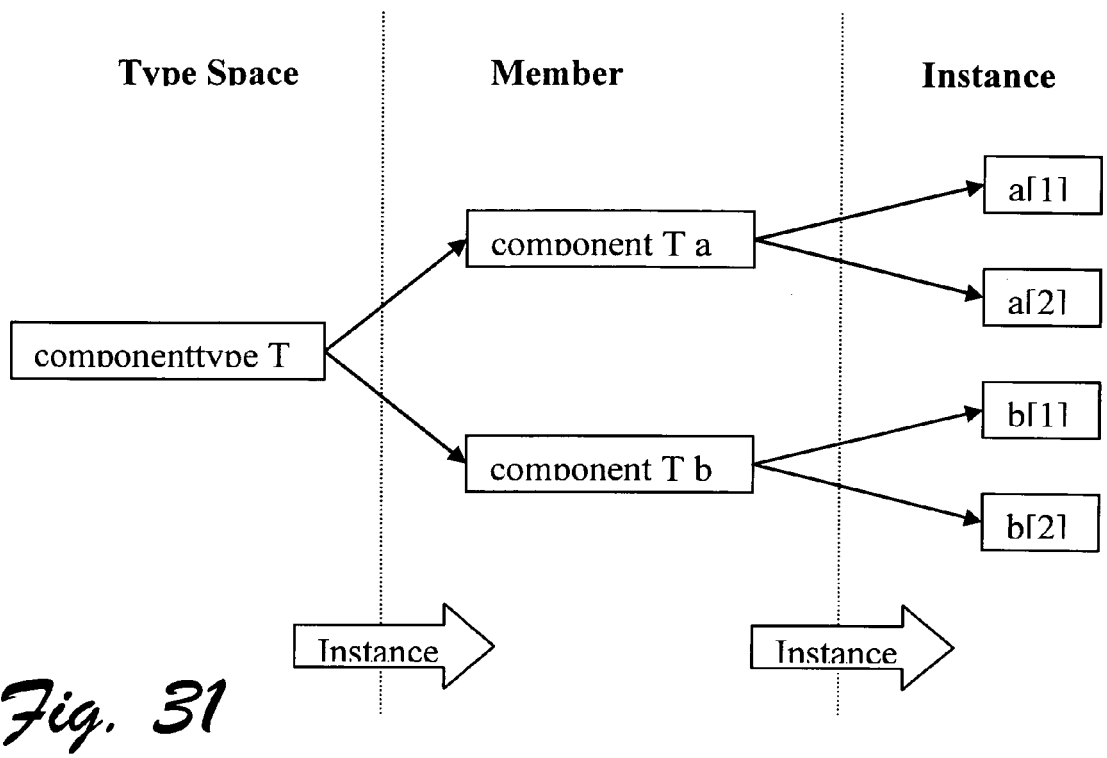
FIG. 31 illustrates an example type space, member space, and instance space.

The relationship between a component type, component and component instance is analogous to class, class member and object in modern object-oriented languages. SDM defines a separation between the type, member and instance space. Component types are in the type space, components are in the member space and component instances are in the instance space. FIG. 31 illustrates the separation between the three spaces.

The "member space" contains instances of the type space. The "instance space" contains instances of the member space. The SDM Runtime is responsible for tracking all three spaces and the relationship between them. This information is stored within the SDM store and can be queried by using the Runtime API. Components and wires can have zero or more instances. Ports can only have one instance.

Figure 32:
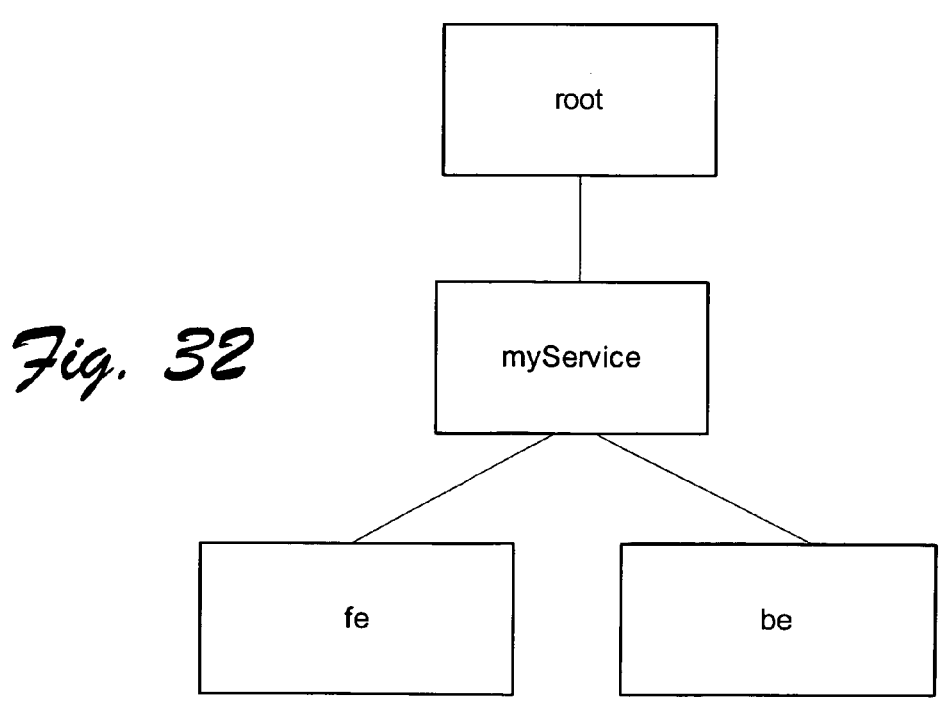
FIG. 32 illustrates an example member tree.
Figure 33:
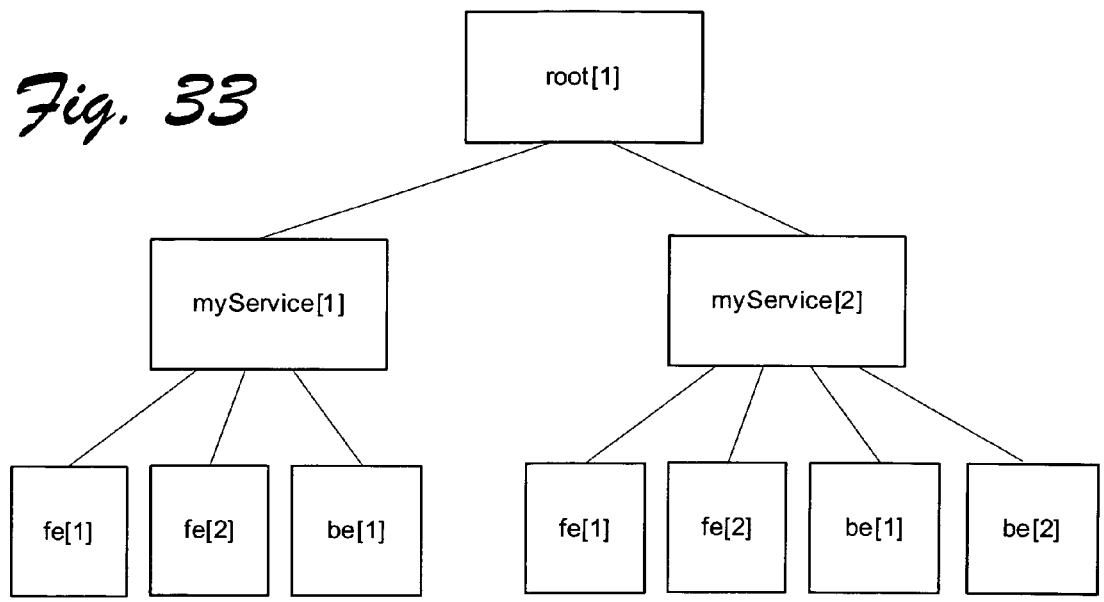
FIG. 33 illustrates an example instance tree.

The SDM member and instance space conform to a strict hierarchy. All components within the member and instance space are arranged in a tree. The root component is a special component referred to as the "root" or "universal" components. Let's look at the member tree from the MyService example in the previous section (FIG. 32). The boxes represent components and the lines are parent/child relationships. myService is a member component of the root component. The instance tree might look as shown in FIG. 33. Notice that there are two instance of the myService component with a different number of children instances. myService[1].fe[1] and myService[2].fe[1] have same component member "fe" and have the same component type "MyFrontEnd" but otherwise are completely distinct component instances. "root[1]" is the only instance of the root component.

Component Instantiation

One of the fundamental operations provided by the SDM runtime is component instantiation. This is the process in which a component instance comes into existence. Unlike traditional component models where creating an instance (or an object) typically involves allocating and initializing a chunk of memory for the instance, SDM components typically involve many steps performed by different parties and can take hours if not days to complete. For example, when a component of type ASP.NET application is instantiated the result is a new virtual web site on a machine running IIS followed by a configuration act. Consider a scenario where the capacity on the IIS machines has been reached and a new one has to be allocated before an ASP.NET application is instantiated. This process might take hours as it will involve allocating a new machine from a pool, possibly incurring a billing charge, and installing the operating system including IIS. The SDM Runtime supports two ways to instantiate components 1) Factory instantiated components and 2) runtime instantiated components. These methods are discussed briefly below. Please refer to the "Component Instantiation" specification for more details.

Factory Instantiated Components

Component factories (or just factories) are the entities responsible for creating instances for one or more component types. Factories are themselves components that expose one or more ports for the purposes of instantiation. One way to think of factories is as resource managers. The resource they are managing is the component type. Factories know how to map a resource into an instance of a component. For example, assume we had a component of type "File Storage". When this component is instantiated an NTFS directory will be created and appropriate ACLs will be provisioned. The factory for this component might manage a number of Windows machines for the purpose of allocating storage. The factory is responsible for creating the NTFS share, setting the ACLs, quotas etc. Component factories play an important role in the SDM Runtime. Since they typically are managing resources on behalf of services they are expected to be reliable and highly available. While the number of component factories supported by the SDM runtime is open ended we expect the BIG V1.0 will have a small number of base component factories. They are:

Hardware—this is base level factory that is responsible for allocating instances of hardware and managing them. For example, it can allocate a server machine with 1 GB of memory, or a storage device such as NAS.

Network—this factory responsible for VLANs, public IP addresses, DNS names etc.

PC—this factory can allocate a machine and deploy a full OS-image on it.

Storage—this factory is responsible for managing and allocating storage.

Software resources—such as ASP.NET, IIS Web Site, SQL Server Database etc.

Instantiation Process

Factories must register with the SDM runtime specifying which component types they are responsible for creating instances of. At a high level, the process of instantiation is as follows:

The caller asks the SDM runtime for the component factory for a given component type.

1. The SDM runtime is responsible for finding the appropriate component factory and returning it to the caller.
2. The caller then communicates with the component factory directly and asks it to create one or more instances.

Running Factory Table

The SDM runtime will maintain a table of the component types and their appropriate factories. Every component instance has a running factory table. The running factory table structure is as follows:

(ComponentTypeID, PortType)->(PortInstance, [cookie])

Component instances can add/remove entries in their tables as well as any of their direct children's tables. By default, the running factory table of the parent is inherited when a new child component instance is created.

Figure 34:
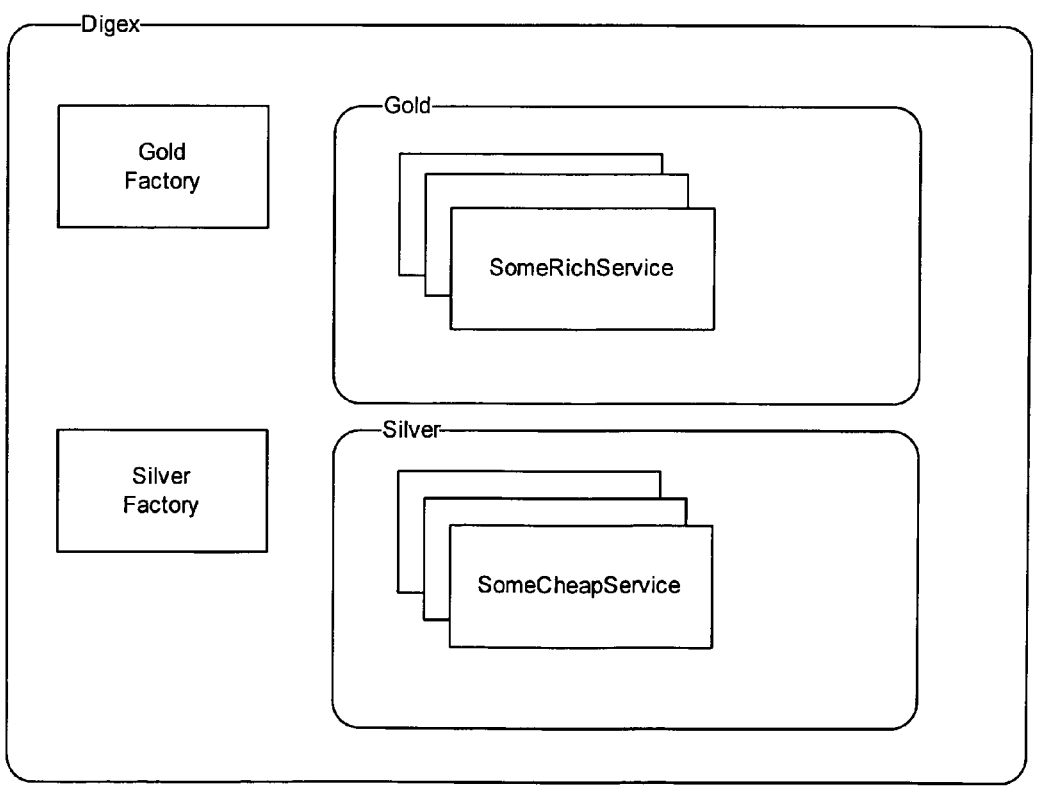
FIG. 34 illustrates an example implementation of the systems described herein.

The running factory table is tracked for every component instance in order to support different factories for the same component type in different contexts. Since factories are typically where resources are allocated hosting environments might mandate different policies for resource allocation. For example, consider a scenario where a hosting entity such as Digex has different plans for their customers. Customers that paid for Gold will get a dedicated IIS box and customers that paid for Silver will get a shared IIS box. The customer's service contains a component of type "ASP- .NET application" and it is unaware of whether it will be hosted on a dedicated IIS machine or a shared one. Digex might implement this as shown in FIG. 34.

Digex is a component that has two component factories Gold Factory and Silver Factory. The factories are components themselves. Digex also defines to other components called "Gold" and "Silver". These "Gold" components will be the parent of all services that have paid for the Gold Service.

When Digex is instantiated it will create an instance of the factories and also instances of the "Gold" and "Silver" components. Gold[1] will have its own running factory table. Digex will register the Gold factory in this table by calling the appropriate SDM runtime API. When a new customer's service is instantiated as a child of Gold[1] and it will inherit the running factory table of Gold[1]. This means that when a component instance of "ASP.NET application" is created the Gold Factory will handle this request and charge the customer's account appropriately.

Factory Tracking

The SDM runtime will keep track of the factory that created each component instance. See FIG. 35. The dotted lines represent a "created by" relationship between a component instance and the factory that created it. As mentioned above the factories are components themselves and therefore they must have factories. To end the infinite recursion the runtime will be the factory for a "runtime-hosted components" as described below. Note also that the root component instance is special and it is its own factory.

Factories and Transactions

Factories will support transactions to relieve service developers from having to worry about complex rollback and error handling logic. Factories that are not built on top of transacted subsystems will need to support compensation. Factories must also support enlisting in a distributed transaction.

Factories will typically maintain lots of bookkeeping information related to instantiation. This bookkeeping information must remain consistent with the SDM runtime in order to guarantee proper recovery. To facilitate this, the SDM runtime will provide a transacted storage service for component instances including factories. A well-written factory will store all its bookkeeping information in this store.

Factory Port

Factories will typically expose one or more ports that can be used for component instantiation. While the port types are not mandated by the SDM runtime we recommend that all component factories support the SDM_Factory port. SDM Factory is a SOAP based port that is called to instantiate new component instances. The C# interface for this port is as follows:

```
public interface ISDMFactory
{
    ComponentInstance Instantiate(
        ComponentInstance parent,
        Component component,
        ComponentType componentType,
        object args);
    void Alloc(ComponentInstance allocInstance);
    void Construct(ComponentInstance constructInstance);
}
```

ISDMFactory supports a three pass instantiation process:
  Instantiation Pass: this pass will create all the component instances recursively with the SDM runtime. It will not however do any allocation or construction. It merely just creates the "skeleton" component instances required.
  Allocation Pass: during this pass all the relevant component factories will allocate any resources needed for the instantiation.
  Construction Pass: If the allocation succeeded then the construction pass will start. This is typically the longest running pass. The factories will typically do all the real work during the construction pass.

Factories can certainly support other port types for instantiation, but the SDM runtime and Runtime APIs have a lot of helper functions that work well with the SDM_Factory implementation. These APIs will certainly improve the developer experience for the majority of developers.

Runtime-Hosted Component Instances

Besides factories, the SDM Runtime will also host implementations for SDM components that reference a CLR assembly using the implementation SDML keyword. The referenced CLR assembly is a literal string that is the fully qualified name of a CLR class. For example:

```
componenttype A
{
    port pt x;
    implementation
    "MyNamespace.MyClassName,MyClrAssemblyName"
}
``` or for strongly named CLR assemblies you can specify the culture, version and key:

```
componenttype A
{
    port pt x;
    implementation "MyNamespace.MyClassName,
    MyClrAssemblyName, culture=neutral, version=1.0.0.1234,
    PublicKeyToken=9a33f27632997fcc"
}
```

For such components, the SDM Runtime will act as the factory and it will host and manage these CLR classes. This also ends the infinite recursion of factories mentioned above since the base level factories are implemented as CLR assemblies hosted by the SDM runtime.

The CLR assembly will be hosted using Microsoft's IIS Server. The implementation keyword references a class that must inherit from MarshalByRefObject and must implement the IRuntimeHostedImplementation and the ISDMFactory interfaces. For convenience, the base class SdmComponentInstance provides a default implementation for these interfaces. The following is an example of a runtime-hosted CLR implementation for component type A above.

```
public class A : SdmComponentInstance
{
    protected override void OnCreate(object args)
    {
        // do something
    }
}
``` class A is a C# class that inherits from SdmComponentInstance and therefore can be hosted by the SDM Runtime. The CLR assembly for this class must also be placed in the \bin subdirectory of the SDU in order for it to work properly. When an instance of component of type A is created the runtime is responsible for finding an available host IIS machine and instantiating the CLR code on that machine. The CLR code is hosted as a .NET remoting application hosted by IIS. All CLR assemblies within an SDU will share an IIS process and have their own AppDomain within that process.

Once the CLR assembly is loaded the runtime will perform a .NET remoting call to the well-defined entrypoint on the IRuntimeHostedImplementation interface. At this point the CLR class is equivalent to a Component Factory and the ISDMFactory interface is consumed as we saw in the previous section.

Ports and Wires

Ports and wires are the basis for communication within the SDM Runtime. Ports and wires solve a number of problems that are common in service deployment today:

Hard coding of communication information—many services typically hard code the name of their server or ip addresses within their code. For example, front end servers will typically hard code the SQL server machine name as well as the connection information such as database name, login and password.

Defining a communication topology—most service deployments typically use DMZs as the only mechanism for defining boundaries for communication. Other constraints are not enforced, for example if the front end server ever needed to communicate with other front end servers, this is not captured anywhere.

Discovery—finding out about new components that are added and removed from a service is a typical problem faced by services today.

The SDM solves these problems with ports and wires. Ports are typed entities that are exposed on components. A port is analogous to service access point—it is where the component exposes well defined functionality. For example, a "storage" component would define a port of type SMB-.Server that can be used for filesystem operations. Wires define the permissible bindings between the ports. They form a communication topology that can constrain the communication paths.

Let's reexamine the MyService example from above:

```
componenttype MyService
{
    component MyFrontEnd fe;
    component MyBackEnd be;
    port http = fe.http;
    wire SqlTds tds
    {
        fe.catalog;
        be.sqlServer;
    }
    implementation "MyService, MyClrAssembly";
}
```

MyService contains a single wire called tds. Wires, just like components, can have instances. For example, the following are two component instance of MyService ms[1] and ms[2] with two different wire instance topologies.

```
component instance ms[1]
    wire instance tds[1]
        fe[1].catalog
        fe[2].catalog
        be[1].SqlServer;
component instance ms[2]
    wire instance tds[1]
        fe[1].catalog
        be[1].SqlServer;
    wire instance tds[2]
        fe[2].catalog
        be[1].SqlServer;
``` ms[1] has a single wire instance tds[1] that contains three port instances. ms[2] has two wire instances tds[1] and tds[2] that have two port instances each. In the first case, fe[1] and fe[2] can see each other. In the second case fe[1] and fe[2] will not see each other.

Wire instance form a physical communication topology. Port instances are members of a wire instance. They can:

1) Query or discover each other—the runtime API supports functions for querying and discovering other port instances on the same wire instance. All members are visible within the same wire instance. In addition, the owner of the wire instance can query the members at any time.

2) Receive events—members of a wire will receive events triggered by SDM operations on member port instance. See "Events" below for more details.

3) Constrain communication—wire instances constrain the allowable communication paths between component instances.

Port Binding Information

Ports are the typed entities that are exposed by a component. A port can have exactly one instance. A port instance can carry binding information which is typically everything required to establish a communication channel between components. For example, the "be[1].SqlServer" port instance from above could have the following binding information for connecting to the SQL backend:

"server=mySQLServer;uid=myLogin;pwd=myPwd;"

This string can be passed to ADO or OLEDB and a TDS connection can be established to the backend SQL Server. The SDM runtime does not get in the way of the communicating parties. It merely acts as the holder of any information required to start the communication.

Port Visibility and Wire Instances

Port instances on a component instance are only visible to other component instance if they have been attached to the same wire instance. This is a pretty powerful mechanism for building logical network topologies for services. The SDM runtime also support means for automatically creating physical Virtual Networks and employing packet filtering as needed in order to implement the wire instance constraint. See the "Networking Architecture" document for more information.

Events

The SDM Runtime raises certain intrinsic events as a result of operations on the SDM instance space. For example, events are raised when a component instance creates a port instance. Depending on the specific event, the destination is either a compound component instance or the port instances on a given wire.

All events are delivered to the component instance on the runtime port. The SDM runtime library is responsible for trapping these events and translating them into a language-specific call. For example, the CLR-based SDM runtime library will raise a CLR event.

Component Instance Events

Figure 36:
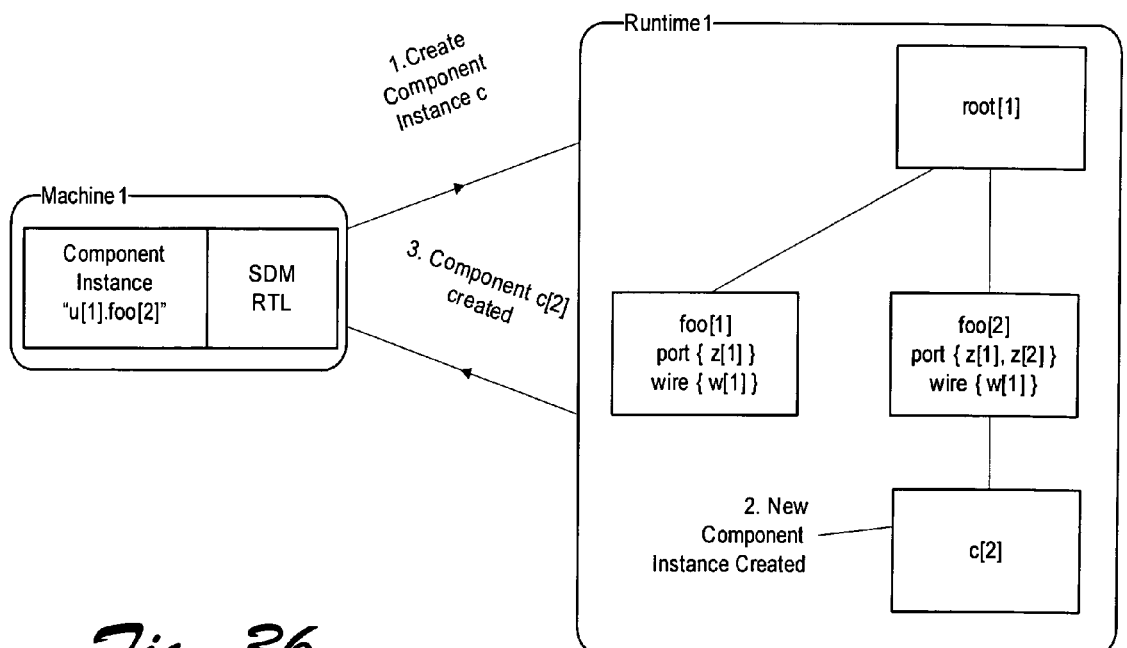
FIGS. 36–39 illustrate example component instance events.

These events are raised when a new component instance is created, or an existing component instance is deleted. The destination of the events is always the parent compound component instance. The events are sent to the direct parent component instance only—they are not propagated up the instance tree. From our example above, assume that component instance "u[1].foo[2]" asked the runtime to create a new instance of the member component "c". See FIG. 36.

The code for component instance "u[1].foo[2]" is currently running on machine1. Using the SDM RTL it asks the runtime to create a new instance of component "c". The runtime knows the identity of the calling component instance and can disambiguate and scope the operation. The new component instance is created and an event raised and delivered back to the calling component instance. When an instance is destroyed or fails the runtime will send the appropriate events to the parent component instance and the appropriate component factories.

Port Instance Events

Figure 37:
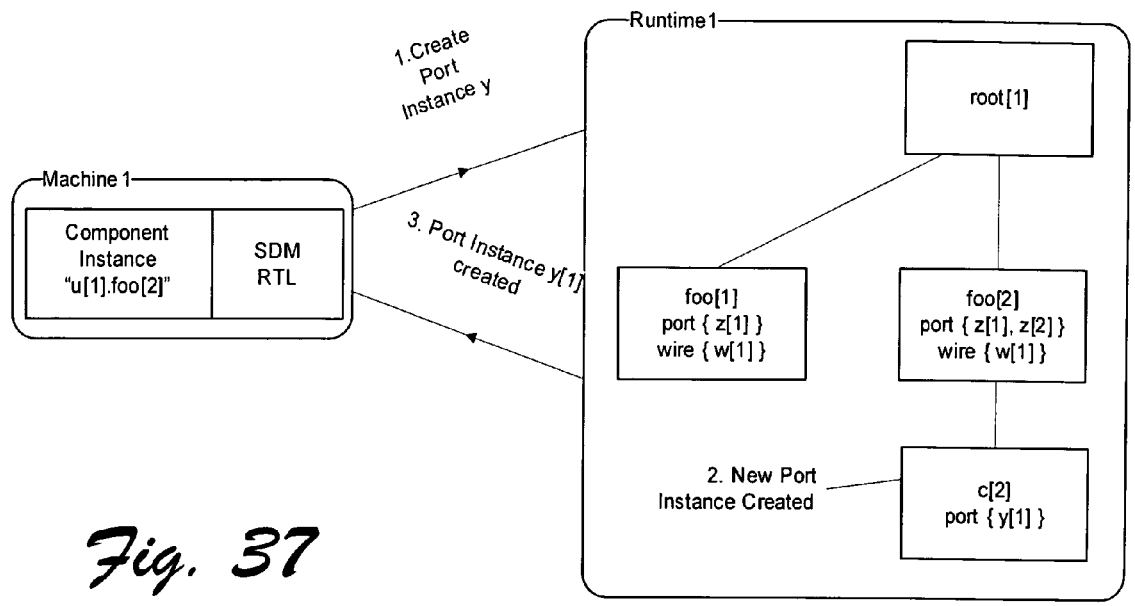

When a component instance creates a port instance or deletes an existing port instance the parent component instance is notified of the changes. See FIG. 37. If a port instance is attached to a wire instance all members of the wire instance will be notified of the change as well as the parent component instance. This is described in the next section.

Port States

Every port instance can be in one of the following states:

Created—this is the state of the port when it is first created. This triggers an event that is sent to the parent component instance.

Attached—the port goes into this state when it is attached to a wire instance. This triggers an event that is sent to the parent component instance and all members of the wire instance.

Online—the port goes into this state when it is ready for operation. This triggers an event that is sent to the parent component instance and all members of the wire instance.

Offline—the port goes into this state when it wants to stop normal operation. This triggers an event that is sent to the parent component instance and all members of the wire instance.

Detached—the port goes into this state when it is detached from a wire instance. This triggers an event that is sent to the parent component instance and all members of the wire instance.

Deleted—the port is in this state when it is removed from the instance space. This triggers an event that is sent to the parent component instance.

Wire Instance Events

Figure 38:
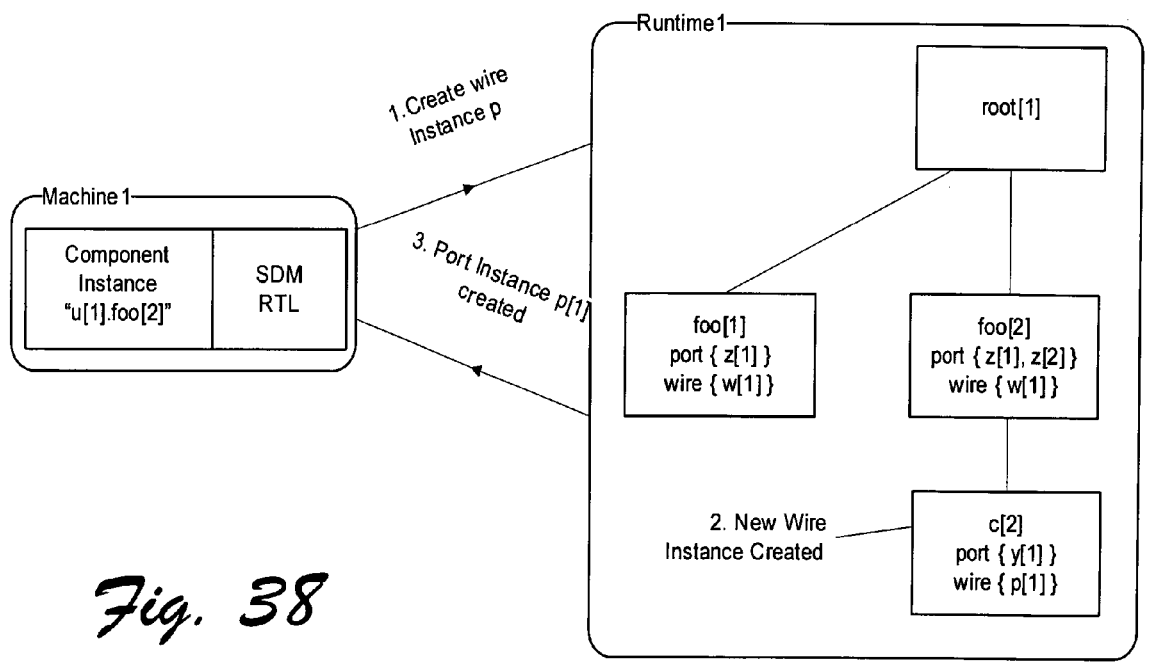

Wire instance events are raised when a wire instance is created or deleted. The destination of these events is always the parent component instance that owns the wire. See FIG. 38.

Wire instances can also contain port references to its members. This wire membership determines the destination of certain member port events. Let us continue our example from above. Assume that "foo[2].c[2]" has created a number of new instances as follows:

```
component instance universal[1]
  component instance foo[2]
    component instance c[2]
      port instance y[1]
      component instance b1[1]
        port instance x[1]
      component instance b2[1]
        port instance x[1]
      wire instance p[1]
        b1[1].x[1]
        b2[1].x[1]
```

Figure 39:
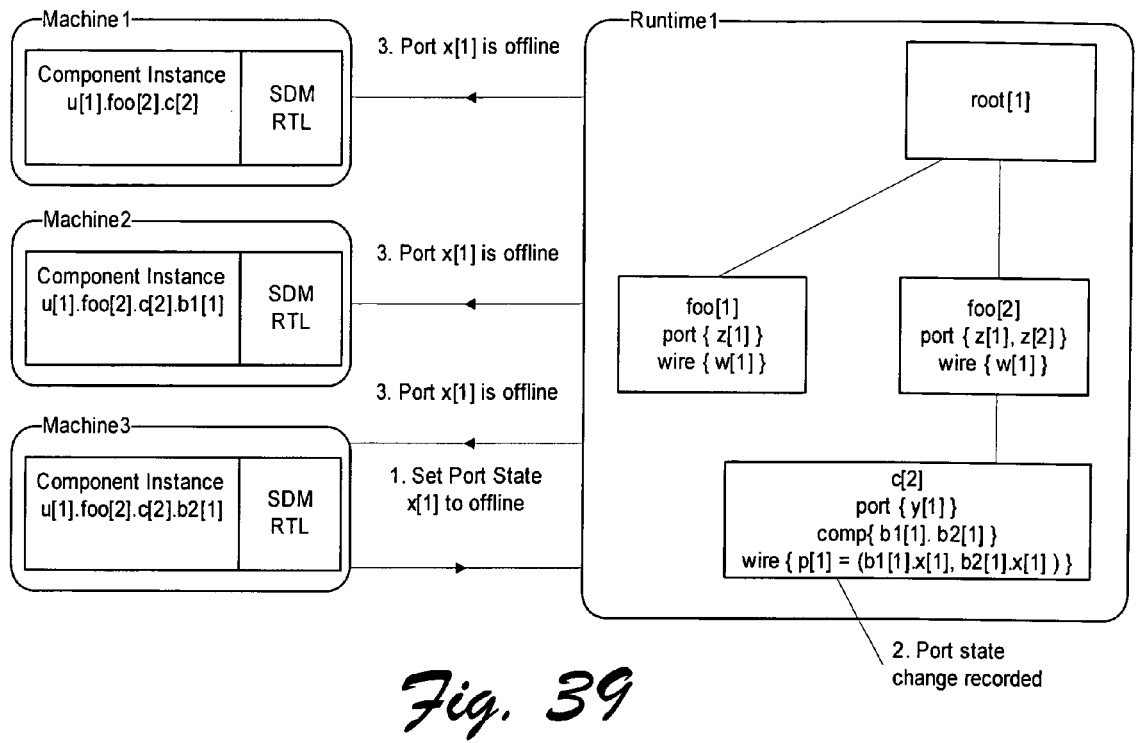

Note that wire instance "p[1]" contains references to two port instances "b[1].x[1]" and "b2[1].x[1]". Let us assume that component instance "b1[1]" and "b2[2]" each run on separate machines. FIG. 39 shows the events raised when "b2[1]" changes its port state to offline.

Note that the "b2[1]" is hosted on Machine3 and it invokes the "set port state" operation on the runtime. The runtime records the change and sends three events—one to the wire instance owner "u[1].foo[2].c[2]" and two to the wire port instance members "b1[1].x[1]" and "b2[1].x[1]".

Event Delivery and Queues

The runtime will guarantee in-order delivery of events but it will not guarantee a complete virtual synchrony between all members of a given wire instance. In other words the SDM Runtime will allow forward progress to be made even if a component instance is running slow or is dead.

SDM events are queued for each component instance. The operation that triggered the event is considered successful if the event is successfully queued on the target's queues. The queue's are circular in nature and can wrap around if a component is severely lagging or is dead. Wrapping around will generate a new "wrap-around" event. This event is sent to the component instance itself as well as the parent and any owning factories.

Runtime Partitioning

Figure 40:
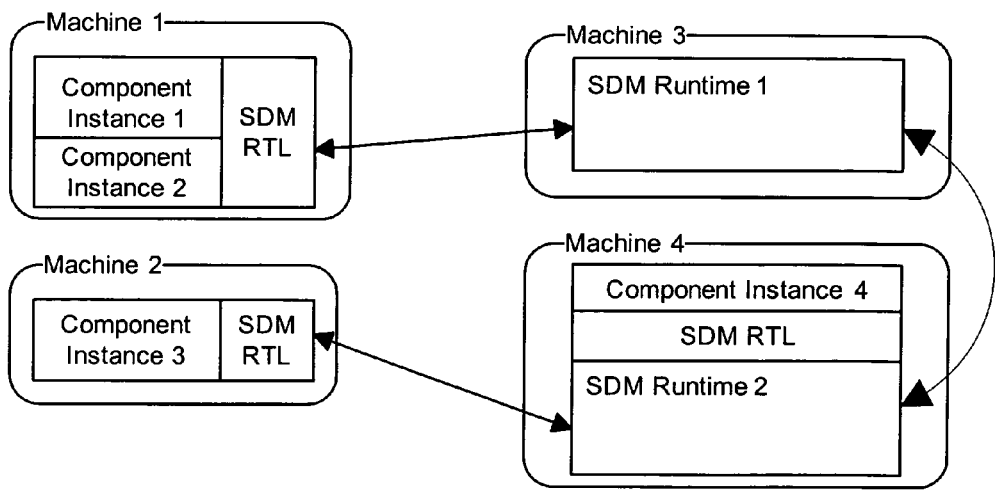
FIG. 40 illustrates an example of a partitioned runtime.

In order to support a large number of clients the runtime can be partitioned. Due to the strict hierarchy of the SDM instance space this problem is fairly tractable. The SDM runtime can be hosted on many machines across a specific deployment. Each SDM Runtime instance is responsible for tracking a portion of the instance space. Component instances communicate with the appropriate runtime using the SDM Runtime Library. FIG. 40 shows a partitioned runtime and some clients.

Machine 1 contains two component instances and an SDM Runtime library. Machine 2 contains a single component instance and a runtime library. Machine 3 is hosting a dedicated SDM Runtime. Machine 4 has an SDM runtime and a component instance. Note also that the two SDM Runtimes on machine 3 and 4 are communicating.

Partitioning

The runtime leverages the natural hierarchy inherent in the SDM to partition itself. The act of partitioning involves distributing portions of the SDM type and instance space across different running runtime instances. Partitioning is a must for scalability. Partitioning happens differently for types and instances:

Type and member space: A given runtime can contain many type definitions that are typically organized within a namespace. Each runtime will only need to know about the types and members that are defined by the instances that it's tracking. These can appear on multiple runtimes. In other words, overlap is permitted in the type and member space.

Instance space: A given runtime will only be tracking a portion of the instance space. The instance space is partitioned on compound component instance boundaries. Overlap in the instance space is not permitted.

This is best explained by an example; consider the following component type definition:

```
componenttype B {
    port X x;
}
componenttype C {
    port Y y;
    component B b1;
    component B b2;
    wire P p { b1.x; b2.x; }
componenttype A {
    port internal Z z;
    component C c;
    wire W w { z; c.y}
}
componenttype universal u {
    component A foo;
    component A bar;
}
```

Figure 41:
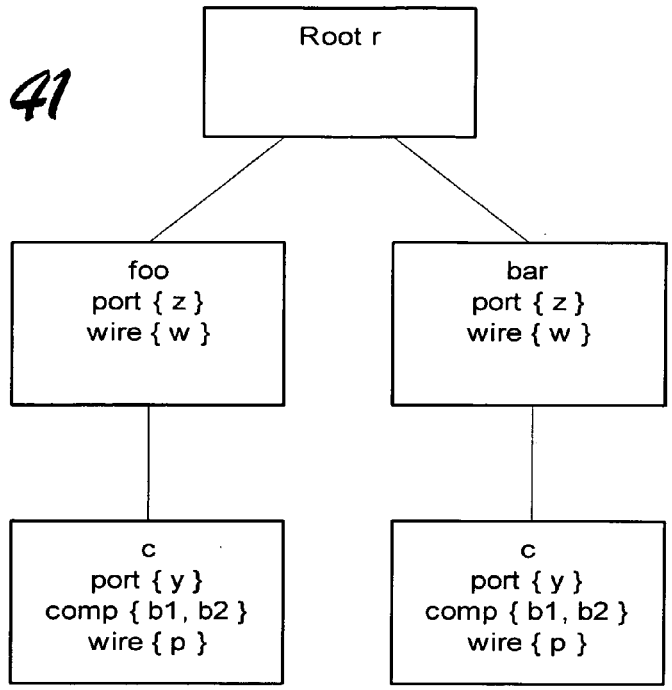
FIG. 41 illustrates an example member space.

This definition contains three component types A, B, and C. A is member of the root universal component. B and C are members of A. It is convenient for us to represent member space pictorially as shown in FIG. 41. We will use boxes to represent compound components. Note that compound component members that are not other compound components are described within the component box. In this example, wire "w" is a member of compound component "foo" and "bar" and is therefore represented within the "a" box.

Figure 42:
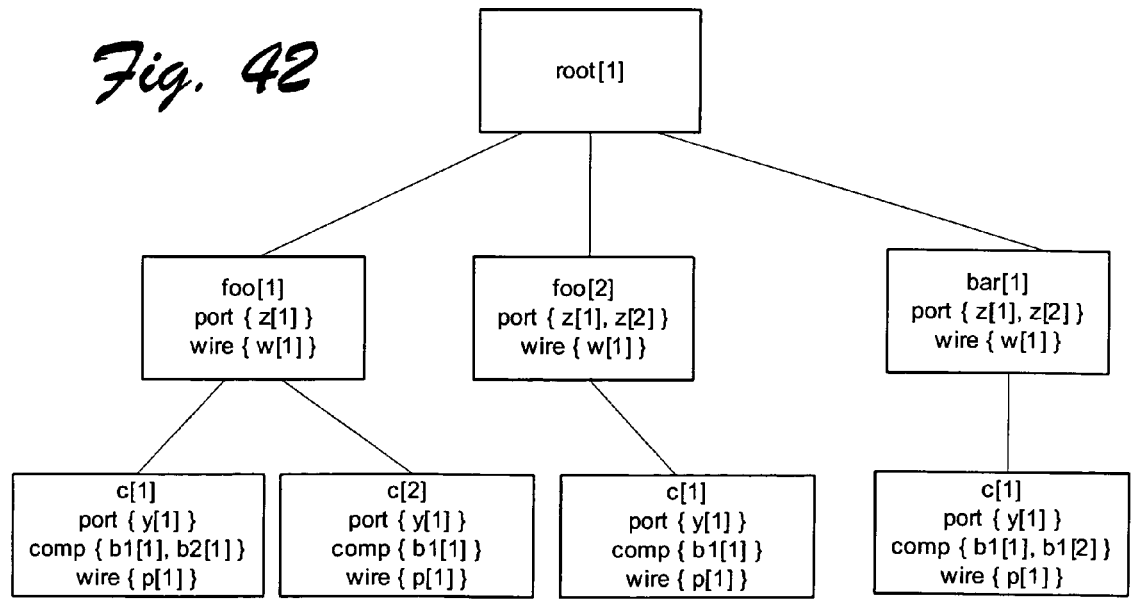
FIG. 42 illustrates an example instance hierarchy.

In the instance space, there may be many instances of each component, port and wire. We represent the instance hierarchy as shown in FIG. 42. The boxes here represent the instance state tracked for a component instance—it is not the component instance implementation code.

Figure 43:
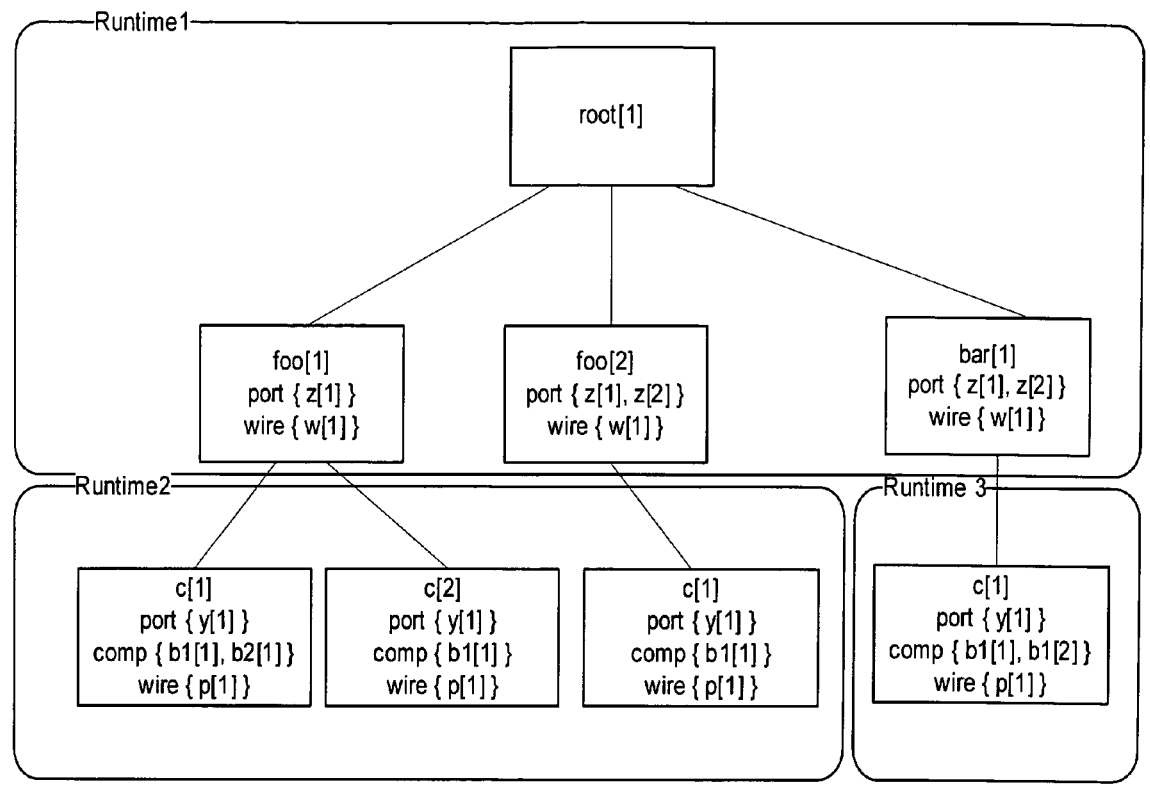
FIG. 43 illustrates an example of partitioning an instance space.

Let us assume that we wanted to partition this SDM model between three runtimes—runtime1, runtime2 and runtime3. FIG. 43 is an example of partitioning the instance space. In this example, Runtime1 is tracking "universal[1]", "foo[1]", "foo[2]" and "bar[1]". Runtime2 is tracking "foo[1].c[1]", "foo[1].c[2]", and "foo[2].c[1]". Runtime3 is tracking "bar[1].c[1]". In addition, the runtimes must know about all the types for the instances that it is tracking. In this example, Runtime3 must know about component type "C", "B" and "A" due to its parent "bar". It must also about port type "Y" and wire "P".

The different runtimes must also maintain a relationship between themselves. This relationship is mandated by the SDM hierarchy. In the previous example, Runtime1 and Runtime2 must know about each in order to manage the "foo[1].c[1]", "foo[1].c[2]" and "foo[2].c[1]" relationship. Similarly Runtime1 and Runtime3 must coordinate work surrounding "bar[1].c[1]". Note that Runtime2 and Runtime3 do not know about each other.

Partitioning Strategy

The runtime will contain enough logic to self-partition itself. The specific partitioning strategy will be based on performance, capacity and SDM defined constraints. This partitioning is dynamic and will change as the SDM model grows.

Single-Root Runtime

Runtimes that are tracking compound component instances that are all instances of a single root component instance are referred to as single-root runtimes. In the example above, Runtime1 and Runtime3 are single-root runtimes. Runtime1 has a root instance tree starting at "universal[1]" and Runtime3 has a root instance tree starting at "bar[1].c[1]".

Multi-Root Runtime

Runtimes that are tracking compound instances that are do not have a root compound component instance are referred to as multi-root runtimes. In the example above, Runtime2 is a multi-root runtime since its tracking "foo[1].c[1]", "foo[1].c[2]" and "foo[2].c[1]" which are all roots.

Service Installation

Before a service can be instantiated on a given SDM Runtime it must first be installed. The installation process involves the following steps:
  Copying the Service Deployment Unit to a runtime deployment share
  Calling the SDM Runtime API to start the installation Service Deployment Units The SDU is a unit of service deployment. It is comprised of:
  SDM assembly—this is the type information for the new service. It includes all the component type, wire types and port types for that service. This assembly is a result of compiling the service SDML.
  Runtime-hosted component instance code—any CLR code that is hosted by the runtime and referenced by the implementation keyword in SDML must be included in the SDU.
  Other service binaries—all other binaries such as configuration files, DLLs, GIFs, HTML, SQL Scripts etc. are also considered as part of the deployment unit.

The SDU is immutable—changes to the SDU are not permitted. Once an SDU is installed it can not be changed. Certainly, one can install a new version of the SDU that upgrades and potentially obsoletes the old version(s).

SDU Format

The SDU is a directory of binaries that are consumed by the SDM Runtime and potentially component factories. The directory is pretty much free form but he the following structure is expected:

```
\sduroot
    \<assembly name>.<version>
    \<assembly name>.sdmassembly
        \bin
            \<Runtime hosted CLR assembly_1>.dll
            \<Runtime hosted CLR assembly_2>.dll
            \<Runtime hosted CLR assembly_n>.dll
            \<other files and directories>
```

The SDU will be packaged up as a CAB file.

Implementation

The SDM Runtime is implemented as a .NET WebService running on-top of IIS Server. The SDM Store is a reliable SQL Server database. The SDM runtime webservice is a stateless webservice. In other words any state in the SDM runtime service is transient. All durable state will be written to the store at clear transaction boundaries.

The SDM runtime service can be shutdown and restated at any point an even on different machines. If it is pointed at the same SDM store all work will resume with little or no interruption.

SDM Store

The SDM runtime utilizes a durable store for the SDMs and instances. This store is typically collocated on the same machine as the SDM runtime service but it can certainly be deployed differently. The SDM store is a SQL server database that contains information about all SDM models and their instances.

This reliability and availability of the SDM store is imperative. One of the key design goals for the SDM is the ability to restart the system at the last know consistent state. The SDM therefore needs to be highly reliable and must survive catastrophic disaster scenarios. This is implemented in two ways:

The SDM Store will be replicated and a redundant hot backup will always be available. This is implemented using Yukon's Redundant Database Technology.

The SDM Store will be backed up regularly and the information will be stored off site. The backup will be a self-consistent snapshot of the current models, instances and any service state that was store in the SDM Store.

Service Storage

The SDM Runtime will provide facilities for storage at a component instance level. Every component instance can use the runtime API to store data in the SDM store. At a minimum this store is a BLOB store although we are considering semi-structure storage.

Service state stored in the runtime is guaranteed to be as reliable and durable as the SDM runtime. It is also guaranteed to be consistent with other runtime state. Certainly we are not advocating for all service state to be stored in the SDM store instead we expect services to store sufficient information (in terms of pointers) to their state. Upon recovery the service can retrieve the pointers to its data and perform the necessary steps. See Recovery below.

SDM Runtime Security

Scenario Description

There are two basic scenarios that will define the security model for the SDM Runtime: the developer test-run scenario and the operator production deployment scenario. The common requirements for both scenarios are as follows:

Ability to connect to target servers from the computer where the SDM Runtime is executing.

Windows authentication using Active Directory domain accounts.

Trusted subsystem model for accessing target server resources to perform install, update and uninstall operations.

SDM Runtime implemented as a Windows Service and run as a trusted service account.

A database (MSDE) configured to use Windows authentication and database roles that tracks SDM class, type and instance information.

Developer Test Run Scenario

A developer must be able to deploy a distributed application to one or more servers in a test environment. The target servers are either part of a standalone workgroup or in the same Active Directory domain. The computer from which the test run deployment is initiated must be in the same workgroup or domain as the target server(s).

1. The developer generates a Service Deployment Unit (SDU) package using Visual Studio.
2. The generated SDU is placed in a deployment folder on the computer where the SDM Runtime service is executing.
3. Developer chooses a deployment action (install, update, uninstall) and is prompted for Windows authentication credentials.
4. Developer is authenticated and mapped to a deployment role which determines whether the authenticated user is authorized to perform the requested deployment operation.
5. Developer selects which components to install, update or delete on which target servers.
6. The SDM Runtime service connects to the selected target servers in one of two-ways: if the SDM Runtime service is running as a trusted service account in Active Directory, then it will connect as that account on the target servers. Otherwise, the SDM Runtime service will connect as the authenticated user, which may required an additional authentication at the target server if impersonation is not possible.

Operator Production Deployment Scenario

An operator must be able to deploy a distributed application to one or more servers in a data center environment. The target servers must be part of an Active Directory domain or forest. The computer from which the test run deployment is initiated must be in the same domain or forest as the target server(s).

1. The application SDU is placed in a deployment folder on the computer where the SDM Runtime service is executing.
2. Operator chooses a deployment action (install, update, uninstall) and is prompted for domain credentials.
3. Operator is authenticated and mapped to a deployment role which determines whether the authenticated user is authorized to perform the requested deployment operation.
4. Operator selects which components to install, update or delete on which target servers.
5. The SDM Runtime service connects to the selected target servers as a trusted service account and performs the operations.

Feature Description

Behavioral Specification

The SDM Runtime is responsible for tracking all SDM classes, types and instances. The SDM Runtime will expose a set of SOAP interfaces for registering and operating over an SDM document for the purpose of deploying a distributed application.

The SDM Runtime is comprised of the following major components:

Web Service with an associated runtime library,

Windows Service,

Database such as MSDE (or Yukon).

Figure 44:
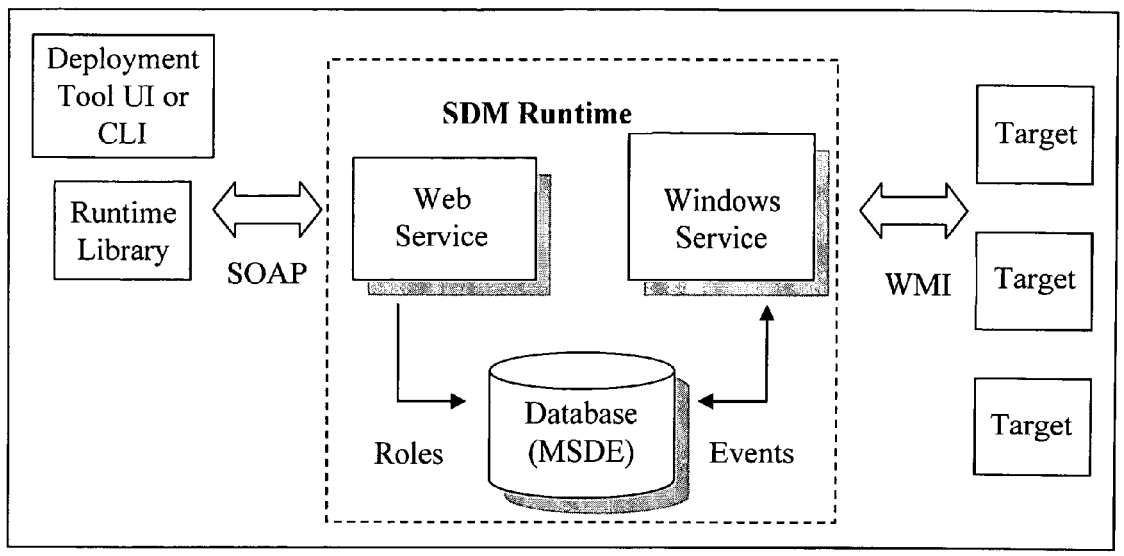
FIG. 44 illustrates example relationships between various components.

FIG. 44 shows the relationships between the SDM Runtime components, the deployment tool and the target servers. In FIG. 44, a user interacts with the deployment tool UI or a command-line interface in order to initiate a deployment action.

The runtime library provides a set of SOAP interfaces exposed by the Web Service. The Web Service writes information into the database that the Windows Service retrieves in order to perform a deployment action. The Web Service authenticates the user to the SDM Runtime database using Windows authentication and authorizes deployment actions based on roles that are defined in the database.

In a production environment, the Windows Service will execute as an Active Directory service account and the target servers will be configured to trust the domain service account for administrative purposes. The Windows Service will use WMI to remote to the target servers using impersonation of the service account (not the user). This trusted service model should be more scalable and it will minimize the need to manage target server ACLs on a per user account basis. Operators will not have to be administrators on the target servers in order to execute deployment operations.

In a test run environment, the Windows Service will execute as either an Active Directory service account or as a non-privileged NetworkService account in the absence of Active Directory. The latter will require impersonation of an authenticated user account on the target servers.

UI Description

There is no UI for the SDM Runtime itself. The SDM Runtime will expose a set of APIs which can be invoked through a deployment tool UI or through a set of command-line tools. The deployment tool UI will be specified in a separate document.

Security Model

Figure 45:
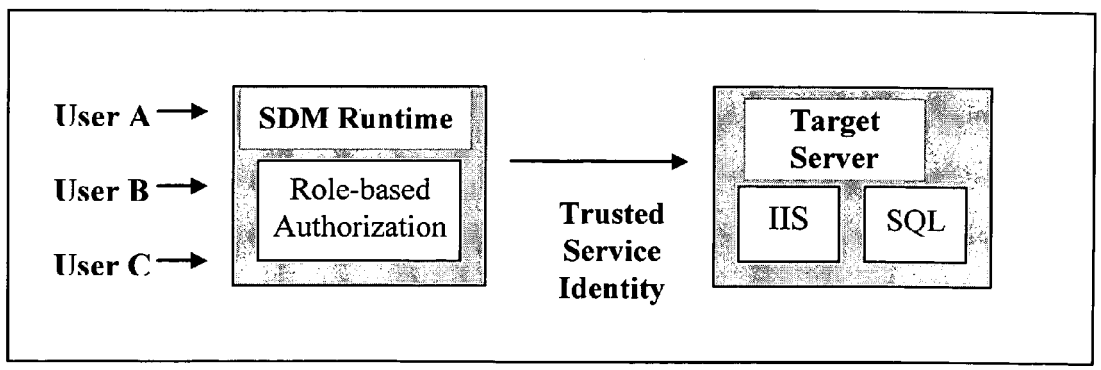
FIG. 45 illustrates an example fixed identity trust relationship.
Figure 46:
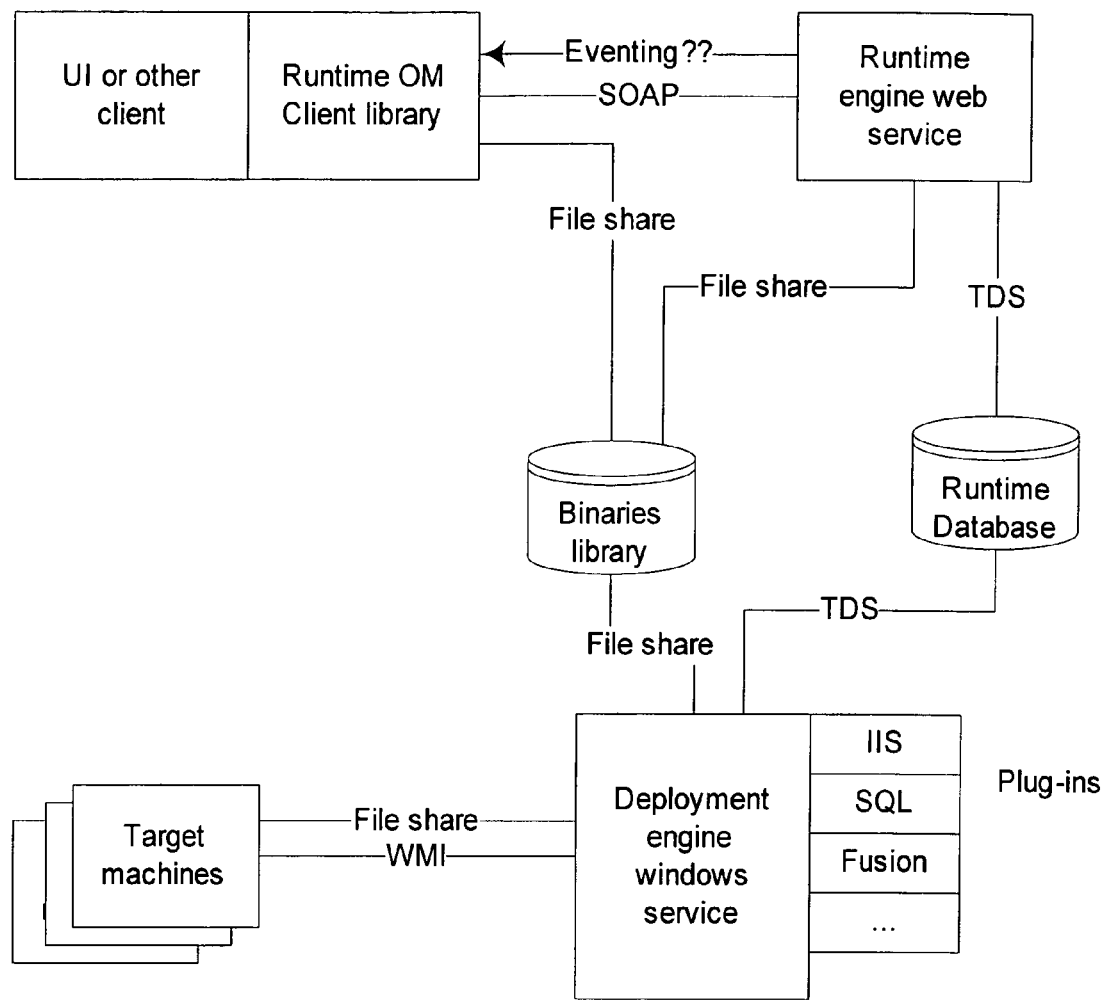
FIGS. 46–47 illustrate an example arrangement of components.
Figure 47:
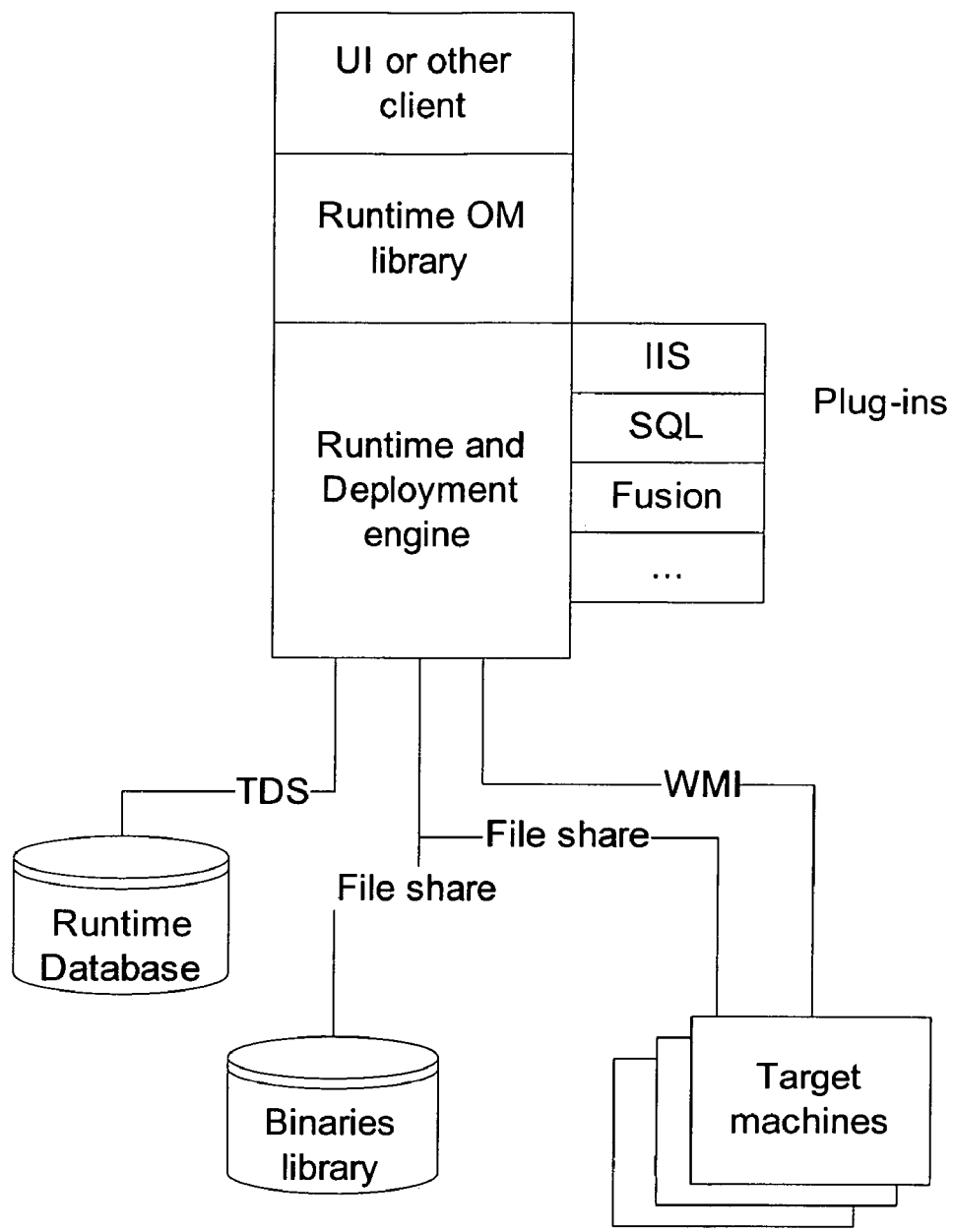

The security model for the SDM Runtime is that of a trusted subsystem that uses a fixed identity to access the target servers to which distributed components will be deployed. The security context of the authenticated user does not flow through to the target servers in this model. The basic assumption of this security model is that the target servers trust the fixed identity of the SDM Runtime service thereby eliminating the need to manage administrative rights for individual users on the target servers. FIG. 45 shows the fixed identity trust relationship.

With the trusted subsystem model it is certainly possible to run the SDM Runtime service under a trusted domain account or even to run it as a local non-privileged NetworkService account. The key point to understand is that the authorization for any deployment action is managed by the SDM Runtime using role-based authorization, and that only the SDM Runtime service can perform install, update and uninstall actions on the target servers once the user has been authenticated and mapped to a role that permits the requested deployment operation.

Authentication

Authentication is the process of verifying a user's identity based on a credential secret known only to the user and the underlying security infrastructure. For the purpose of distributed application deployment, the user will be authenticated using Windows authentication either through Active Directory domain accounts or local accounts. If local accounts are used, the local account names and passwords on the deployment computer must be the same on the target servers.

Authorization

Once the user is authenticated, authorization for performing a deployment operation such as install, update or uninstall will be granted based on the database role the authenticated user is a member of. Because Windows user and group accounts can be members of SQL Server database roles, the basic authorization sequence is as follows:
 1. Web Service authenticates user using Windows authentication.
 2. Web Service connects to database as the authenticated user.
 3. User is mapped to a database role based on user or group account membership.
 4. Web Service writes deployment action information to appropriate database table that can be read asynchronously by the Windows Service component of the SDM Runtime Notice that there is no need to manage passwords outside of the operating system infrastructure nor to manage per user ACLs on the target servers.

Impersonation

Impersonation is the ability to execute code in the security context of a different account than the current process owner. Remote connections to target servers will be established using WMI with impersonation enabled. Impersonation will be based on the trusted service identity when Active Directory is present and the security context of the authenticated user when Active Directory is not available (e.g., test run environment).

Windows Service

The Windows Service component of the SDM Runtime should be run as a service account with administrative rights on the target servers. The need for administrative rights is due to the requirements of installing software on the target servers and creating various settings for IIS, SQL and the registry.

In the absence of an Active Directory domain account, the Windows Service will impersonate a user account that is authorized to perform administrative actions on the target servers. In this case the Windows Service will run as a NetworkService account which does not require passwords and is a non-privileged user on the local computer. The Windows Service will present the local computers credentials to remote computers when connecting.

IIS

SQL Server

SQL Server can operate in two authentication modes: Windows Authentication mode and Mixed mode. Because Windows Authentication mode is more secure than Mixed mode, SQL Server for the SDM Runtime database will be configured for Windows Authentication mode only. This will prevent the sa account from being used to authenticate to the SDM Runtime database. Administrative privileges for the SDM Runtime database should be controlled through Windows group membership in order to leverage the Active Directory authorization infrastructure. By creating an Active Directory group for administering SQL Server and adding specific users to the group, it will be easier to control access to the SDM Runtime database without having to manage passwords on a specialized account.

In addition to the SDM Runtime database, target servers running SQL Server should also use Windows Authentication mode and manage administrative access through Windows group membership. The Windows group for the SDM Runtime database and the Windows group for the target servers should be different groups. It is a policy decision for the customer whether or not to have one or several Windows groups for administering the SQL Server machines. For example:
 SDM Runtime Administrator Group
  User A, User B
 SQL Server Tier 1 Administrator Group
  User C, User D
 SQL Server Tier 2 Administrator Group
  User C, User E

SDM Server Overview

Introduction

What is the SDM server—The SDM Server is the set of services built around the SDM. There are currently two general approaches we can take on the architecture of the deployment tool. Each is outlined here.

Distributed Approach

In this approach tools that make use of the SDM runtime and deployment engine are built against a runtime OM client library which in turn communicates using a web service to the SDM runtime engine and a file share for placing SDU's (binaries). The SDM and deployment engines share a database of SDM entities and deployment jobs. Deployment tasks are performed asynchronously by the deployment engine using WMI and SMB (file share) to communicate with the target machines.

Simplified Approach

In this approach the client, SDM object model library, SDM engine, deployment engine and installer plug-ins all run in the same process so that there is no service as such. The Runtime database and binaries library can be on different machines. The WMI and SMB connections to target machines are directly from where the client or UI is running.

User Interface and Other Clients

The user interface for the SDM server will include:
- A wizard in Visual Studio that will provide a simple method to deploy, update or remove a test instance of an application.
- Command line tools to load SDM's, SDU's and instance requests.
- A complete UI that surfaces all the functionality of the object model and additionally provides graphical tools for composing Host models and instance requests.

Runtime OM Library

The public interface to the SDM server is through this library. It is a managed code object model and using it you can:
- Manage the SDM's in the runtime. You can load SDM's into the runtime. SDM's are strongly named and immutable and are loaded a SDM at a time (i.e. you load an SDM file not individual types, classes or mappings). You can delete SDM's from the runtime and produce the XML document for an SDM in the runtime. SDM's cannot be deleted from the runtime while there are references to it from other SDM's in the runtime or from instances.
- Manage the SDU's known by the runtime.
- Find and reflect on SDM elements (from SDM loaded in the runtime). There is no API provided for authoring a new SDM (i.e. this is a read only object model over the immutable elements of the SDM). This includes SDM's, SDU's, identities, versions, classes, types, binding/mappings and versioning policy.
- Find and reflect on instances of components, ports, wires and physical placements (the hosting relations in the instance space). In the instance space each instance can be identified by a GUID, a stable path or an array based path. The paths are strings and can be relative. These identifiers, including relative paths allows instances to be found and referenced in documents such as the instance request document.
- Manipulate instances including creating, changing topology, upgrading, changing settings and deleting. Instance changes are made within the bounds of an instance request which provides an atomic unit of update so that any errors or constraint violations will result in the entire request failing. Instance requests also allow for instances to exist temporarily without a binding to a host, as an instance must have a host when the request is committed. It also allows for many operations that will affect a single component's installation or settings to be performed and have the installation or settings update deferred until commit so that a single update occurs on the component.
- Create sequencing within instance request when creating an instance request. Sequencing allows control over ordering of installation on the components that result from and instance request.
- Find and reflect on instance requests including getting their state including all error information, and retrying the installation/update of components affected by the request.
- Load an instance request. An instance request is an XML file that represents a set of instance space operations. This document can take advantage of relative paths to be a reusable 'script' for creating or deleting application instances.
- Generate an instance request document from an instance request in the database. Such documents are somewhat portable.
- Manage security permissions to the SDM service. This includes setting credentials used to manipulate the target machines and permissions around instance operations such as who can create instances hosted on a specific host instance.
- Subscribe to events around the functions above including, instance request installation completed. The lifetime of these event subscriptions limited by the lifetime of the process that loaded the client library (i.e. these are regular CLR events).

SDM Runtime Engine

The SDM runtime engine performs the reasoning on the SDM model and the functions surfaced by the object model.

In the distributed approach the library communicates to the runtime engine as a web service with fairly course calls such as load SDM, create component instance and get entire SDM (for reflecting on SDM entities). This reduces round trips to the server. The format of many of the parameters for this web service is XML with the same schema for SDM files.

In some sense the web service provides all the functionality of the SDM service with the client library simply making it much simpler to use.

In the distributed approach the engine performs the checks on permissions (see security spec for details).

Installer Plug-Ins

The installer plug-ins are associated with a class host relation. They are closely related to the plug-in using in visual studio that provide the design experience for the classes and produce the associated binaries in the SDU and the deployment values. They provide the following to the functions to the SDM server:
- Installation, uninstall and reinstall components on their hosts. When an instance request results in a new component instance, removal of a component instance or a change to a component that requires a reinstall, it is the installer that takes the settings for the instance, the host instance, the types associated with the component and the binaries associated with those types in the SDU and performs the install or uninstall of the instance. At the application layer of the SDM it is most common for an installer to simply require a type provided base .msi to be installed on the host (with particular parameters) and a second task to execute on the host that sets the appropriate settings and port views.

Updating a component instance when its settings change or when the view from one of its ports changes (either due to topology changes or a visible port has settings change). At the application layer of the SDM it is most common for this to be a rerunof the second part of install.

Maps the ports visible on ports to settings on an installed component instance. In the SDM and component instance has port instances that, as a result of some wire topology, allows the port instance to see the details of other port instances, usually so that it can bind to it. For example, an ASP.NET web site may have a database client port instance so it can be wired to a database. When correctly wired its database client port is able to see a single database server port instance and the settings on that server port. This information is used by the ASP.NET installer to place a connection string for the server in the web.config file under the name of the client port.

The installers also provide code that does the constraint checking between hosts and their guests. This check is performed by the SDM engine which is not shown in the distributed approach above. Most installers are anticipated to use a common constraint language based on XML, XPath and XQuery.

Audit settings
Audit existence
Audit Full
Audit hosted instances

Mapping Settings to Components.

The Interface

Providing a set of base mechanisms to the installers such as execute command as local system on hosts. In the future others with provide further mechanisms that require only a net address and an account. Interface is managed code.

Design

The following sections address how to design data centers and distributed applications that are hosted as such data centers. The designer employs the SDM to model various building blocks used in architecting the physical resources employed at the data center (e.g., hardware, network, host servers) and the applications.

Data Center Description

This section describes how to model data center components without representing specific resources, such as numbers of machines. It provides a scale-invariant model of the physical data center environment using the service definition model (SDM) semantics.

A virtual data center (VDC) is a logical representation of a physical data center environment that simplifies the developer's view of the data center. Ideally, an IT professional or architect should be able to describe the data center in the same scale-invariant manner that a developer can describe a distributed application/service. The VDC is an abstraction of the server, network and storage resources within the data center and their topological relationships.

A typical data center diagram is quite complex with multiple interconnected servers, network equipment, IP addresses, VLANs, operating systems, storage, etc. all expressed on a single diagram drawn using Visio or a similar tool. In addition to the diagram, there are usually long documents that prescribe exactly how the data center is partitioned, configured and managed.

An example of this complexity is the Microsoft Systems Architecture (MSA) Enterprise Data Center (EDC). It should be obvious that keeping the manually drawn diagrams and documents current with the state of the data center over time as updates and upgrades are applied becomes a costly if not impossible task. Likewise, the ability to validate the environment against the document prescriptions is difficult and prone to human error.

The ability to represent a complex data center such as the MSA EDC in a scale-invariant manner would be immensely powerful to both the developer and the IT professional. The ability to describe a data center using components, ports and wires provides a powerful framework within which to model and validate deployment requirements that is missing in today's design and deployment process.

One aspect of the data center decription is the ability to virtualize hardware and configure mechanisms for aggregated computing environments. In a traditional data center environment, operators typically build out a hardware environment specific to a particular application. For example, when deploying a new email system into the data center, the operators will buy a set of servers, add network adapters for different networks like backup and data zones, and add network hardware like switches and load balancers. The deployment of the hardware for an application requires extensive physical effort.

Not only are these manually constructed, application specific hardware configurations expensive to create, but they are not easily modified; their static nature results in poor resource utilization as resources can easily be moved to new applications as work loads change.

This disclosure describes a way to create a data center virtualization environment which allows operators to run a single pool of physical resources that include servers, storage, and network devices. From that single pool, resources are allocated and configured on demand to meet application needs. A set of resource providers track the ownership of resources and know how to configure resources to meet application needs.

When deploying a new application into the data center environment, operators create abstract description of the resources needed by the application. A request is to the services platform asking that the abstract description be resolved into real resources. The services platform works with the resource managers to locate resources that can fulfill the request, selects the resources which most economically fulfill the request, marks the resources as used, configures the resources to fit the request requirements, and places the concrete description of the allocated resources into the abstract description. As the application's needs change, the operator updates the resource description and asks the service platform to resolve the update application description. Individual resource providers can use hardware or OS specific software drivers that configure physical resources to meet application needs.

Concepts associated with data center description include (1) a graph language for describe desired resources, resource requests, and granted resources; (2) a set of domain specific resource providers with knowledge of available resources of a given type and the ability to configure those resources to meet application requirements; and (3) a resource manager which processes resource requests, communicates with resource providers to find appropriate available resources, optional optimizes the choice of specific resources, asks the resource providers to configure the chosen resources, and updates the resource request to reflect the chosen resources.

Application Description

Figure 20:
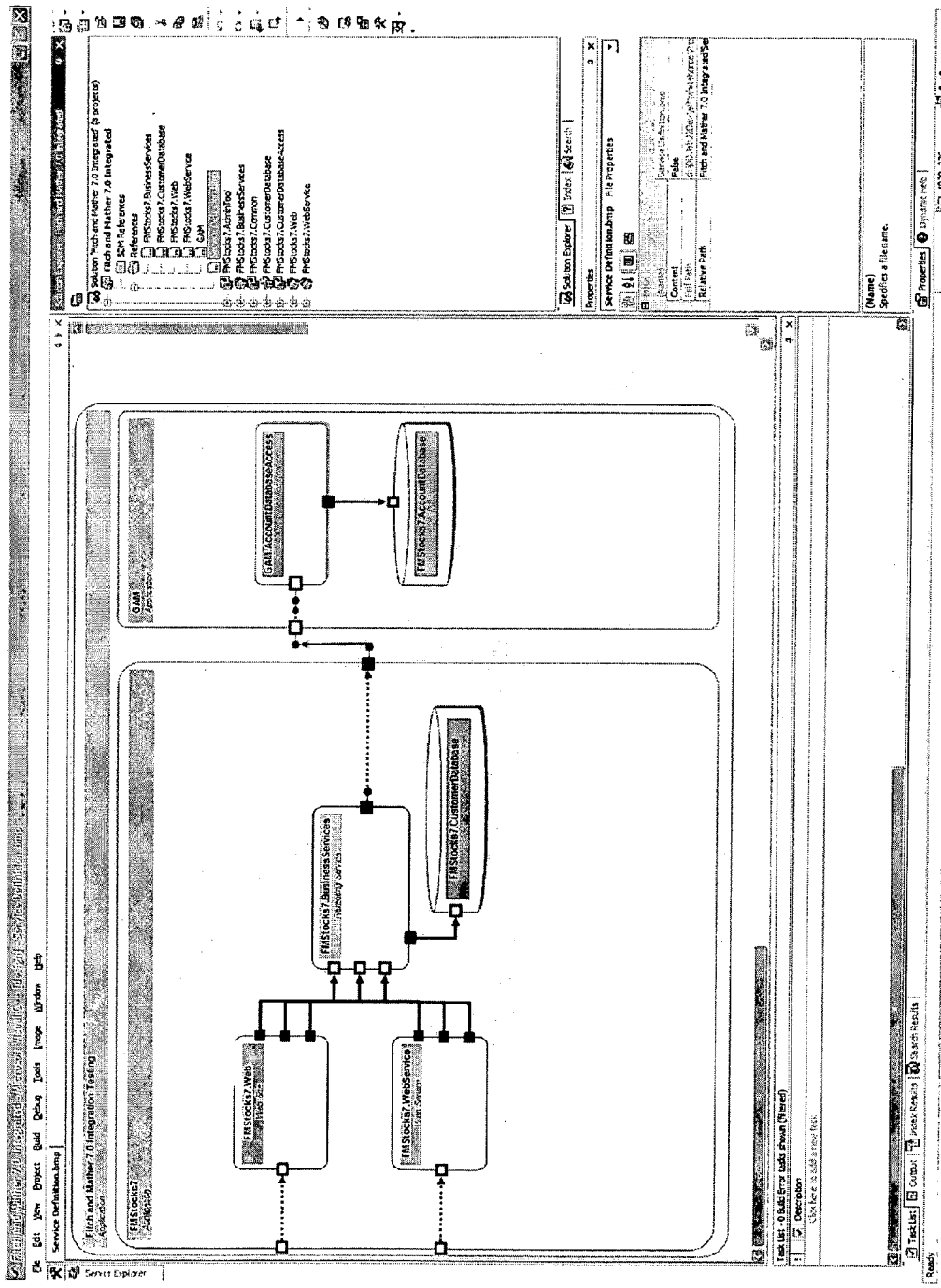
FIGS. 20–21 illustrate an example graphical user interface.

Applications can likewise be defined using the SDM semantics. This is described above in more detail with reference to the SDM sections beginning in paragraph 0. FIG. 20 shows a graphical user interface (UI) that allows the architect to describe a large-scale distributed application in terms of SDM semantics.

Logical Placement of Application onto Physical System

Figure 21:
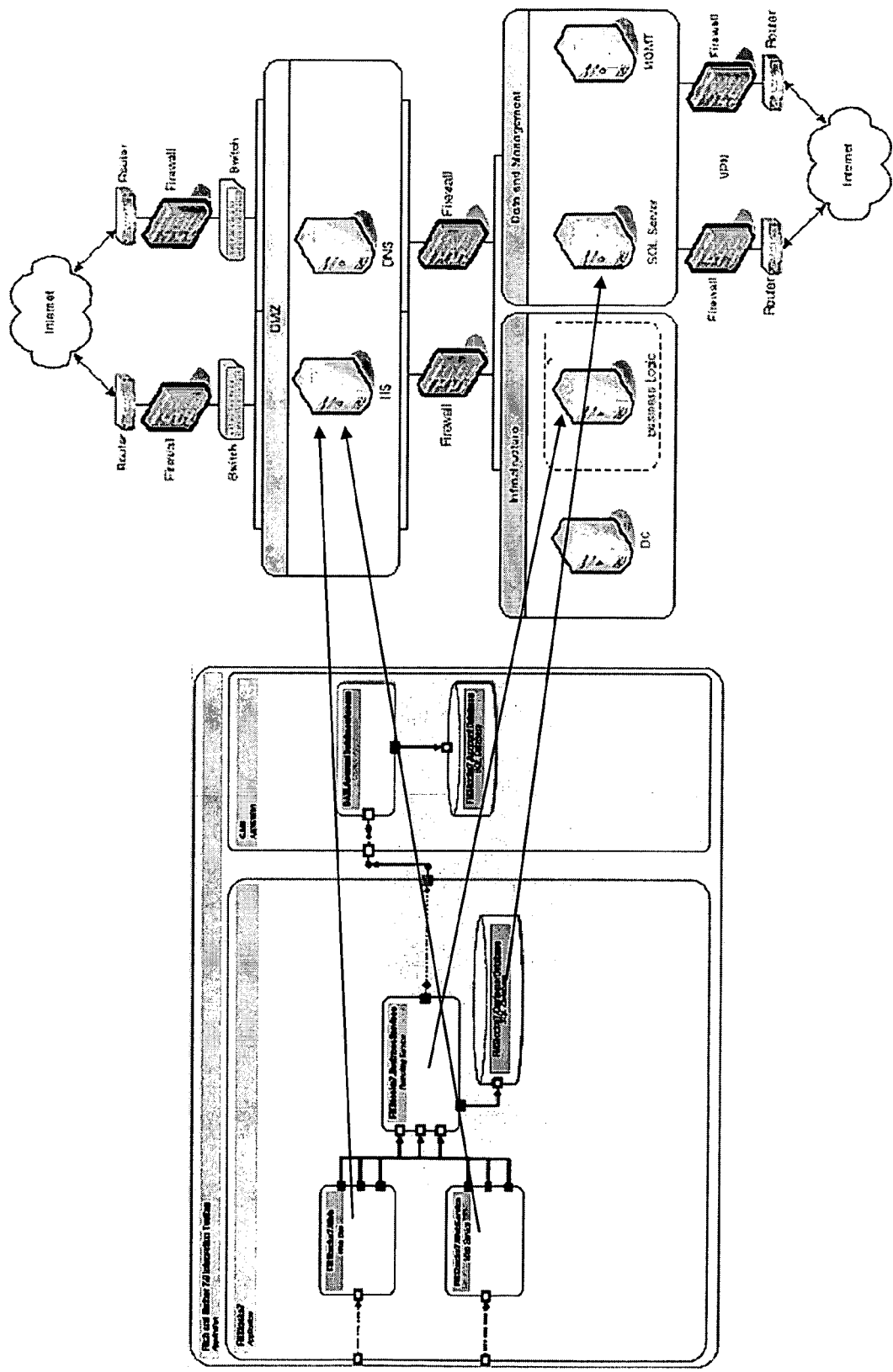

Once the applications and virtual data centers are architected using SDM semantics, the architect can logically try different logical placements of the application elements onto the virtual hardware elements. There can be different logical placements for different deployment environments (development, test, production, etc.). Logical placement can be done at design time, and requirements and constraints are checked and the developer is alerted of any errors or warnings. The result of the logical placement is captured in a separate file, with constraint checking being implemented using XPath and the XSD specified on each component, port and wire class. This is illustrated in FIG. 21. The designer may utilize a UI (user interface) for intuitive gestures when placing different application elements onto the physical elements.

Design Time Validation

The following section addresses an approach to design time validation of the logical placement of the applications onto the physical resources. Enhancements to the SDM components, ports and wires add layers and mappings between layers to achieve design-time validation of distributed application design and deployment requirements.

While components, ports and wires are powerful abstractions when combined with hosts, factories, resource managers and the SDM runtime, they are not sufficient to deploy and manage a distributed application/service. In order to create and manage the physical instances of these logical abstractions, some additional constructs are involved. Those additional constructs are layers and mappings.

Layers

FIG. 11 shows the layer abstractions defined by the SDM.

The application layer describes the distributable components, their deployment requirements and constraints, and their communication relationships in the context of an application/service.

The deployment layer describes the configuration and policy settings and constraints for hosts such as IIS, CLR and SQL, among others.

The Virtual Data Center (VDC) layer describes the data center environment settings and constraints from the operating system through the network topology down to the servers, network and storage devices.

The hardware layer is describes the physical data center environment and is either discovered or specified in a declarative manner using XML, for example. This layer is not scale-invariant and therefore not modeled in the SDM, but is included for completeness.

Mappings

Because the SDM is layered, there needs to be a way to bind between the various layers. A mapping is essentially a binding of a component or port at one layer to a component or port at the next layer down. A mapping can be described as follows:

$$M_T=[T_n \rightarrow T_{n-1}]+[T_{n-1} \rightarrow T_{n-2}]+[T_{n-2} \rightarrow T_{n-3}][\ldots]$$

where M represents a mapping and T represents a component, port or wire and n represents the layer. The arrow symbol represents the direction of the mapping which is always from a higher layer to a lower layer.

For example, in FIG. 12 the component at the application layer named MyFrontEnd is mapped to a component at the deployment layer called IIS. Likewise the component named MyBackEnd is mapped to the SQL component at the deployment layer.

Design-Time Validation

The binding between a component and its host component at the layer below can surface problems to the developer before the application/service is actually deployed in the live data center. These problems can be due to incompatible types, configuration conflicts, mismatched operations, missing topological relationships, etc. For example, the attempted mapping depicted in FIG. 13 would result in an error because there is no potential communication relationship between the IIS and SQL components at the deployment layer.

While the mapping from the MyBackEnd component to the SQL host component could have been a valid binding based on the component and host type compatibility and the lack of configuration conflicts, it is invalid because the MyService SDM defined a topological relationship between MyFrontEnd and MyBackEnd that does not exist at the specified deployment layer.

Layered Architecture

Figure 48:
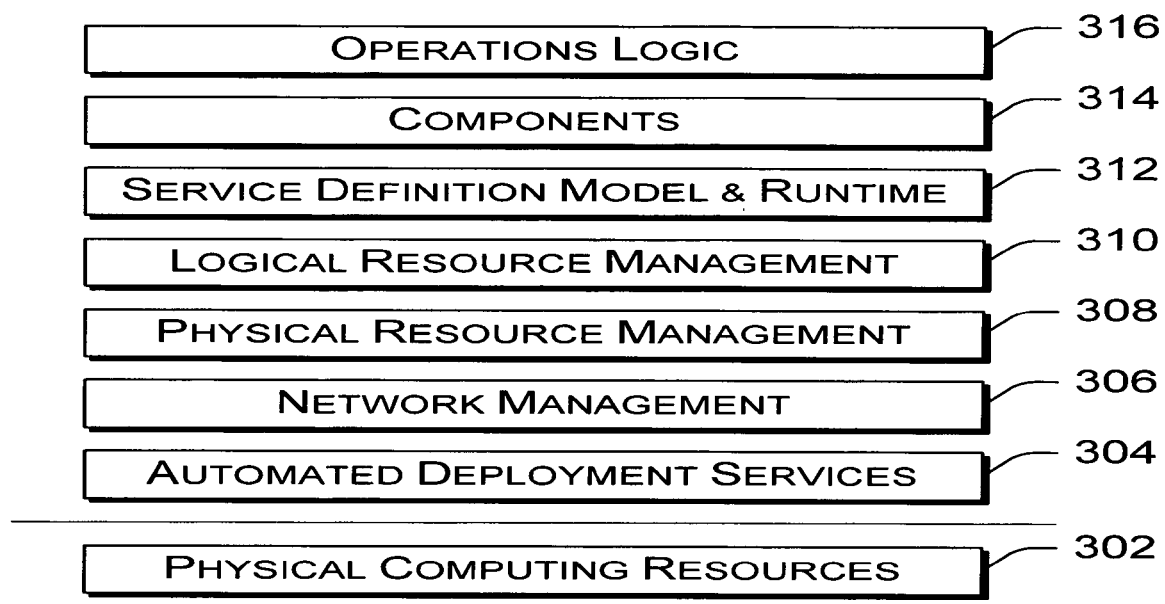
FIG. 48 illustrates an example platform architecture.

FIG. 48 shows a platform architecture for automating design, deployment, and management of distributed applications on a distributed computing system. The architecture shows multiple layers atop a base layer 302 that represents the physical computer resources of the distributed computing system. An automated deployment services layer 304 provides tools to convert machines into servers used in the distributed computing system. Such tools allow creation, editing, and deployment of OS (operating system) images. The remote programming of the machine is accomplished using fully programmatic interfaces, such as WMI (Windows Management Instrumentation), which is a programming interface (API) in Microsoft's Windows® operating systems that allows system and network devices to be configured and managed.

A network management layer 306 sits atop the automated deployment services layer 304. The network management layer 306 allows for network management and virtual topology generation. In part, the network management layer supports a driver model for network computers that facilitates connection of individual computers to one or more VLANs via a single physical network interface connected to an associated port of the network switches. According to the driver model, a VLAN driver is installed at the server and used to create virtual network interfaces (VNICs) above the single physical network interface. The VLAN driver creates one virtual network interface (VNIC) for each VLAN. The VNICs reside just above the network interface (NIC) in the IP stack at the server SO that the server can handle packets passed over more than one VLAN, even though all packets physically travel through the same physical NIC.

The driver model supports VLAN tagging to allow data packets being passed over the distributed computing system to be tagged with identities of the VLAN to which they belong. The network switches enforce the tagging and only accept packets with tags identifying the VLANs to which the switches belong. In one implementation, the network switches have both tagged ports and non-tagged ports. Tagged ports of a switch are tagged with VLANs identifiers and used for connection to tagged ports of other switches. This allows rapid transfer of packets through the network of switches. Untagged ports of a switch are used for connection to the servers or computers. When packets reach their destination server, VLAN tags are stripped from the packets prior to communicating the packets upstream to the servers so that the servers need not know anything about the tagging.

A physical resource management layer 308 resides atop the network management layer 306. The physical resource management layer 308 maintains a physical model of the distributed computing system, tracking ownership and coordinating allocation of all physical computing resources. The physical management layer 308 further supports batched resource allocation, thereby enabling dynamic configuration and management of physical computing resources.

A logical resource management layer 310 sits atop the physical resource management layer 308. The logical resource management layer 310 facilitates allocation of logical resources requested by the distributed application. For instance, the application might call for such resources as databases, load balancing services, firewall, web services, and so forth. The logical resource management layer 310 exposes such logical resources.

The next layer is the service definition model and runtime layer 312, which allows description of the distributed application and tracking of its operation. The service definition model (SDM) provides a namespace and context for describing operations processes and an API for application introspection and control of application resources. It further enables operators and developers to share common application views.

The sixth layer atop the computing resources layer is the components layer 314. This layer permits definition of reusable building blocks of a distributed application, which use the SDM APIs for context, naming, and binding.

The top layer is the operations logic layer 316, which accommodates the operational aspects of the distributed application. The operations logic is responsible for starting a service, growing and shrinking the service, upgrades and downgrades, fault detection and recovery, and state partitioning. The operations logic enables reuse of proven operational practices across deployments and applications. Through use of the SDM layer, the operations logic has context to better understand issues that may arise. For instance, when a failure occurs, the operations logic can determine that the failure occurred at the front-end of an email service, rather than just at some server in the middle of the room.

Deployment

The following sections address the deployment of the data centers and distributed applications. It involves instantiation of the logical models, physical placement of the application, and deployment of the application and data center. FIG. 23 generally illustrates the deployment phase.

Instantiation

Because SDM types are scale invariant and can be created to any scale, one aspect of deployment is to define the number of instances to be created for a given logical component and wiring topology to physically implement the hardware/application. An instance request document is created to provide a declarative definition of the instances that need to be created.

Physical Placement of Application

Physical placement is the act of picking the specific host instance that is the target of deployment. Physical placement is constrained by the logical placement and constraints are revalidated during physical placement. The physical placements are saved in a physical placement file.

Data Center and Application Deployment

The SDU, logical placement file, instance request, and physical placement file are fed into the SDM Runtime. The SDM Runtime invokes the appropriate installer (based on the class and host relationship), which is responsible for creating a new instance on the host and configuring it to match the settings values on the type. SDM Runtime will maintain a database of all instances, their final setting values, and placement. A runtime API supports querying of the instance space.

BIG Deployment Tool

Scenario Description

Feature Summary

The BIG Deployment Tool performs distributed SDM application deployment for datacenter operators and for developers testing their applications. It consumes Service Definition Model (SDM) applications, which includes the bits of the application (SDU), mapping files, and a set of deployment constraints. The user specifies placement of the application onto his/her servers and provides deployment time settings. The tool installs or uninstalls instances against remote machines and provides status to the operator. The operator can later add new instances, decommission instances, and reconfigure the application's topology.

Scenarios

A large enterprise has a separate datacenter and developer organization. The datacenter deploys, maintains, and hosts applications for end-users that serve both employees and customers. The datacenter's topology changes infrequently and closely matches the MSA EDC 1.5, which is not a BIG Computer.

The datacenter org provides the developers a scale-invariant abstraction of its hosting policy, which we call a Logical Information Model (LIM). The policy specifies the hosts' configuration including constraints on applications, allowable settings, and basic topology.

The developer org codes and hot-fixes these applications to meet the end-users' needs and stay within the datacenter's policy. The developer provides deployment guidance by specifying the apps requirements and expected hosts.

The Application Operator uses the BIG Deployment Tool to deploy applications in the datacenter. The Deployment Tool uses the developer guidance and datacenter policy to ensure proper deployment. The Application Operator later uses the tool to scale-out, reconfigure the apps topology, or uninstall.

Feature Description

Behavioral Specification

Figure 49:
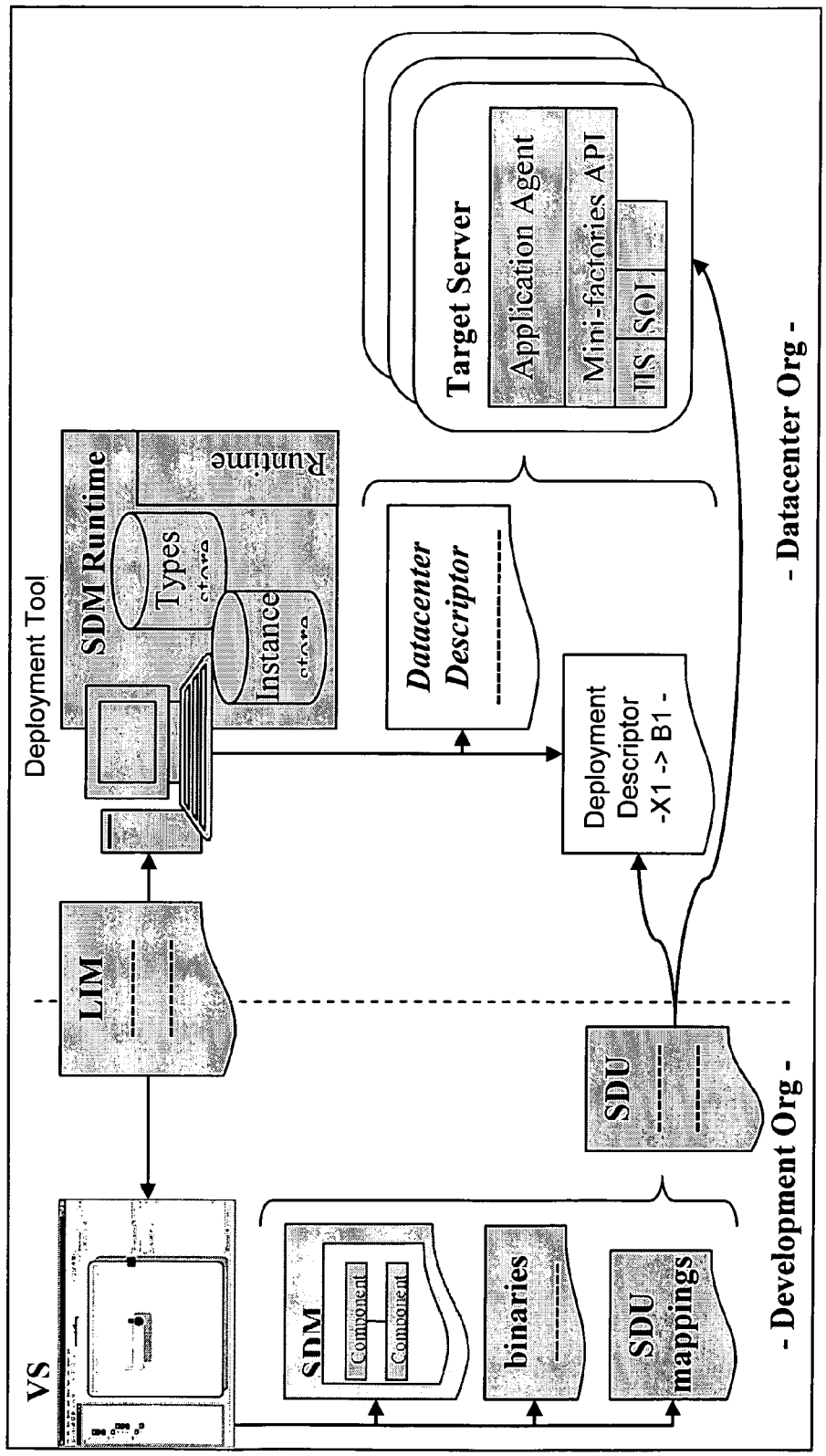
FIG. 49 illustrates example usage flow for application deployment.

The overview of how the tool fits with Whidbey and other products is shown below. Note the SDM Runtime, LIM, SDM/SDU, and Whidbey are detailed in other specs. FIG. 49 illustrates an example usage flow for application deployment.

The key points to communication in FIG. 49 are (from left-to-right):

The developer delivers an application SDU, which includes the SDM, binaries, and SDU mappings. (We use binaries to mean the application bits and content.)

The Development & Datacenter Orgs are separate but share the same LIM.

On the machine running the Deployment Tool, there is a SDM Runtime with stores and APIs.

The Application Operator is responsible for the Datacenter Description; Deployment Descriptor; and uses the LIM, SDU, and SDU mappings.

An agent and "mini-factories" reside on target servers, which take the SDU, Deployment Descriptor, and Datacenter Descriptor as input for deployment.

The Agent uses a common mini-factory API to talk with the mini-factories.

The mini-factories in this example are SQL and IIS but may be extended for other products. These will do the work of install, configure, and uninstall.

Overview of Settings and Constraints

The BIG Deployment Tool consumes SDM applications. In order to understand how the tool will use settings and constraints, this section provides a basic overview of settings and constraints with the SDM. For a full explanation on settings, constraints, and the schema, see the related specs. In this discussion, we do not differentiate if the settings/constraints are on the SDM meta-type, type, or member.

With the SDM model, developers, Network Architects, and Application Operators will have the ability to provide settings/constraints (Network Architect and developers), SDU mappings (developers), and deployment-time settings (Application Operators). These constraints and settings will be scoped per host (i.e. IIS, SQL, BizTalk) each with its own schema, rules, and values.

Each host's exposed group of settings will be divided into those settable by the application and those reserved by the host. We refer to the former as application settings and latter as host settings. Furthermore, a host restricts the application settings by specifying 'host constraints', and an application gives prerequisites on host settings through 'application constraints'. Restrictions may be on a setting's range of values, a specific value, or dependencies.

The following table summarizes settings and constraints for hosts versus applications.

TABLE 1

Setting Definitions

| Definition of Settings/Constraints | Example |
| --- | --- |
| Application settings - settings made by the developer about the application | Shopping app: maxWorkerThreads = 8<br>401k app: maxWorkerThreads = 4 |
| Application constraints - perquisites against the 'host settings' needed to run the app | Mode = WorkerProcessIsolationMode |
| Host settings - group of settings for all applications hosted on that resource | Mode = WorkerProcessIsolationMode |
| Host constraints - limits (exact values, range of values) against application settings | High-perf host: maxWorkerThreads <25<br>Best-effort hosts: maxWorkerThreads <5 |

The goal of the Logical Information Model (LIM) is to provide an abstracted view of the datacenter's policy and deployment blockers. The LIM declares the division between host versus application constraints/settings; host settings; and application constraints. The policy that the LIM captures is authored by the Network Architect. This policy may be codified into a LIM file by the Network Architect, developer, or facilitated by the use of a canonical Microsoft LIM that is edited with Notepad.

The LIM is then used by developers to write applications and test against its representation of the datacenter. As part of the application, developers supply values for the application settings that the LIM permits, host constraints for where the app will run, and metadata about placement of components onto hosts. Developers provide guidance on the placement of the app onto hosts through a mappings file. Unspecified settings will be passed through as deployment-time settings that Application Operators will provide (i.e. IP address or App_pool_ID).

Figures 50, 51:
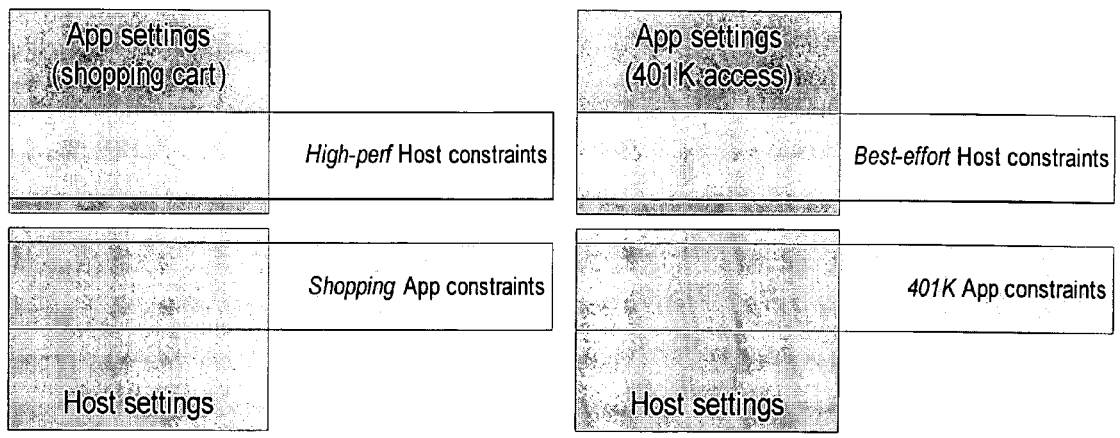
FIG. 50 illustrates example application settings and host settings.
FIG. 51 illustrates example phases for a deployment tool.

A basic example would be a Network Architect specifies different host constraints for customers buying services on High-perf versus Best-effort hosts. The host constraint may limit the number of IO or WorkerThreads differently. The High-perf and Best-effort host settings in this example are the same, using IIS_6's new mode. The developer writes two applications with different budgets and requirements. The first Shopping application wants more WorkerThreads. The 401K application is less discriminating. Both applications constrain (require) running in WorkerProcessIsolationMode. FIG. 50 illustrates application versus host 'settings and constraints'.

Phases of Deployment

Using the BIG Deployment Tool, there are four phases around SDM application deployment shown below. FIG. 51 illustrates example phases for a deployment tool.

Initial Phase is where the LIM is produced to represent the datacenter in a scale-invariant manner and then used to create a hardware classification file (Datacenter Descriptor).

App Deployment Phase is when the developer codes against the LIM and uses the Deployment Tool APIs to test and debug his/her SDM application.

Install Phase is where the Application Operator installs apps on an already configured machine.

Running Phase is when the Application Operator scales-out, reconfigure the topology, or uninstalls an already running app.

Note throughout this document and especially in the flow charts, we use the term "deploy" to include all the necessary host settings/constraints check, flagging host versus app incompatibilities, writing app settings, and calling the mini-factory actions. Mini-factory actions are all those that perform install; uninstall; configuration; and hook into Fusion, MSI, or future Microsoft installers.

Initial Phase

The Initial Phase is when the LIM and Datacenter Descriptor are created.

The datacenter's Network Architect selects and downloads the closest matching, digitally-signed LIM from Microsoft.com. The Network Architect then edits the file to reflect the desired datacenter policy, including network topology, permitted application settings, and hosting constraints.

Additionally, a LIM can be authored in Visual Studio Whidbey's design surface. The process flow would then be a Network Architect gives the developer org all relevant policy and topology information, which today are captured in Word docs and Visio diagrams. The developer then creates the appropriate LIM describing the datacenter and iterates with the Network Architect to ensure correctness.

Figure 52:
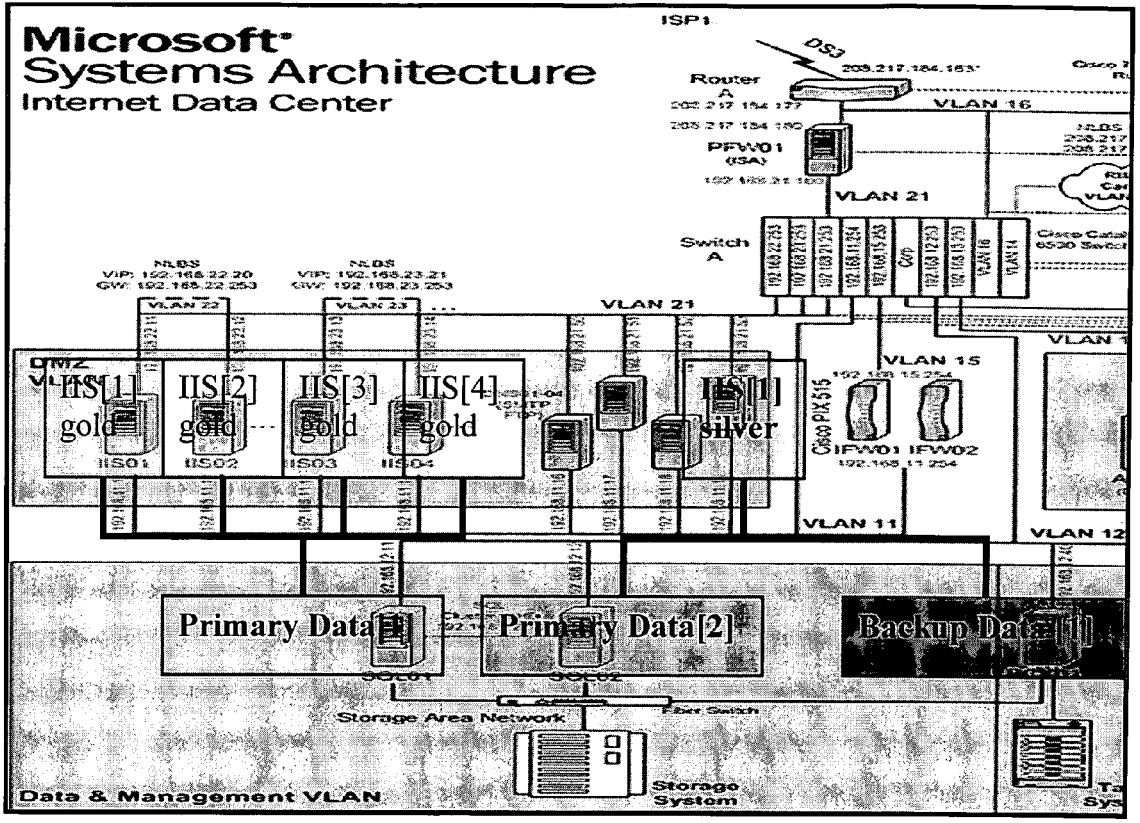
FIG. 52 illustrates an example visualization of a data center description.

Once the LIM is created, the datacenter org then classifies their hardware according to the LIM by creating a Datacenter Descriptor file. The Datacenter Descriptor maps the LIM components against running hardware, which we call the act of classification. Therefore, the Datacenter Description is not scale-invariant and includes machine specific details like IP address. The following figure visualizes a Datacenter Descriptor but does not suggest UI. Note a LIM would have the concept of "IIS gold" and "IIS silver" logical hosts. In the Datacenter Descriptor, these logical hosts are mapped to physical machines, thereby we have an IIS[1] gold is on IP address 192.168.11.2, IIS[2] gold is on IP address 192.168.11.3, etc. FIG. 52 illustrates an example visualization of a datacenter description.

Note as the Datacenter Operator installs/configures the servers, network, resources, and everything below the application, actions need to stay within the LIM. (Remember the Datacenter Operator is responsible for everything below the application.) Both the Network Architect and Datacenter Operator perform their tasks outside of the Deployment Tool.

App Development Phase

In this phase, the developer codes against the LIM and uses the BIG Deployment Tool APIs for test/debug deployments. This LIM was either provided by the datacenter or codified by the developer org on behalf of the datacenter (as described above).

Figure 53:
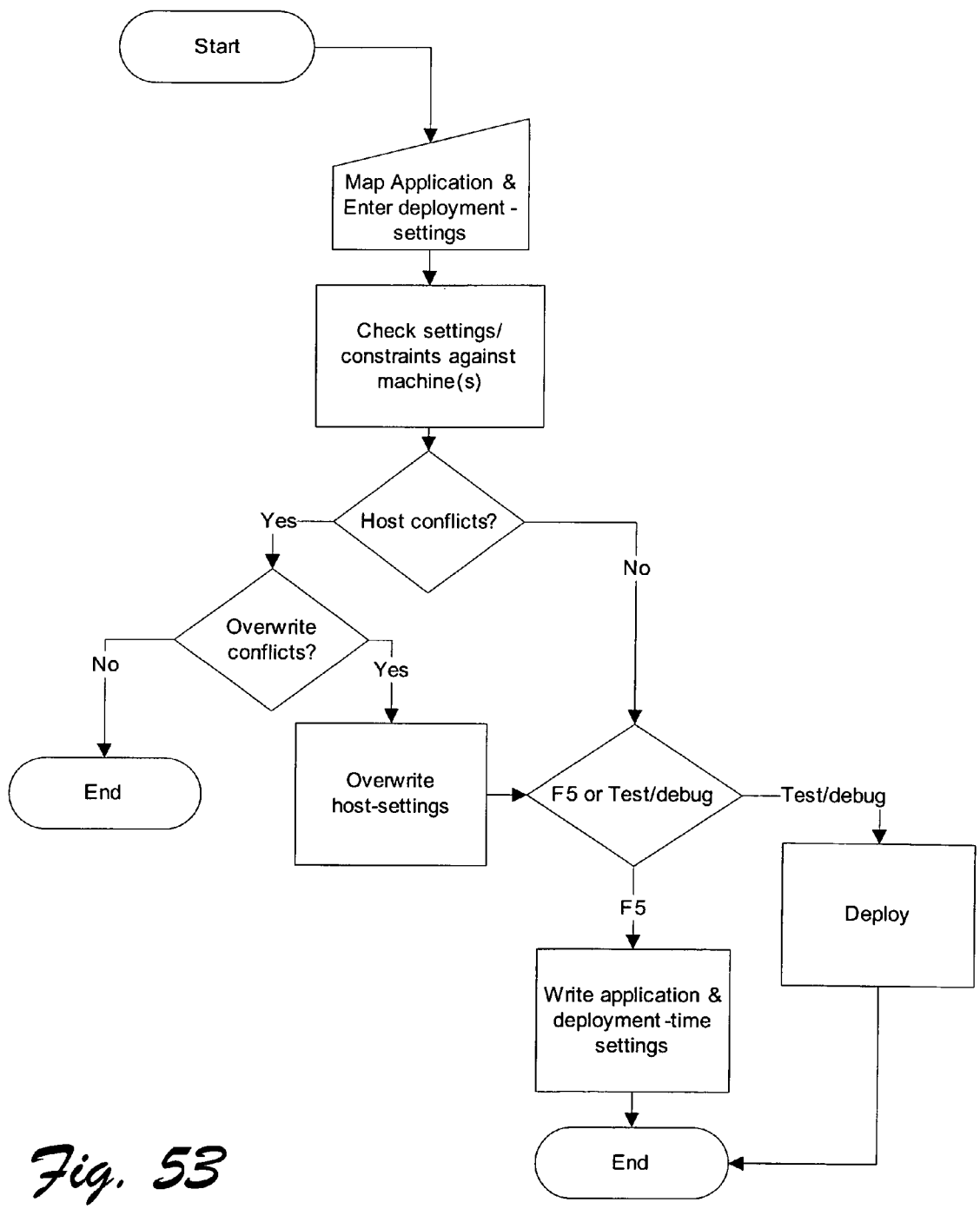
FIGS. 53–54 illustrate example flow diagrams.

The Deployment Tool APIs enable two scenarios for Visual Studio Whidbey to perform their "F5" and "Test/debug" deployments. The F5 and Test/debug deployments are to a single developer box and multiple machines respectively. In the F5 scenario, the necessary bits are already on the target single developer box. The Test/debug case requires that the Deployment Tool transfer bits to targets machine(s), as in normal deployments. However, both F5 and Test/debug scenarios enable developers to be warned of conflicting settings and overwrite both application and host settings. (Normally, only the application settings can be written by the Deployment Tool.) Note these VS scenarios will not use the SDM Runtime. FIG. 53 depicts these VS scenarios.

The important caveats for the Visual Studio "F5" and "Test/debug" scenarios are:

The BIG Deployment Tool API's will be called from VS through a wizard.

The VS wizard will select machines to deploy against and take deployment-time settings (i.e. IP_address or App_pool_ID=17).

VS will implement the user interface.

In the F5 scenario, the SDM, SDU, binaries, and all bits are already on the target single development box. Thus, writing settings is all that is needed.

In the Test/debug loop, "Deploy" includes writing the necessary settings.

Both scenarios flag when settings conflict and allow overwriting the target machines' settings, including host and application.

Not shown in FIG. 53 is the developer is coding the application against the LIM and the notion of SDU mappings to a LIM. (For more on the LIM, see the LIM/LID specs.) The developer delivers to the Application Operator the SDU, which contains the SDM, binaries, and SDU mapping files.

Install Phase

For the Install phase, the operator is provided the application (SDU with mappings) and Datacenter Descriptor (which extends the LIM).

Figure 54:
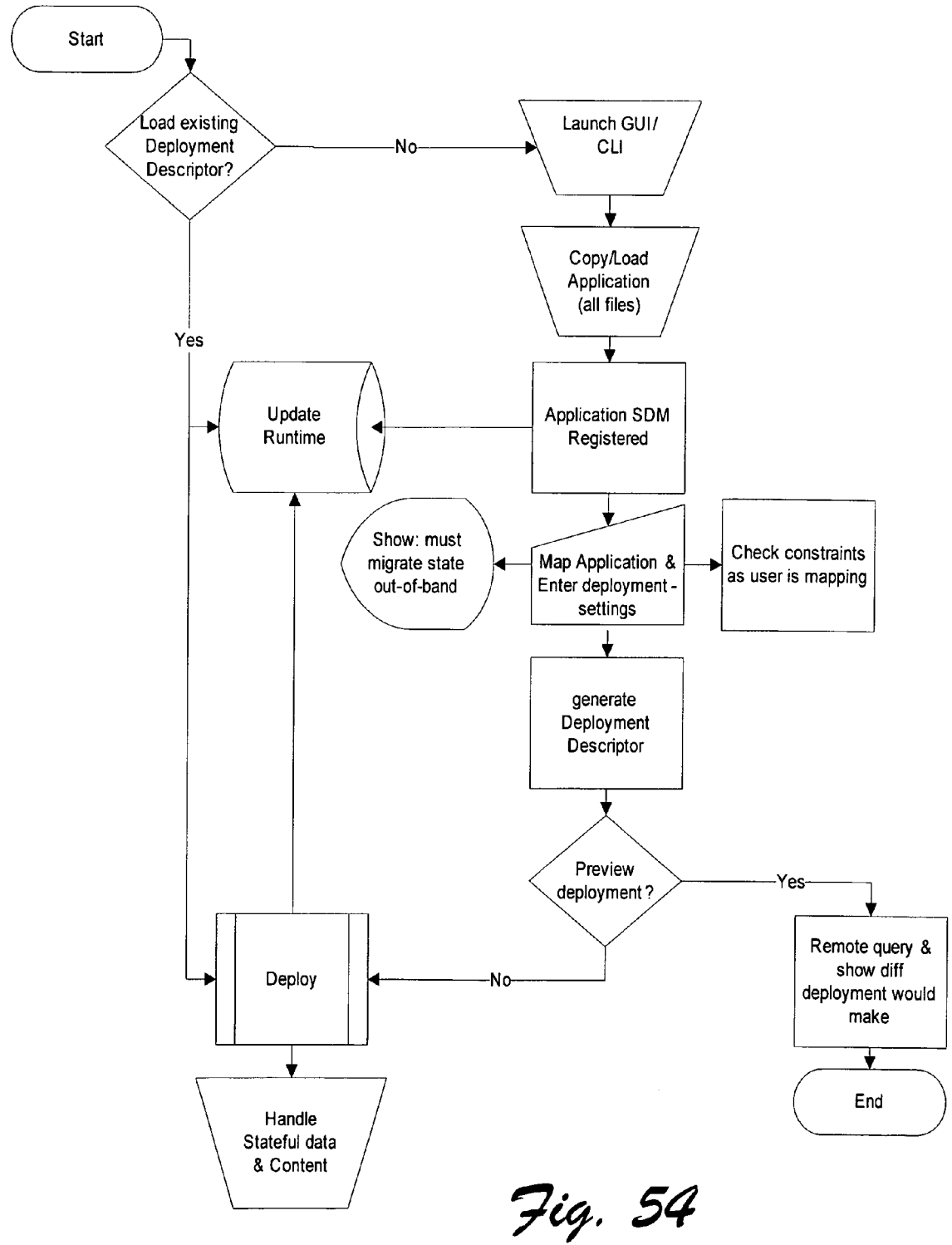

For FIG. 54 describing application installation, the following caveats are important:

The Application Operator launches the tool (GUI/CLI).

Copies and Loads the application with all the files and Datacenter Description.

The application is registered in the SDM Runtime.

Application Operator selects the host/machine of the application_components. (Examples are given in the next section.)

During this selection (we call mapping), constraints are being checked against the Runtime's view of the world. We do not make guarantees if you modify the settings outside of this tool causing a disjoint view.

Deployment performs host versus application constraints/settings check and installs. (Note the implementation may be much more complex with caching files and settings ACL's on the cache to avoid network flakiness.)

Tool makes it clear through UI or documentation that we do not handle stateful data (such as populating SQL databases).

Above steps generates a Deployment Description, which can be reused for that specific deployment or modified. (Examples given in the next section.)

A "Preview" function allows the Application Operator to get a list of the changes the tool will make. The user can then rerun the tool using the Preview generated Deployment Descriptor.

An already generated Deployment Descriptor can be loaded and ran, assuming the SDM Runtime knows of the application, application bits are still available, and the same Datacenter Descriptor is valid. FIG. 54 illustrates an example install scenario.

An Example of Specifying Deployment

To clarify the flow of data needed to specify deployment, we use the example of MSN constraining their datacenter through a LIM.

The LIM may be digitally signed, time-stamped, and versioned. The development org uses the LIM to code a two tiered application hosted on MSN datacenter's hosts (IIS and SQL servers). The developer specifies the host on which a component should be hosted, generating a SDU mapping file. We show this MSN example in FIG. 55.

Figure 55:
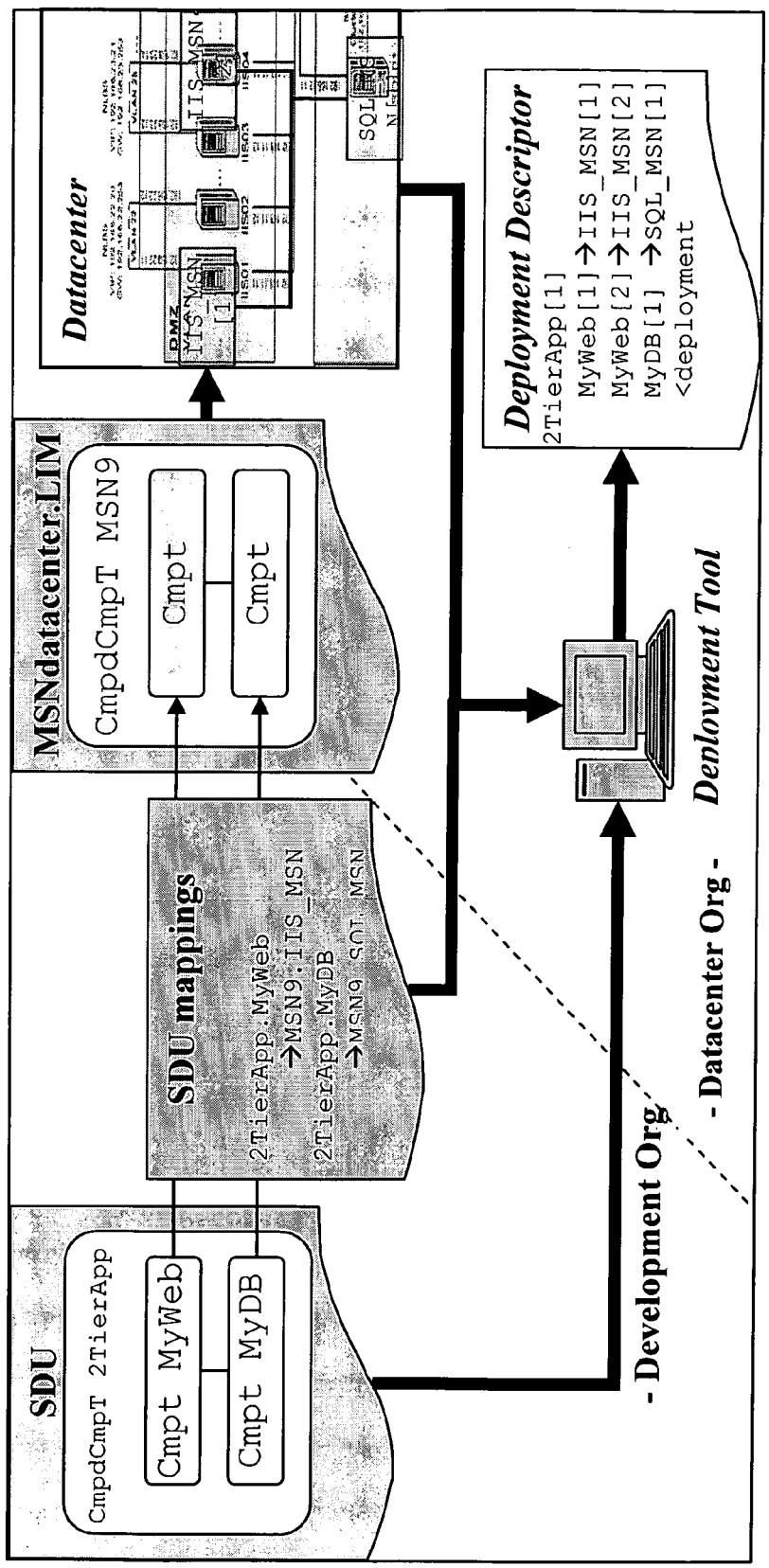
FIG. 55 illustrates an example of handling an SDU.

The following are important about FIG. 55 and the flow of data in application deployment:

The SDU includes the SDM.

The developer maps SDU components to the LIM (MSN-datacenter.LIM), creating a SDU mappings file. The mappings are the allowable placements.

The Datacenter Description classifies actual/physical servers according to LIM components and is not scale-invariant.

The SDU, SDU mappings, Datacenter Description, and user input feed into the Deployment Tool to create a Deployment Descriptor.

The Deployment Descriptor specifies the components (from the SDU) to install on which machines (from the Datacenter Description).

The Deployment Descriptor takes deployment-time settings such as URLs.

FIG. 55 illustrates an example of generating a deployment descriptor file.

In the example above, the SDU mappings file says that the developer binds the SDM Component 2TierApp.MyWeb to the MSN constrained host Component MSN9.IIS_MSN and the same for 2TierApp.MyDB→MSN9.SQL_MSN. (We specify the Compound Component to disambiguate in the event of multiple MyWebs.)

The Network Architect edits the MSNdatacenter.LIM that describes how the IIS and SQL constraints and settings are configured. This LIM is scale-invariant because it describes IIS and SQL hosts, not specific machines running IIS or SQL. The datacenter then derives a Datacenter Descriptor, which says which machines are running IIS and SQL as configured in the LIM. We use the notation IIS_MSN [1] and IIS_MSN [2] to signify there are two machines running the IIS_MSN component.

The BIG Deployment Tool takes as input the SDU, SDU mappings, Datacenter Descriptor, deployment settings (provided by the user), and generates a Deployment Descriptor. In our example, the Deployment Descriptor specifies a deployment. Meaning running it will cause software to be installed/scaled-out/reconfigured/uninstalled on target servers.

As detailed in the Deployment Descriptor text, an instance of MyWeb (MyWeb [1]) will be installed on server IIS_MSN[1], MyWeb[2] on server IS_MSN[2], and MyDB [1] on server SQL_MSN[1]. Deployment-time settings are provided by the Application Operator such as IP address or App_Pool_ID. Note this Deployment Descriptor may be reused provided the files it depends on exist.

Running Phase

Scale-Out [in] Scenario

For an already running application, the scale-out [in] scenario allows the Application Operator to add [delete] a component, port, or wire. An example of the usefulness of this feature would be the Joe_Millionaire website experiences dramatic increase in traffic and wants to scale-out for just the regular TV season and scale-in afterwards (or nightly).

In the flow chart for application scale-out [in], the following are the important points:

Scale-out [in] is a subset of installing.

The Application Operator selects a running SDM application and can:

Add components, ports, wires, and enters deployment-settings.

Delete components, ports, and wires.

Figure 56:
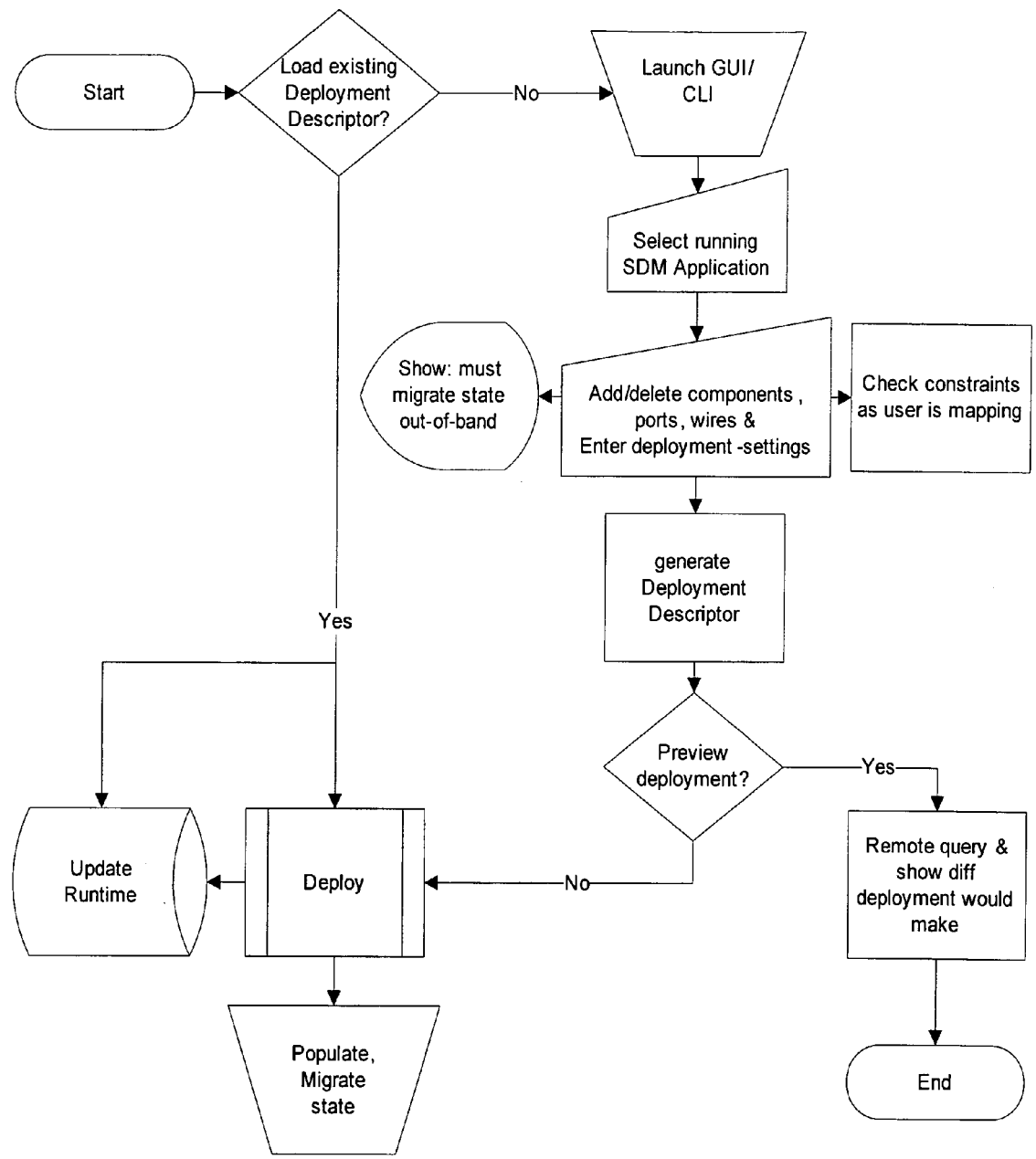
FIGS. 56–58 illustrate example flow diagrams.

Scenario can be run from a previously generated or modified Deployment Descriptor. (Provided the earlier caveats of having the same Datacenter Descriptor/LIM, access to application, and SDM Runtime still has the app registered.) FIG. 56 illustrates an example scale-out scenario.

Topology-Reconfiguration Scenario

The topology-reconfiguration allows the Application Operator to rewire a running app without uninstalling, reinstalling. Examples of rewiring would be changing your front-end databases to now point to a new back-end database.

The important points in the topology-reconfiguration are:

This scenario differs from scale-out in that it allows editing of an existing port and wires without uninstall, reinstall.

It potentially allows users to "bridge" two different SDM applications.

Figure 57:
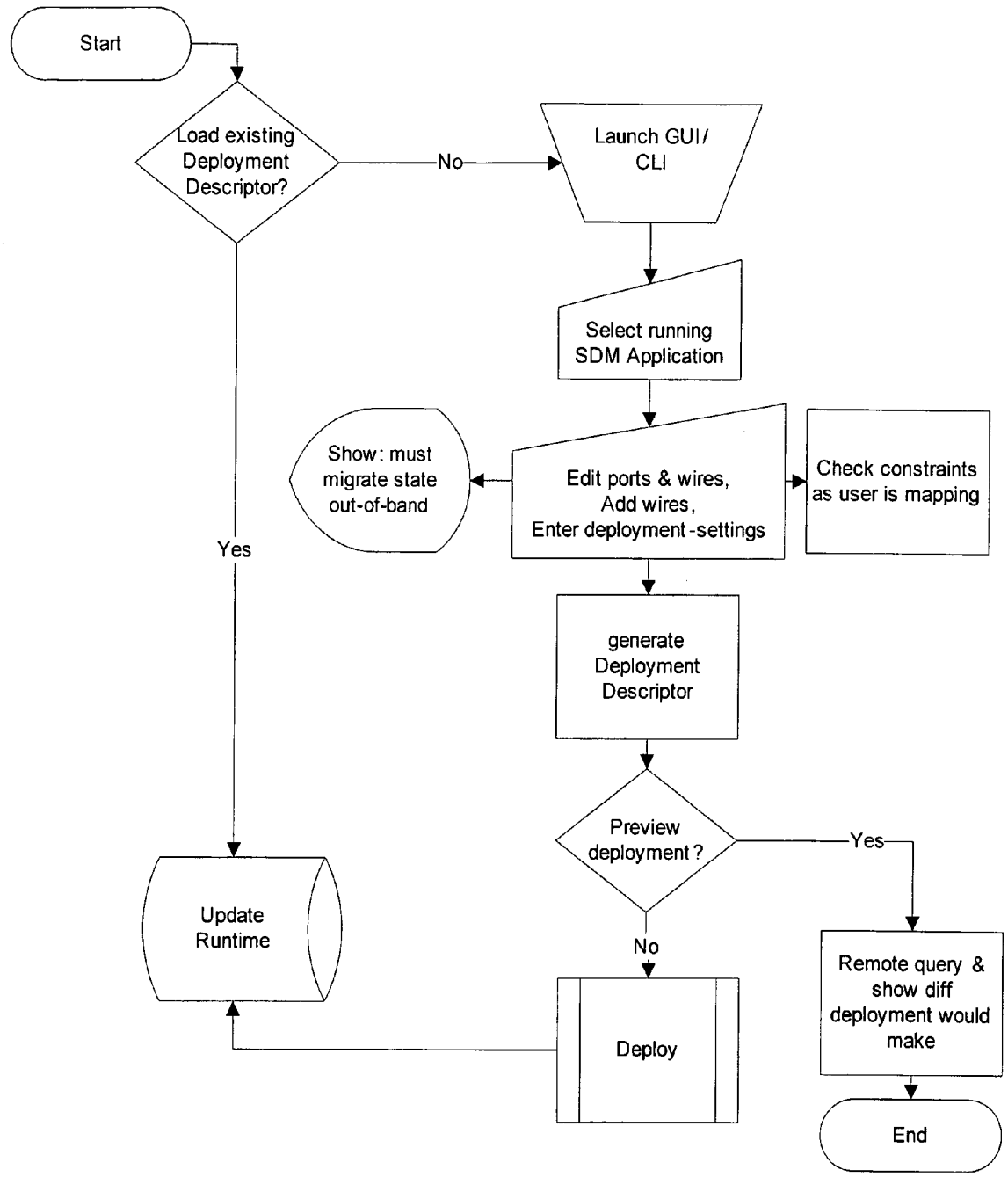

FIG. 57 illustrates an example topology-reconfiguration scenario.

Topology-reconfiguration is useful in failure cases where you do not want to redeploy the entire application. As an example, Passport stores all my credit-card-numbers on a backend and made available through an IIS front-end. The front-end fails and I do not want to redeploy/migrate data. Instead, I deploy a new front-end (as part of normal install) and rewire the new front-end to my Passport database.

An example of the bridging with topology-reconfiguration would be if the beta_MSN10 app wanted to share MSN9 app's databases. The Application Operator deploys the beta_MSN10 normally. Now, the beta_MSN10's front-ends need to talk to MSN9's database, requiring a reconfigure (and new wire) on MSN9's database.

Uninstall Scenario

With the uninstall scenario, the Application Operator selects the application and all running instances are deleted and the Runtime is updated. The user does not select the exact instance to uninstall because that is possible through the scale-in scenarios.

The following points are important for the uninstall scenario:

Uninstall can be performed through an existing (potentially edited) Deployment Descriptor.

The user selects the application to uninstall and all instances are removed.

Stateful content must be destroyed outside of this tool through existing means.

Figure 58:
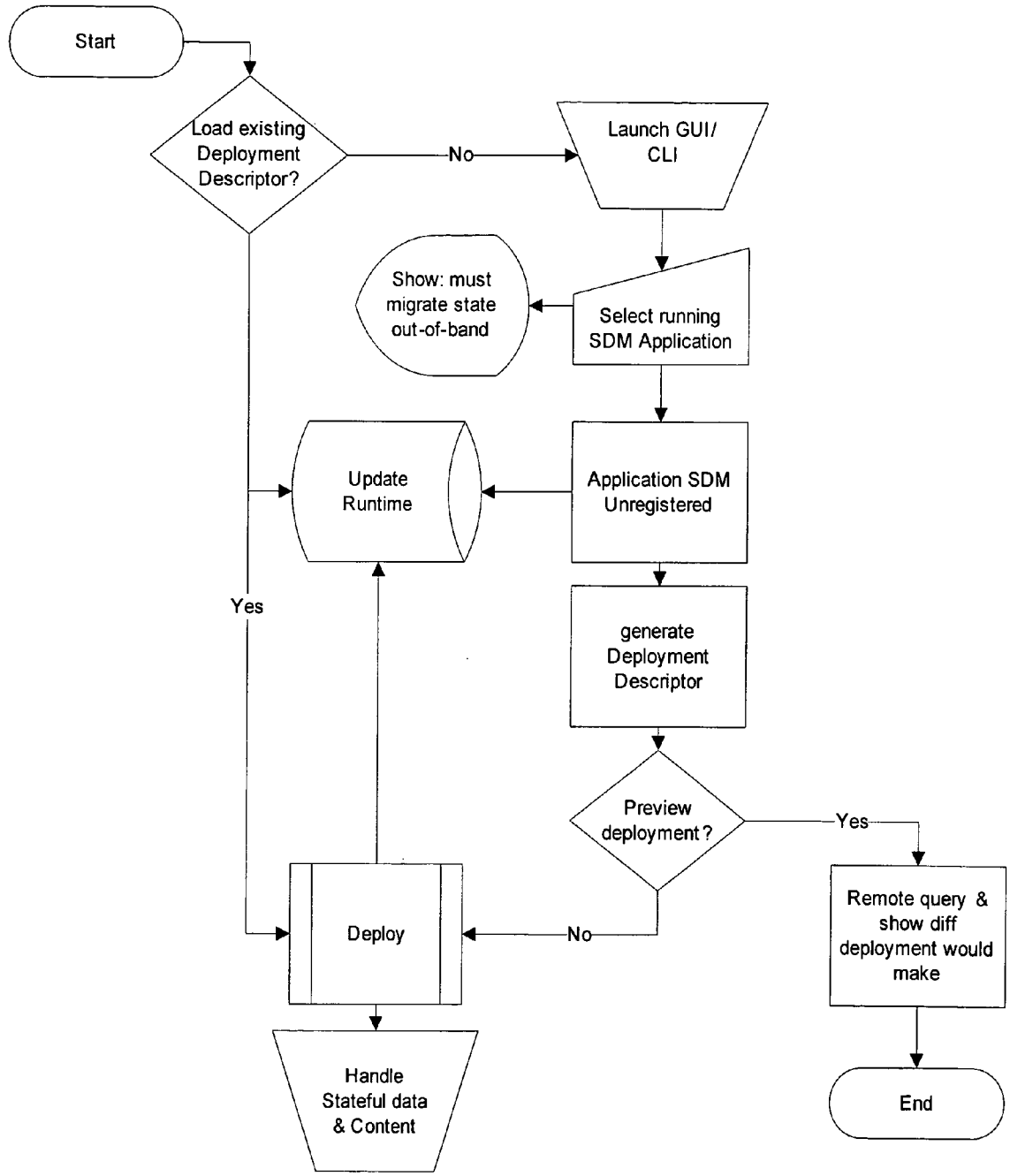

FIG. 58 illustrates an example uninstall scenario.

Management

The following sections address the management of the data centers and distributed applications after they are deployed. A model-based management tool is first described, followed by discussion of an introspection/tracking mechanism and operational logic.

Model-Based Management

Model-based management (or Ops Logic) is processing which will accept event triggers from the physical environment based on definitions of operator and application developer intent and policy in an SDM-based model of the application and will active and orchestrate a series of tasks or processing with in the context of the model, which will instigate change and will provide consistency between the model and physical world.

A trigger or request or other threshold will be an event aimed at a particular instance in the SDM. The component instance will receive the trigger and based on other details about itself in the context of the overall application and hardware environment represented in the SDM, it will kick-off a sequence of steps to address the issue identified by the trigger. It is the context of the application and the resources from the SDM which gives this automation its richness and ability to provide more manageability to the Operations staff of the service.

Figure 59:
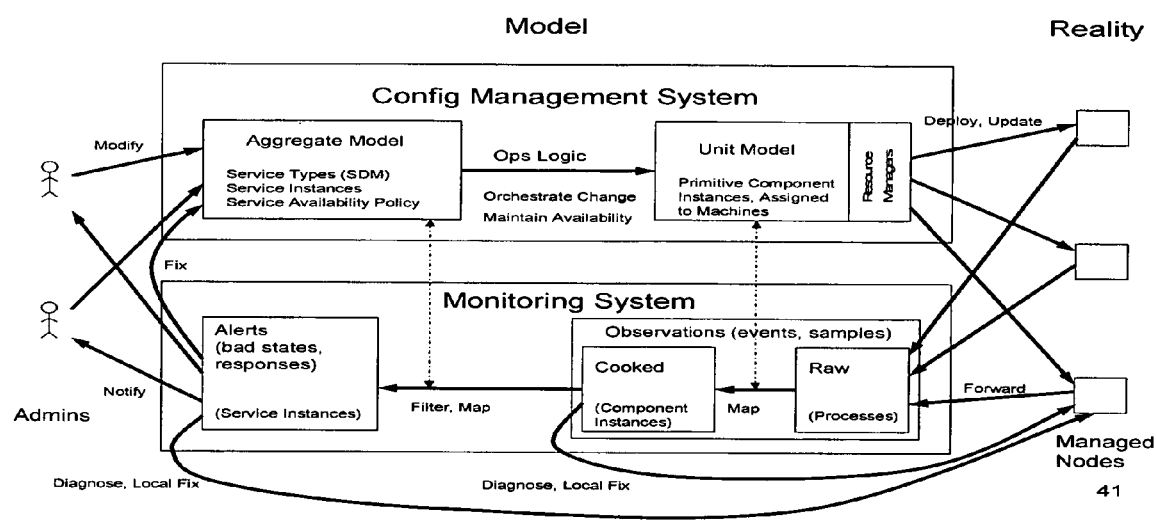
FIG. 59 illustrates an example model architecture.

FIG. 59 is an overall architecture for the model (BIG) and management pieces of what we call Ops Logic or Model-based Management. To summarize the proposed flow of processing in the overall architecture:

An application developer will be able to define an aggregate model (SDM) of a new application, or the classes of component types that will make up the end-user application or service.

The developer or an operations developer will be able to also add "operator intent" to the model by annotating component types in the model with policy and guidelines for operation, such as setting a minimum number of servers that must be running.

The SDM Run-time or unit model of instances implemented for a particular implementation of the application will be held in the Unit Model. There is a one-to-one correspondence between the instances holding the desired state of each machine and a physical machine.

The resource managers of BIG will work with the Unit Model to implement change in the physical world of servers.

Each server will in part be managed by BIG and in part may be managed outside of the model by operators.

Between the aggregate model and the unit model is one type of model-based processing to orchestrate change and implement operator intent through the model to physical machines.

Another type of model-based processing will flow the other way and provide consistency between the physical space and the model.

In the management area, the Monitoring System will be collecting events and grouping them into alerts.

Components subscribing to events and alerts will be notified of important events. The event information will flow to the subscribing component with information about the run-time SDM unit or instance involved, which provides the mapping to the model.

If an event is an operational trigger, the event will trigger the model-based processing which can instigate change in the physical machines through a sequence of orchestrated ops tasks.

Figure 60:
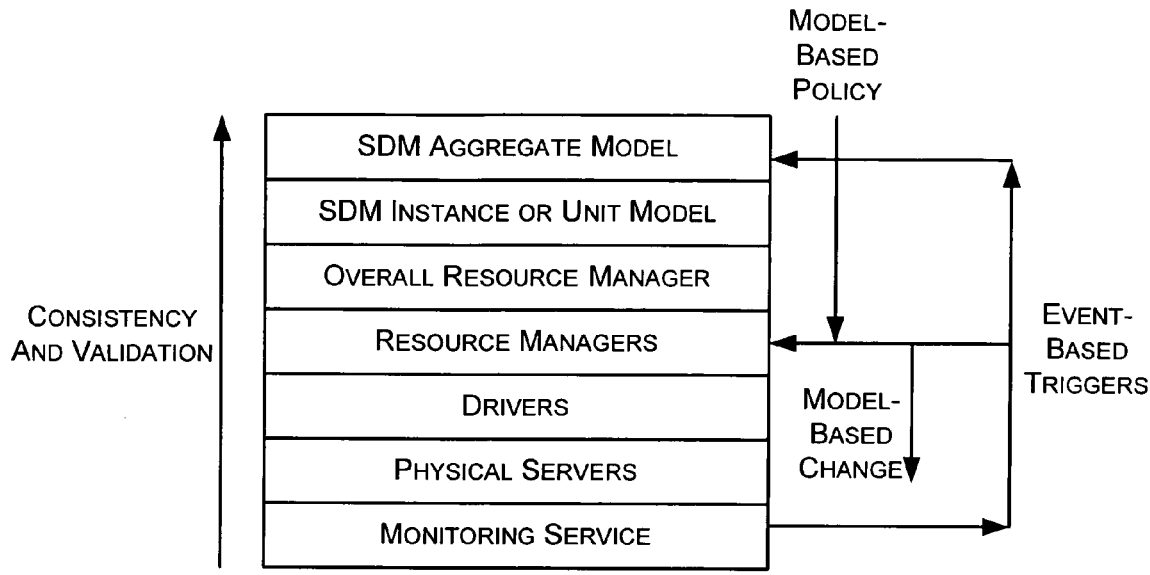
FIG. 60 illustrates example layers of management.

FIG. 60 shows representative layers of management. This is a blow-up of the model section of the overall architecture diagram above which has been turned horizontally so that the aggregate model corresponds to the SDM and the unit model corresponds to the SDM Instance Space. The Overall Resource Manager manages requests to the individual Resource Managers (also called Factories).

Introspection/Tracking Mechanism

Given a trigger such a user request, a hardware trigger, or a hardware threshold being hit, an appropriate operational process will be activated. The operational process will be a set of operations tasks that will be executed. The execution of operational tasks requires processing by orchestration because each task is a transaction which may be long-live and requires initiation and completion before the next task. The engine which oversees this sequence of activity to execute operational processes is the orchestration engine for Ops Logic.

Applying orchestration to a sequence of operations tasks on potentially distributed servers or hardware resource is a unique approach. These properties of Ops Logic make a more sophisticated approach to transaction processing:

Long-lived—Operational processes may run for long periods of time, such as days or months.

Asynchronous—A trigger or event may start a transaction or process, but can not wait until the triggered task is complete to process other events.

Transacted—The steps in an operational process are actions that have an agent who starts or send it, an agent who receives and processes it and a compensation process that backs-out the changes if the task should fail.

Durable—Ops processes need to be able to last for a long time without becoming damaged or unstable.

Highly-available—Being available as much as possible reliability is a requirement for operational processes of the highly-available BIG computer and services.

Figure 61:
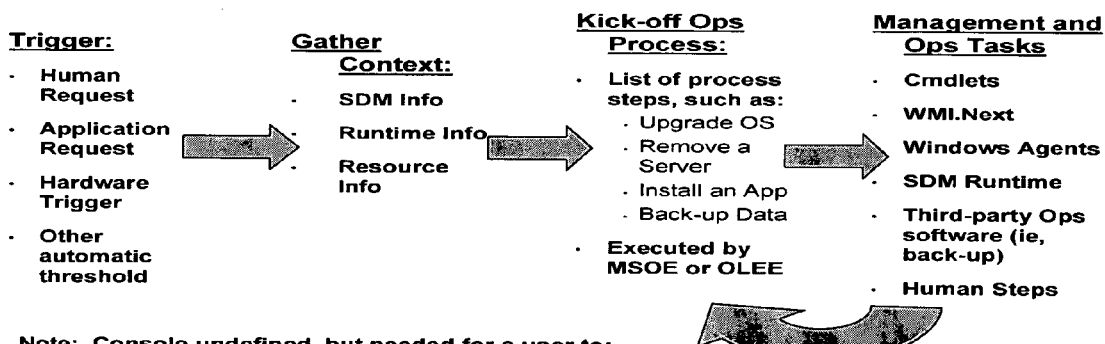
FIG. 61 illustrates an example operation of a system.

Ops Logic will provide operations and application developers the opportunity to codify and standardize sequences of operations actions based on a trigger in the BIG environment. Once a trigger is raised, the relevant sequence of tasks will be activated. The steps for a particular situation may include a command to an individual machine, a change in an application component instance or in the model or human steps. Each step is a transaction which has a start and an end and may succeed or fail. By using an orchestration engine to step through these tasks, the process will be managed, tracked and reported upon. The orchestration engine will initiate a task, watch its progress and note its completion or failure. Orchestration will also enable alternative actions to be taken in the event of partial or complete failure, depending on how the operations process has been defined. See FIG. 61.

Resource Manager

The Resource Manager is responsible for allocating logical and physical resources within the distributed computing system. The Resource Manager discovers available hardware, processes resource allocation requests, and tracks ownership of logical and physical resources. By providing an interface to a dynamic pool of resources, the Resource Manager provides the bed-rock for availability and scalability within the server.

The Resource Manager owns and controls all hardware in the distributed computing system including both computers and network devices such as switches. Access to hardware resources in the system is controlled through the Resource Manager. In addition, the Resource Manager provides base mechanisms for controlling logical resources such as load balancing groups.

The Resource Manager provides a common API for all resource management within the system. Services and the runtime converse through the Resource Manager API to make resource queries, allocate resources, change resource requirements, and free resources.

BIG Resource Manager

Introduction

Feature Summary

BIG defines a distributed service runtime, a common hardware reference platform, and a resource manager. The distribute service runtime provides a service with a skeleton defining the service components, their interrelationships, and an execution environment for scalability and availability policy in the form of operations logic. The hardware reference platform defines a common hardware structure that enables services to run on systems ranging from one to thousands of computers.

The BIG Resource Manager is responsible for allocating logical and physical resources within the BIG computer. The Resource Manager discovers available hardware, processes resource allocation requests, and tracks ownership of logical and physical resources. By providing an interface to a dynamic pool of resources, the Resource Manager provides the bed-rock for availability and scalability within the BIG machine.

This document describes the goals, architecture, and implementation of the BIG Resource Manager. Chapter 1 describes goals and driving scenarios. Chapter 2 describes the architecture of the Resource Manager and its associated Resource Providers. Chapter 3 describes implementation details and APIs.

Discussion

The BIG Resource Manager is responsible for management of allocation and usage of resources within the BIG computer. The BIG Resource Manager owns and controls all hardware in the BIG computer including both computers and network devices such as switches. Access to hardware resources in the BIG computer is controlled through the Resource Manager. In addition, the Resource Manager provides base mechanisms for controlling logical resources such as load balancing groups.

The BIG Resource Manager provides a common API for all resource management within the BIG computer. Services and the BIG runtime converse through the Resource Manager API to make resource queries, allocate resources, change resource requirements, and free resources.

Resource Providers

While the Resource Manager provides a common interface into resource management, knowledge of actual resources comes from a set of Resource Providers. A Resource Provider has specific knowledge about the existence and management of a particular class of resources. For example, the Network Resource Provider knows about the existence and specifics of managing VLANs. Other Resource Providers in BIG include a Physical Device Provider, an IIS VRoot Provider, an SQL Database Provider, a CLR AppDomain Provider, and a Win32 Surface Resource Provider.

Resource Providers extend the Resource Manager with resource-specific knowledge. Resource Providers manage the conversion of resource specific requests to a common query format. Resource Providers extend the Resource Manager API with resource-specific configuration APIs through a provider helper DLL., Finally, Resource Providers add appropriate state into the Resource Manager data store to allow tracking of resource specific information. Higher-level Resource Providers build on lower-level Resource Providers. For example, the IIS VRoot Resource Provider allocates machines through the Physical Device Resource Provider. Layering of Resource Providers minimizes redundancy and increases uniformity of resource management.

A strong analogy can be drawn between the I/O management system in Windows and the resource management system in BIG Like the Windows I/O Manager, the BIG Resource Manager provides a common API, common logic for resource access control, a common resource tracking, and a common mechanism for walking requests through a diverse set of providers. Like Windows Device Drivers, BIG Resource Providers extend the management system with specific knowledge for controlling a distinct class of resources. The BIG Resource Manager, like the Windows I/O manager provides a model for unifying diverse resources under a common umbrella.

Automatic Resource Management and Optimization

The BIG Resource Manager frees data center operators from direct involvement in the allocation and placement of components on resources. For example, when a new service is installed into the BIG computer, operators do not need to decide on which computers to place the service. Operators only need to grant the service a resource quota; the Resource Manager then decides how to optimally place the service within the BIG computer in order to conserve limited shared resources such as core network bandwidth.

The base set of trusted Resource Providers participates in the optimization of component placement with the Resource Manager. Resource Providers participate in placement optimization by making providing the Resource Manager with placement choices and provider-specific relative cost preferences. The Resource Manager then balanced global concerns with each Resource Provider's local concerns to maximize efficiency and minimize resource usage.

Optimal component placement is an ongoing concern. Over time, the resource needs of individual services shrink and grow. The available physical resources change as new equipment is added to the BIG computer and older equipment is decommissioned. The Resource Manager periodically re-examines placement decisions and evaluates the merit of moving components. Resource Providers participate in the placement reevaluation by provide the Resource Manager with costs of moving components. Movement costs can range from infinite for a non-movable store to quite small for a stateless IIS component.

The BIG Resource Manager frees operators from concern about resource allocation and component placement. The Resource Manager also frees developers from the need to write complex allocation logical; instead, developers simply provide the Resource Manager with a graph of resource requirements. The Resource Manager takes into account both local and global resource requirements to optimally place components within the BIG computer.

Feature Description

Execution Environment

The BIG Resource Manager runs as a CLR managed service backed by Highly-Available SQL. It is expected that each BIG machine will only have a single Resource Manager replicated across the pair of SQL servers in the HA SQL cluster.

The BIG Resource Providers execute within the BIG Resource Manager process. The Resource Manager gives the Resource Providers an asynchronous execution environment within which to operate and a shared database into which they store their state. It is expected that all Resource Providers will be CLR managed code using the BIG operations logic model.

All Resource Providers keep their state in the Resource Manager database. Resource Providers can create their own tables as needed to meet their management requirements.

The Resource Provider's state in the Resource Manager database is authoritative. So, for example, the IIS metabase is a cache of the data in the Resource Manager database. If an IIS VRoot entry is found in the IIS metabase with no corresponding entry in the Resource Manager database, then the VRoot in the metabase is deleted.

All resource allocation and de-allocation requests are unified within transactions. Resource Providers that execute within exclusively within the Resource Manager process using exclusively the Resource Manager database. Even aggregated, cross-provider resource requests execute in deterministic, non-distributed manner. This greatly simplifies the design and implementation of Resource Providers and ensures that resources are never lost between servers in failure scenarios.

The BIG Resource Manager separates resource allocation and resource initialization into two distinct, separate acts. Resource allocation is a non-distributed, deterministic operation that executes exclusively within the Resource Manager process. Resource initialization on the other hand is an inherently distributed and non-deterministic process.

Resource allocation is typically prefaced by a depth-first operations logic phase in which components are instantiated, connected with wires, and attributed as necessary with resource requirements.

By separating component instantiation and resource allocation from resource initialization, the BIG Runtime and services can use common error-handling mechanisms whether a resource is unavailable because it has not completed initialization or it is unavailable because the device on which it resided just vaporized. Resource initialization will be driven typically by a state machine that saves state in an HA SQL store like either the Resource Manager database or the SDM database.

Resource Providers

The BIG Resource Manager owns all resources in the BIG computer. Through resource-specific Resource Providers, the Resource Manager is extended with knowledge specific to distinct classes of resources. The Resource Manager provides storage, management of aggregate resource operations, and acts as a host for resource providers.

The BIG Resource Manager provides a small, specific set of resources through a limited number of Resource Providers. While small in number, it is expected that the basic set of Resource Providers will cover the requirements of most, if not all, of the target customers. The following Resource Providers are expected in the first product release:

Physical Resource Provider (raw devices)
Network Resource Provider (VLANs)
External Resource Provider (DNS names, external IP addresses)
IP Load Balancing Group Resource Provider
IIS VRoot Resource Provider
SQL DB Resource Provider
CLR AppDomain Resource Provider
Win32 Surface Resource Provider (a Win32 program)

Creation Pattern

Typically resource management will be driven by operations logic packaged as CLR managed code running. The operations logic will be written to the "disembodied object" pattern in which a CLR managed object represents the target component. The disembodied object is responsible for allocation any logical or physical resources needed by the component, initialization those resources, and eventually deconstructing and releasing those resources when the component is no longer needed.

A call like,

```
FrontEnd f = new FrontEnd( );    // Instantiate the disembodied
                                    object.
``` results in the creation only of a disembodied object, a CLR class with an component instance record in the runtime database, but nothing more. Operations logic interacts with FrontEnd f to set parameters, like scaling requirements, etc.

The disembodied object, FrontEnd f in this case, takes part in any resource allocation by responding to a request for a graph of desired resources and a subsequent setting of resources,

```
r = f.GetResourceGraph( );   // Ask f to produce the logical resource
                                request graph (recursively if f is compound).
```

```
rgo = BigAllocateResources(rgi);    // Ask the Resource Manager to
                                       do the global allocation request.
f.SetResources(rgo);                // Notify f of the actual resources
                                       allocated (recursively if f is compound).
```

The disembodied object directs all object initialization, like say formatting a disk and laying down an image:

```
f.BeginConstruct( );   // Kick off the construction/initialization state
                          machines.
f.EndConstruct( );     // Get results when construction has finished
                          (this is just the .NET async pattern).
```

Furthermore, the disembodied object's lifetime exceeds that of the represented object with the disembodied object directing destruction. The previous statement does not prohibit object quiescence.

```
f.BeginDestruct( );   // Kick off the destruction state machines.
f.EndDesctruct( );    // Get results when destruction has finished.
```

The disembodied object also releases its resources:
fReleaseResources( );

After which it can be destroyed:
f=null;

There are a couple of things worth noting. Because f is just a disembodied object and because resource allocation is distinct from resource initialization/construction, the following lines can all be placed in a single deterministic transaction. It can even be a non-distributed transaction provided the RM DB is in the same SQL as the SDM DB.:

```
BeginTransaction( );
FrontEnd f = new FrontEnd;
r = f.GetResourceGraph( );          // Ask f to produce the logical
                                       resource request graph
rgo = BigAllocateResources(rgi);    // Ask the Resource Manager to
                                       do the global allocation request.
f.SetResources(rgo);                // Notify f of the actual resources
                                       allocated.
EndTransaction( );
```

All Resource Providers, at some point, will invoke distributed operations, but not during the BigAllocateResources( ) call. An implementation of a given Resource Provider may leverage distributed code through its own SDM modeled service.

Placement Optimization

First, in the context of this discussion, I'd like to define the following terms with respect to placement optimization:

I. Local Optimization: Optimization isolated to a single component factory, by implication ignoring the effects on placement within other component factories.

II. Aggregated Optimization: Optimization taking into account multiple component factories. For example, optimization which considers the placement of both IIS applications and SQL databases.

III. Global Optimization: Optimization (including movement of existing components) of the entire system, i.e. all of the applications in a BIG computer. Global optimization differs from aggregated optimization primarily because it has the option of moving existing components.

Unless I have misunderstood people's positions, I think everyone agrees on the following:

I. BIG V1 should provide an aggregated allocation API. The aggregated allocation API takes as arguments a collection of component and wire instances with configuration parameters on the component and wire instances in the SAM. In a single transaction, the aggregated allocation API calls into the component factories to reserve the necessary resources. [Note: I have specifically used the term aggregate instead of batch to highlight the fact that the allocation may include differing component factories. Note that I have not said "aggregated optimized allocation API" in the point.]

II. In the long term, BIG should provide global placement optimization. The goal of global placement optimization is to re-arrange the placement of component instances within the BIG machine to optimize certain properties, the primary property being the usage of the BIG machine's shared resources.

III. Aggregated placement optimization can be occur at initial allocation or can take the form of global optimization later with controlled application consent. The easiest time to affect placement is when a component instance is initially allocated.

IV. Movement of a component after initial placement can be very costly, or even prohibitively expensive. Moving a large SQL backend can be extremely costly and may seriously impair application availability. Movement of a component should consider the wishes of an application.

V. In long-running applications, movement of components will be inevitable even without global placement optimization. Hardware may fail unexpectedly. Hardware will definitely be decommissioned due to normal depreciation and life-cycle constraints. This implies that any long-running application will ultimately require some mechanism for moving components. Whether these mechanisms are leveraged by global placement optimization is orthogonal to the existence.

VI. Long-running application will support migration of some form for upgrades. The mechanisms for rolling upgrade, for example, might be leveraged by global placement optimization. For example, if an application's rolling upgrade policy is to bring a new front-end online and decommission the old one, then that allocation of the new front-end is a perfect time for optimizing its placement. Upgrade provides a window of opportunity for global placement optimization.

Based on feedback from other in the team, I would like to propose the following for BIG V1:

1) BIG V1 provides a batch allocation API. The batch API takes as arguments a collection of component and wire instances with configuration parameters on the component and wire instances in the SAM. In a single transaction, the batch API calls into the component factories to reserve the necessary resources.

2) BIG V1 formalizes the movement of components. At a minimum this should include a standard component interface for taking a component offline and bring it back in another location. Think of it as the component equivalent of ISerialize. This formalization would be used by operation logic to perform rolling upgrades and cloning of entire front ends. It might also be used for partitioning SQL back ends. It would used when decommissioning hardware, etc. We should have the concept of a movable component, and what it means to move different types of component, how to estimate the cost, etc.

3) BIG V1 provides an aggregated placement optimizer. The complexity of the optimizer is tuned to meet the needs of the development cycle. It may be a simple as a crude clustering optimizer or much more sophisticated.

4) The aggregated placement optimizer is used by the batch allocation API during initial placement. Component factories cooperate with the placement optimizer to aid its decisions.

5) Throughout application lifetime the aggregated placement optimizer may be invoked periodically to move component instances to perform global placement optimization. The optimizer may leverage windows of opportunity presented naturally by an application. It may also ask an application to consider component movement at other times. Basically, the global optimization just leverages the aggregated placement optimizer and the pre-existent support for movable components.

6) BIG V1 IIS application component factory implement movable components, subject to application allowance. It is quite likely that much of the benefits of global placement optimization can be realized by ignoring heavy components such as SQL databases and moving VRoots. IIS also naturally supports operations such as drain which facilitate movement of VRoots. In effect, the IIS VRoot component factor becomes the V1 poster child for component movement and global placement optimization.

Modeling Physical Resources

Underlying the entire resource management system is a hardware resource graph. The hardware resource graph describes the totality of hardware resources and their connectivity available to the BIG Resource Manager. The hardware resource graph includes servers, network devices, and network topology. Additionally the hardware resource graph can contain information about power grids and physical containment relationships.

The hardware resource graph consists of three basic elements: entities, connectors, and connections.

An entity is the fundamental unit of hardware accessible by software. Examples of entities include servers, disk drivers, network devices, etc.

A connector is a physical interface to an entity. A connector is always associated with exactly one entity. Examples of connectors include network interfaces, IDE interfaces, AC power connectors, and physical containership, etc.

A connection is a physical relationship between exactly two connectors. Examples of connections include network cables, IDE cables, AC cables, etc.

All three element types, entities, connectors, and connections, have associated properties. The properties are tuples consisting of a property name, maximum value, and available value.

All three element types can have duals. A dual is a peer used for fail over. An element and its dual are always allocated together to provide redundancy necessary for high availability. Typical examples of duals include fail-over switches on redundant networks, redundant NICs, and cables connecting redundant NICs to redundant switches.

Figure 62:
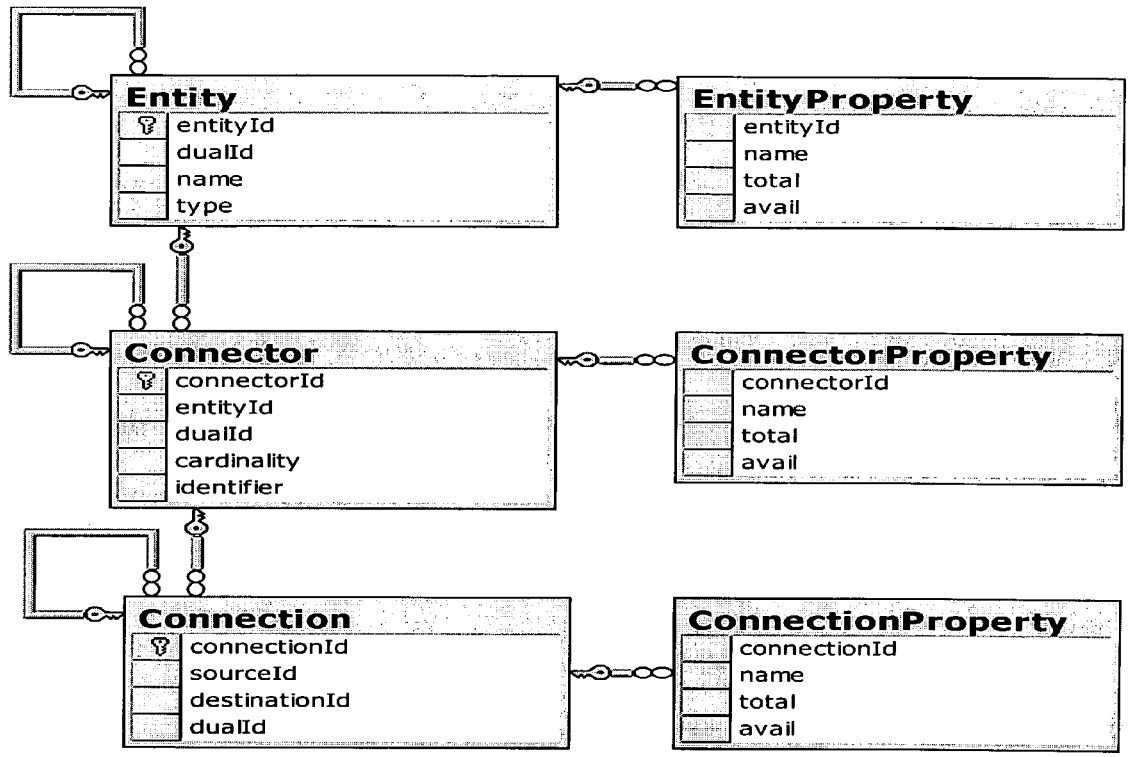
FIG. 62 illustrates an example connector arrangement.

All connectors have cardinality, which specifies the maximum number of connections allowed per connector. For example, an IDE connector has cardinality of two, one master and one slave device. See FIG. 62.

Principles for defining fundamental types:
What is the fundamental hardware protocol?
At the hardware level, what language does the device speak?
Fundamental entities have exactly one owner.
Connector and Connection categories must match.
Duals are fail-over pairs that must be allocated as one.
Entities, Connectors, or Connections can be duals.

What are the modeling elements?
Entity
Connector Src=Entity
Connection Src=Connector, Dst=Connector What are the fundamental categories?
Entity Categories:
X86 PC: describes Software/CPU/RAM interaction. CPUs and RAM are values.
EFI PC: describes Software/CPU/RAM interaction. CPUs and RAM are values.
Network Device. Speaks IP+SNMP. Product identifier is a value.
Disk. Sends and receives sectors.
Physical Container.
Connector/Connection Categories:
Ethernet. Bandwidth is value.
ATA. Bandwidth and format are values.
SCSI. Bandwidth and format are values.
Power.
Physical (Containment).
Others: FibreChannel, Serial, Parallel, USB, FireWire, 802.11, Infiniband.

Figure 63:
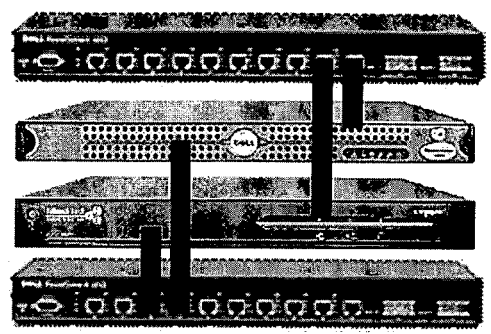

Initial Physical Configuration—See FIG. 63.

Figure 64:
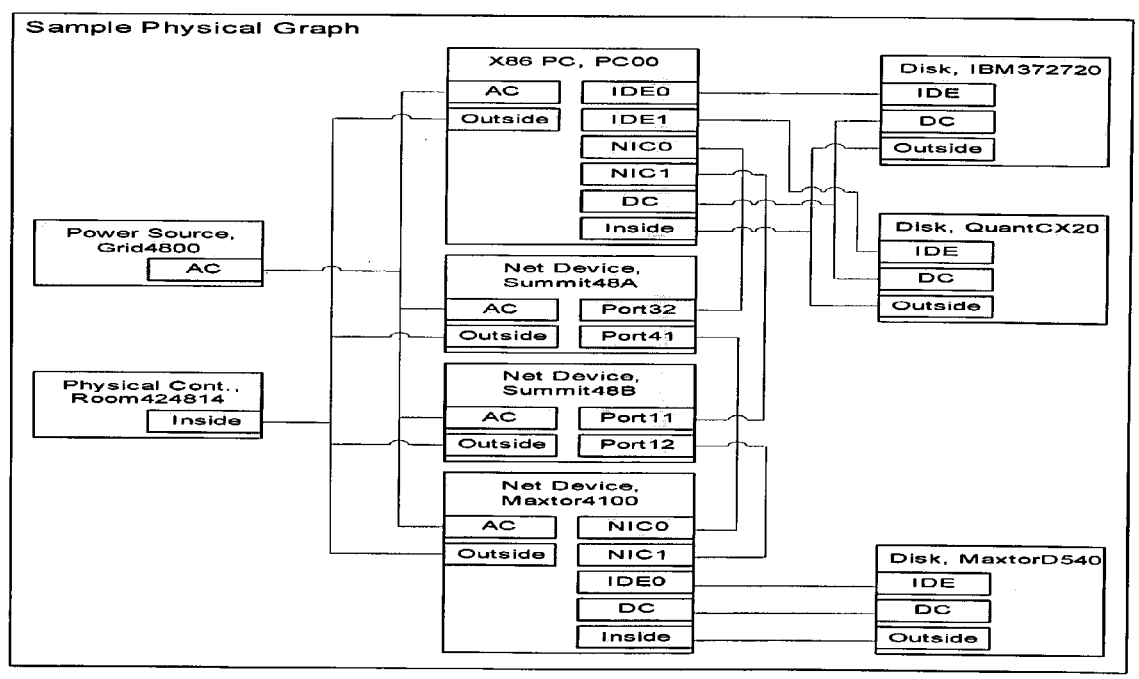

Detailed Example—See FIGS. 64 and 65.

Figure 66:
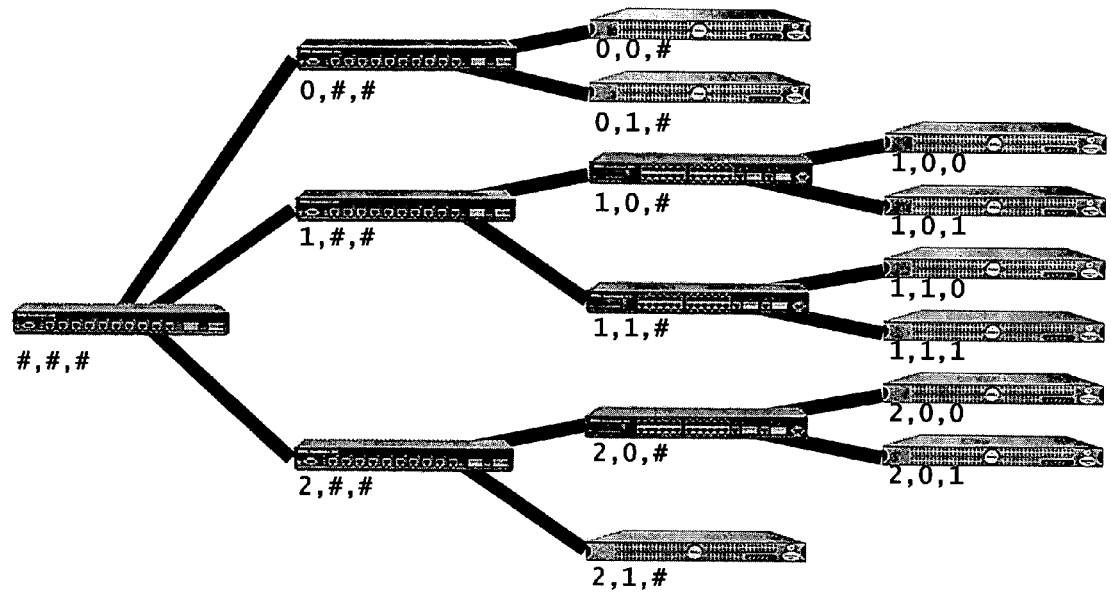

Location-Based Device Identifiers
Every networked device has a unique identifier of its location in network.
At each level, value=port number on parent switch.
Terminated levels have a termination value, "#".
The termination value, "#", is larger than all port numbers.
For example, see FIG. 66.

Figure 67:
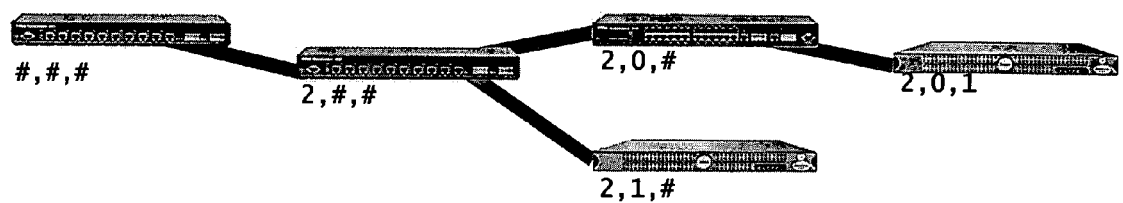

Calculating the Path between Two Devices
Consider two devices (2,0,1) and (2,1,#)
For each device, compute terminated prefixes:
    (2,0,1)→(#,#,#), (2,#,#), (2,0,#)
    (2,1,#)→(#,#,#), (2,#,#)
Most specific common terminated prefix is common parent:
    (2,#,#)
Remaining terminated prefixes are name intermediate switches:
    (2,0,1)→(2,0,#)
    (2,1,#)→none.
Final Path:
    (2,0,1) to (2,1,#)→(2,0,#), (2,#,#)=two switch hops=three wire hops.
Also trivial to find closest peers to a device:
    (2,0,1)→(2,0,?)
See FIG. 67.

Modeling Resource Requests
The BIG Resource Manager models the BIG machine as a graph of nodes (resources) and edges (relationships). Both nodes and edges may be annotated with attributes (name-value pairs).

One of the most common types of query against the resource graph is sub-graph isomorphism. The client creates a request graph and asks the Resource Manager to find a sub-graph within the hardware resource graph with the same shape and properties. The Resource Manager finds a match and returns a fully annotated reply graph.

As part of sub-graph isomorphism the Resource Manager MUST NOT fold or combine graph nodes. That is, if the request graph contains two PC nodes, the reply graph must contain two PC unique nodes.

Request graphs may include search parameters, such as find a PC node or find a PC node with at least 256 MB of RAM. Reply graphs contain specific ids of each of the matching elements (both nodes and edges).

In the base case, request graphs are read-only queries. However a common optimization allows for read-write operations in the form of resource allocation. When drawn on paper, write operations are labeled with brackets.

Figure 68:
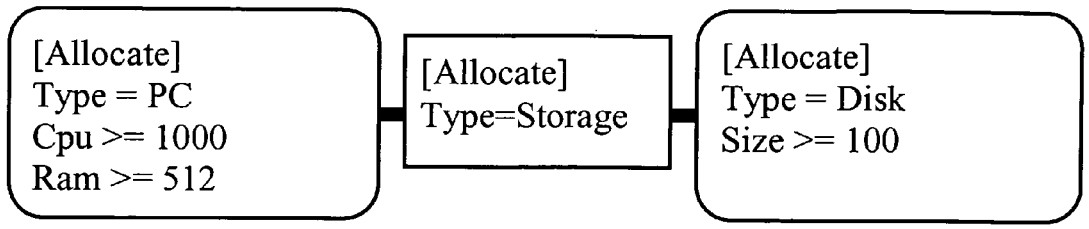
FIG. 68 illustrates an example request graph.
Figure 69:
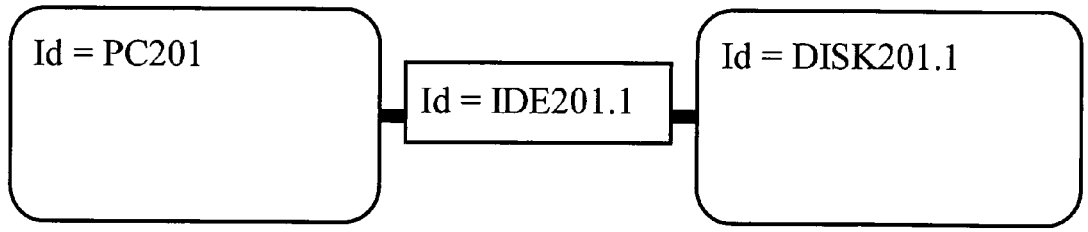
FIG. 69 illustrates an example reply graph.

FIG. 68 is a request graph to allocate a PC and an attached disk connected through a storage transport such as IDE or SCSI. Note that nodes are represented as round-edged rectangles and edges are represented as dark lines with overlaid rectangles where attributes are specified. The successful allocation might result in the reply graph of FIG. 69.

Figure 70:
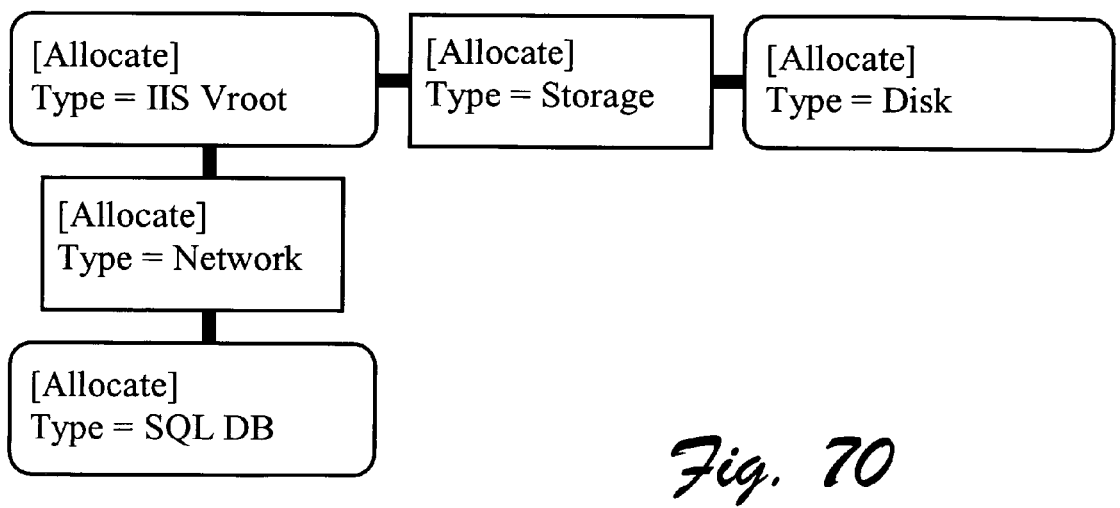
FIGS. 70–86 illustrates example scenarios in which the invention may be used.
Figure 71:
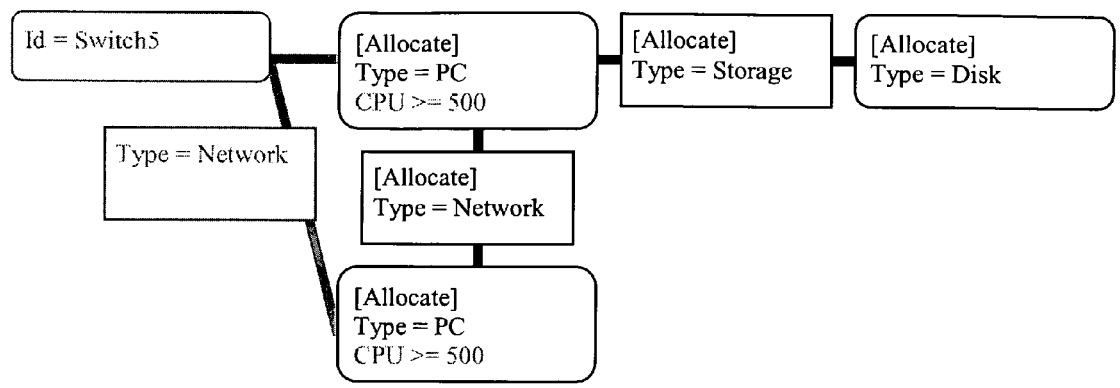
Figure 72:
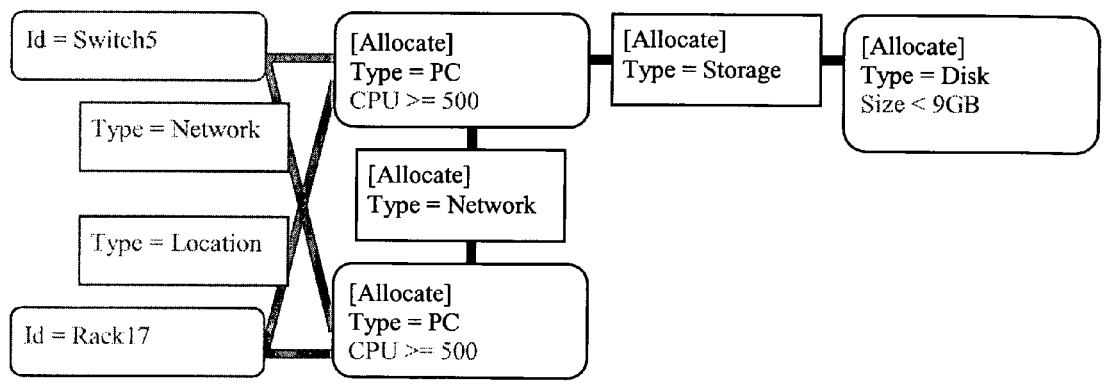

Driving Scenario
Joe's Flower Shop makes the resource request shown in FIG. 70. MSN insures that Joe gets at least a 500 MHz PC because he has the "gold" SLA and that his PCs are attached to Switch5 to maintain locality. With the addition shown in FIG. 71, Exodus guarantee that MSN always gets machines in Rack17 and also gets small disks because they have a "$2^{nd}$" class storage SLA. See FIG. 72.

Implementation Ideas

```
class Graph;
class Client
{
    private IResourceMediator mediators[ ];
    private Object mediatorStates[ ];
}
interface IResourceMediator
{
    public void MediateRequest(ref Graph graph, ref Object state);
    public void MediateReply(ref Graph graph, ref Object state);
}
class ResourceManager
{
    public Graph Allocate(Graph request, Client client)
    {
        for (int n = 0; n < client.mediators.Length; n++)
        {
            client.mediators[n].MediateRequest(ref request,
                    ref client.mediatorStates[n]);
        }
        Graph reply = PrimitveAllocate(request);
        for (int n = client.mediators.Length - 1; n >= 0; n--)
        {
            client.mediators[n].MediateReply(ref reply,
                    ref client.mediatorStates[n]);
        }
        return reply;
    }
    private Graph PrimitiveAllocate(Graph request);
}
```

Basic Resource Allocation Scenarios

This section list a number of scenarios. Included with each scenario is the corresponding request graph. Nodes that will be allocated as a result of the query transaction are labeled with "[Allocate]". Nodes that will not be allocated and that must be unallocated for the search to match are labeled with "[Free]". Nodes without a bracketed label are not allocated, instead they provide context for the rest of the request graph.

PC

Figure 73:
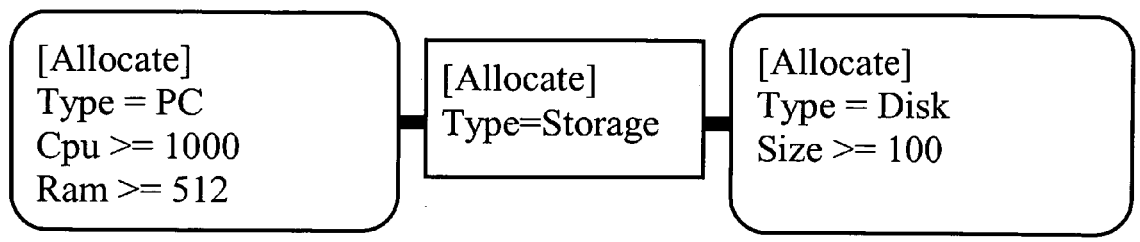

Akamai needs to allocate a server in the Digix data center with at least a 1 GHz CPU, 512 MB of RAM, and 100 GB of local disk storage. See FIG. 73.

VLANs

Figure 74:
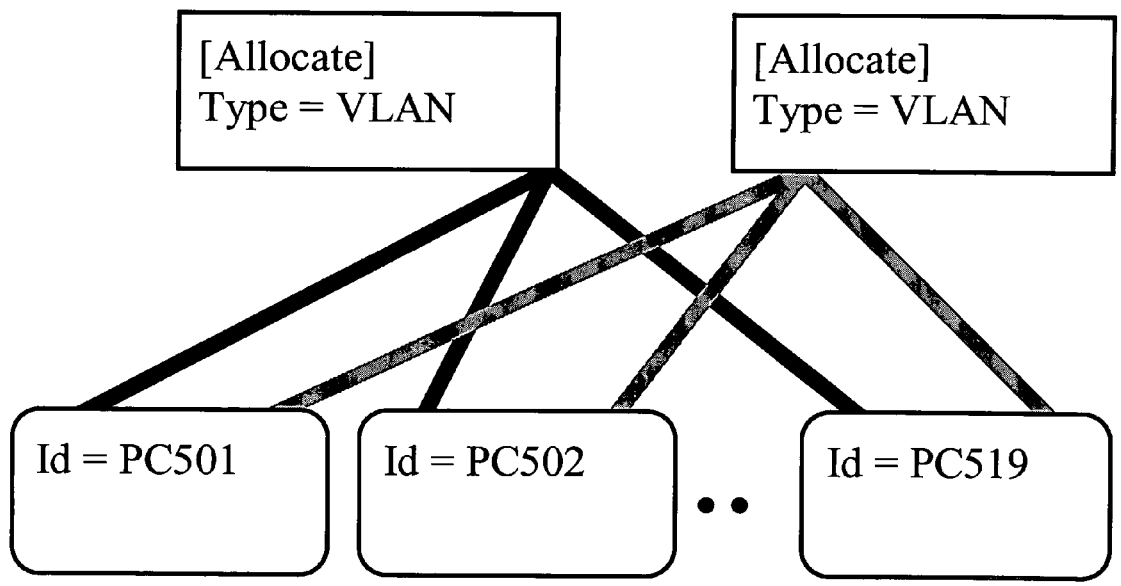

MSN Instance Messaging has decided to implement a DMZ containing its front-ends. In order to do so, it needs 2 VLANs with coverage of its front-ends. See FIG. 74.

Public IP Address or DNS Name

Figure 75:
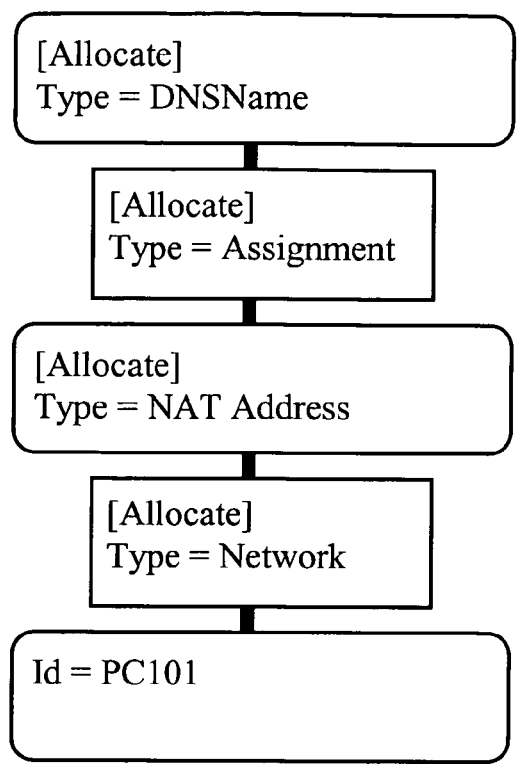

Joe's Web Service needs to make itself visible to the outside world. He needs to allocate a DNS entry and a routable IP Address. See FIG. 75.

Load Balancing Groups

Figure 76:
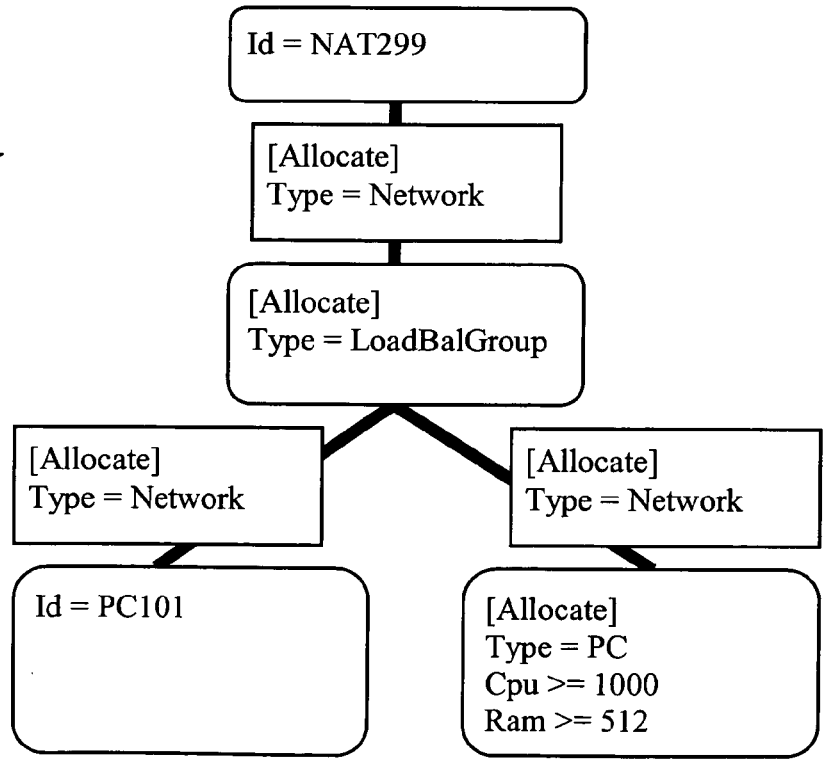

Joe's Web Service has grown too large for a single PC. He needs to allocate a load balancing group and another PC. He then needs to place both PCs behind the load balanced group's virtual IP address. See FIG. 76.

Path

Figure 77:
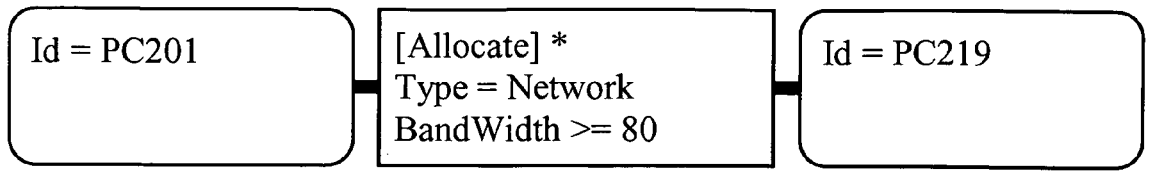

Hotmail needs to allocate an 80 Mbps path to transfer email accounts from one UStore to another. Hotmail may specify latency and QOS requirements on the path also. See FIG. 77.

Specific Storage

Figure 78:
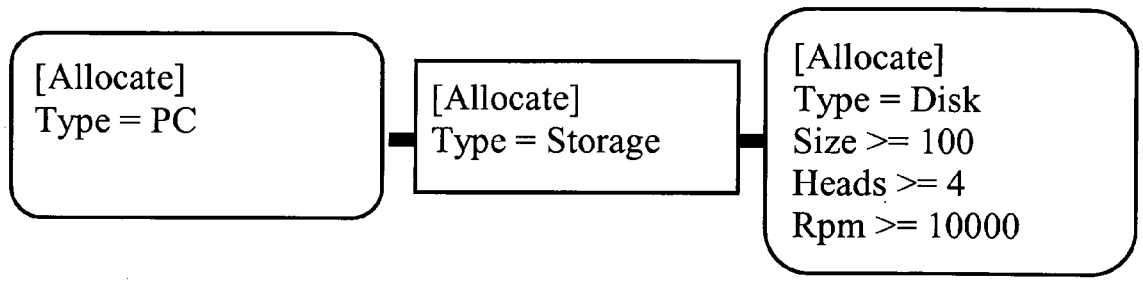

Hotmail wants to create a new UStore. It wants a Raid 1 box with 100 GB spread over at least 4 sets of unshared heads rotating at 10,000 RPM or better. See FIG. 78.

Cluster (Quorum) Storage

Figure 79:
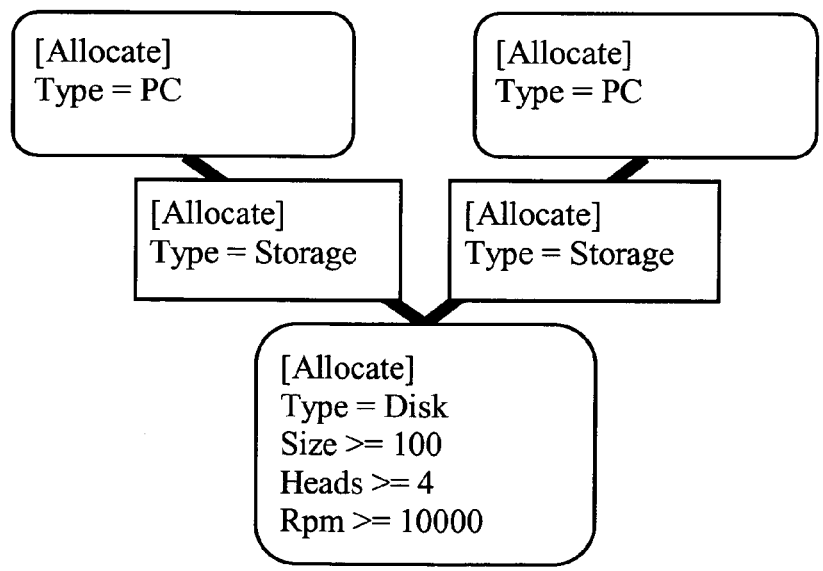

Hotmail wants to allocate a pair of machines with a shared disk for a fail-over cluster. It wants a Raid 1 box with 100 GB spread over at least 4 sets of unshared heads rotating at 10,000 RPM or better. See FIG. 79.

Shared Storage

Figure 80:
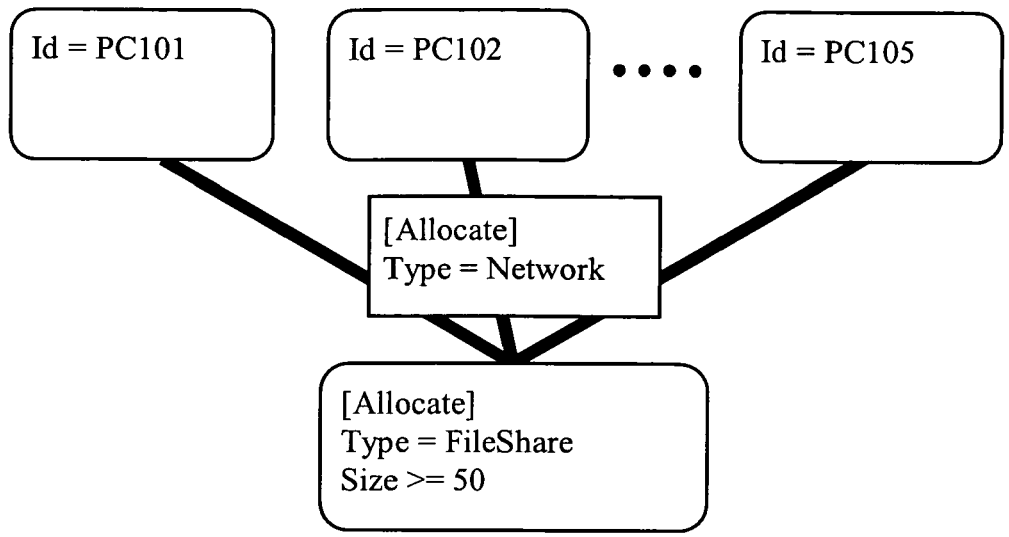

Joe's Web Service needs 50 GB of common storage usable by multiple machines to hold rollback images of service specific configuration. The storage is available to 0 to N machines. See FIG. 80.

Allocation Placement Scenarios

Proximal Machine Allocation

Figure 81:
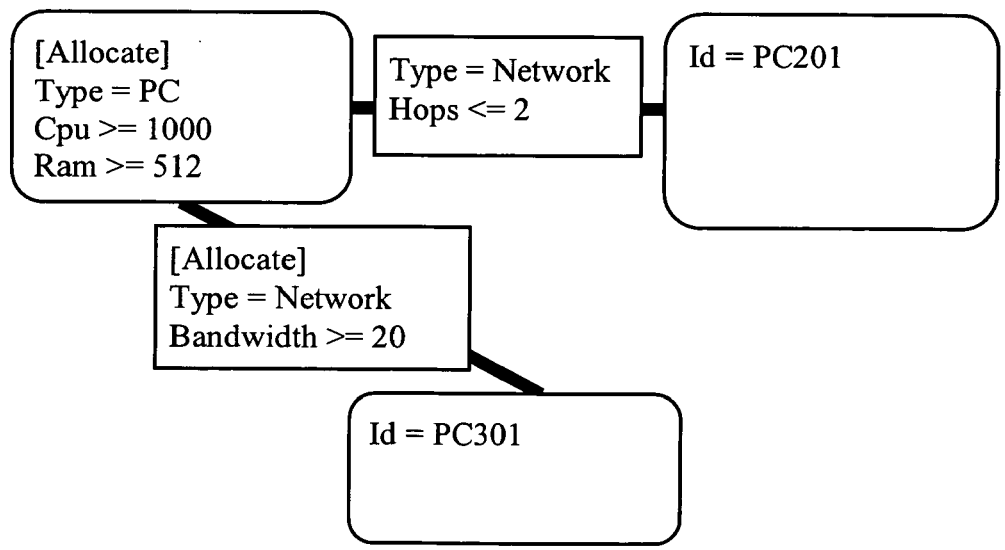

Hotmail needs to allocate a new front-end. It wants to find a machine on the same switch as its other front-ends with sufficient bandwidth to the back-end cluster. See FIG. 81.

Distant Machine Allocation

Figure 82:
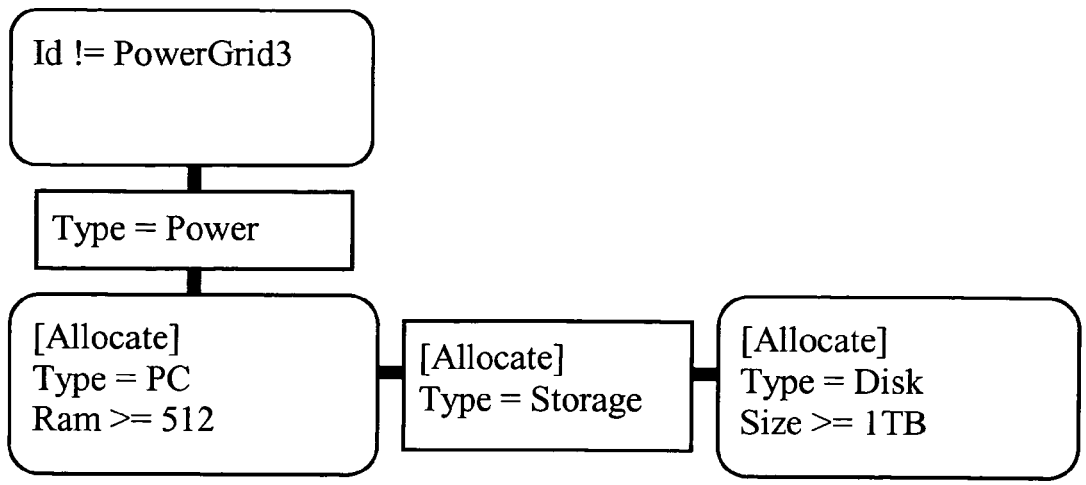
Figure 83:
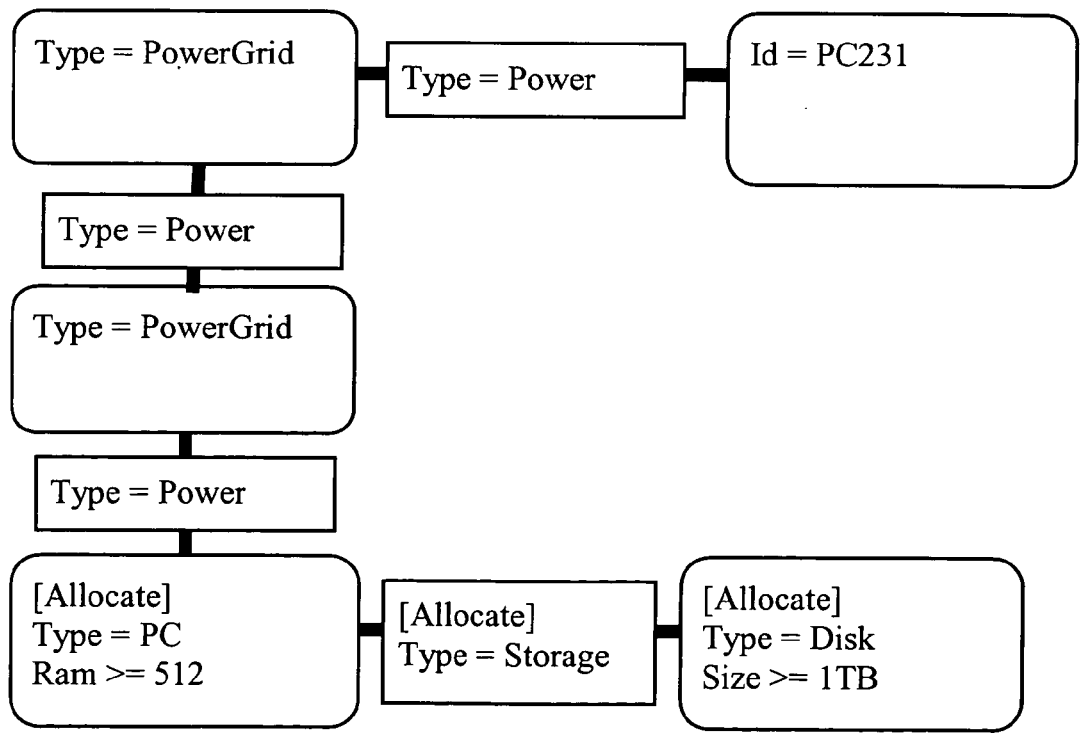

The Expedia customer profile database needs to another machine for SQL replication. It wants a machine that is located in a part of the data center covered by a different battery backup unit. See FIG. 82. Or possibly the example of FIG. 83.

Latency Driven Allocation

Figure 84:
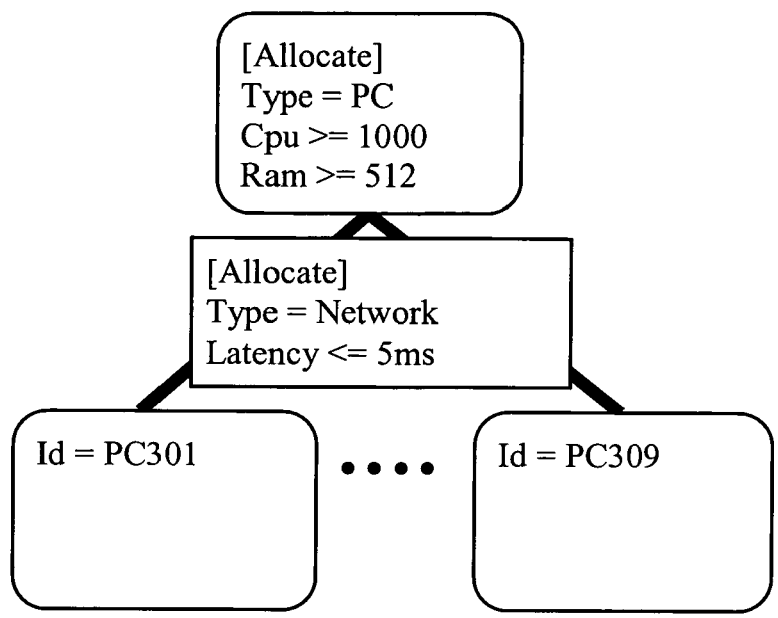

The Hotmail back-end needs to allocate a machine for cluster coordination. The machine must be within 5 ms latency of the machines already in the cluster, but bandwidth is low. Alternatively this could be represented by needing the machine to be within 1 network hop. See FIG. 84.

Seeding a Compound Component

Figure 85:
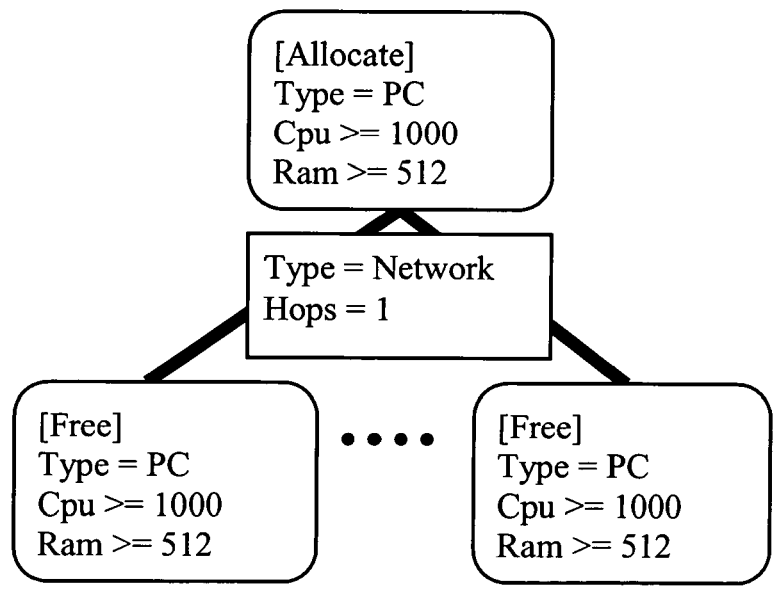

Hotmail is about to create a new email unit. The unit should be allocated in a single-hop cluster with room to grow to at least 500 PCs, although Hotmail may only initially allocate a few dozen machines. See FIG. 85.

Batch Allocation

Figure 86:
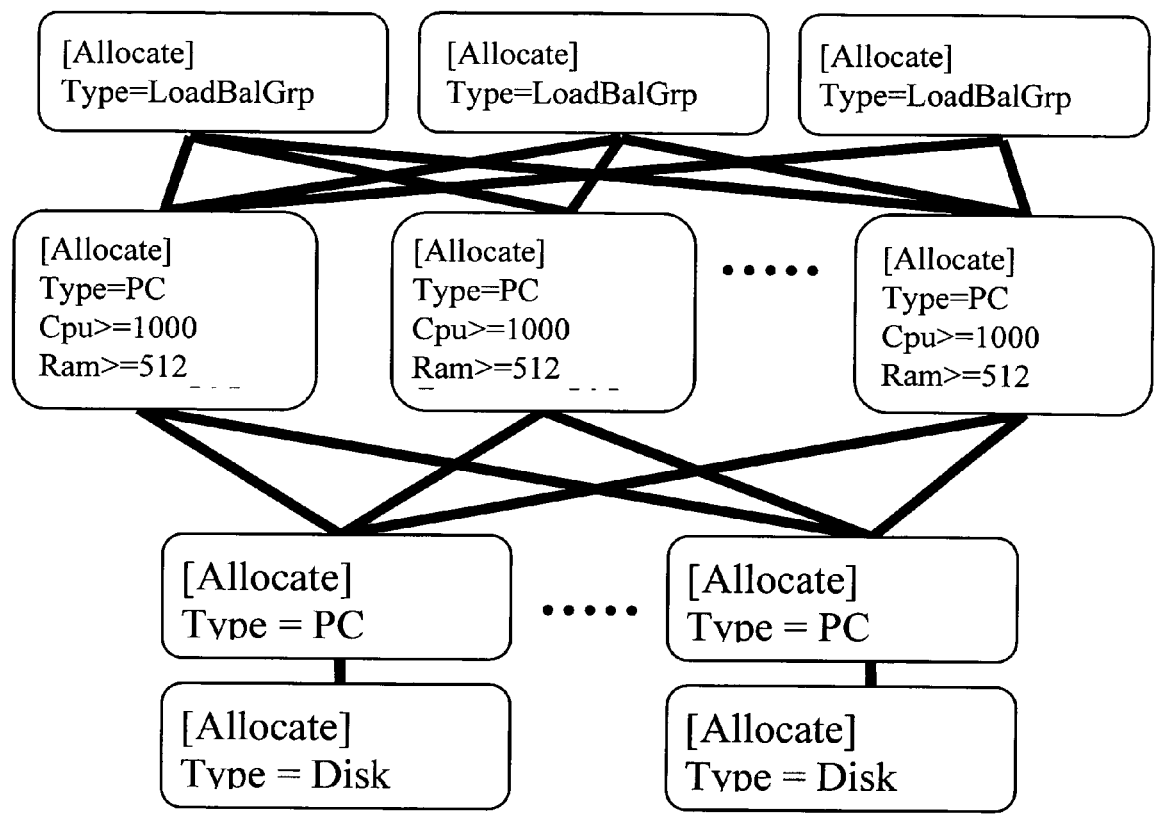

MSN Search decides to add the ability to search MP3s for based on small music samples. It wants to allocate a block of 400 PCs, 3 load balancers, and 20 TB of storage. It wants an all-or-nothing allocation. See FIG. 86.

Revocation Scenarios

Recovery

Joe's Web Service has stopped paying the IDC. The IDC needs to recover all of the resources allocated to Joe's Web Service and return them to the pool of available resources.

Hardware Lifetime Revocation

One of Expedia's front-ends is a PC which has reached the end of its life cycle. The triggered by the IDC's operation logic, the Resource Manager notifies Expedia that it has 72 hours until the machine is returned to the IDC.

Controlled Revocation

Hotmail allocated 20 short-term machines for a massive reshuffling of its UStores. In accordance with its SLA, the IDC has now asking for one machine to be returned. Hotmail can either return one of the twenty or another equivalent machine.

Figure 87:
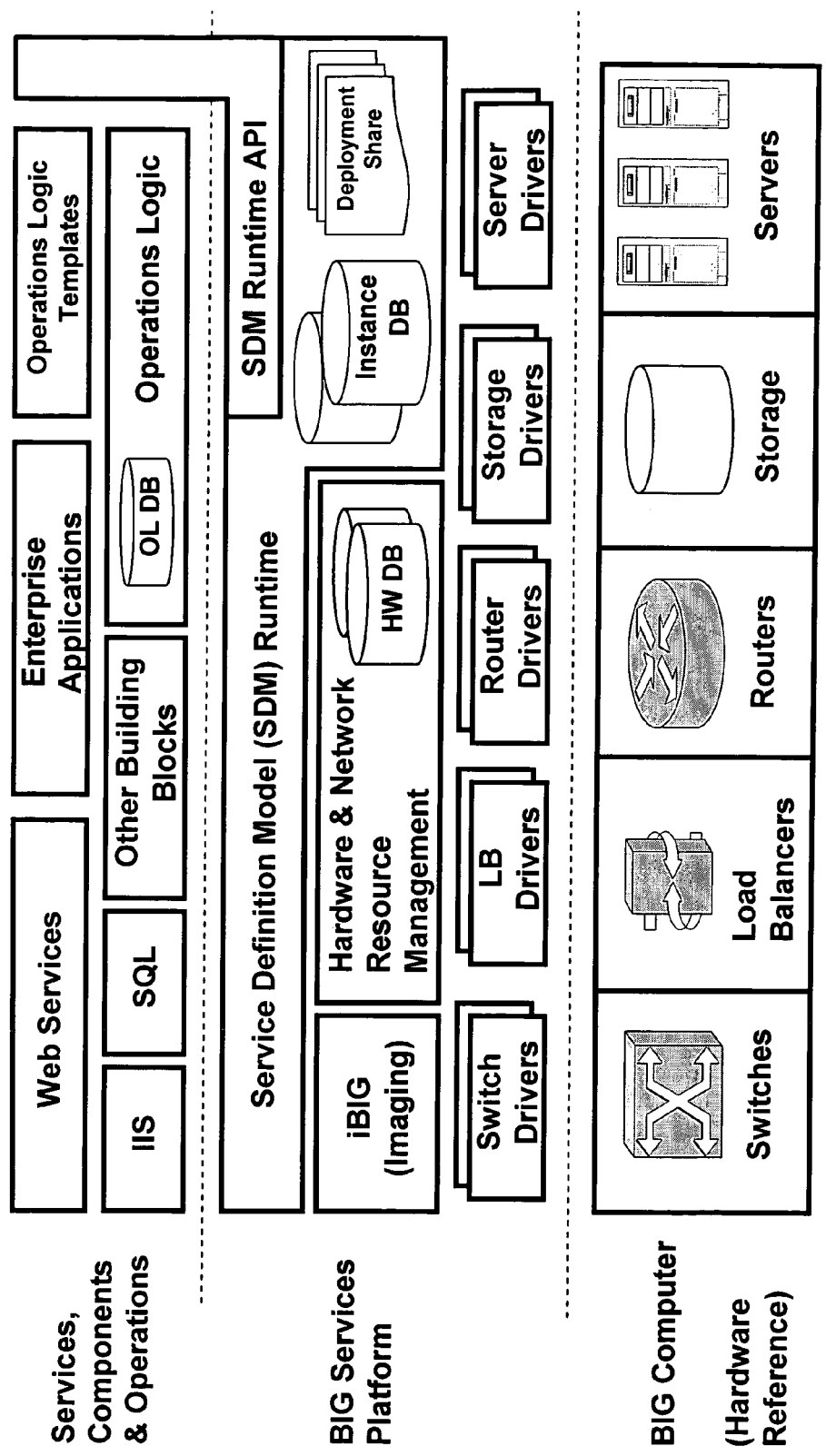
FIG. 87 illustrates an example services platform architecture.

BIG Vision—Enable:
- development of distributed, scalable and highly available services using Visual Studio and reusable building blocks like SQL, IIS, . . .
- deployment across a set of abstracted hardware and software resources that are automatically allocated, purposed and configured
- lower cost of ownership through automation by codifying operational best practices to control service availability and growth
- procurement of standardized data center hardware that leverages commodity economics BIG Services Platform Architecture—See FIG. 87.

Figure 88:
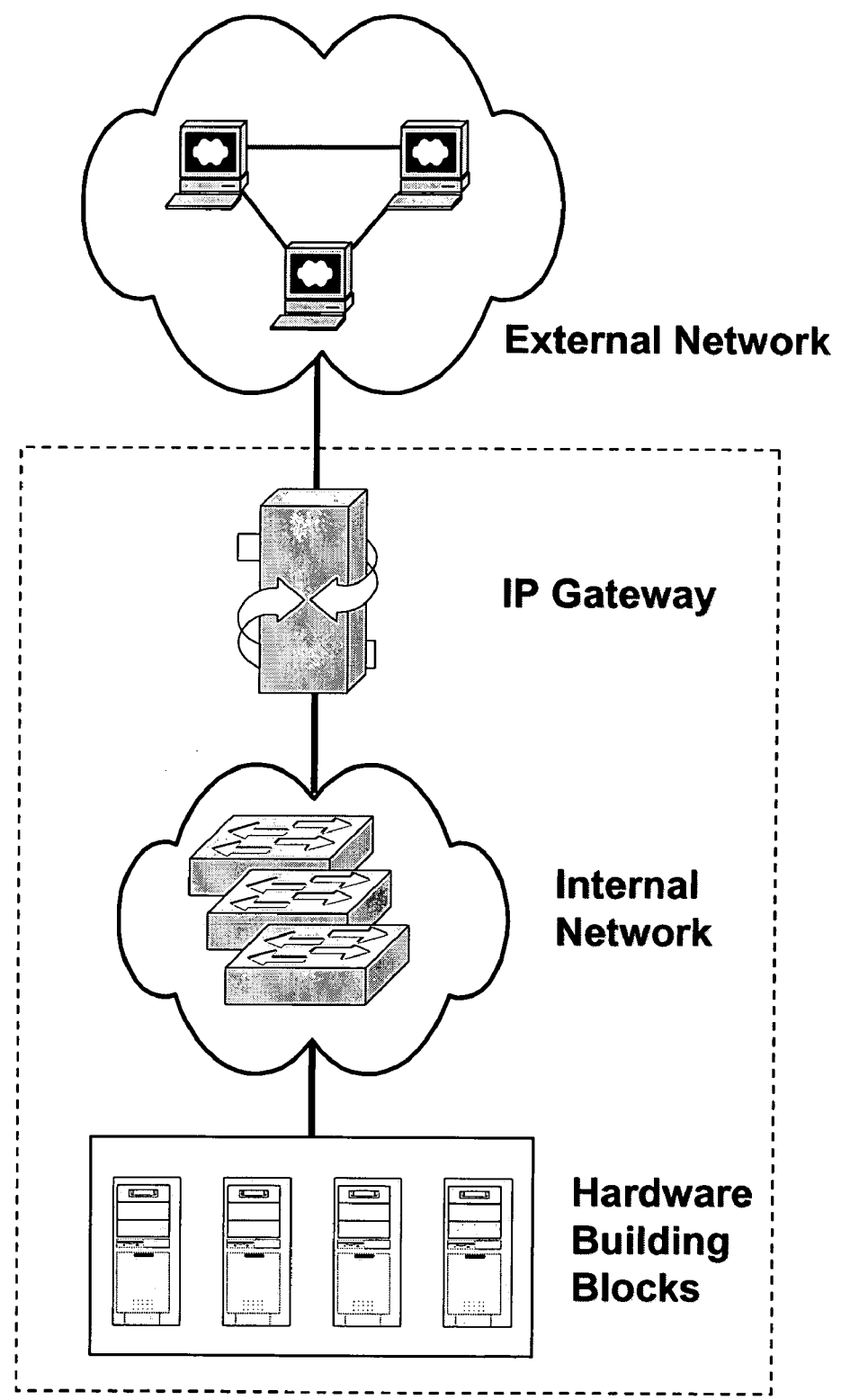
FIG. 88 illustrates example components in a system.

BIG Computer—Hardware Reference Platform
- Reduces the cost of design, test and operations:
- Limits number of hardware devices to support
- Constrains the network topology
- Enables automation of network configuration
- Eliminates customer concerns about BIG technology deployment requirements
- PXE, DHCP, DNS, VLANs IP Gateway
- Mediates IP traffic between the external network and the internal network
- Network Address Translation (NAT), firewall, load balancing Internal Network
- IP addrs and VLANs are managed exclusively by BIG
- VLANs are automatically configured Hardware Building Blocks
- Combinations of commodity servers, network switches, and disks See FIG. 88.

FIG. 89 illustrates examples of current products that can be inside a BIG computer.

Resource Management Features

Dynamic discovery of server, storage or network hardware resources.

Highly available database containing (physical and logical) resources.

Runtime API that supports enumeration, querying and updating of resources.

Logical resource driver model and API for binding resource drivers to physical hardware devices.

Programmatic allocation and de-allocation of server resources.

Automatic configuration and management of network resources such as VLANs and load balancing groups.

Dynamic configuration and management of block and file-based storage resources.

Failure detection monitoring and notification.

Resource Management Components

Resource Managers are responsible for allocation of hardware and software resources inside the BIG Computer
  Resource managers register with the BIG runtime
  Resource managers are essentially factories for a given resource type Hardware Resource Manager
  Base level factory responsible for allocating hardware instances Network Resource Manager
  Responsible for allocating VLANs, Load balancing groups, IP addresses, . . .

Storage Resource Manager
  Manages storage resources such as disks and files

PC Resource Manager
  Allocates target servers and deploys OS using iBIG services Software Resource Managers
  Allocates and configures IIS vroots, SQL databases, ASP .NET, . . .

Figure 90:
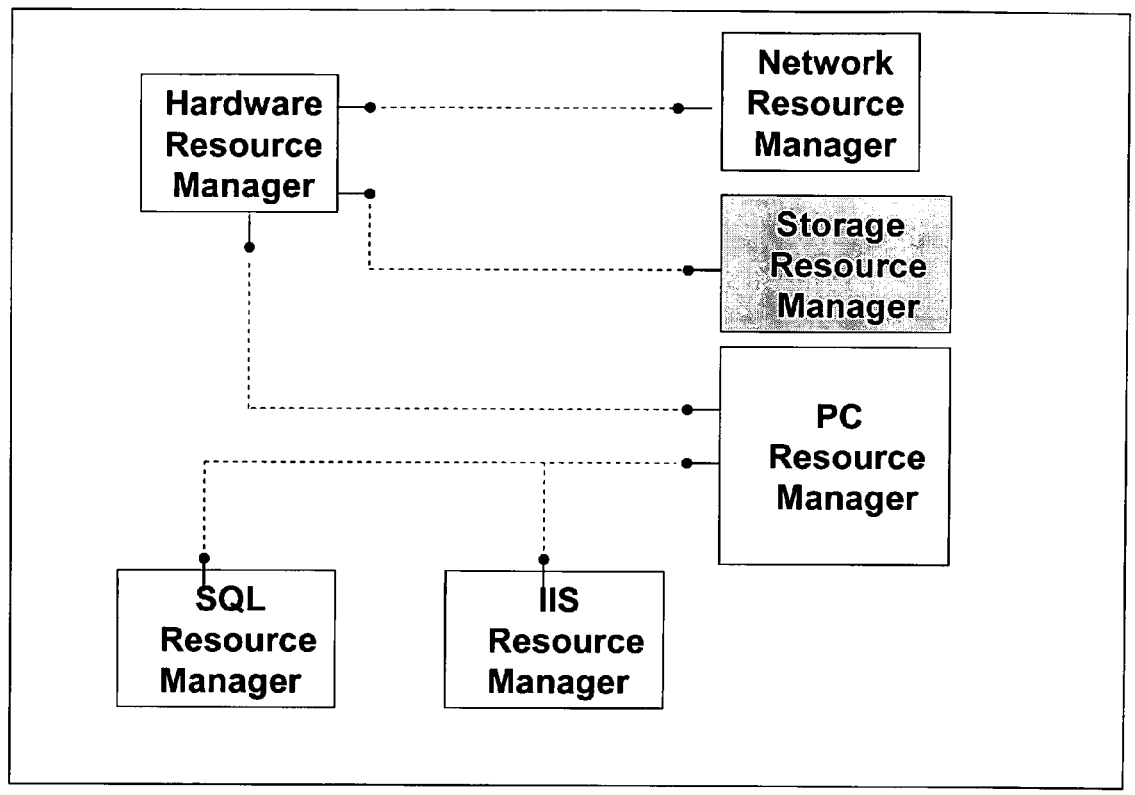
FIG. 90 illustrates various resource management components.
Figure 91:
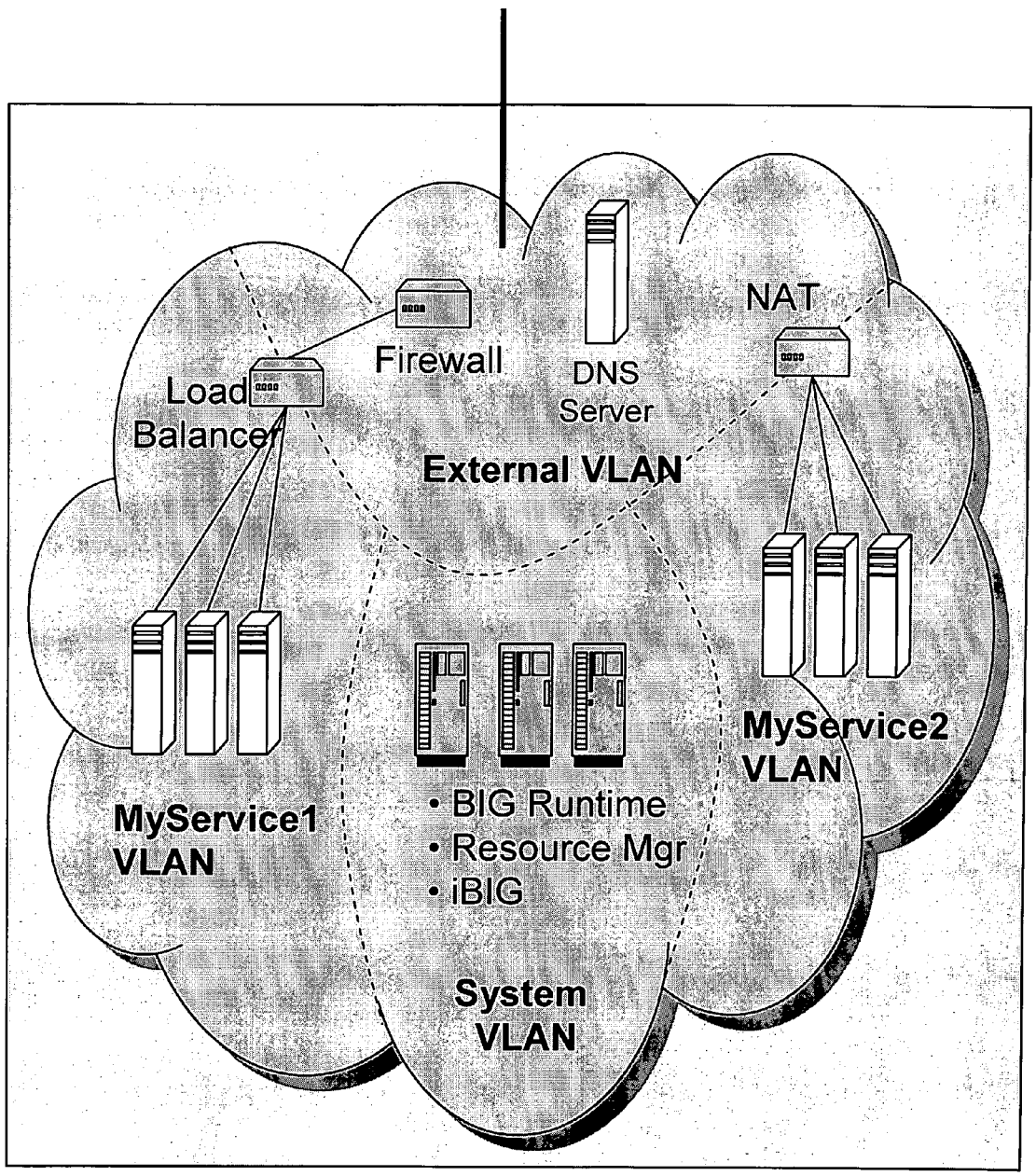
FIG. 91 illustrates an example arrangement of multiple LANs.

FIG. 90 illustrates various resource management components.

Hardware Resource Discovery and Management
  Properties: Power, Network, Storage, Processor, Memory, Location Hardware inside BIG Computer is automatically discovered. Resource drivers are bound to hardware devices and expose logical resources to Hardware Resource Manager (HRM). HRM translates a logical resource allocation request to a physical resource binding. See FIGS. 63, 64, and 65.

Network Resource Management within the BIG Computer
  BIG Computer defines an abstraction layer for network resources.
  Network Resource Manager: allocates network resources and programs the network switches and load balancers inside the BIG Computer, and interfaces with the network resource drivers.
  VLANs provide isolation and partition the network inside the BIG Computer. Network resource examples: VLANs, Load Balancing Groups, Network Filters, IP addresses, DNS names.

BIG Storage Resource Management Requirements

Global view of storage connected to the BIG Computer that encompasses file and block-based storage resources.

Virtualization of the storage interconnect fabric.

Framework for creating and managing higher level storage abstractions such as LUNs, volumes, arrays, etc.

A driver/provider model to allow existing and new storage devices to plug into a BIG Computer.

Interoperability with SAN systems.

Infrastructure Services (Automated Deployment Services (ADS))—Features

Base Deployment Services
  Basic Network Boot Service (PXE) and Image Builder Service
  Pre-boot OS environment (BMonitor)
  Virtual floppy delivered over network for legacy tools support Image Deployment and Management
  Tools for creating, editing and deleting images
  Deployment of images to systems running pre-OS Multiple Device Management (MDM)
  Scripts for common tasks
  Task sequencing to coordinate multiple steps and processes for deployment
  Full programmatic interface (WMI)

Figure 92:
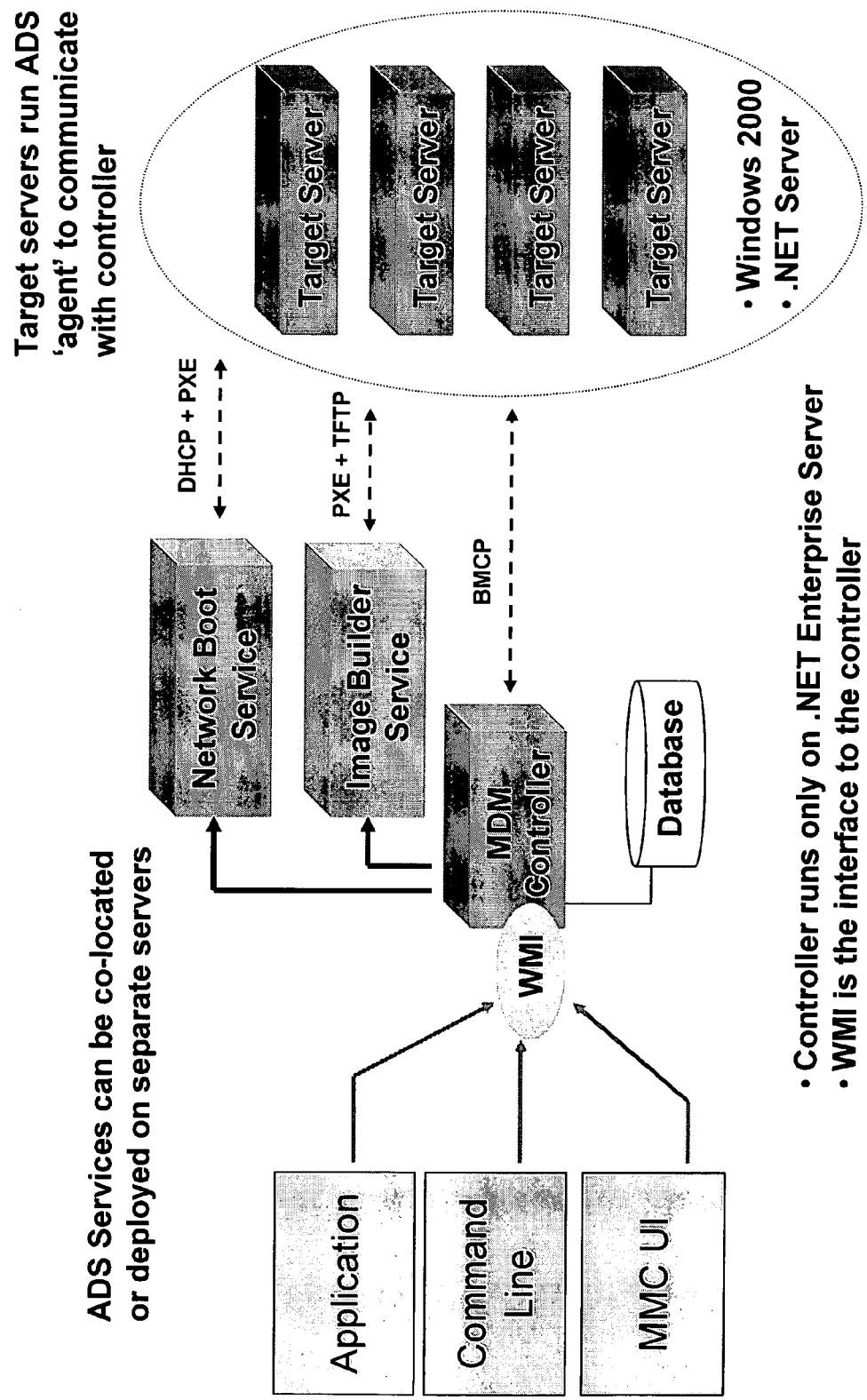
FIG. 92 illustrates an example ADS architecture.
Figure 93:
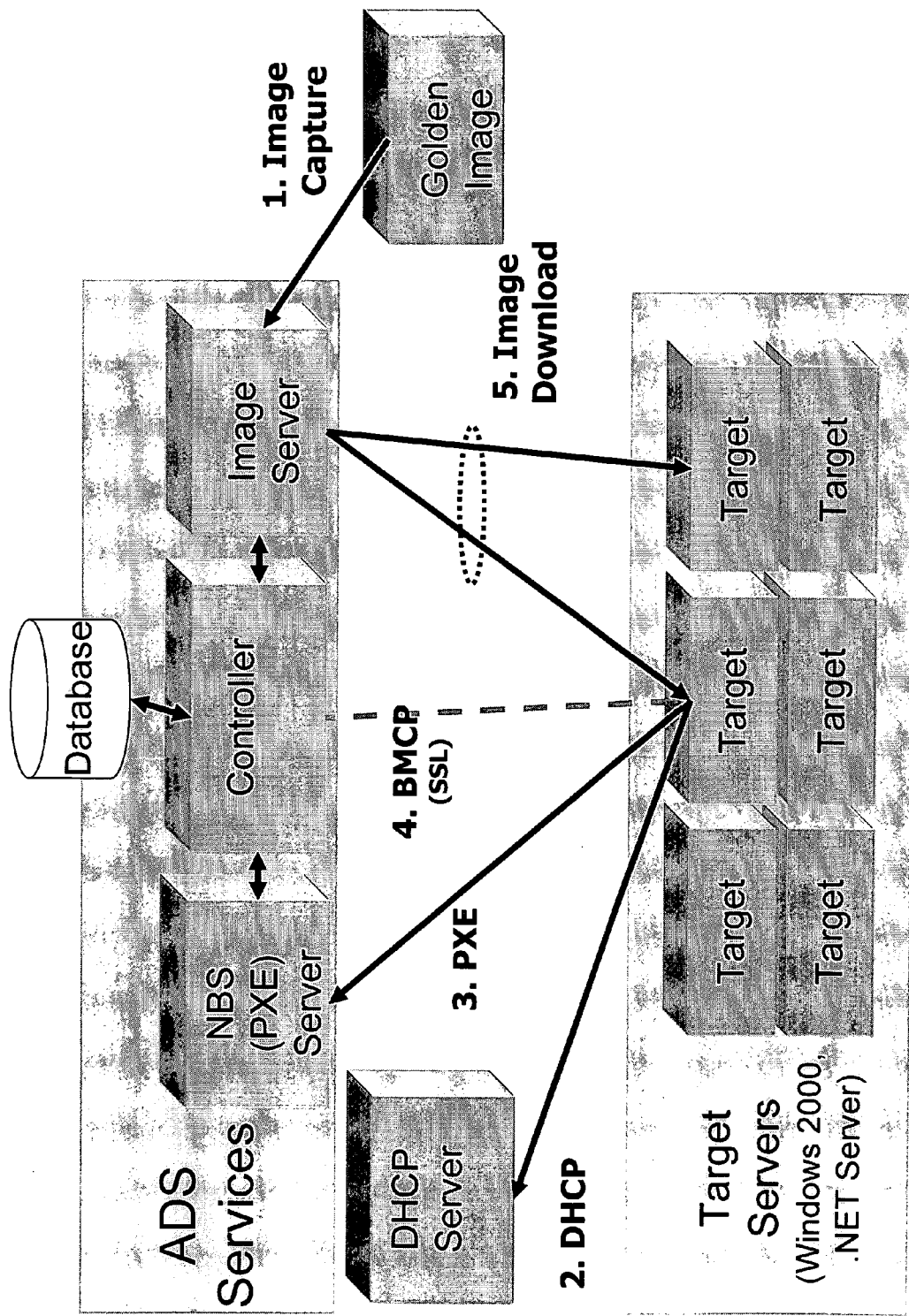
FIG. 93 illustrates an example ADS remote boot and imaging system.

Ships 60 days from .NET ServerRTM
  Supports Windows 2000 and .NET Server targets
  FIG. 92 illustrates an example ADS Architecture.
  FIG. 93 illustrates an example ADS Remote Boot and Imaging system.

Service Definition Model (SDM)

Figure 94:
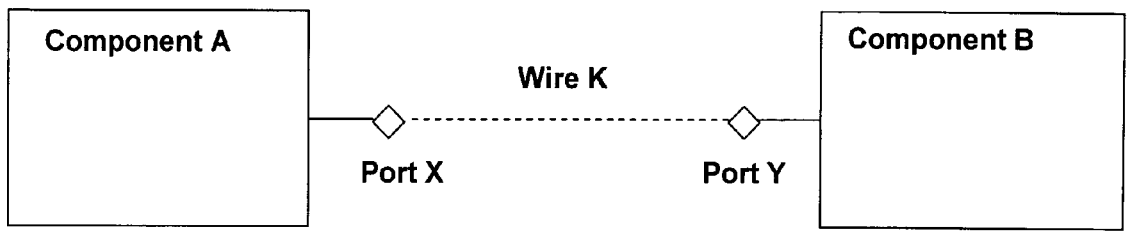
FIG. 94 illustrates an example topology arrangement.

The programmatic description of the entire service
  Declarative definition of the service
    Defines the overall service structure of the service in a scale-invariant manner
    Provides a framework for deployment, management, and operations
  Component-based model captures in a modular fashion the elements of a service SDML is the declarative language for defining Service Definition Models
  Components, ports and wires
  Type, member and instance space
  Supports composition and encapsulation SDM: Components, Ports and Wires Components are units of implementation, deployment and operations
  For example, dedicated server running .NET Server, IS virtual web site, SQL database
  Expose functionality through ports and communicate through wires
  Compound components created by composition Ports are names (service access points) with an associated type (protocol)
  BIG does not mandate what protocols to use for communication
  Protocols capture the information required for establishing communication Wires are the permissible bindings between ports
  Wires declare a topological relationship between ports See FIG. 94.

Figure 28:
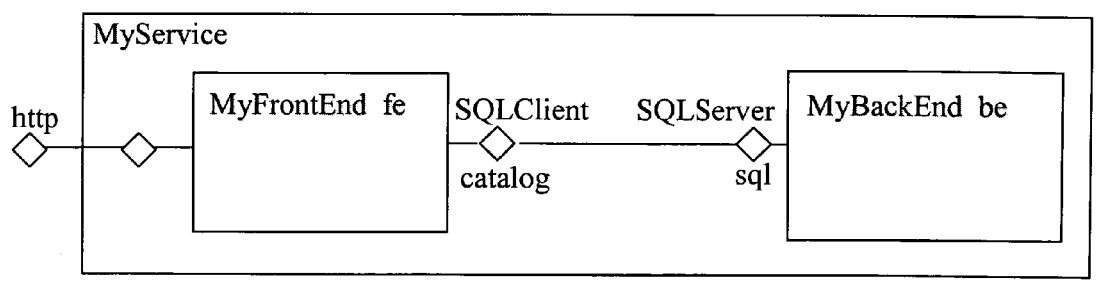
FIG. 28 illustrates an example graphical representation of a service.

FIG. 95 illustrates an SDML example: MyService.sdml. FIG. 28 is also related to this SDML example.

Figure 96:
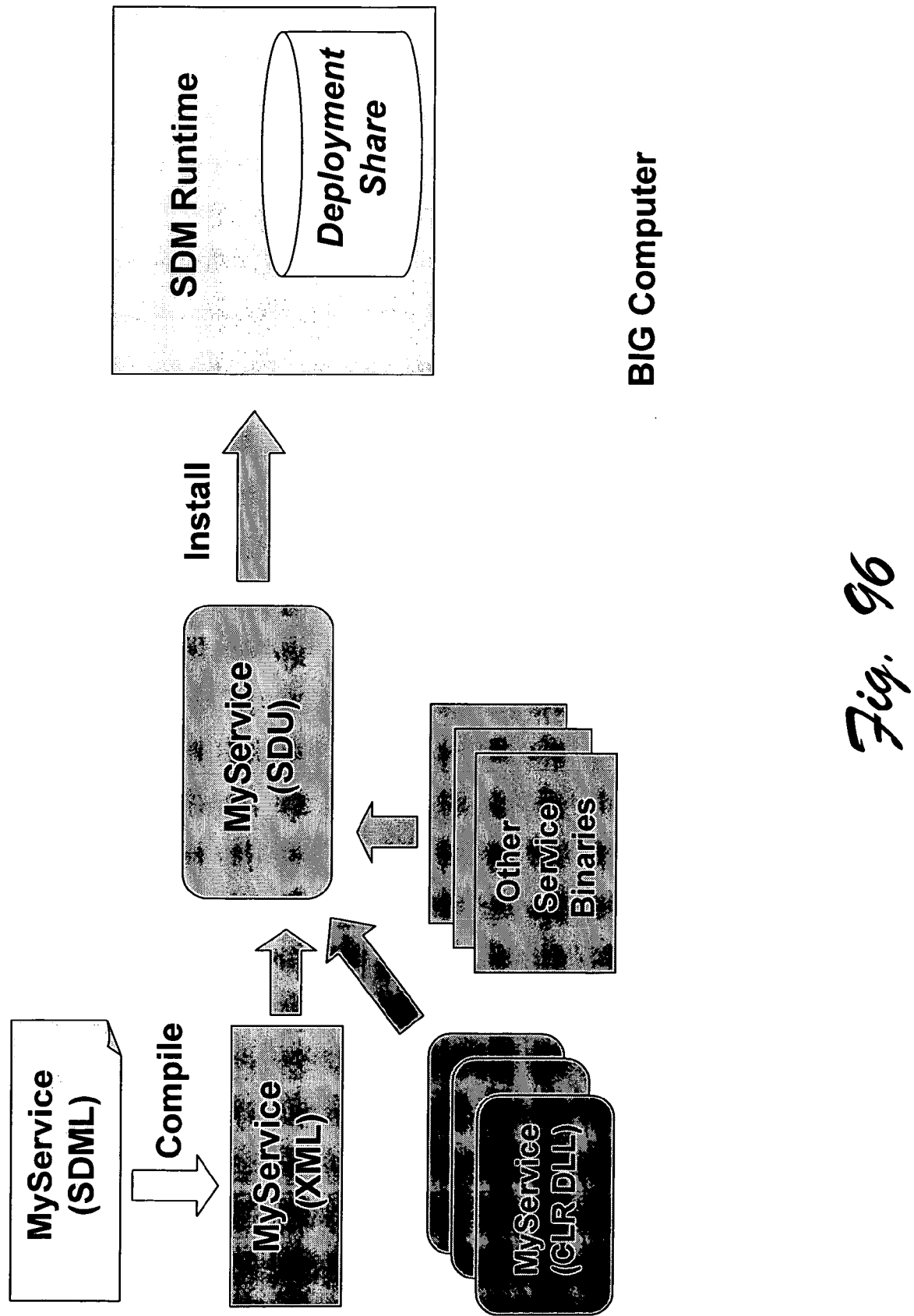
FIG. 96 illustrates an example collection of data in a SDU.

Service Deployment Unit (SDU)—Encapsulates all the pieces that make up a service, including: SDM model for the application/service, CLR assemblies for component implementations, and MSI, ASP.NET, SQL scripts, Static content, etc. See FIG. 96.

SDM Runtime
SDM Runtime is responsible for tracking SDM models and instances
  Implemented as a Web Service hosted by IIS
  Can be partitioned for scalability
Runtime API exposes SOAP endpoints
  Communication with runtime is done through a runtime library
Highly available SDM Store (using Yukon's redundant database technology)
  Two SQL servers and a witness server
See FIG. 27.
Example: Component Instantiation Using Microsoft.SDM;

```
public class MyService:
        SDMComponent
{
  public OnCreate(...) {
  fe1 = CreateInstance("fe", "");
  be1 = CreateInstance("be", "");
  w1 = CreateWireInstance("tds");
  w1.Members.Add(fe1.Ports["catalog"]);
  w1.Members.Add(be1.Ports["sql"]);
    }
  }
myservice.cs is C# code that uses the SDM API.
  componenttype MyService
  {
        component MyFrontEnd fe;
        component MyBackEnd be;
        port http = fe.http;
        wire TDS tds {
            fe.catalog;
            be.sql;
        }
        implementation "MyService, MyCLRApp"
  }
```

Figure 35:
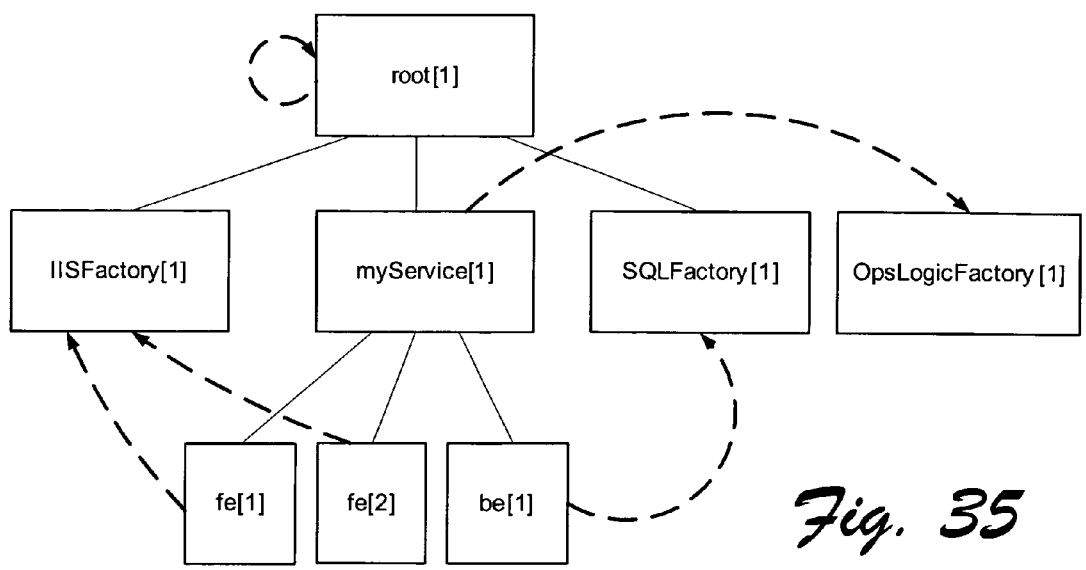
FIG. 35 illustrates example of tracking creation of component instances.
Figure 97:
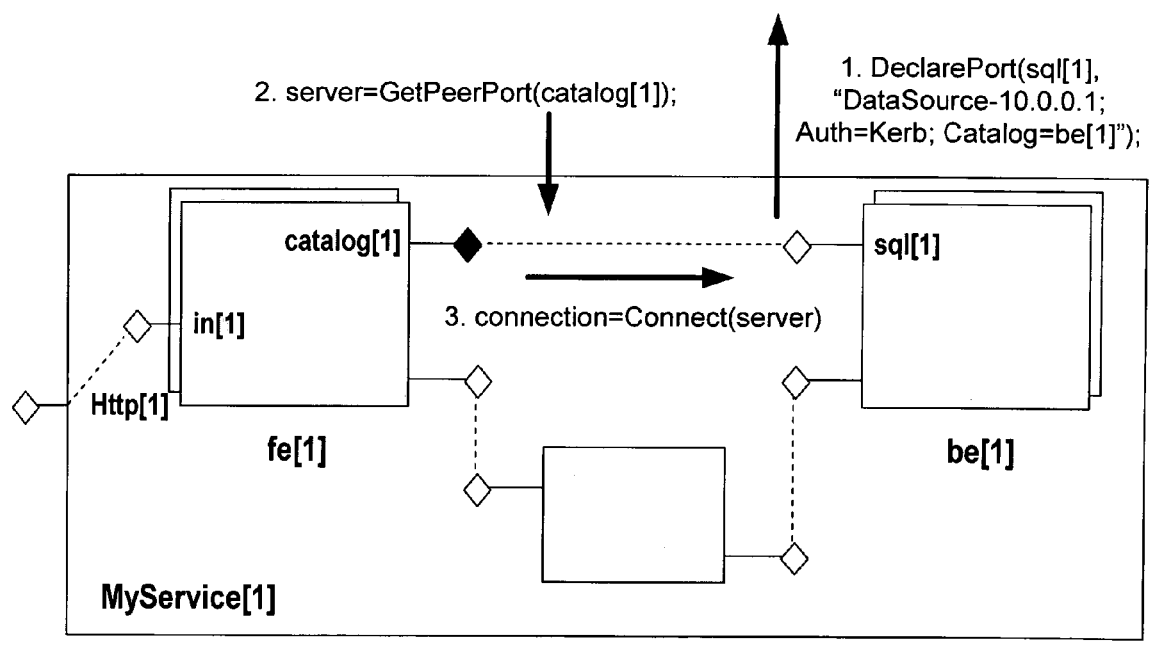
FIG. 97 illustrates an example of dynamic binding using SDM runtime APIs.

See FIG. 35.
Example of Dynamic Binding Using SDM Runtime APIs (See FIG. 97)
  1. be[1] declares that sql[1] port is ready and registers its port connection information with the SDM Runtime using DeclarePort( )
  2. fe[1] initializes and asks the SDM Runtime for peer information for catalog[1] port and receives information about sql[1] port using GetPeerPort( ) 3. fe[1] then connects to be[1] using the port connection information provided dynamically by the SDM Runtime Service Definition Model (SDM) Workgroup
SDM Workgroup is comprised of 5 teams
  Indigo
  Whitehorse
  Fusion
  Management
  BIG
Charter was to define a class-level application schema for distributed and/or heterogeneous applications
  Describes applications using components, ports and wires
  Includes deployment, configuration and management information
SDM is an exoskeleton that references Fusion and Management (and potentially other) schemas
  Fusion assemblies are referenced for deployment (where applicable)
  MBU Settings and Instrumentation schema are referenced and specified for configuration and monitoring
SDM Schema (Simplified)

```
<sdm>
  <identity />           // identifies the group of definitions
  <porttypes />          // descriptions of ports
  <wiretypes />          // descriptions of topologies
  <componenttypes>       // set of components defined in this library
    <componenttype>
        <ports />        // communications capabilities
        <settings />     // configuration settings for component
        <instrumentation /> // monitoring schema
        <deployment />   // installer type, installer info, (e.g.,
                              Fusion)
        <components />   // subcomponents for composition
        <wires />        // defines relationships between ports
    </componentType>
  </componenttypes>
</sdm>
```

Figure 98:
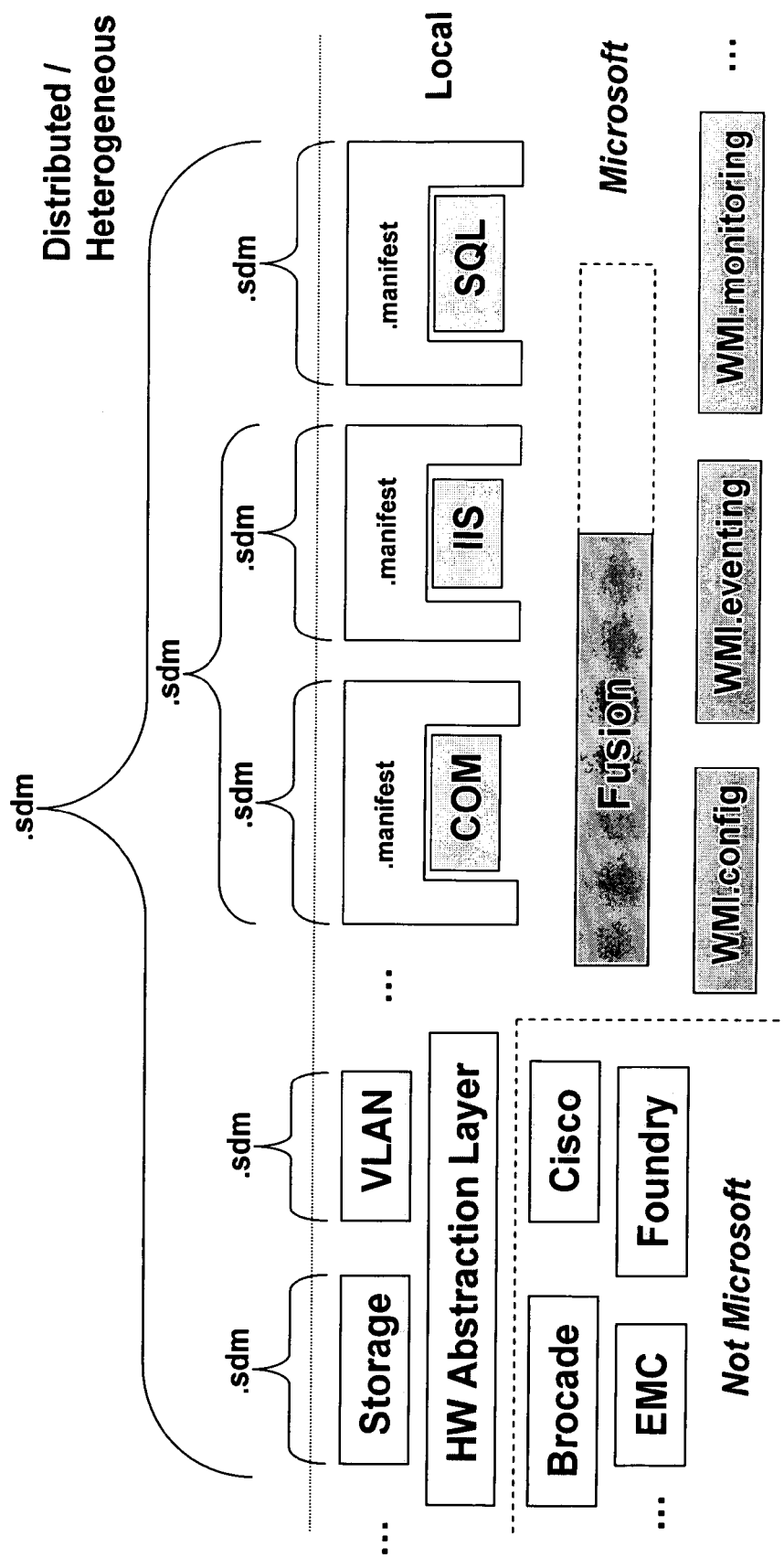
FIG. 98 illustrates an example SDM arrangement.
Figure 99:
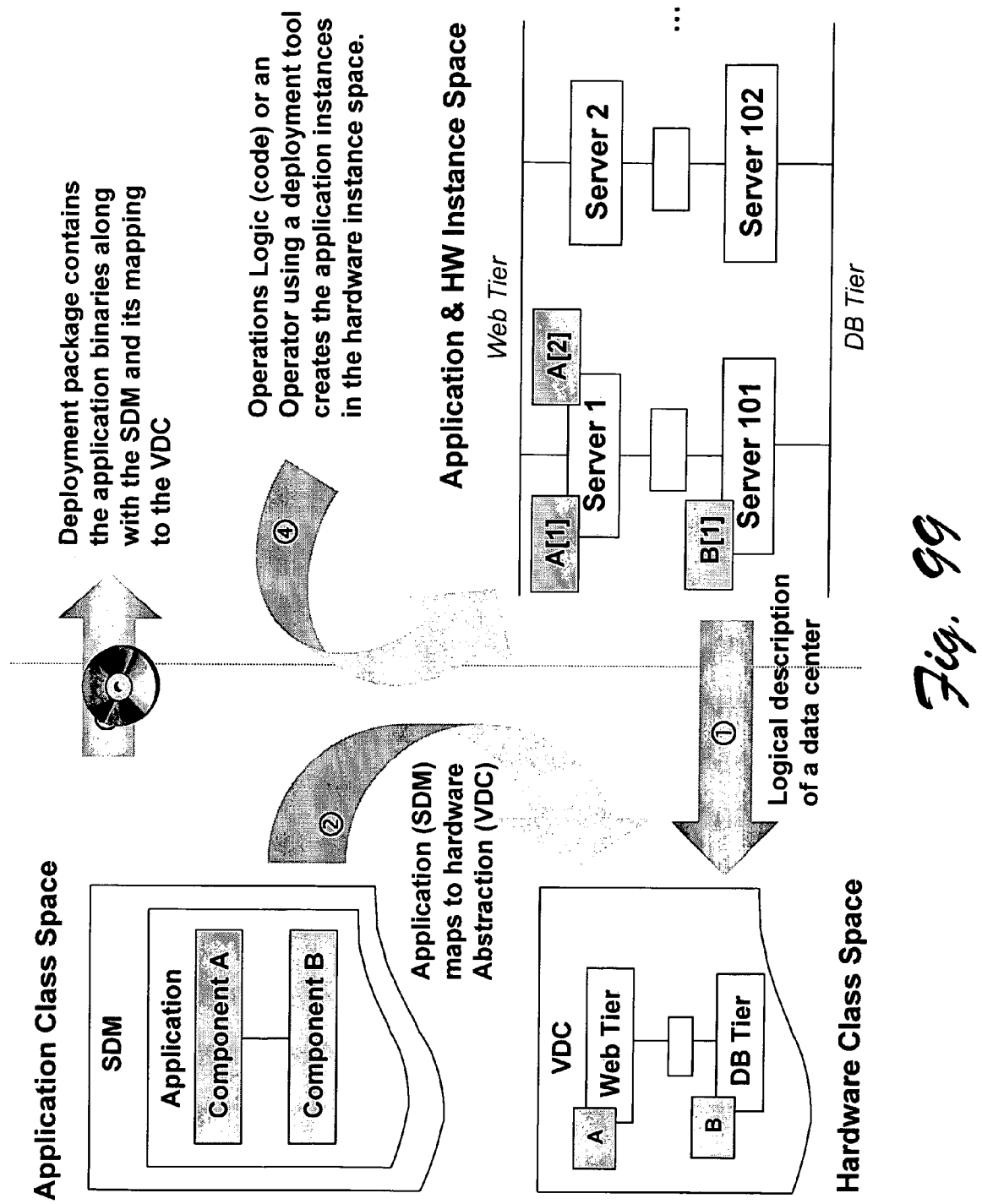
FIG. 99 illustrates an example deployment.
Figure 100:
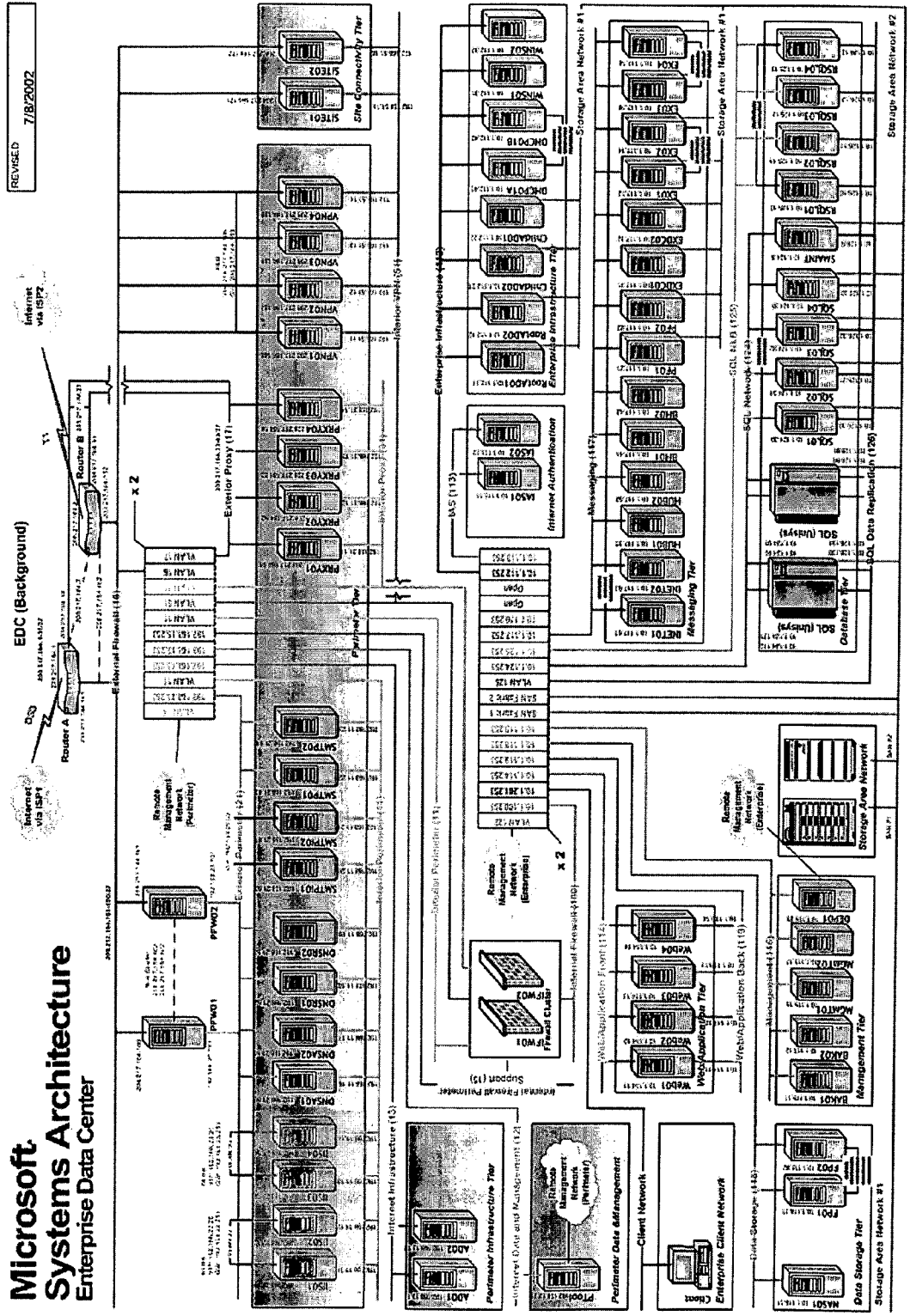
FIG. 100 illustrates an example system architecture.
Figure 101:
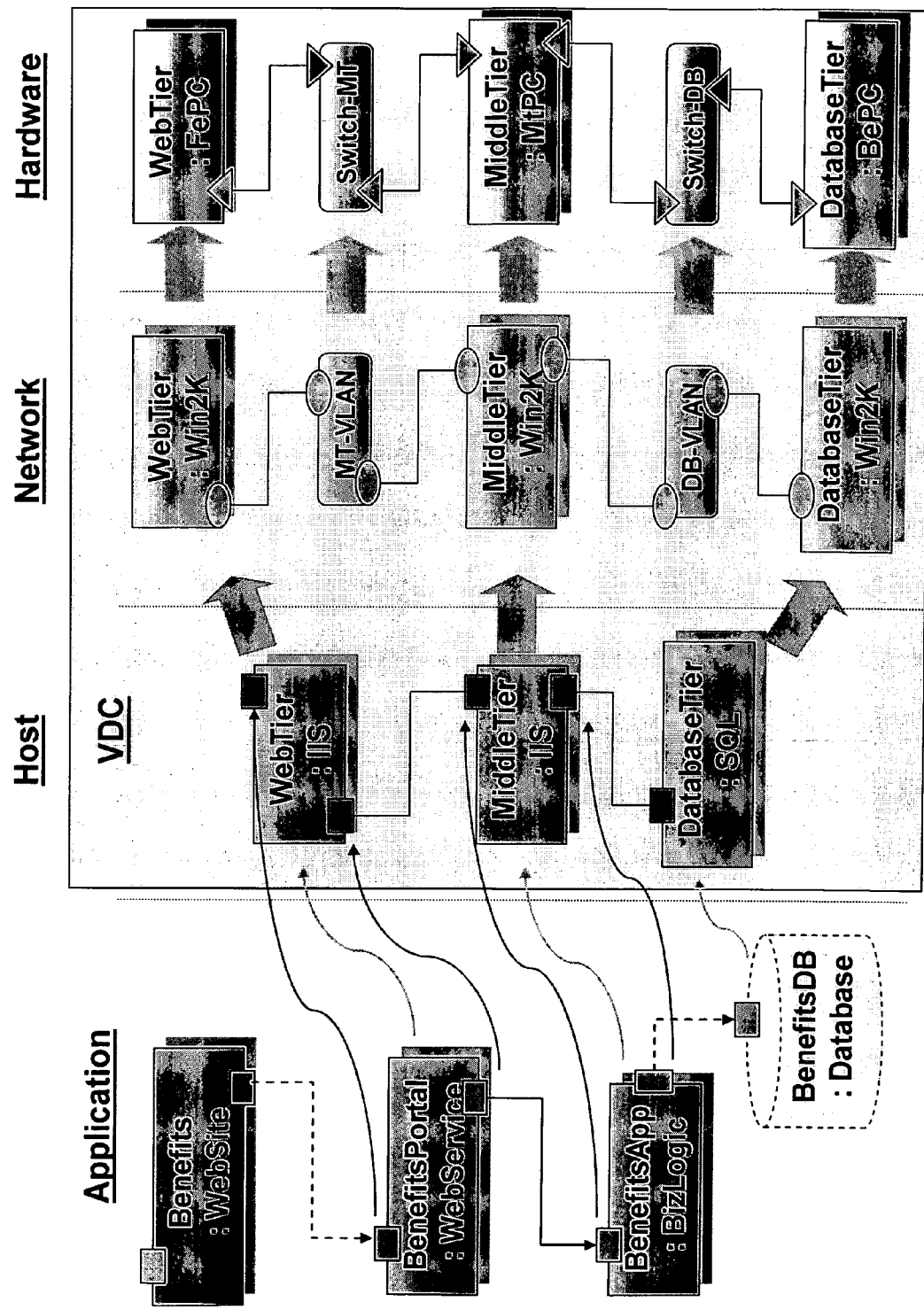
FIG. 101 illustrates an example of various deployment layers.
Figure 102:
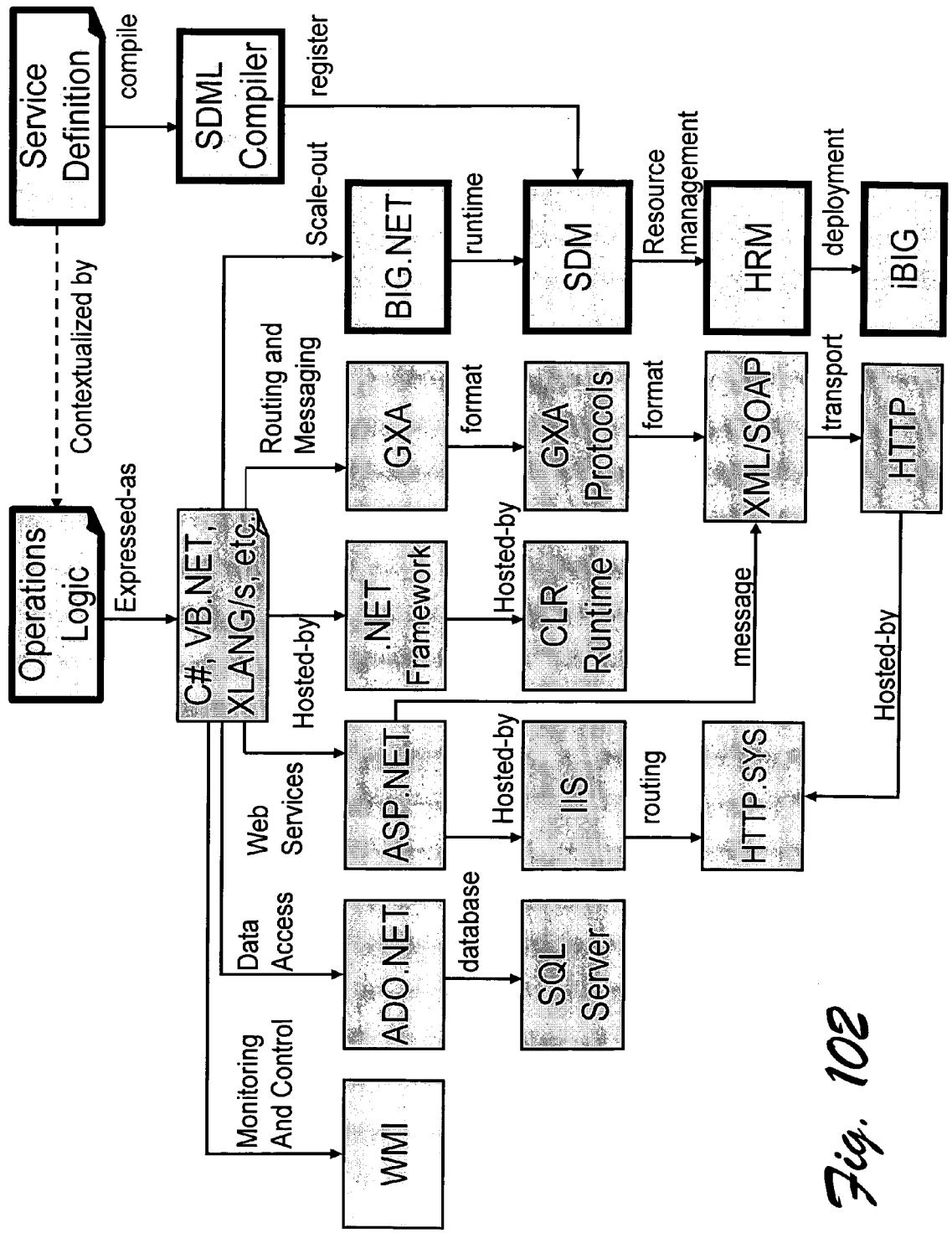
FIG. 102 illustrates example operations logic.

SDM and Fusion—See FIG. 98.
Local settings with default values are specified in the Fusion Manifest (or other local install technology).
Settings in an SDM are processed by Ops Logic and the BIG runtime.
  Example: "number of users" would be used to determine the initial scale-out condition of the application SDM and Deployment—See FIG. 99.
  Describing the structure of an application in a scale-invariant manner requires a similar scale-invariant description of the application host environment (i.e., data center) to enable design-time validation of deployment requirements and constraints.
    Microsoft and customers expend lots of energy drawing elaborate descriptions of their data center environments and writing very large documents to explain the drawings.
    These drawings and documents merge many layers of information from physical machine names to IP addresses to VLANs to server roles into one comprehensive view that is often confusing.
    FIG. 100 illustrates an example system architecture.
    FIG. 101 illustrates an example of various deployment layers.
    Operations Logic is the "Business Logic" of Operations
    Operations Logic is CLR code that captures repeatable patterns encoded as reusable best practices
    Not specific to a service or operating environment
    Can be developed, tested and shipped
    Reduces the need for manual procedures that require people to execute them
    OpsLogic is responsible for the overall operation of a service
    Starting up a service
    Service growth and shrinkage
    Upgrades and updates
    Fault detection and recovery
    Database partitioning
    OpsLogic will be implemented using MS middle-tier technologies
      ASP.NET web services hosted on IIS
      DTC for transaction coordination
      SQL server for storage
      WMI for monitoring and management
      MSMQ for messaging Repeatable Upgrade Patterns→Operations Logic
Upgrade is an example of the type of reusable Operations Logic template we want to ship with BIG
In-place Upgrade Pattern
   Cost of moving data is high, code instantiation cost is low, or no spare resources
   Takes component out of service, runs update, put it back in service
Side-by-side Upgrade Pattern
   Cost of moving data is low, code instantiation cost is high, have spare resources
   Create new component; Take old component out of service; Migrate data to new component; Put new component into service
Replacement Upgrade Pattern
   No data migration
   Add new components; remove old ones; coordinate to maintain service availability
Rolling Upgrade is an example of higher-level operations logic that can reuse the codified upgrade patterns
   Operations logic can be tested and the framework supports rollback
   Removes human error from execution by letting software perform the steps Operations Logic, BIG and the Microsoft Programming Model—See FIG. 102.

The Internet transforms enterprise applications—Increased exposure has resulted in increased costs. See FIG. 103. New architecture has led to an increase in costs driven by HW, people and a decrease in agility due to complexity. See FIG. 104. Moore's Law is spreading across the DC—dramatic increase in disk density, NW throughput and processing power.

Figure 105:
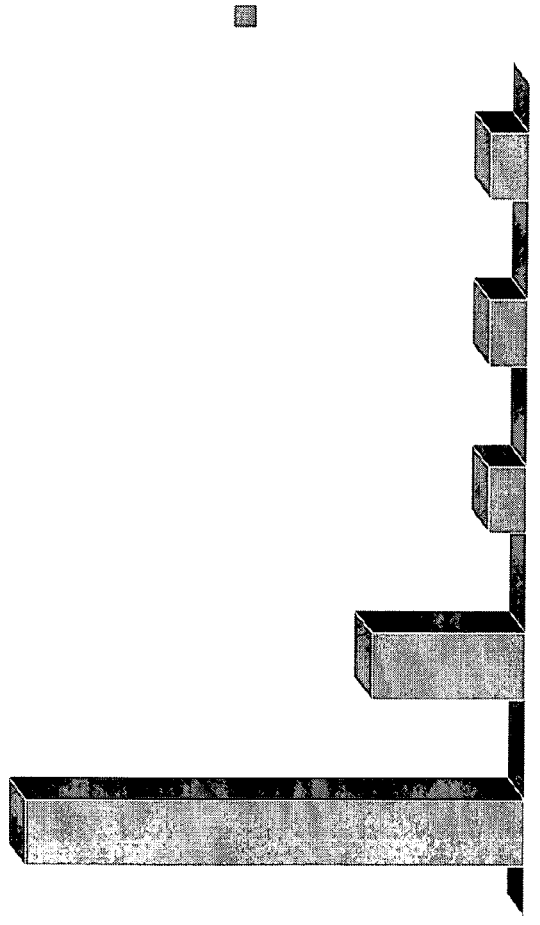

Service delivery is people intensive—human involvement impacts security, reliability, flexibility and cost. See FIG. 105.

Figure 106:
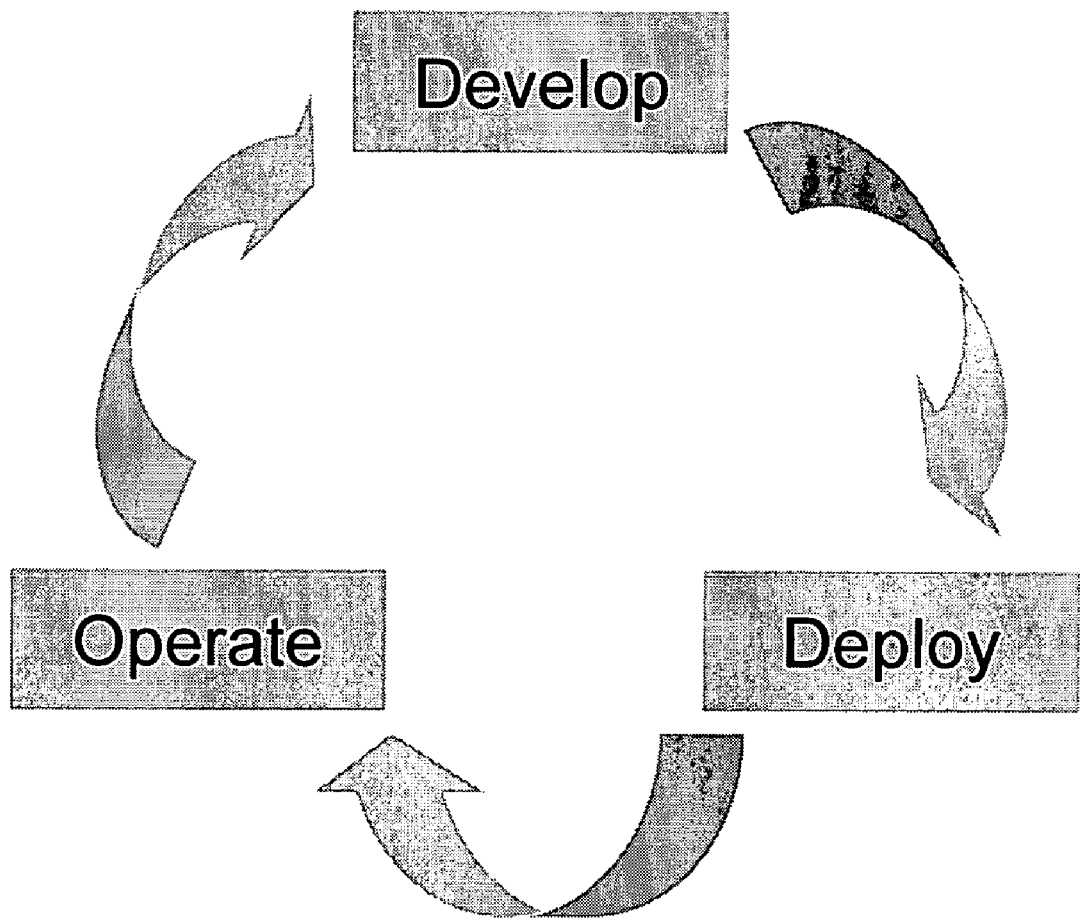
FIG. 106 illustrates an example application lifecycle.

This is a lifecycle problem—customer pain spans develop, deploy, and operate phases. See FIG. 106. Applications are not developed with: scale in mind-tied to HW configurations, manageability in mind, operations in mind—what are the requirements in my data center? Test—"Thrown over the wall". Developer desktop→test configuration? How does this map to my production environment. Deployment challenges: Which servers do I use? What is the right topology? Have I checked with the server, storage and networking teams? How much future demand do I need to anticipate? Operational challenges: What do I do with all of these alerts? How will that failing NIC affect my application? Why is the performance of my service degrading? I wish I could clone my email admin.

Addressing the Service Delivery Challenges—Core Tenants of a Viable Solution for Customers.
   Independent value at each step of the lifecycle
   Develop, Deploy, Operate
   Unifying architecture for the entire lifecycle
   Improved coordination and feedback between steps
   Enable mapping to changing business needs
   Mapping can only be done once you have agility
   Built on lowest TCO platform
   Effectively leverage industry standard hardware through scale out
   Project Summit—A revolutionary service delivery architecture. See FIG. 106. Develop services that: are instrumented and manageable, include deployment requirements, encapsulate operations knowledge, and leverage standard building blocks. Easily deploy services: rapid provisioning, DC resource virtualization, self contained, one-click deploy, consistently from test to production, and independent of scale. Simplified operation: aggregated administration, monitoring and change management, manage services not applications, true automation via context, rich service-centric management console.

Map business needs to IT systems. Capture IT operational knowledge in the tools.

Figure 107:
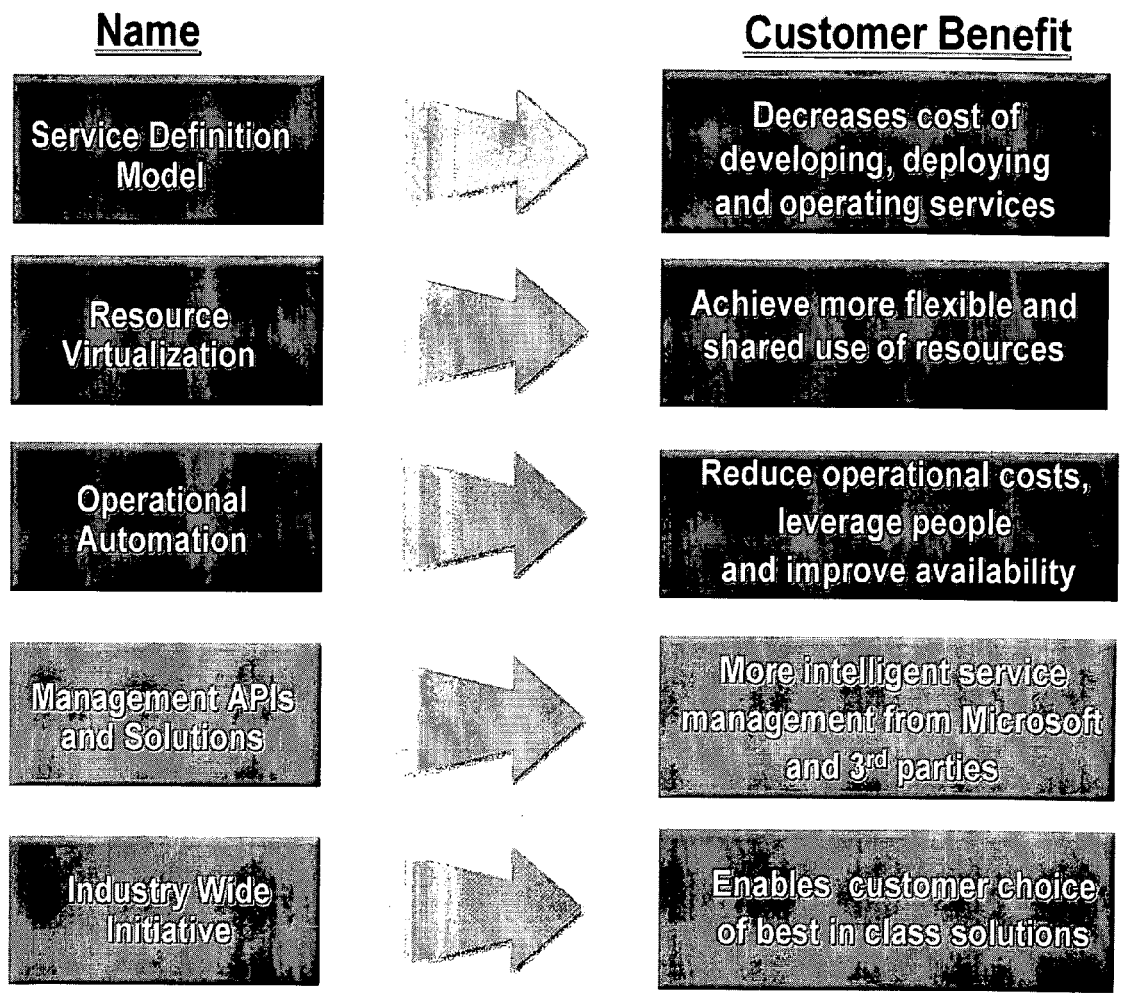
FIG. 107 illustrates example benefits of a new architecture.

Project Summit—a comprehensive new architecture and an industry wide initiative. See FIG. 107.

Figure 108:
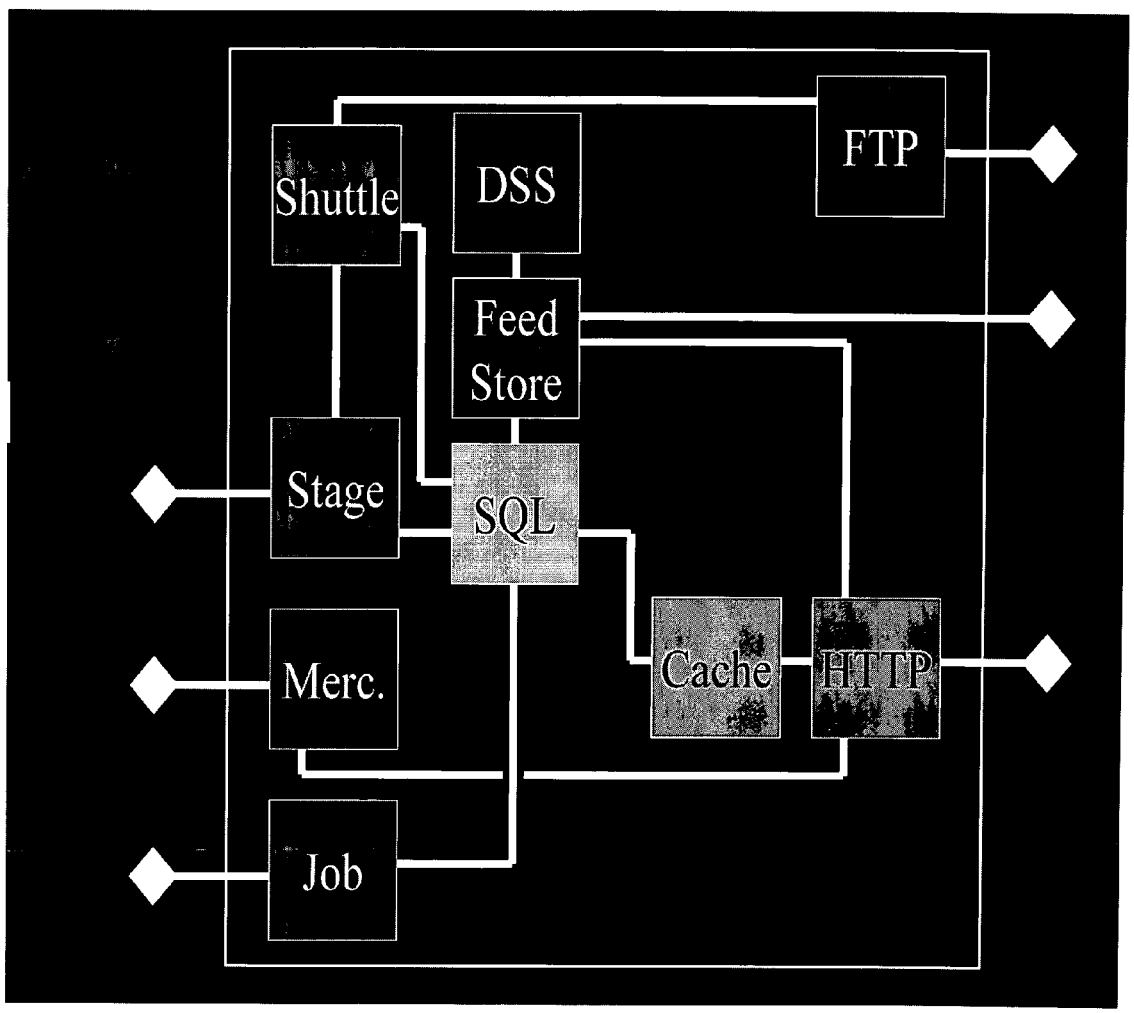
FIG. 108 illustrates an example of converting complex systems into simple diagrams.

Concept→Architecture→Product
A long term, customer and partner-driven effort.
   A major investment beginning in 1999
   Began with deep research into operational needs of large MS internet properties
   Validated initial finding across broad customer base
   Prototype from the product group in late 2000
   Strong set of joint development partners
   Large enterprise and service provider customers involved in product definition
   IHV and ISV partners consulted to help define functionality exposed via APIs
   Initial product shipping with Windows Server 2003
   Customers convert complex systems into simple diagrams. See FIG. 108.

Who is involved in delivering your IT Service?—Humans are an integral part of the system.
Application architect—designs the service.
Network architect—configures the network.
Storage architect—configures remote storage.
Application operator—maintains the service.
Network operator—maintains the network.
Storage operator—maintains remote storage.
Server operator—maintains the servers.
Problems with this model: many human interactions, no common language, blurring of domain knowledge.

Figure 110:
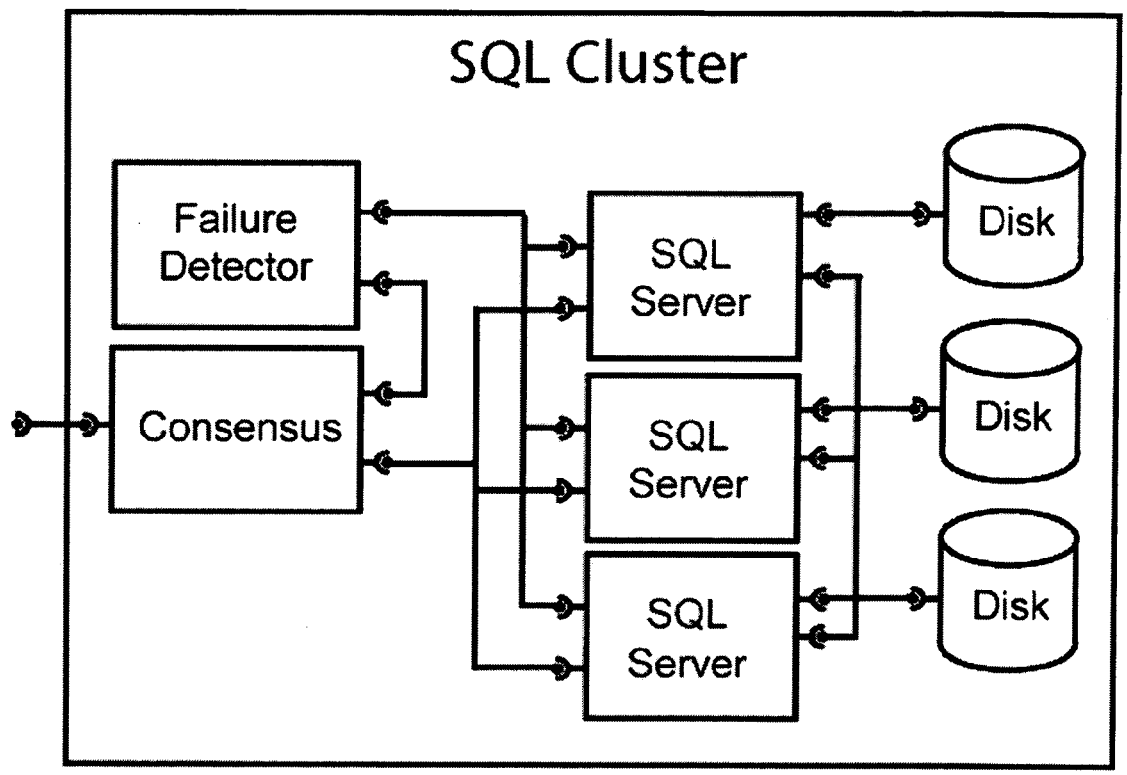
FIG. 110 illustrates an example SQL cluster.
Figure 111:
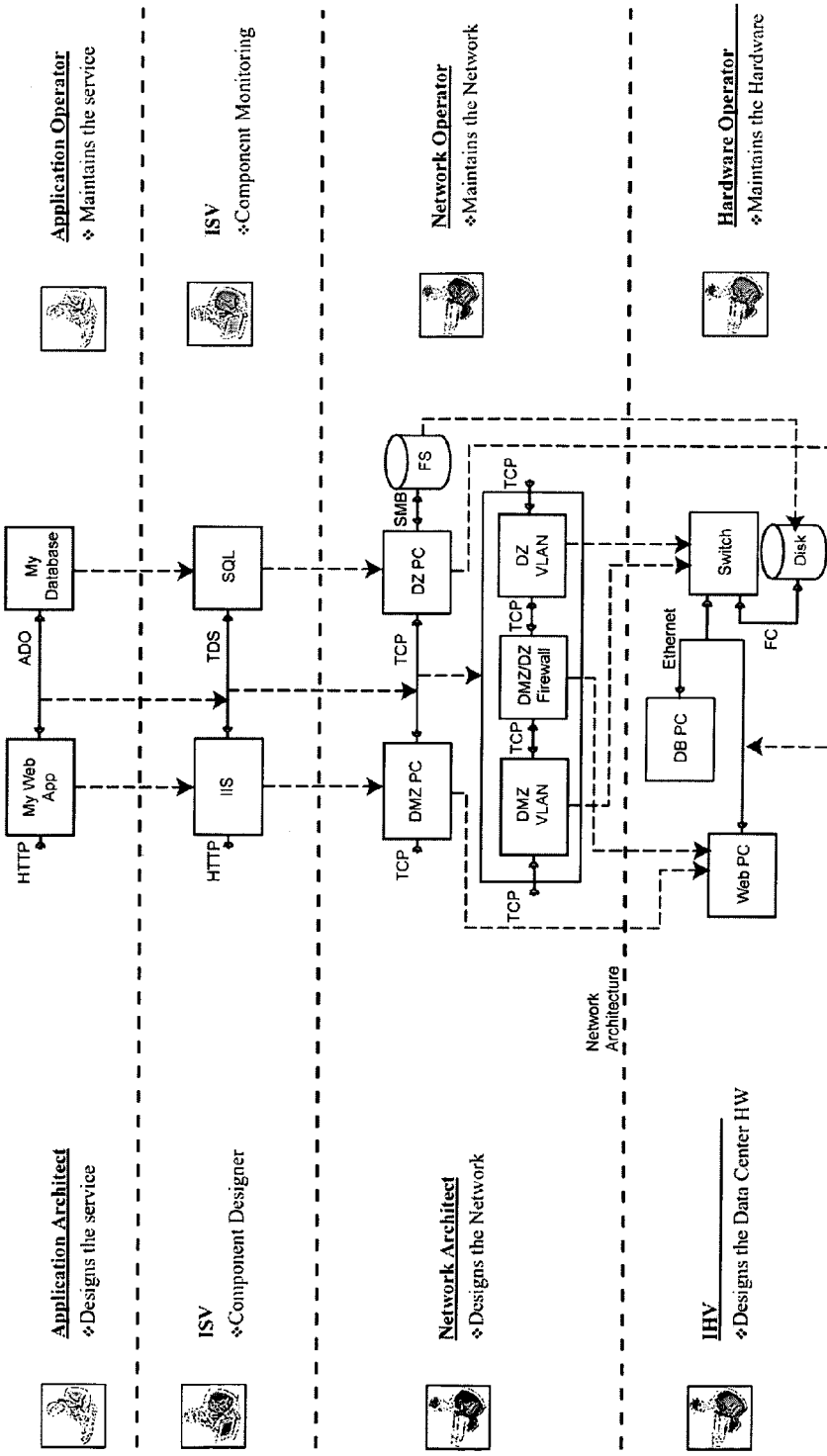
FIG. 111 illustrates an example SDM data center model.
Figure 112:
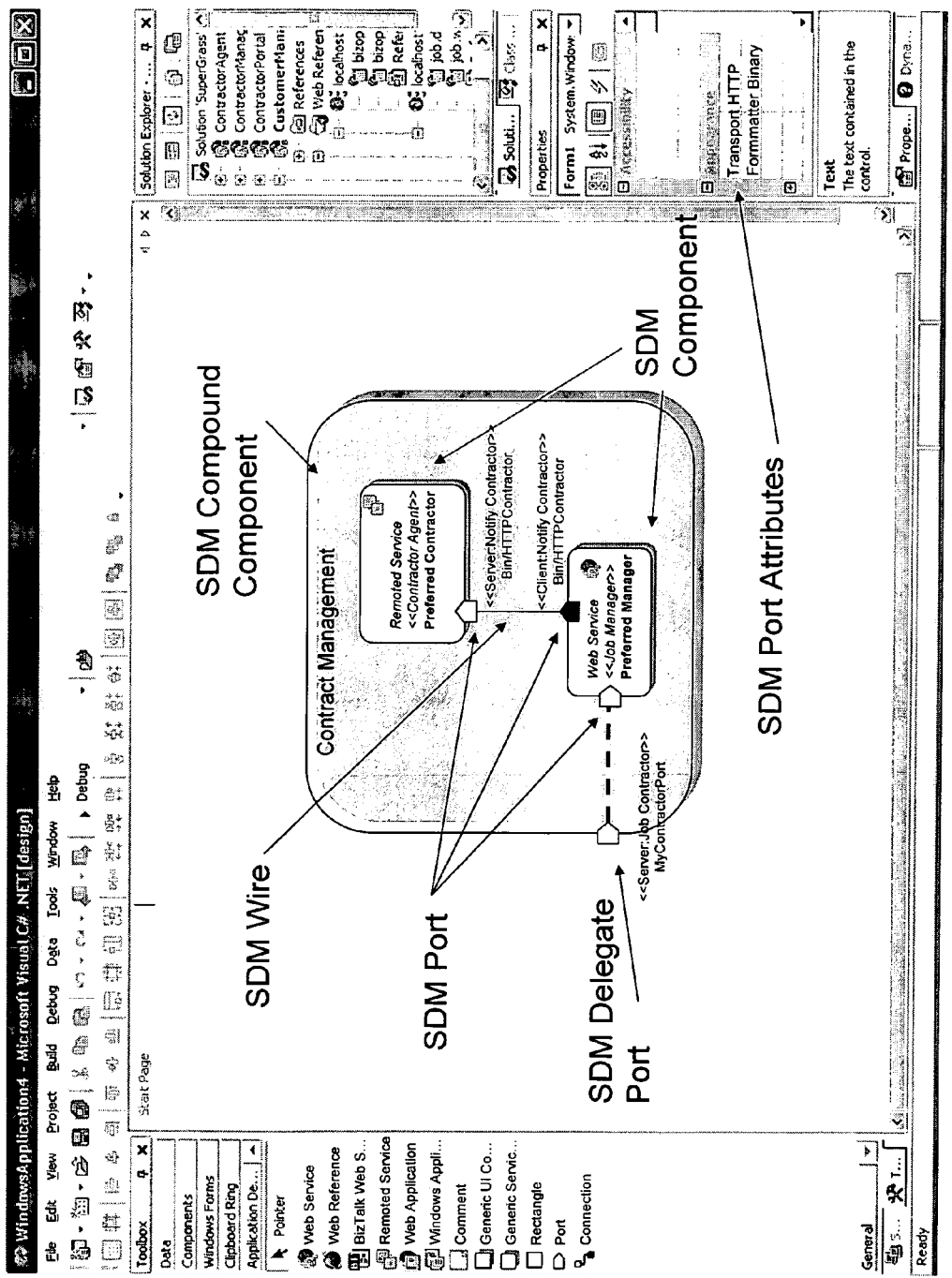
FIG. 112 illustrates an example design application surface.
Figure 113:
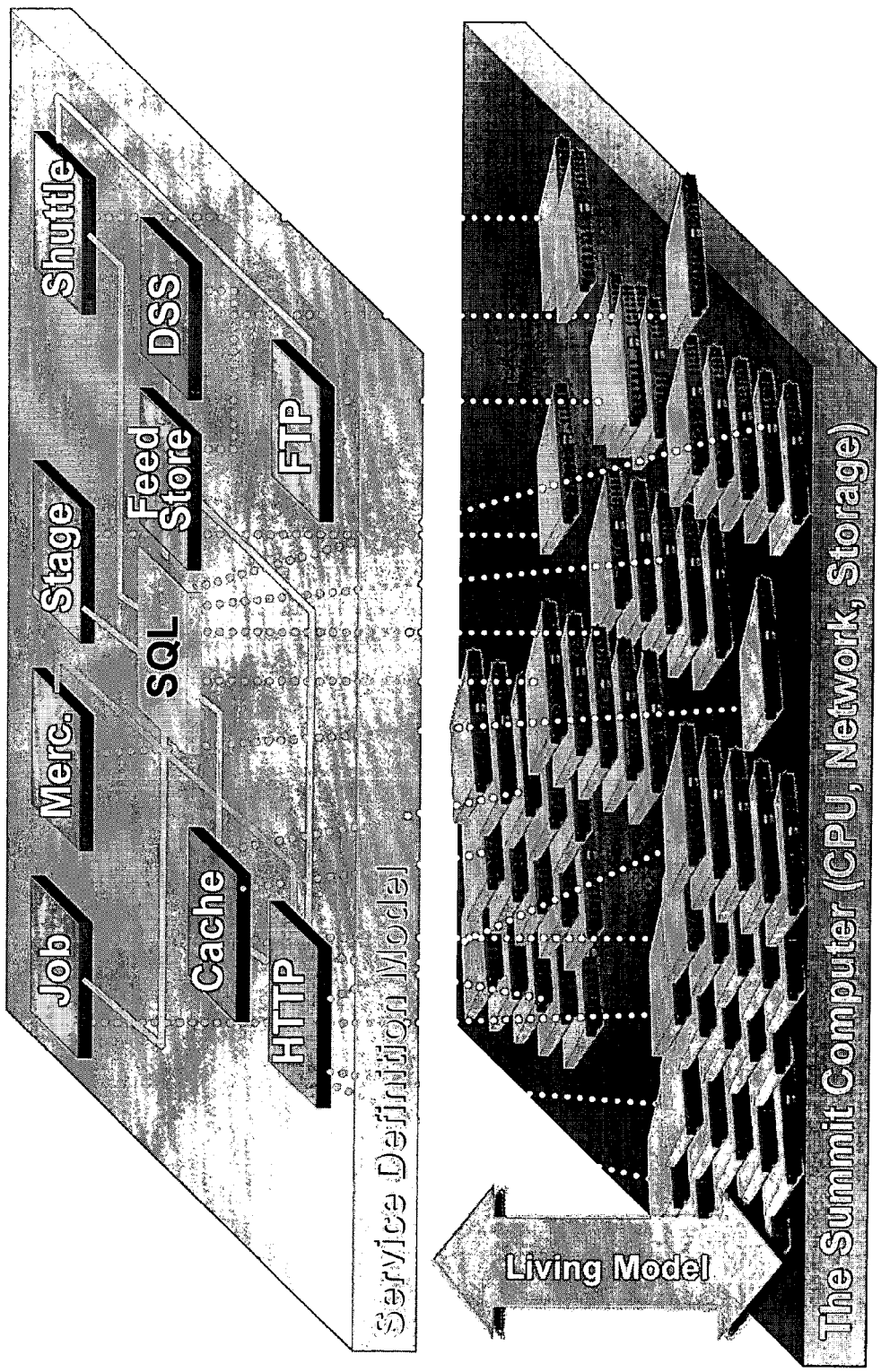
FIG. 113 illustrates an example SDM service in a data center.

Details of the Solution:
   Service Definition Model
   Resource Virtualization
   Operational Automation
   Management APIs and Solutions
   Driving an Industry wide initiative
The Service Definition Model (SDM)—capturing the complete service.
   Comprehensive description of a service
   Application components and instrumentation
   Service topology
   Underlying resources (server, storage, network)
   Relevant to developers and operators
   Layers and separates responsibility
   Provides a consistent frame of reference
   Exposed in Visual Studio for developers
   A living model at run time for operators
   Logically consistent ind. of allocated resources
   Tracks resources in real time
   The single authority on service composition
   Provides context for true automation SDM Terminology
Components—the building blocks of services.
   Logical construct
   Scale invariant
   One component may have multiple instances Simple or compound
Single logical entities (database, web service, file partition)
Combined logical entities (HA database, email, etc. . . . )
Include a deployment manifest specific to the component
DB component includes the database schema
Web service component includes URL directory, content, code
Interconnected with ports and wires
Ports—service access point
Wires—communication relationship between ports
SDM provides the means for abstraction and encapsulation. See FIG. 110.
Enables reuse
Structures complexity
Mapping people to the SDM—provides a consistent frame of reference. See FIG. 111.
Developing an SDM application—a new Visual Studio design surface. See FIG. 112. Legacy apps, New apps.
An SDM service in the data center—comprehensive description with living model tracking resources. See FIG. 113.

Figure 114:
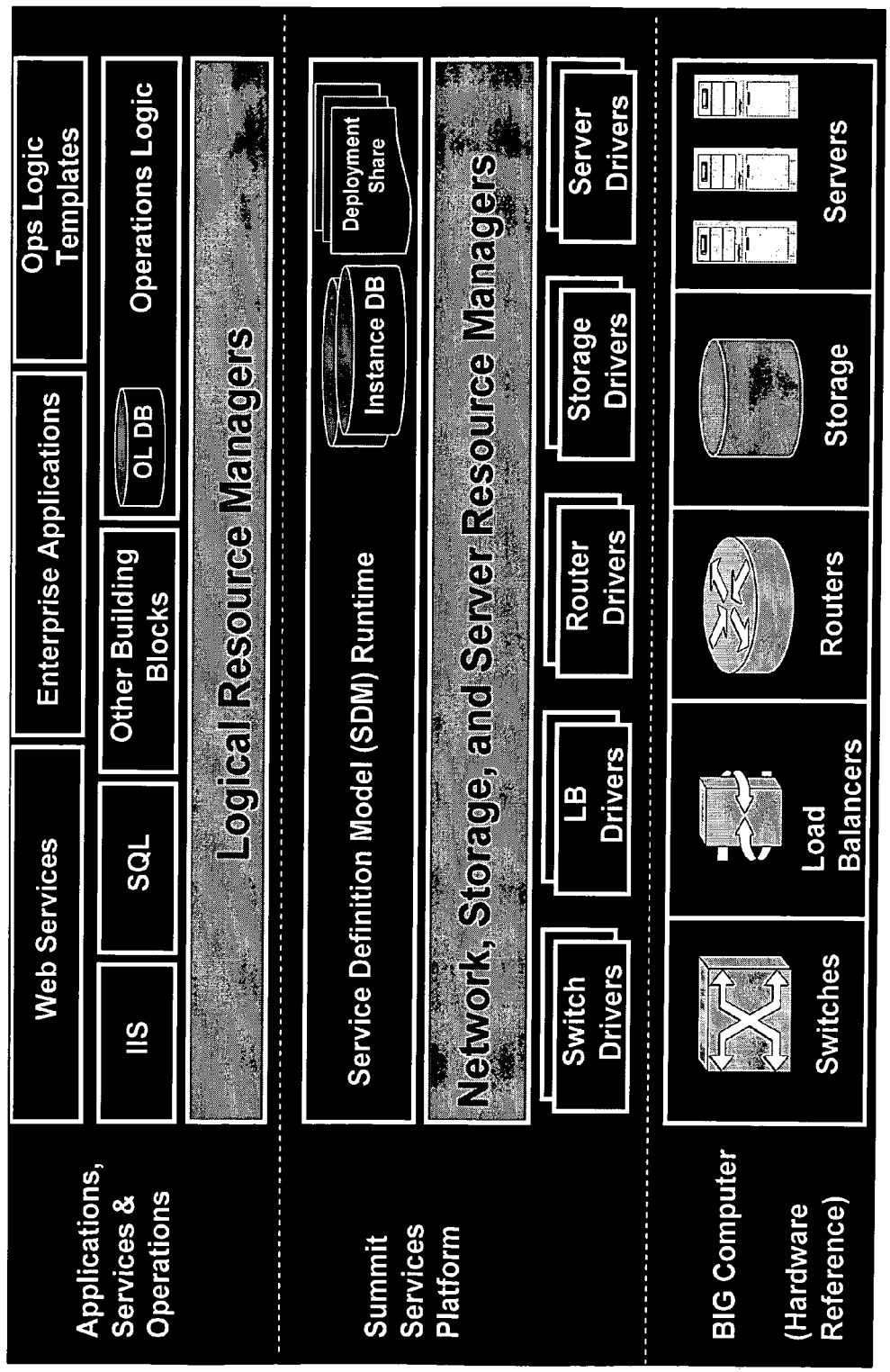
FIG. 114 illustrates example resource managers.
Figure 115:
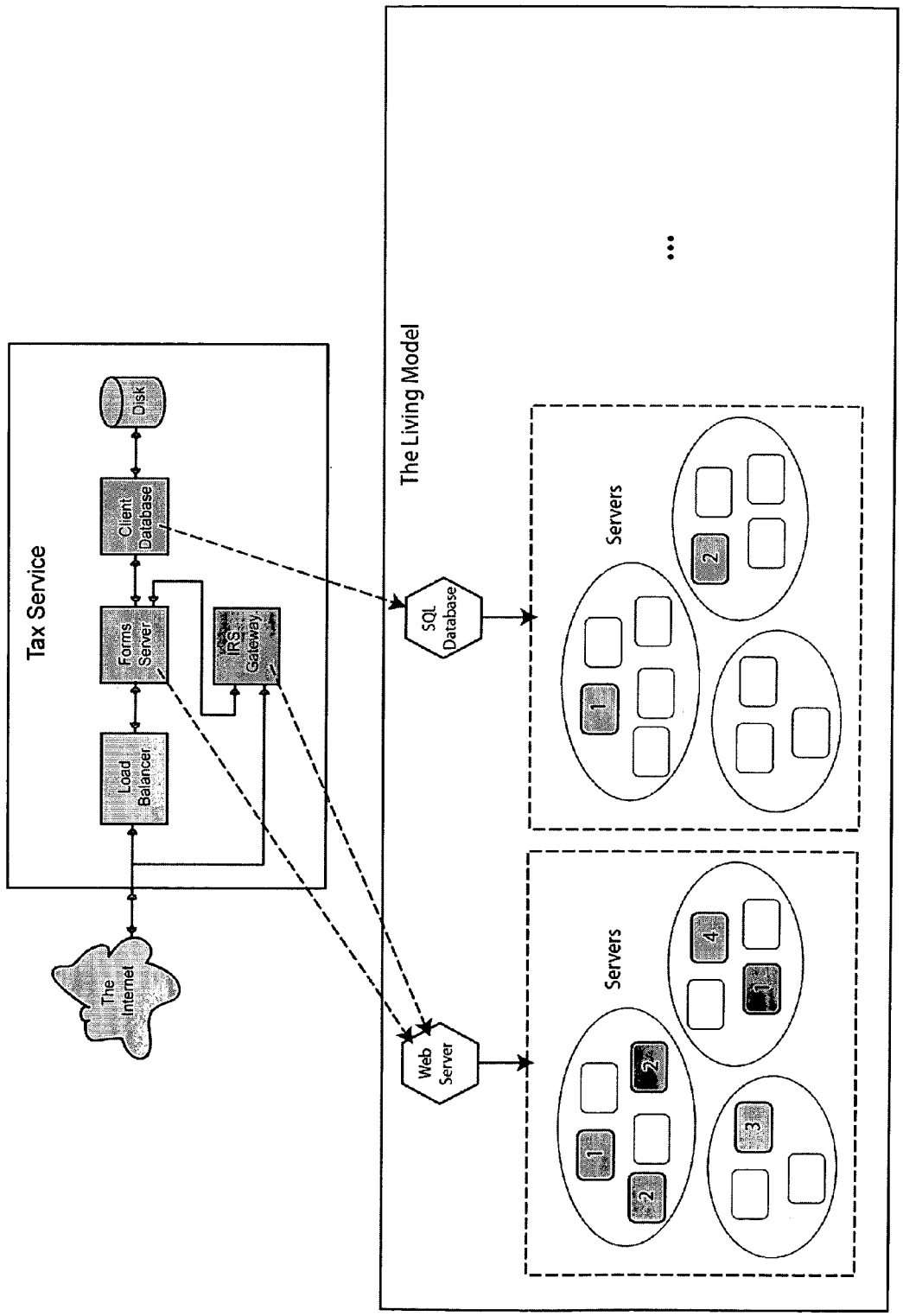
FIG. 115 illustrates an example of resource virtualization.
Figure 116:
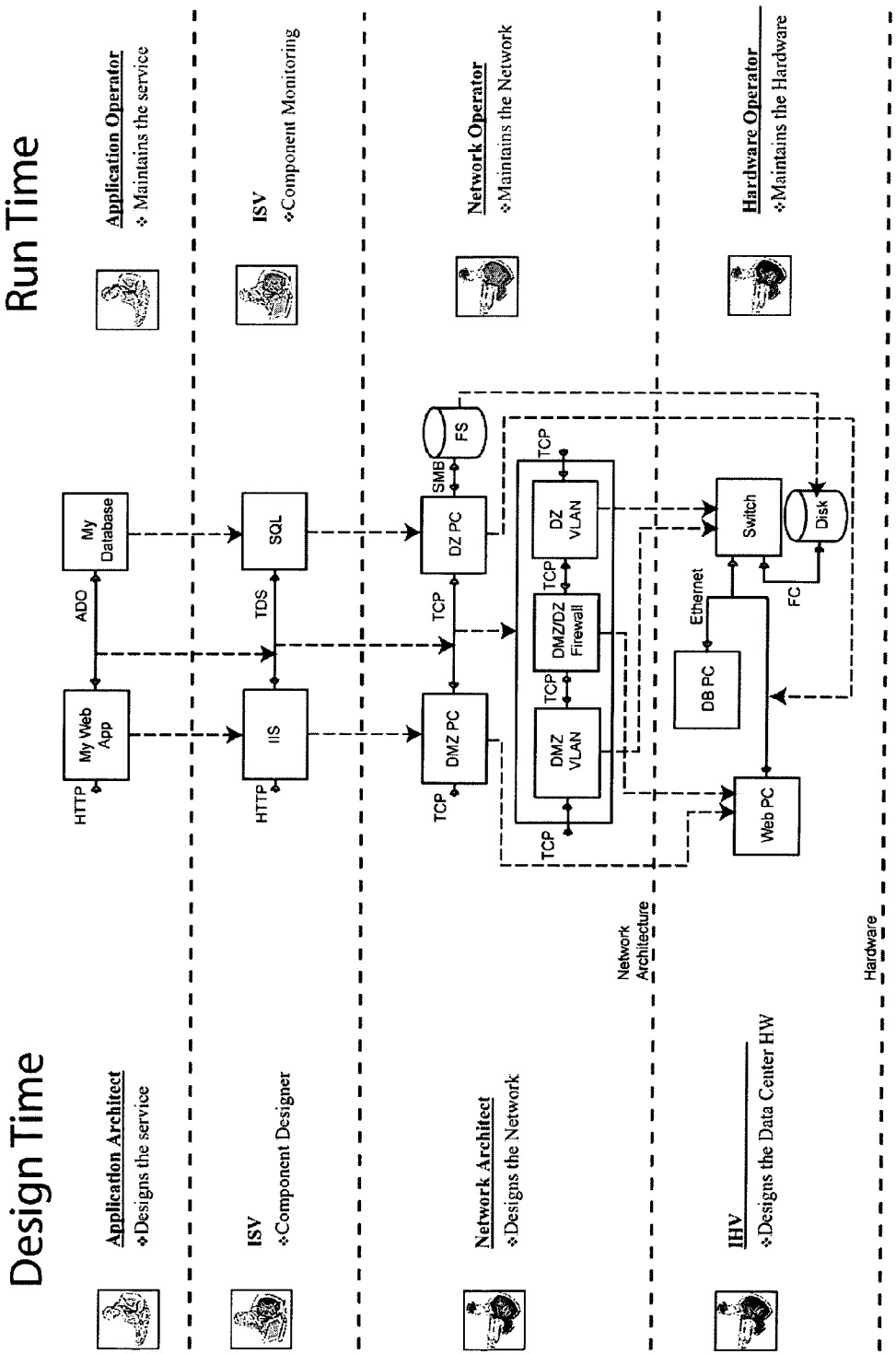
FIG. 116 illustrates example programming operations logic.

What is a Summit Computer?
An agile pool of virtualized hardware resources
Servers, Storage, Network Devices, Managed Fabrics.
Few dozen to few thousand servers.
Assembled from existing HW or ordered as one SKU from OEM.
A single managed entity
Summit provisions and manages all HW resources w/in Summit Computer.
Summit owns complete configuration of internal network fabrics.
A bounded domain of control
Standardized topology bounds complexity of build, test, and operations.
Ownership unchanged for resources outside the Summit Computer.
A catalyst for software innovation
Q: What data center environments should I target for my server application?
A: The Summit Computer.
Just like Win3 let ISVs forget about details of printers and graphics cards.
A catalyst for hardware innovation
Microsoft engaged with major hardware vendors to define a reference platform.
First specs & innovations to appear at WinHEC (May 2003).
Summit provides SW environment for aggregation innovations:
Dense blades, Smart racks, etc.
Summit enables simplification of hardware, for example allows:
Drop KVM from servers and human interfaces from network devices.
FIG. 114 illustrates example resource managers.
Resource Virtualization—the bridge between the SDM and component instances. Responsible for sharing, allocating, and recovery. See FIG. 115.
Server Resource Virtualization—Automated Deployment Services (ADS) in Windows Server 2003.
Complete infrastructure for rapidly purposing and re-purposing Windows Servers
Imaging tools to capture and edit both Windows 2000 and Windows Server 2003 images
Secure, remote deployment framework enabling zero touch server builds from bare metal
A framework for mass server administration
Secure, reliable, script execution infrastructure
Programmatic model of your Windows datacenter
A persistent log of all administrative activities
Graphical and Programmatic interfaces
Simple MMC UI for GUI-based operation
Full functionality exposed through command line tools and/or WMI layer Key Benefits of ADS
1. Lower the TCO associated with bare metal server builds and script-based administration
   Enable zero-touch server builds from bare metal
   Secure script based administration of 1000 servers as easily as 1
2. Improve the consistency, security and scalability of your Windows Server datacenter
   Encode operational best practices and eliminate human error
   Maintain a persistent store of all administrative activities
   Centrally perform secure, script-based administration of your entire
   Windows datacenter
   Rapidly change server role in response to changes in workload requirements
3. Leverage your existing server administration investments
   Extend and enhance your existing script-based automation methodologies Operational Automation—Core Tenents of Automation
Flexible framework to enable capture and re-use of operational best practices
Operations Logic
Rich context within which to automate
Events are contextualized by the SDM to enable true automation of systems management
"Which application will be effected by the NIC that dies on the 5th DL380 in rack 22?"
Transact-able
Compensation based model allows rollback and un-do Operations Logic—a Framework for Developer and Operator Automation.
What is operations logic?
Encoded operations processes that are long-lived, highly-available and durable
Leverages the SDM for context and control of Summit computer resources
Enables operators to vary the level of automation in a system
Benefits for the developer
Allows the developer to capture how the system should respond to and resolve application events and messages (such as return codes)
Enables Microsoft and the ISV community to provide standard, predefined operational processes that the developer can use or extend
Deploy, upgrade, scale-out and remove resources
Benefits for the ITPro or Operator
Enables easy re-use of proven operational best practices for the data center Operational Automation—programming operations logic. See FIG. 116.

Figure 117:
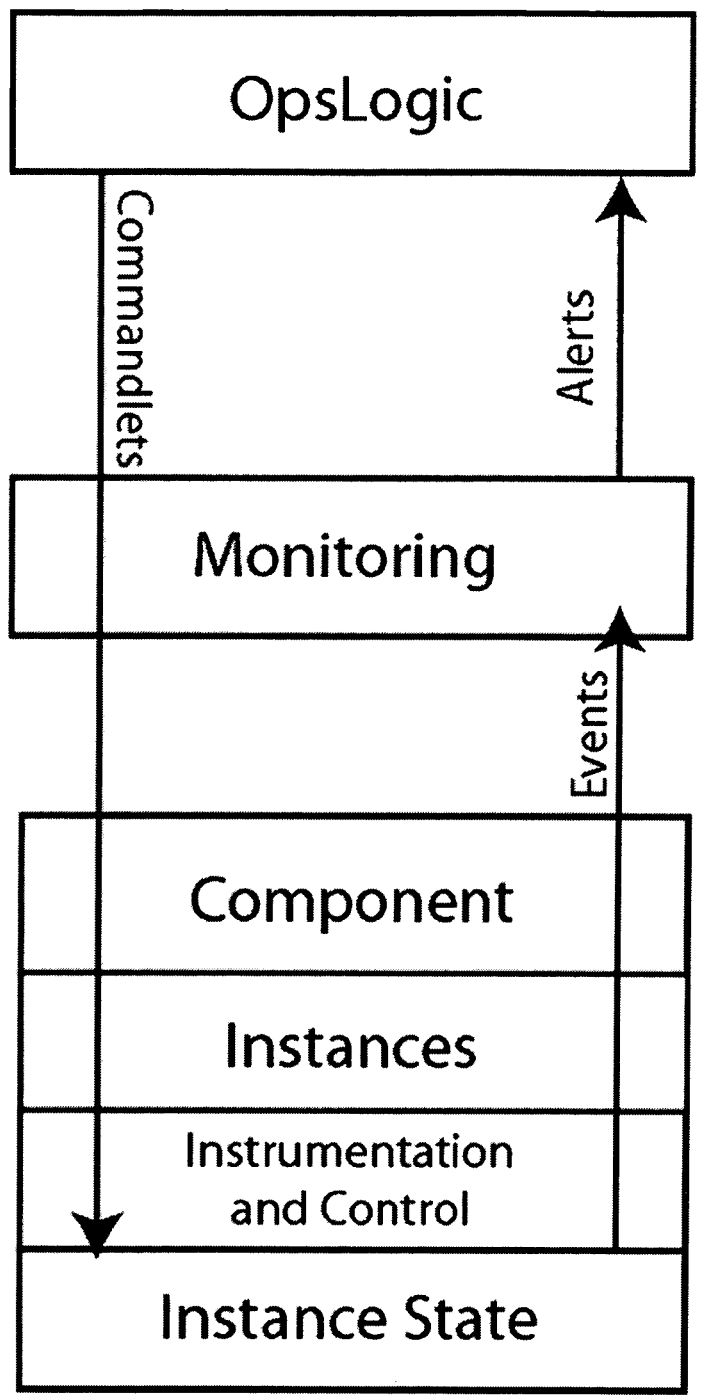
FIG. 117 illustrates example interaction with operations logic.

How the SDM Interacts with Operations Logic:
Events are annotated to indicate instance and component information
The monitoring subsystem does time-based event correlation
Alerts are a roll-up of events
   Greater semantic meaning
Commandlets are,
   The set of management commands exposed by a component
   Are self-describing
   Can be used directly within a shell
   Can have a GUI forms representation
   Can provide a "man-page" for use by operators See FIG. 117.

Figure 118:
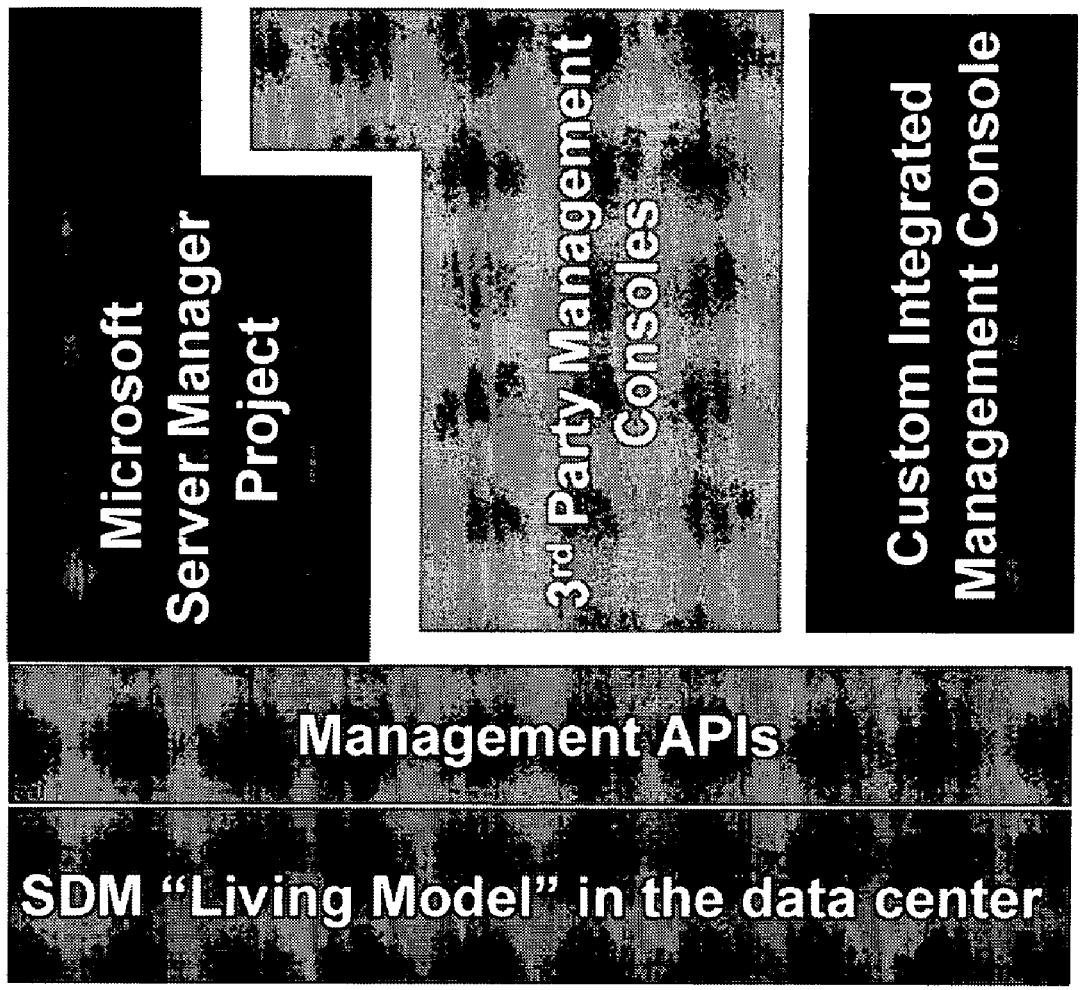
FIGS. 118–119 illustrate an example of managing heterogeneous environments.
Figure 119:
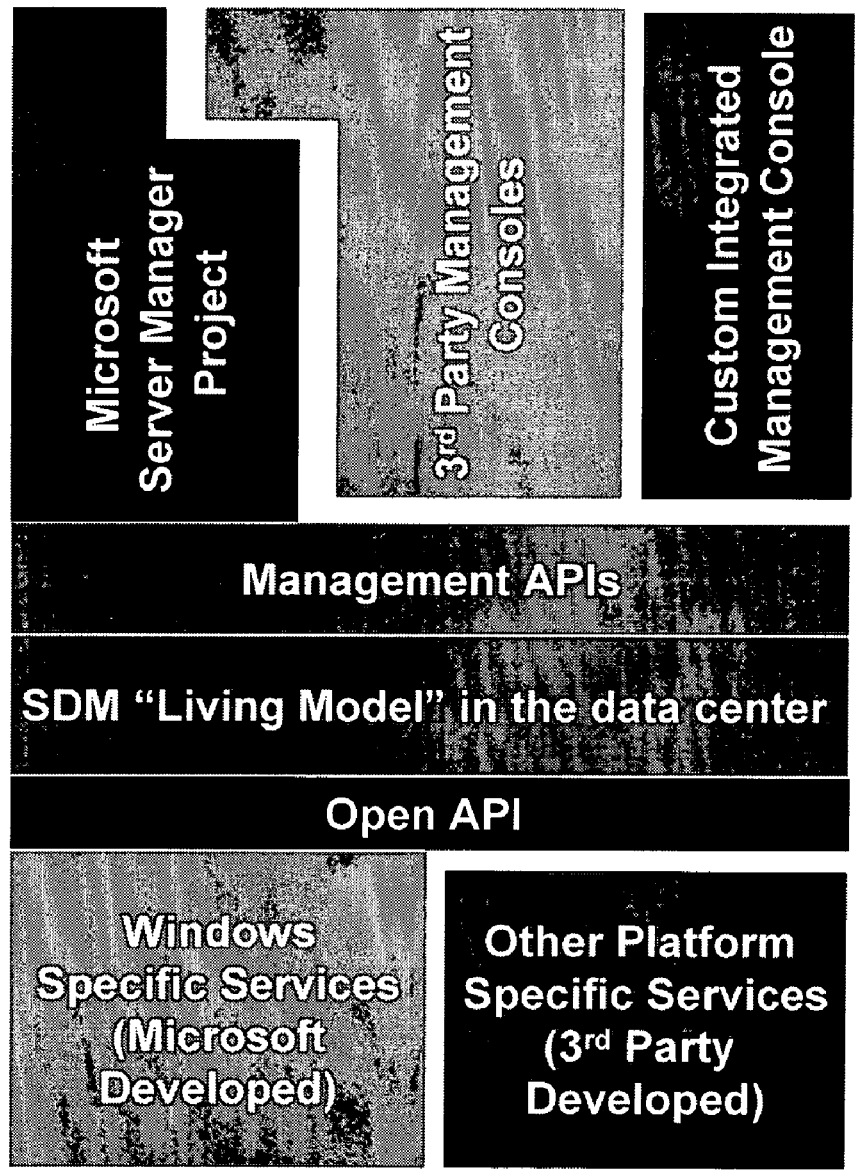

Operational Automation—Transact-Able.
Transactions are essential to support fault-tolerant operations
   Example: Adding a web service
   Powerful extension to ad-hoc shell scripts
All forms of Operations Logic function under the auspices of a transaction model
   Compensation-based
   Durable
Using orchestration, transactions can span multiple machines
Management APIs and Solutions—Leveraging the Richness of the SDM.
Visualization occurs through the SDM
   3rd party consoles can pull information directly from the SDM or
   leverage platform know-how of the Microsoft management solutions
   Microsoft will build an SDM-based management console for the data center
   Customer could create custom consoles via the SDM See FIG. 118.

Industry Wide Initiatives—Unleashing IHV, ISV, SI Innovation.
IHV HW reference platform specification
   Working closely with major OEMs and switch manufacturers
   Targeting release at WinHEC (May '03)
   Drive new compelling features into future HW offerings
Engage key 3rd party ISVs
   Create application components for Visual Studio
   Resource managers for their applications within the SDM
   Mgmt ISVs to create SDM based management consoles
Work with SIs as both customers and partners
   Customer
      Dramatically lower their operational costs
   Partner
      Create innovative new service offerings on this platform
      Capitalize on operations expertise→develop Operations Logic Major Customer Benefits: provide choice and create the most economical, manageable platform for the data center.

Industry wide initiatives—extending the richness of the SDM to heterogeneous environments. Developing heterogeneous SDM applications using Visual Studio (enables development of SDM applications for Windows) or $3^{rd}$ party tools (enable development of SDM applications for other platforms).

CONCLUSION

Although the invention has been described in language specific to structural features and/or methodological acts, it is to be understood that the invention defined in the exemplary appended claims is not limited to the specific features or acts described. Rather, the specific features and acts are disclosed as exemplary forms of implementing the claimed invention. Moreover, these claims are exemplary in terms of scope and subject matter. Many other combinations and sub-combinations of the features described herein may later be claimed in patent applications claiming priority to this application.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. One or more computer readable media having stored thereon a plurality of instructions that, when executed by one or more processors, causes the one or more processors to:
   facilitate design of a virtual data center and a distributed application;
   logically place parts of the distributed application onto the virtual data center; and
   determine whether the placement of the parts of the distributed application is valid.

2. One or more computer readable media of claim 1 wherein the one or more processors further generate a warning message if the placement of the parts of the distributed application is not valid.

3. One or more computer readable media of claim 1 wherein the one or more processors further implement a physical data center based on the virtual data center.

4. One or more computer readable media of claim 1 wherein the one or more processors further allocate resources of the virtual data center to support the distributed application.

5. An apparatus comprising:
   a first application to facilitate design of a virtual data center and a distributed application;
   a second application to logically place parts of the distributed application onto the virtual data center; and
   a third application to determine whether the placement of the parts of the distributed application is valid.

6. The apparatus of claim 5 further comprising a fourth application to generate a warning message if the placement of the parts of the distributed application is not valid.

7. The apparatus of claim 5 further comprising a fourth application to implement a physical data center based on the virtual data center.

8. The apparatus of claim 5 further comprising a fourth application to allocate resources of the virtual data center to support the distributed application.

9. A method comprising:
   providing a first software layer for tools used to convert machines into servers used in the distributed computing system;

providing a second software layer for network management and virtual topology generation of distributed applications;

providing a third software layer to maintain a physical model of the distributed computing system;

providing a fourth software layer to facilitate allocation of logical resources requested by the distributed application;

providing a fifth software layer for a service definition model (SDM) that provides a namespace and context for describing operations processes and an API for application introspection and control of application resources; and providing a sixth software layer to define reusable building blocks of a distributed application, which use the SDM APIs for context, naming, and binding; and providing a seventh software layer for operational management of the distributed application.

* * * * *